(12) United States Patent
Kelly-Morgan et al.

(10) Patent No.: US 11,095,129 B2
(45) Date of Patent: Aug. 17, 2021

(54) CAPACITOR BASED POWER SYSTEM AND UNMANNED VEHICLE WITH THE CAPACITOR BASED POWER SYSTEM THEREOF

(71) Applicant: Capacitor Sciences Incorporated, Menlo Park, CA (US)

(72) Inventors: Ian Kelly-Morgan, San Francisco, CA (US); Pavel Ivan Lazarev, Menlo Park, CA (US)

(73) Assignee: CAPACITOR SCIENCES INCORPORATED, Menlo Park, CA (US)

( * ) Notice: Subject to any disclaimer, the term of this patent is extended or adjusted under 35 U.S.C. 154(b) by 737 days.

(21) Appl. No.: 15/849,411

(22) Filed: Dec. 20, 2017

(65) Prior Publication Data

US 2018/0205242 A1    Jul. 19, 2018

Related U.S. Application Data

(63) Continuation-in-part of application No. 15/043,315, filed on Feb. 12, 2016, now Pat. No. 10,305,295.

(51) Int. Cl.
*H02J 7/00* (2006.01)
*H01G 4/14* (2006.01)
(Continued)

(52) U.S. Cl.
CPC .......... *H02J 7/0021* (2013.01); *B64C 39/024* (2013.01); *B64D 27/24* (2013.01);
(Continued)

(58) Field of Classification Search
CPC ........ H02J 7/0021; H02J 7/345; H01G 4/005; H01G 4/14; H01G 4/228; H01G 4/18; Y02T 50/40; Y02T 50/60; B64C 2201/042; B64C 2201/128; B64C 2201/027; B64C 2201/108; B64C 2201/165; B64C 39/024; H02M 3/1582; H02M 3/156; B64D 2221/00; Y02E 60/13
See application file for complete search history.

(56) References Cited

U.S. PATENT DOCUMENTS

2006/0120020 A1 *   6/2006   Dowgiallo, Jr. ......... H01G 4/30
                                                          361/313
2009/0122386 A1 *   5/2009   Aksyuk .................. B82Y 20/00
                                                          359/291
(Continued)

*Primary Examiner* — Richard Isla
*Assistant Examiner* — Johali A Torres Ruiz
(74) *Attorney, Agent, or Firm* — BCF LLP

(57) ABSTRACT

The present disclosure provides an unmanned vehicle comprising a device to be powered; a capacitor energy storage system (CESS) and controller board for at least temporarily powering and operating the device to powered. Further, the CESS includes one or more metacapacitors as an energy storage medium. Additionally, the disclosure provides a capacitor energy storage cell composed of the at least one metacapacitor and a DC-voltage conversion device, where the output voltage of the metacapacitor is the input voltage of the DC-voltage conversion device. Still further, the CESS may be comprised of a module of said capacitor energy storage cells, or a system of modules of said capacitor energy storage cells.

20 Claims, 40 Drawing Sheets

(51) Int. Cl.
*H01G 4/005* (2006.01)
*H01G 4/228* (2006.01)
*H01G 4/18* (2006.01)
*B64C 39/02* (2006.01)
*H02M 3/158* (2006.01)
*H02M 3/156* (2006.01)
*B64D 27/24* (2006.01)
*H01G 11/56* (2013.01)
*H02J 7/34* (2006.01)
*H02K 11/00* (2016.01)

(52) U.S. Cl.
CPC ............... *H01G 4/005* (2013.01); *H01G 4/14* (2013.01); *H01G 4/18* (2013.01); *H01G 4/228* (2013.01); *H01G 11/56* (2013.01); *H02M 3/156* (2013.01); *H02M 3/1582* (2013.01); *B64C 2201/027* (2013.01); *B64C 2201/042* (2013.01); *B64C 2201/108* (2013.01); *B64C 2201/128* (2013.01); *B64C 2201/165* (2013.01); *B64D 2221/00* (2013.01); *H02J 7/345* (2013.01); *H02K 11/0094* (2013.01)

(56) References Cited

U.S. PATENT DOCUMENTS

| | | | |
|---|---|---|---|
| 2010/0315043 A1* | 12/2010 | Chau | B60L 3/0046 320/134 |
| 2012/0091257 A1* | 4/2012 | Wolff | B64C 29/0033 244/12.4 |
| 2012/0274145 A1* | 11/2012 | Taddeo | H02J 2207/20 307/82 |
| 2013/0187475 A1* | 7/2013 | Vendik | H02J 50/05 307/104 |
| 2013/0194716 A1* | 8/2013 | Holme | H01G 4/1209 361/301.4 |
| 2015/0041598 A1* | 2/2015 | Nugent | B64C 39/024 244/53 R |
| 2016/0035855 A1* | 2/2016 | Marks | H01L 51/0545 257/40 |
| 2016/0257401 A1* | 9/2016 | Buchmueller | G01C 21/3423 |

* cited by examiner

CAPACITOR BASED POWER SYSTEM AND UNMANNED VEHICLE WITH THE CAPACITOR BASED POWER SYSTEM THEREOF

CLAIM OF PRIORITY

This application is a continuation-in-part of U.S. patent application Ser. No. 15/043,315 filed Feb. 12, 2016, the entire contents of which are incorporated herein by reference.

FIELD OF THE DISCLOSURE

The disclosure relates to an unmanned aerial vehicle having a capacitor energy storage system (CESS) and optionally a connector interface and controller board, the controller board being connected to the CESS, the CESS can discharge and charge through the connector interface, and a DC-voltage conversion device capable of down stepping and up stepping voltage discharge of said CESS to power the controller board and other optional subsystems. An electronic switch can control the power-on and -off of the CESS, thereby avoiding the generation of sparks during the power on process and allowing for the normal use of the capacitor storage unit and the safety of the vehicle.

BACKGROUND

Unmanned vehicles such as unmanned aerial vehicles (UAVs) can be used for performing surveillance, reconnaissance, aerial video and photography, wireless communication signals, exploration tasks for military and civilian applications, and recreational and professional videography. Such unmanned vehicles typically include a propulsion system for remote controlled or autonomous movement with the surrounding environment. For example, the unmanned vehicles may have a CESS that powers a device of the unmanned vehicle, such as the propulsion system.

Existing systems of powering unmanned vehicles, however, can be less than ideal. For example, batteries traditionally used in UAV's can lack high energy storage capacity for extended aerial operation, and lack high power density. Due to the internal resistance and material degradation inherent in batteries, advanced battery management systems have been developed to improve battery cycle life, increase the rate of charging, manage temperature, etc. as described in U.S. patent application Ser. No. 14/262,478. Additionally, rapid battery swapping mechanisms have been developed, as described in US patent application PCT/US2015/032240 filed May 22, 2015; to aid operators in quickly redeploying a UAV with fully charged batteries and minimize operational interruption from slowly recharging one battery pack out in the field. Further, existing capacitor technology is generally considered to have significant deficiencies for energy storage or power systems for unmanned vehicles. Capacitors do not produce constant voltage during discharge and generally have low energy density (watt-hours/kilogram). Traditionally, capacitors also lack an indicator for an energy or CESS level. Additionally, use of a CESS system for unmanned vehicles creates a need for a safe and convenient charging or replacement system for the CESS system.

Traditionally rechargeable electrical energy storage systems are based on rechargeable batteries. Rechargeable batteries store and release electrical energy through electrochemical reactions. Emergence of varied uses of unmanned aerial vehicles are driving the technology to reduce cost, weight, and size, and increase lifetime. Such an application often uses rechargeable batteries in conjunction with a battery management system (BMS) that monitors battery parameters such as voltage, current, temperature, state of charge, and state of discharge and protects against operating the battery outside its safe operating ranges. Rechargeable batteries have drawbacks due to relatively large weight per unit energy stored, a tendency to self-discharge, susceptibility to damage if too deeply discharged, susceptibility to catastrophic failure if charged too deeply, limited power availability per unit weight, limited power availability per unit energy, relatively long charging times, and degradation of storage capacity as the number of charge-discharge cycles increases.

Alternatives to batteries for rechargeable energy storage include capacitor-based systems. However, due to cost and energy per unit volume limitations in traditional supercapacitors, they have not been practical for UAVs operating over long time frames. Film capacitors store energy in the form of an electrostatic field between a pair of electrodes separated by a dielectric layer. When a voltage is applied between two electrodes, an electric field is present in the dielectric layer. Unlike batteries, capacitors can be charged relatively quickly, can be deeply discharged without suffering damage, and can undergo a large number of charge discharge cycles without damage. Despite improvements in capacitor technology, including the development of ultracapacitors or supercapacitors, rechargeable batteries store more energy per unit volume. One drawback of capacitors compared to batteries is that the terminal voltage drops rapidly during discharge. By contrast, battery systems tend to have a terminal voltage that does not decline rapidly until nearly exhausted. Also, because the energy stored on a capacitor increases with the square of the voltage for linear dielectrics and at a power greater-than or equal to 2 for metadielectrics, capacitors for energy storage applications may operate at much higher voltages than batteries.

Further, energy is lost if constant current mode is not used during charge and discharge. These characteristics complicate the design of power electronics for use with metacapacitors and differentiate a metacapacitor management system from battery management systems that are presently in use.

It is within this context that aspects of the present disclosure arise.

INTRODUCTION

Aspects of the present disclosure address problems with conventional rechargeable electrical energy storage technology in unmanned aerial vehicles by combining a capacitive energy storage device having one or metacapacitors with a DC-voltage conversion device having one or more switch mode voltage converters coupled to the terminals of the capacitive energy storage device. Metacapacitors have greater energy storage capacity than conventional ultracapacitors or supercapacitors. The DC-voltage conversion device regulates the voltage on the capacitive energy storage device during charging and discharging.

A voltage conversion device typically includes a voltage source (an input), one or more active or passively controlled switches, one or more inductive elements (some advanced converters, e.g., charge-pump circuits, do not specifically use inductors per se though there may be parasitic inductance in the circuit board and/or wiring), one or more energy storage elements (e.g., capacitors and/or inductors), some way of sensing output voltage and/or current, and some way of controlling the switches to create a specific output voltage or current, and terminals to connect this device to external inputs and outputs such as various loads. A standard circuit for producing an output voltage $V_{out}$ that is less than the input voltage $V_{in}$ ($V_{out}/V_{in}<1$) is called a buck converter, and a standard circuit for producing an output voltage that is greater than the input voltage ($V_{out}/V_{in}>1$) is called a boost converter. The basic circuit often used to describe buck conversion is a switched LC filter (FIG. 1). The load can be thought of as a resistor that will vary its resistance to achieve a set current moving through it. Effectively, this is an LCR low-pass filter, with the capacitor and resistor in parallel. When the switch is closed, the LC network begins to absorb energy, and current begins to flow through the inductor. However, when the switch is opened while current is flowing, the inductor will attempt to maintain the current i(t) and will generate reverse voltage v(t) following equation (I).

$$v(t) = L \frac{di(t)}{dt}, \qquad (I)$$

The reverse voltage generated will be extremely high if the incremental change in current di occurs over a sufficiently short increment of time dt, and this may damage or destroy the switching element SW1. Therefore, it is necessary to provide a path to ground so that current can continue to flow. This path can be implemented with a diode that operates as a one-way valve, opening automatically when the inductor tries to pull current out of the switching element SW1 (see FIG. 2). This is called a non-synchronous buck converter, because the diode is automatically synchronized with the switching of a power transistor, such as a metal oxide semiconductor field effect transistor (MOSFET). Such a converter does not need to be actively synchronized. A possible issue with this type of circuit is that the turn-on voltage of the diode needs to be reached and be maintained while the switching element SW1 is turned off and the diode is active. This means that there will always be a voltage drop of, e.g., ~0.6V across the diode due to current flowing through it, and therefore a power loss. This can be improved by implementing a synchronous converter design, where the diode is replaced with a second switch SW2 (see FIG. 3) and the controller actively synchronizes the activity of both switches such that they are never on at the same time.

The delay between turn-off and turn-on of the MOSFETs in a synchronous design needs to ensure that a shoot-through event does not occur. Although two separate pulses can be set up with a delay, a better solution would only need a single pulse width modulation (PWM) channel set up and automatically derive the second signal. With a little bit of thought, this can be achieved using digital buffers (or inverters) to introduce a time delay into the switching signals applied to the switches SW1 and SW2 shown in FIG. 3. Typical gates have 2-10 ns propagation delay, but programmable logic devices such as a complex programmable logic device (CPLD) or field programmable gate array (FPGA) can be programmed with variable propagation delay. FIG. 4 demonstrates the signal treatment required to generate a pair of signals, S' and !S&&!S" correspondingly to switches SW1, SW2 with the required time delay spacing, with the only inputs being a pulse-width modulated signal, S, and a time delay, $t_{delay}$. S'(t)=S(t+$t_{delay}$) and S"(t)=S(t+ 2*$t_{delay}$). In FIG. 4, it is assumed that a switch is "closed", e.g., conducting, when the switching signal is high and "open", e.g., non-conducting when the switching signal is low. In FIG. 4, S is an input PWM input signal. S' is the input signal S delayed by $t_{delay}$. S" is S' delayed by 2*$t_{delay}$, !S is the inverse of the input signal S, !S" is the inverse of signal S", and !S&&!S" is the logical AND of !S with !S".

When deciding between synchronous or non-synchronous it is important to consider the efficiency losses due to switching (e.g., energy needed to move charge on and off the gate of a MOSFET) and those due to conduction through the diode. Synchronous converters tend to have an advantage in high-ratio conversion. They are also a fundamental building block of the split-pi-bidirectional converter because the extra switches are needed to provide dual-purpose buck or boost.

In the off-state, the boost converter delivers the supply voltage directly to the load through the second switch element SW2 in FIG. 5. The process of increasing the voltage to the load is started by opening the switching element SW2 and closing the switching element SW1 (FIG. 6). Due to the additional voltage drop on inductor L1, current flowing through inductor L1 will increase over time (see, equation (II)).

$$i(t) - i(t_0) = \frac{1}{L1} \int_{t_0}^{t} v(t) dt, \qquad (II)$$

When the circuit is returned to the "OFF" state, the inductor will attempt to maintain the same current that it had before by increasing its voltage drop proportional to the change in current (see, equation (III)).

$$v(t) = L1 \frac{di(t)}{dt}, \qquad (III)$$

In the "off state" the switching element SW2 is closed so that this increased voltage gets translated to the output capacitor. The output capacitor provides filtering; averaging between $V_{in}$ and the inductor's voltage spikes.

N-channel MOSFET (NMOS), P-channel MOSFET (PMOS), and push-pull complementary metal oxide semiconductor (CMOS) topologies of a stacked MOSFET for fully integrated implementations in Honeywell's 150 nm SOI Radiation Hardened process described in following paper (J. E. Founds, H. L. Hess, E. J. Mentze, K. M. Buck, M. E. Richardson, "High Voltage Switching Circuit for Nanometer Scale CMOS Technologies," 13th NASA Symposium on VLSI Design, June 2007.), which is incorporated herein by reference. The stacked MOSFET is a high-voltage switching circuit. A low-voltage input signal turns on the first MOSFET in a stack of MOSFET devices, and the entire stack of devices is turned on by charge injection through parasitic and inserted capacitances. Voltage division provides both static and dynamic voltage balancing, preventing any device in the circuit from exceeding its nominal operating voltage. The design equations for these topologies are presented. Simulations for a five device stack implemented in Honeywell's 150 nm process verify the static and dynamic voltage balancing of the output signal. The simulated stack is shown to handle five times the nominal operating voltage.

An example of a reliable circuit configuration for stacking power metal-oxide semiconductor field effect transistors (MOSFETs) is described, e.g., in R. J. Baker and B. P. Johnson, "Stacking Power MOSFETs for Use in High Speed Instrumentation", Rev. Sci. Instrum., Vol. 63, No. 12, December 1992, pp. 799-801, which is incorporated herein by reference. The resulting circuit has a hold off voltage N times larger than a single power MOSFET, where N is the number of power MOSFETs used. The capability to switch higher voltages and thus greater amounts of power, into a 50Ω load, in approximately the same time as a single device is realized. Design considerations are presented for selecting a power MOSFET. Using the design method presented, a 1.4 kV pulse generator, into SO 50Ω, with a 2 ns rise time and negligible jitter is designed.

Another voltage switching circuit configuration is based on an Integrated Gate-Commutated Thyristor (IGCT). The integration of a 10-kV-IGCT and a fast diode in one press pack is an attractive solution for Medium Voltage Converters in a voltage range of 6 kV-7.2 kV if the converter power rating does not exceed about 5-6MVA. (see, Sven Tschirley et al., "Design and Characteristics of Reverse Conducting 10-kV-IGCTs", *Proceedings of the 39th annual Power Electronics Specialist Conference*, pages 92-98, 2008, which is incorporated herein by reference). Tschirley et al. describe the design and characterization of the world's first reverse conducting 68 mm 10-kV-IGCTs. On-state-, blocking and switching behavior of different IGCT and diode samples are investigated experimentally. The experimental results clearly show, that 10-kV-RC-IGCTs are an attractive power semiconductor for 6-7.2 kV Medium Voltage Converters.

The physical characteristics of the dielectric material in the capacitor are the primary determining factors for the performance of a capacitor. Accordingly, improvements in one or more of the physical properties of the dielectric material in a capacitor can result in corresponding performance improvements in the capacitor component, usually resulting in performance and lifetime enhancements of the electronics system or product in which it is embedded. Since improvements in capacitor dielectric can directly influence product size, product reliability, and product efficiency, there is a high value associated with such improvements.

Compared to batteries, capacitors are able to store energy with very high power density, e.g. charge/recharge rates, have long shelf life with little degradation, and can be charged and discharged (cycled) hundreds of thousands or millions of times. However, capacitors often do not store energy in small volume or weight as in case of a battery, or at low energy storage cost, which makes capacitors impractical for mass produced aerial vehicles. Accordingly, it may be an advance in energy storage technology to provide capacitors of higher volumetric and gravimetric energy storage density and lower cost.

SUMMARY

A need exists for a power supply system for unmanned vehicles that incorporates advantages of capacitors (e.g. cycling lifetime, quick charging/recharging, and high power density) while minimizing a capacitor's disadvantages (e.g. non-linear voltage discharge and low specific energy). Previously described unmanned vehicle power supply systems use batteries or battery packs that often incorporate battery management systems to manage the complexity of safely operating lithium type batteries (see U.S. patent application Ser. No. 14/262,478 filed on Apr. 25, 2014, which is incorporated by reference herein). Further, due to the internal resistance of batteries power supply systems in unmanned vehicles often suffer from low power density and hinders the unmanned vehicles from operating in harsh environments such as high winds and low and high temperatures.

Aspects of the present disclosure address problems with conventional unmanned vehicles with rechargeable electrical energy storage technology by combining a capacitor energy storage device having one or more metacapacitors coupled with a DC-voltage conversion device having one or more switch mode voltage converters coupled to the terminals of the capacitive energy storage device. Examples of such capacitive energy storage devices are described and incorporated in its entirety herein in U.S. patent application Ser. No. 15/043,315, Published as U.S. Patent Application Publication Number 20170237271 (attorney docket number CSI-024) filed Feb. 12, 2016. Metacapacitors have greater energy storage capacity than conventional ultracapacitors or supercapacitors. The DC-voltage conversion device regulates the voltage on the capacitive energy storage device during charging and discharging.

The individual metacapacitors are comprised of a first electrode and a second electrode separated by a layer of metadielectric material with a relative permittivity greater than or equal to 1000 and a resistivity between $10^{15}$ Ω·cm and $10^{24}$ Ω·cm. The metadielectric material can have a constant breakdown field ($E_{bd}$) strength between 0.01 V/nm and 8.0 V/nm. Additionally, capacitor energy storage devices comprised of aforementioned metacapacitors in some embodiments may have gravimetric energy densities greater than or equal to 130 Wh/kg, 260 Wh/kg, 520 Wh/kg, 780 Wh/kg, 1300 Wh/kg, or 2.6 kWh/kg.

Metadielectric layers maybe comprised of so-called Sharp polymers (as described in U.S. patent application Ser. Nos. 15/043,247 and 14/919,337), YanLi Polymers (as described in U.S. patent application Ser. Nos. 15/449,587 and 15/710,587, Furuta polymers (as described in U.S. patent application Ser. No. 15/043,186), para-Furuta polymers (as described in U.S. patent application Ser. No. 15/043,209), Non-Linear Static Dielectrics (as described in U.S. patent application Ser. Nos. 15/090,509 and 15/163,595), Electro-Polarizable compounds (as described in U.S. patent application Ser. No. 15/469,126), or any combination thereof; which are incorporated herein by reference, and are herein referred to as polarizable materials.

In some embodiments, the layer of metadielectric material may be comprised of liquid crystal derived structures, and said liquid crystal derived structures are comprised of supramolecular structures of polarizable compounds. The liquid crystal derived structures may include nematic type structures, chematic type structures, chiral nematic type structures, lyotropic type structures, or any combination thereof. In some embodiments the lyotropic type structures may be preferentially lamellar and micelle structures.

Said supramolecular structures of polarizable compounds may be comprised of composite organic molecules with one or more enhanced polarizable fragments, and electrically resistive substituents that reduces the electrical interaction of the enhanced polarizable fragments from other supramolecular structures of polarizable compounds in said metadielectric material. Said polarization may include non-linear polarization, hyperpolarization, ionic polarization, electronic polarization, or any combination thereof. Further, said polarizable fragments demonstrating hyperpolarizablity or non-linear effects may be non-centrosymmetric due to positioning of one or more electrophilic groups, one or more nucleophilic groups, conjugated rings systems (such as phenyl groups, naphthyl groups, anthryl groups), or any combination thereof.

The present disclosure provides an unmanned vehicle comprising a propulsion unit to be powered, a device to be powered and a capacitor energy storage system (CESS). The capacitor energy storage system assembly is comprised of one or more capacitor energy storage modules (CESM and modules herein), wherein embodiments with a plurality of CESM are networked in parallel. Further, the capacitor energy storage system is comprised of an interconnection system, a system controller, a system power meter, and power switches connected to each module. Further still, the CESS is adapted to power the unmanned vehicle.

Each CESM is comprised of one or more capacitor energy storage cells (CESC and cells herein). In one aspect, a capacitor energy storage module may include one or more individual capacitor energy storage cells and one or more power buses consisting of an interconnection system, wherein a power bus connects the power ports of the individual cells in parallel or series or any combination thereof, to create common module power ports consisting of common anode(s) and common cathode(s) of the module. The module may have additional sensors to monitor temperature, module power, voltage and current of the module's interconnection system, and may include a communication bus and/or communication bus protocol translator to convey these sensor values as well as the values from the individual cells.

Cells are comprised of a capacitor energy storage device (CESD) coupled with a DC-voltage control device. A CESD is comprised of one or more metacapacitors connected in parallel, series, or any combination thereof. The DC-voltage conversion device may have one or more switch mode voltage converters. The CESD is configured to have a power port (consisting of a positive terminal and a negative terminal, or anode and cathode) to connect the capacitor-side power port on the DC-voltage conversion device. The DC-voltage conversion device has one or more other power ports, which may interface to external circuitry. The power ports are intended to convey power with associated current and voltage commiserate to the specification for the cell. Each terminal in the port is a conductive interface. Each cell may include means to monitor and/or control parameters such as voltage, current, temperature, and other important aspects of the DC-voltage conversion device.

Further, the one or more cells may comprise a thermal management system (TMS) capable of communicating with a module control node, monitoring each cell's temperature, and cooling the one or more cells. The TMS being comprised of a cooling mechanism in thermal contact with the one or more CESD, a temperature sensor, and a communication system.

In another aspect, a capacitor energy storage system includes one or more of the aforementioned capacitor energy storage modules, an interconnection system and a system control computer that monitors, processes, and controls all the values on the aforementioned communication bus.

In yet another aspect, the CESS adapted to power an unmanned vehicle may be configured to discharge through a connector interface to power a propulsion unit of the unmanned vehicle. In some embodiments, the propulsion unit may include one or more rotors with rotatable blades and electric motors and drivers for speed control, and wherein the CESS causes rotation of the rotors including the blades via powering the electric motors, thereby generating a lift for an unmanned aerial vehicle (UAV).

Additionally, the CESS adapted to power an unmanned vehicle may be configured to discharge through the connector interface and voltage converter to power a controller board, sensors, an external communication system, a navigation board, an inertial measurement unit, or any combination thereof. The controller board may be linked to and configured to receive performance data from the CESS and send control commands to the CESS. Further, the controller board in some embodiments may be linked to and configured to receive and send data from and to the one or more motor drivers, the external communication system, the sensors, or any combination thereof for processing and controlling the unmanned vehicle. Additionally, the controller board may be linked to and configured to receive data from the navigation board and inertial measurement unit for processing and controlling the unmanned vehicle. The controller board may be electrically connected to an electronic switch and an input device for controlling a power-on or a power-off of the controller board and CESS.

The electronic switch may utilize solid state electronics. In some implementations, the electronic switch does not include any devices with moving parts. The electronic switch may be based on silicon (Si) insulated-gate bipolar transistors (IGBTs), silicon carbide (SiC) metal oxide semiconductor field effect transistors (MOSFETs), gallium nitride (GaN) MOSFETs, Graphene or organic molecular switches.

In some embodiments, the system may further comprise a power meter in communication with an indication device through the controller board, the power meter being electrically connected to the one or more modules and configured to calculate a level of charge of the system, and the indication device being electrically connected to the controller board and configured to indicate a percentage of the remaining charge of the individual modules and system as a whole. The power meter, in some embodiments, may comprise a voltmeter measuring potential drop across the one or more modules and calculating additive totals for the system. The level of charge of the CESS may be calculated based on the potential difference between the common anodes and cathodes of the one or more modules. Alternatively, the level of charge of the CESS is calculated based on measurement of a current collector measuring current over time, and is electrically connected to the common anodes and cathodes of the CESS. Optionally, the indication device may comprise a plurality of indicator lights and the number of simultaneously-lit indicator lights may correspond to a percentage of the level of charge of the CESS. Further, an interface may be provided that is configured to provide access to the level of charge of the CESS and voltage of the CESS.

The level of the charge of the capacitor energy storage system may be displayed with one or more LED lights. Activation of a first LED light may indicate that the CESS has between about 0% and about 25% power remaining. Activation of a second LED light may indicate that the CESS has between about 25% and about 50% power remaining. Activation of a third LED light may indicate that the CESS has between about 50% and about 75% power remaining. Activation of a fourth LED light may indicate that the CESS has between about 75% and about 100% power remaining.

The input device may include one of a button switch, a mechanical switch, a potentiometer, or a sensor. In some embodiments, the sensor includes at least a touch sensor, photo sensor, or audio sensor.

In some embodiments, a ratio between a weight of the controller board and the weight of the CESS is less than 1:11. In some embodiments, the CESS and controller board combined may weigh less than about 400 g. Alternatively, in some embodiments, the combined weight of all CESD in the CESS may weigh less than 400 g. Alternatively still, in some embodiments, the combined weight of all CESD in the CESS may weigh more than 400 g, for example 10 kg, 100 kg or 1000 kg. The CESS may produce a current of at least about 500 mA. The CESS, in some embodiments, may produce a current of at most 10000 A. The CESS, in some embodiments may operate at a DC bus voltage of 5V to 1800V. Combined, this provides for a power range of 2.5 W to 18 MW which corresponds to providing vertical lift for a wide range of vehicle gross weights. For example, a UAV with a mass of 5300 kg would commonly utilize about 1.4 MW of power. The UAV may be capable of flying for at least about 10 mins without recharging the CESS.

Further, in some embodiments, the CESS assembly may comprise a system controller capable of at least one of (i) controlling discharge of the CESS, (ii) calculating the level of charge of the CESS, (iii) protecting against a short circuit of the CESS, (iv) protecting against over-charge of the CESS, (vi) communicating information with an external device, (vii) balancing level of charge amongst the one or more modules. Further aspects of the disclosure may include a UAV, comprising: at least one CESS; a controller board, a voltage converter, a navigation board, an inertial measurement unit, a state of charge indication device, and an input device configured to receive a user input to switch between a plurality of operational modes associated with the UAV, said operational modes including at least one of (i) activating display of a level of charge of the CESS and (ii) turning on or turning off the CESS by turning on or off of an electronic switch in electrical communication with the CESS, (iii) a flight mode, (iv) a landing mode, (v) a take-off mode.

An aspect of the invention may include a method for managing a CESS in accordance with another aspect of the invention. The method may comprise: receiving an input signal provided by a user of the CESS; and in response to the input signal, selecting an operational mode from a plurality of operational modes associated with the CESS based at least in part one or more characteristics associated with the input signal, the plurality of operation modes including at least (i) activating display of a level of charge of the CESS and (ii) turning on or turning off the CESS by turning on or off of an electronic switch in electrical communication with the CESS.

The capacitor energy storage system (CESS) may be powered on or off without generating a spark. One or more characteristics associated with the input signal may include a length of time of the input signal. Selecting the operational modes may optionally include comparing the input signal with a predetermined signal pattern.

In some embodiments, a power supply circuit may be connected to the CESS, wherein the CESS discharges through the power supply circuit to power the unmanned aircraft, wherein the power supply circuit comprises an electronic switch, the electronic switch being electrically connected to the CESS for controlling a power-on or a power-off of the CESS.

In some embodiments, the power supply circuit may further comprise a power indication device being electrically connected to the power switch of the CESS and configured to indicate a percentage of the remaining charge of the CESS. A power measurement device may be disposed on a cell, a module, or CESS; and may comprise a voltmeter, analog parameter bus, or digital parameter bus configured to detect a voltage differential across the one or more metacapacitors and calculate the level of charge of the cell. Optionally, the indication device may comprise a plurality of indicator lights and the number of simultaneously-lit indicator lights may correspond to a percentage of the level of charge of the CESS. Furthermore, an interface may be provided that is configured to provide access to the level of charge of the cell, module, or CESS and voltage of the cell, module, or CESS.

The electronic switch may utilize solid state electronics. In some implementations, the electronic switch does not include any devices with moving parts. The electronic switch may be based on silicon (Si) insulated-gate bipolar transistors (IGBTs), silicon carbide (SiC) metal oxide semiconductor field effect transistors (MOSFETs), gallium nitride (GaN) MOSFETs, Graphene or organic molecular switches.

The level of the charge of the CESS may be displayed with one or more LED lights. Activation of a first LED light may indicate that the CESS has between 0% and about 25% power remaining. Activation of a second LED light may indicate that the CESS has between about 25% and about 50% power remaining. Activation of a third LED light may indicate that the CESS has between about 50% and 75% power remaining. Activation of a fourth LED light may indicate that the CESS has between about 75% and about 100% power remaining.

The input device may include one of a button switch, a mechanical switch, a potentiometer, or a sensor. In some embodiments, the sensor includes at least a touch sensor, photo sensor, or audio sensor.

In some embodiments, a ratio between a weight of the power supply circuit and the weight of the CESS is less than 1:11. The CESS and power supply circuit combined may weigh less than about 400 g. The CESS may produce a current of at least about 500 mA. Alternatively, in some embodiments, the weight of all the CESD in the CESS may more than 10 kg, more than 100 kg, or more than 1000 kg. The CESS may produce a current of at most about 10000 A. The UAV may be capable of flying for at least about 10 mins without recharging. Existing lithium battery technology has demonstrated specific energy density between about 100 and 250 Wh/kg (see https://en.wikipedia.org/wiki/Lithium-ion_battery#Performance and https://na.industrial.panasonic.com/sites/default/pidsa/files/downloads/files/panasonic_overview_information_on_li-ion_batteries.pdf). A 400 g lithium battery would therefore have a maximum energy output of 100 Wh. By comparison, a 400 g metacapacitor can have a specific energy density of 2,500 Wh/kg, which is 1000 Wh of stored energy.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

DETAILED DESCRIPTION

While various embodiments of the disclosure have been shown and described herein, it will be obvious to those skilled in the art that such embodiments are provided by way of example only. Numerous variations, changes, and substitutions may occur to those skilled in the art without departing from the disclosure. It should be understood that various alternatives to the embodiments of the invention described herein may be employed.

The systems, methods, and devices of the present invention provide for an unmanned vehicle, a device to be powered and a capacitor energy storage system (CESS), as a power supply, with a power supply control assembly thereof. Further, said CESS includes at least one metacapacitor. The CESS may include one or more capacitor energy storage modules (CESM), each of which may include one or more capacitor energy storage cell (CESC). Variations and examples of CESS, CESM, and CESC are described in U.S. patent application Ser. No. 15/043,315 (attorney docket number CSI-024) filed Feb. 12, 2016; which is incorporated by reference in its entirety herein. A power supply control assembly may include a CESS electrically connected to and in communication with a controller board, wherein the CESS is electrically connected to the controller board via a voltage converter. The controller board may overcome challenges related to the capacitor based discharge control to power motor drivers and motors. The controller board can be connected to the CESS. The CESS can discharge through a connector interface. The controller board can comprise an electronic switch and an input device, with the electronic switch being electrically connected to the controller board for controlling power on or off of the controller board and CESS. The input device can be electrically connected to the electronic switch for controlling the switched-on or switched-off state of the electronic switch. Use of the electronic switch which may utilize solid state electronics and may prevent sparking from occurring during charge, discharge, or replacement of the CESS.

For example, the electronic switch may include one of a power MOSFET, a solid state relay, a power transistor, an insulated gate bipolar transistor (IGBT), a GaN MOSFET, a SiC MOSFET, or a JFET. The input device which may communicate with the electronic switch. The input device may include one or more of a button switches, mechanical switches, potentiometers, sensors, or any combination thereof.

Figure 11:
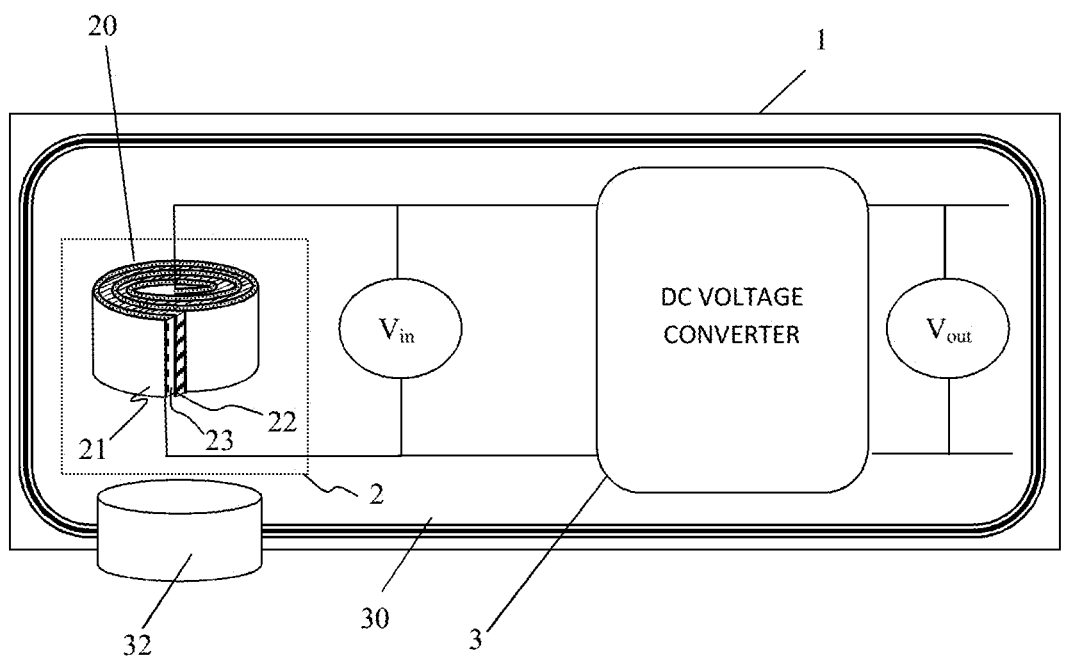
FIG. 11 schematically shows an energy storage cell according to aspects of the present disclosure.

The capacitor energy storage cell (CESC), of the present disclosure, is comprised of a capacitive energy storage device and a DC-voltage conversion device. FIG. 11 schematically shows a capacitive energy storage cell 1 comprising a capacitive energy storage device 2 that includes one or more metacapacitors 20 and a DC-voltage conversion device 3, consisting of one more switch-mode voltage converters 100, e.g. a buck converter, boost converter, buck/boost converter, bi-directional buck/boost (split-pi) converter, cuk converter, SEPIC converter, inverting buck/boost converter, or four-switch buck/boost converter.

A metacapacitor is a capacitor comprising of a dielectric film that is a metadielectric material, which is disposed between a first electrode and second electrode. In one embodiment, said electrodes are flat and planar and positioned parallel to each other. In another embodiment, the metacapacitor comprises two rolled metal electrodes positioned parallel to each other. Further, the metadielectric material may have a breakdown field ($E_{bd}$) between 0.1 V/nm and 1 V/nm, a relative permittivity greater than 1000 at or above a critical voltage, and a resistivity greater than $10^{15}$ Ω·cm, or greater than $10^{16}$ Ω·cm.

Said metadielectric materials are comprised supra-structures formed from composite organic compounds. The supra-structures may form from liquid crystals in solution. By way of example and not limitation, liquid crystal structures types may include nematic, chematic, chiral nematic, lyotropic lamellar, and lyotropic micelle.

In some embodiments said composite organic compounds may be comprised of electrophilic and nucleophilic enhanced cores forming a non-centrosymmetric polarizable unit with substituents that are electrically resistive and may aid solubility of said composite organic compounds in common organic solvents. Said electrically resistive substituents may be selected from alkyl and aryl moieties and can be further selected from single chain moieties, branched chain moieties, fused polycyclic moieties, or any combination thereof. Additionally, the electrically resistive substituents may be haloalkyl or haloaryl moieties. Fused perfluoro polycyclic alkyl substituents of three cyclic groups long and longer are alternative resistive substituents for improving performance of metadielectric layer breakdown by providing additional structural properties and reducing voids in the layer.

The metadielectric layers used in such energy storage devices may include compounds with rigid electro-polarizable organic units, composite organic polarizable compounds, composite electro-polarizable organic compounds, composite non-linear electro-polarizable compounds, Sharp polymers, Furuta polymers, YanLi polymers, and any combination thereof.

Sharp polymers are composites of a polarizable core inside an envelope of hydrocarbon (saturated and/or unsaturated), fluorocarbon, chlorocarbon, siloxane, and/or polyethylene glycol as linear or branched chain oligomers covalently bonded to the polarizable core that act to insulate the polarizable cores from each other, which favorably allows discrete polarization of the cores with limited or no dissipation of the polarization moments in the cores. The polarizable core has hyperelectronic, nonlinear, or ionic type polarizability. "Hyperelectronic polarization may be viewed as the electrical polarization in external fields due to the pliant interaction with the charge pairs of excitons, in which the charges are molecularly separated and range over molecularly limited domains." (See Roger D. Hartman and Herbert A. Pohl, "Hyper-electronic Polarization in Macromolecular Solids", Journal of Polymer Science: Part A-1 Vol. 6, pp. 1135-1152 (1968)). Ionic type polarization can be achieved by limited mobility of ionic parts of the core molecular fragment.

molecule, n is number of the electro-conductive oligomers which is equal to 0, 2, or 4, R3 is a substituent comprising one or more ionic groups from a class of ionic compounds that are used in ionic liquids connected to the electro-conductive oligomer (Core2) directly or via a connecting group, s is number of the ionic groups R3 which is equal to 0, 1, 2, 3 or 4. The R4 is a resistive substituent providing solubility of the organic compound in a solvent and electrically insulating the column-like supramolecules from each other, k is the number of R4 substituents, on said electropolarizable compound, which is equal to 0, 1, 2, 3, 4, 5, 6, 7 or 8.

In one embodiment of the present disclosure, the aromatic polycyclic conjugated molecule (Core1) comprises rylene fragments.

EXAMPLE 1

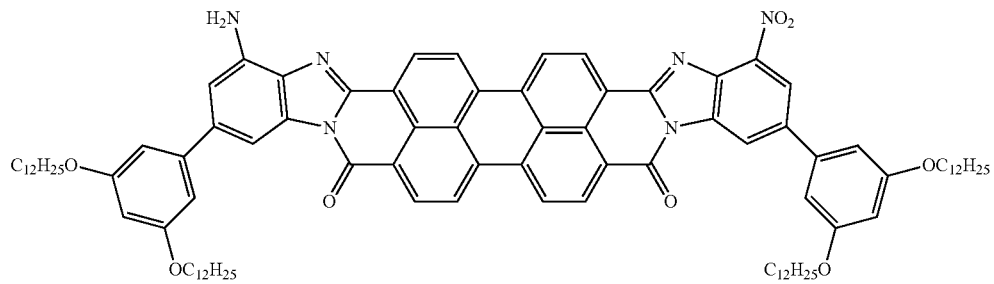

An electro-polarizable compound has a general structural formula:

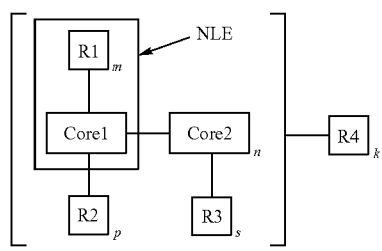

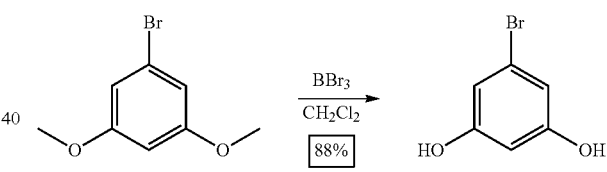

Where Core1 is an aromatic polycyclic conjugated molecule having two-dimensional flat form and self-assembling by pi-pi stacking in a column-like supramolecule, R1 is a dopant group connected to the aromatic polycyclic conjugated molecule (Core1), m is the number of dopant groups R1 which is equal to 1, 2, 3 or 4, R2 is a substituent comprising one or more ionic groups from a class of ionic compounds that are used in ionic liquids connected to the aromatic polycyclic conjugated molecule (Core1) directly or via a connecting group, p is number of ionic groups R2 which is equal to 0, 1, 2, 3 or 4. The fragment marked NLE containing the aromatic polycyclic conjugated molecule with at least one dopant of group has nonlinear effect of polarization. The Core2 is an electro-conductive oligomer self-assembling by pi-pi stacking in a column-like supra- Synthesis of 3,5-dihydroxybromobenzene: To a 50 mL reaction flask oven dried overnight at 90° C., 3,5-dimethoxybromobenzene (1.012 g, 4.662 mmol) was dissolved in anhydrous $CH_2Cl_2$ (8 mL) and placed in an ice water bath to cool for 10 minutes. To this chilled solution, $BBr_3$ (10.2 mmol, 10.2 mL, 1 M in $CH_2Cl_2$) was slowly added over 5 minutes. Once this addition was complete, the reaction was removed from the ice water bath and allowed to warm in in air to room temperature and allowed to stir overnight. The reaction was confirmed to be completed after 18 hours by $SiO_2$ TLC using 1:1 Hexanes:EtOAc. The reaction was placed back on an ice water bath to cool for 10 minutes before 1 mL of methanol was added to quench any unreacted $BBr_3$ still present. This reaction mixture was washed with 10 mL of aqueous HCl (2 M) and extracted with EtOAc (3×10 mL). The organic fractions were collected and dried with $Na_2SO_3$ before being filtered. The crude reaction mixture was concentrated under vacuum and precipitated into hexanes to yield 3,5-dihydroxybromobenzene (0.768 g, 88%) $^1$H NMR (250 MHz, $CDCl_3$) δ 6.60 (d, 2H), 6.29 (m, 1H), 4.96 (s, 2H) ppm.

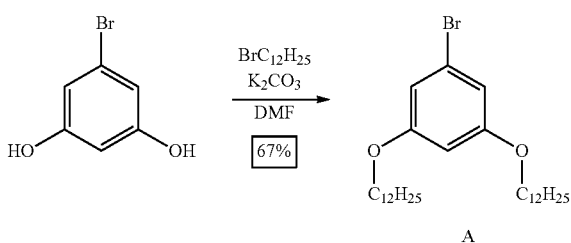

Synthesis of A: To a 25 mL reaction flask oven dried overnight at 90° C., 3,5-dihydroxybromobenzene (0.502 g, 2.66 mmol) and $K_2CO_3$ (1.097 g, 7.937 mmol) was dissolved in anhydrous DMF (11 mL) and stirred at room temperature for 10 minutes. To this mixture, bromododecane (2.0 g, 1.9 mL, 7.935 mmol) was added and the reaction was placed in a preheated 100° C. oil bath and stirred overnight. The reaction was confirmed to be completed after 18 hours by $SiO_2$ TLC using 1:1 Hexanes:EtOAc. The reaction removed from the oil bath and allowed to cool in air to room temperature. Excess $K_2CO_3$ was quenched with 10 mL of aqueous HCl (2 M) and the reaction was extracted with EtOAc (3×10 mL). The organic fractions were collected, washed with dionized water (10 mL) and dried with $Na_2SO_3$ before being filtered. The solvent was removed under vacuum and the product was purified by silica gel chromatography (100% Hexanes to 10% EtOAc:90% Hexanes) and isolated as a colorless oil that slowly solidified into a white solid (0.929 g, 67%). $^1$H NMR (250 MHz, $CDCl_3$) δ 6.64 (d, 2H), 6.3 (m, 1H), 3.90 (t, 4H), 1.75 (m, 4H), 1.27 (s, 34H), 0.89 (t, 6H) ppm.

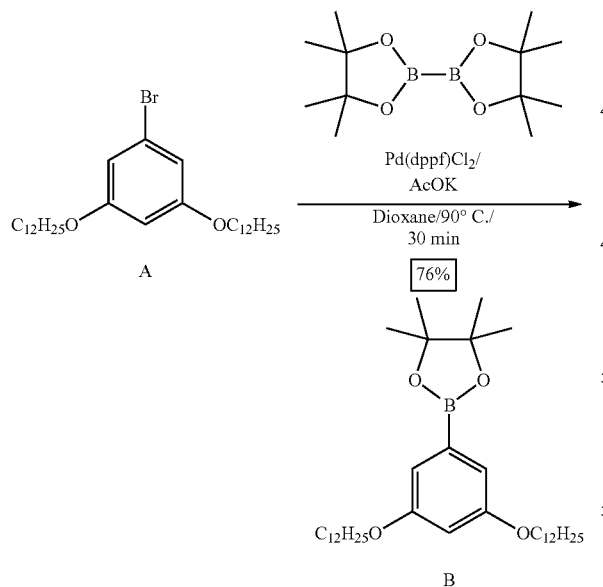

Synthesis of B: A (4.711 g, 8.962 mmol), bis(pinacolato) diboron (3.623 g, 14.26 mmol), potassium acetate (2.733 g, 27.85 mmol), $Pd(dppf)Cl_2$ (0.211 g, 0.288 mmol) were evacuated inside a 100 mL round bottom flask and backfilled with $N_2$. In a separate flask, 32 mL of dioxane was sparged with a $N_2$ flow for 15 min before being added to the reaction flask via syringe. This reaction solution was placed in a preheated oil bath set to 90° C. and monitored by TLC (9:1 Hexanes:Hexanes). When the reaction was complete, the reaction mixture was washed with 25 mL of 2M HCl and extracted with ethyl acetate (3×25 mL). The organic fractions were collected and dried using $Na_2SO_4$ and filtered before removing the solvent under reduced pressure. The crude material was redissolved in hexanes and filtered using a silica plug using hexanes as the eluent. Hexane was removed under reduced pressure to isolate a viscous oil (5.852 g, 114% yield). This crude mixture stirred for 1 h in 50 mL of methanol to give a white solid precipitate that was collected by vacuum filtration. B was isolated as a white solid (3.941 g, 76%).

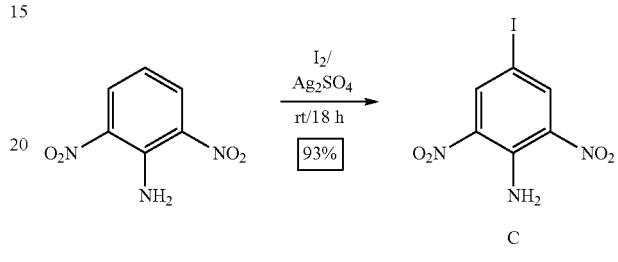

Synthesis of C: 2,6-dinitroaniline (1.007 g, 5.496 mmol), $Ag_2SO_4$ (2.34 g, 7.502 mmol), and $I_2$ (1.965 g, 7.743 mmol) were added to a 50 mL round bottom flask at room temperature. To this mixture, 10 mL of ethanol (0.5 M of 2,6-dinitroaniline) was added and the reaction was allowed to stir at room temperature for 18 hours. The next morning a yellow precipitate had formed and TLC analysis (1:1 EtOAc:Hexanes) had shown complete consumption of the starting material. This reaction mixture was filtered and the solid residue was washed with EtOAc until the filtrate ran clear. The solvent was then removed from the filtrate under vacuum and the crude solid was redissolved in a minimum amount of $CH_2Cl_2$ before being precipitated into 100 mL of hexanes. The mixture was set aside for 30 minutes until no more solid precipitated and the solid was isolated via vacuum filtration. C was isolated as an orange solid (1.578 g, 93%).

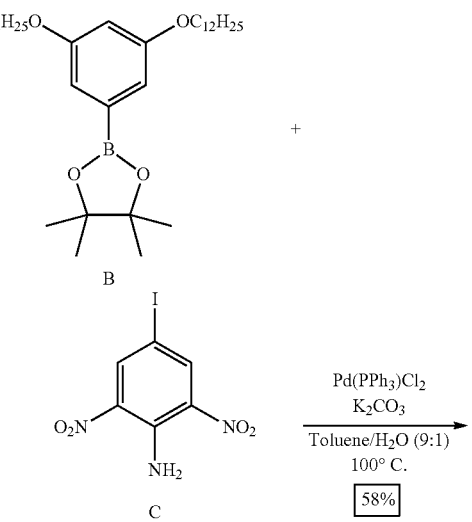

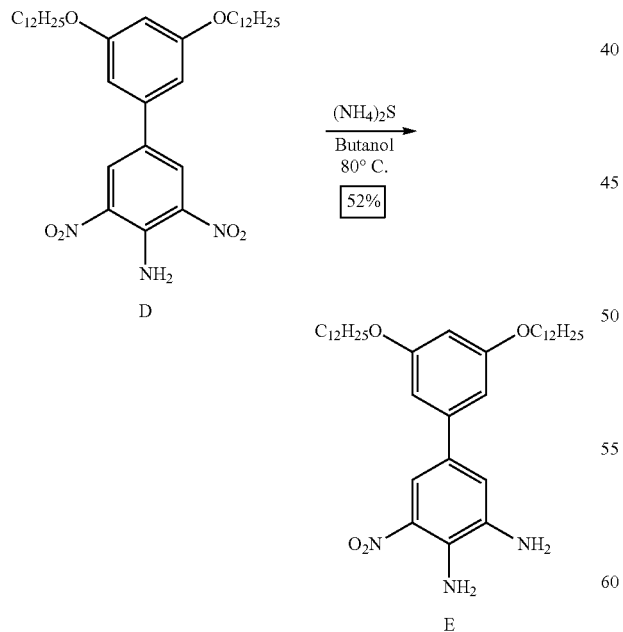

Synthesis of D: C (0.702 g, 2.24 mmol), B (1.418 g, 2.47 mmol), Pd(PPh$_3$)$_2$Cl$_2$ (0.049 g, 0.070 mmol), and K$_2$CO$_3$ (0.628 g, 4.50 mmol) were added to a 25 mL round bottom flask before being evacuated and backfilled with N$_2$ three times. In a separate flask, N$_2$ was bubbled through a 10 mL of toluene and 5 mL of H$_2$O for 30 min before adding 4.7 mL of degassed toluene and 0.53 mL of degassed water to the reaction flask. This solution was then placed in a preheated oil bath at 100° C. and stirred for overnight. The reaction was monitored by TLC (7:3 Hexanes:EtOAc). Once the reaction was complete, it was removed from the oil bath and allowed to cool to room temperature in air for 30 min. The mixture was washed with 5 mL of distilled water and excess base was carefully acidified with the addition of 2M HCl (10 mL) then extracted with EtOAc (3×10 mL). The organic fractions were collected and dried with NaSO$_4$, filtered, and the solvent was removed under vacuum distillation. The crude product was dissolved in a minimum amount of CH$_2$Cl$_2$ and precipitated into MeOH. The solid was filtered to give D as a yellow solid (0.818 g, 58%).

Synthesis of E: D (0.489 g, 0.773 mmol), was added to a round bottom flask and dissolved into n-butanol (3.2 mL) at 80° C. To this solution was added a 20 wt % aqueous solution of (NH$_4$)$_2$S (2 equiv, 0.54 mL). The reaction was stirred for 1 hr and was monitored by TLC (7:3 Hexanes/EtOAc). When the reaction was complete, the reaction mixture was washed with 5 mL of 2 M HCl and extracted with ethyl acetate (3×5 mL). The organic fractions were collected and dried using Na$_2$SO$_4$ and filtered before removing the solvent under reduced pressure. The crude material was redissolved in hexanes purified using SiO$_2$ column chromatography (7:3 Hexanes/EtOAc) to give E as a viscous red oil (0.241 g, 52%).

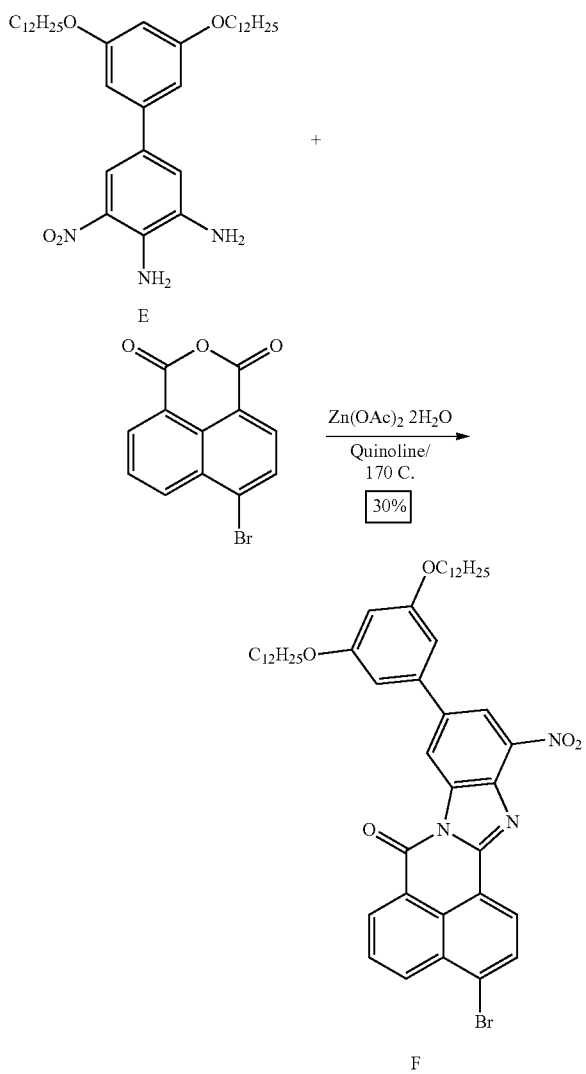

Synthesis of F: E (0.050 g, 0.0836 mmol) and 4-bromonaphthalic anhydride (0.030 g, 0.101 mmol), and Zn(OAc)$_2$ 2H$_2$O (0.008 g, 0.035 mmol) were added to a round bottom flask before being evacuated and backfilled with N$_2$. In a separate flask, quinoline was sparged for 15 min under a flow of N$_2$ and added to the reaction mixture (0.7 mL). This suspension was heated to 170° C. and let to stir overnight. When the reaction is complete (monitored by TLC), the hot solution was poured into MeOH (50 mL) and the resulting solid was washed with 20 mL of additional MeOH before being collected. Residual MeOH was removed under reduced pressure. F was collected (1.038 g, 74%).

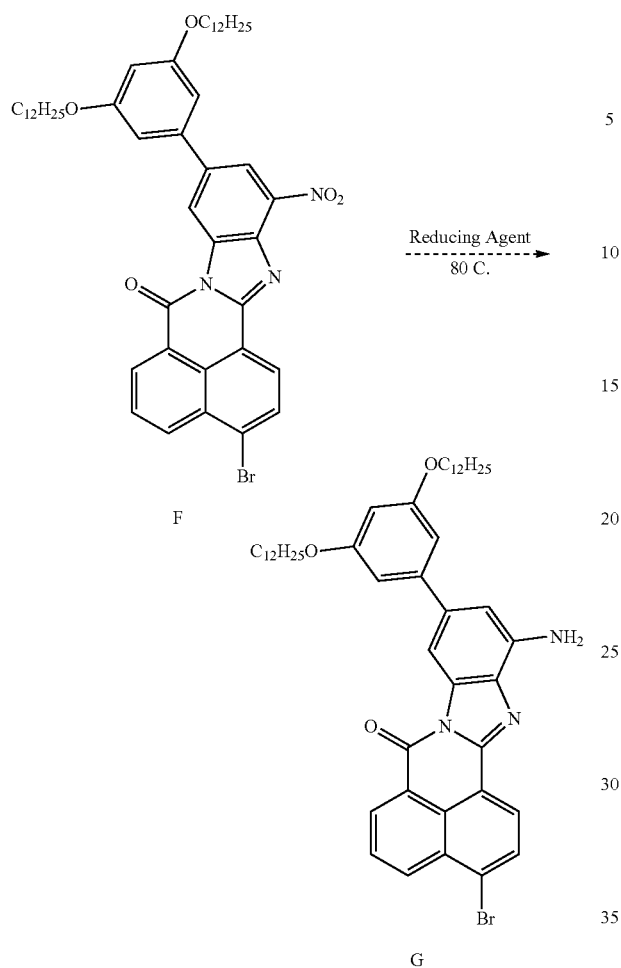

F

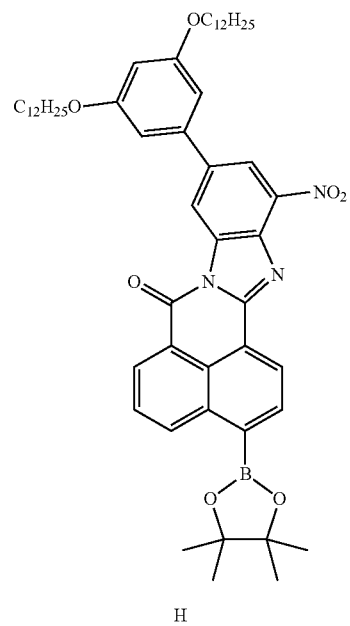

H

Synthesis of H: F (1 equiv.), Pd(dppf)Cl$_2$ (0.05 equiv.), AcOK (2 equiv.), and B$_2$Pin$_2$ (1.5 equiv.) were added to 25 mL round bottom flask. This mixture was then evacuated and backfilled with N$_2$ 3 times. In a separate flask, dioxane (0.3 M) was bubbled with N$_2$ for 30 minutes. This degassed solvent was then added to the reaction flask under an N$_2$ atmosphere and placed into a preheated 100° C. oil bath and allowed to stir overnight. When the reaction was complete, it was removed from the oil bath and allowed to cool to rt before being washed with 2M HCl (~20 mL) and extracted using EtOAc (2×30 mL). The organic layers were collected, dried with Na$_2$SO$_4$, filtered, and the solvent was removed under reduced pressure. The crude product was purified by column chromatography (100% Hexanes-8:2 Hexanes/EtOAc). The solvent was removed to give H.

Synthesis of G: F (1 equivalent) was added to a round bottom flask with butanol (0.3 M). This suspension was heated to 80° C. and a reducing agent (SnCl$_2$, (NH$_4$)$_2$S, or HNaS; 1 equivalent) was transferred to the hot reaction mixture. The reaction was monitored by TLC analysis and allowed to stir overnight. By TLC, SnCl$_2$ and HNaS had completely consumed the starting material, however there is no observable product that could be isolated from the reaction mixture. (NH$_4$)$_2$S revealed no reaction and only starting material could be isolated.

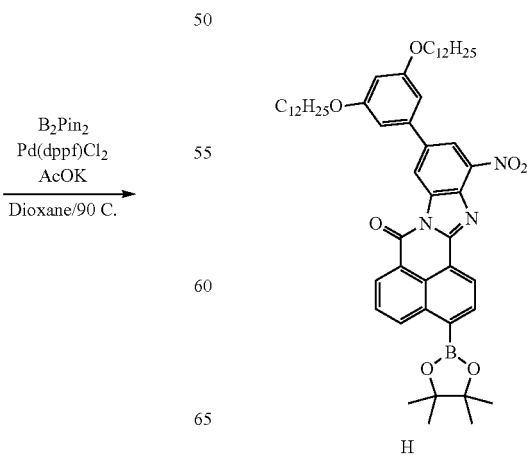

H

-continued

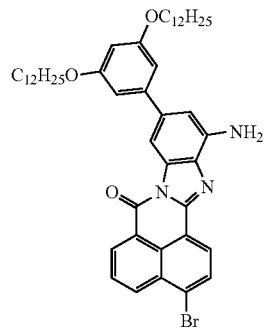

G

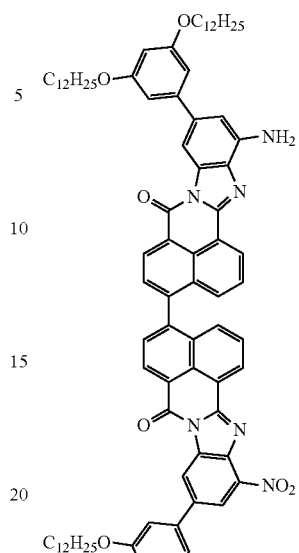

I

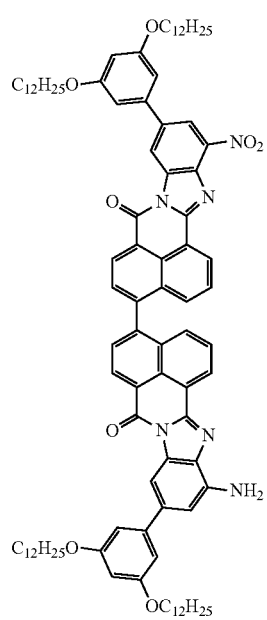

I

Synthesis of I: H (1 equiv.), Pd(PPh₃)₄ (0.05 equiv), K₂CO₃ (2 equiv.), and G (1 equiv.) were added to a reaction flask. This mixture was then evacuated and backfilled with N₂ 3 times. In a separate flask, a mixture of toluene, H₂O (2:1) was bubbled with N₂ for 10 minutes. This degassed solvent was then added to the reaction flask under an N₂ atmosphere via syringe and placed into a preheated 100° C. oil bath and allowed to stir overnight. When completed, the reaction was removed from the oil bath and allowed to cool to rt before being washed with 2M HCl (10 mL) and extracted using EtOAc (2×10 mL). The organic layers were collected, dried with Na₂SO₄, filtered, and the solvent was removed under reduced pressure. The crude solid was dissolved in a minimum amount of CH₂Cl₂ and precipitated into MeOH.

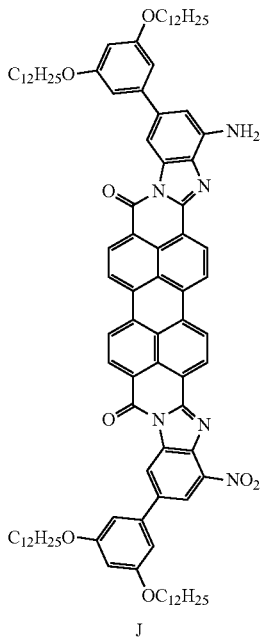

J

I (1 equivalent) was dispersed in triethanolamine (0.02 M) and K₂CO₃ (25 equivalents) was added. The mixture was stirred at 130° C. for 24 hours under argon atmosphere. Upon cooling to room temperature, the reaction mixture was diluted with dichloromethane and washed with water. The organic layer was dried over anhydrous sodium sulfate and purified by precipitation into methanol or silica gel column chromatography to yield J as dark purple solid.

A Sharp polymer has a general structural formula:

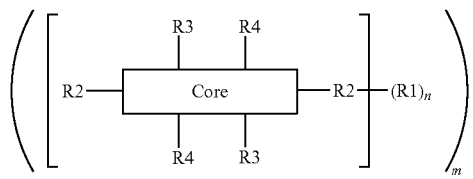

Where Core is an aromatic polycyclic conjugated molecule comprising rylene fragments. This molecule has flat anisometric form and self-assembles by pi-pi stacking in a column-like supramolecule. The substitute R1 provides solubility of the organic compound in a solvent. The parameter n is number of substitutes R1, which is equal to 0, 1, 2, 3, 4, 5, 6, 7 or 8. The substitute R2 is an electrically resistive substitute located in terminal positions, which provides resistivity to electric current and comprises hydrocarbon (saturated and/or unsaturated), fluorocarbon, siloxane, and/or polyethyleneglycol as linear or branched chains. The substitutes R3 and R4 are substitutes located on side (lateral) positions (terminal and/or bay positions) comprising one or more ionic groups from a class of ionic compounds that are used in ionic liquids connected to the aromatic polycyclic conjugated molecule (Core), either directly, e.g., with direct bound SP2-SP3 carbons, or via a connecting group. The parameter m is a number of the aromatic polycyclic conjugated molecules in the column-like supramolecule, which is in a range from 3 to 100,000.

In another embodiment of the composite organic compound, the aromatic polycyclic conjugated molecule comprises an electro-conductive oligomer, such as a phenylene, thiophene, or polyacene quinine radical oligomer or combinations of two or more of these. In yet another embodiment of the composite organic compound, the electro-conductive oligomer is selected from phenylene, thiophene, or substituted and/or unsubstituted polyacene quinine radical oligomer of lengths ranging from 2 to 12 or combination of two or more of these. Wherein the substitutions of ring hydrogens by 0, S or NR5, and R5 is selected from the group consisting of unsubstituted or substituted $C_1$-$C_{18}$alkyl, unsubstituted or substituted $C_2$-$C_{18}$alkenyl, unsubstituted or substituted $C_2$-$C_{18}$alkynyl, and unsubstituted or substituted $C_4$-$C_{18}$ aryl.

In some embodiments, the substitute providing solubility (R1) of the composite organic compound is $C_XQ_{2X+1}$, where $X \geq 1$ and Q is hydrogen (H), fluorine (F), or chlorine (Cl). In still another embodiment of the composite organic compound, the substitute providing solubility (R1) of the composite organic compound is independently selected from alkyl, aryl, substituted alkyl, substituted aryl, fluorinated alkyl, chlorinated alkyl, branched and complex alkyl, branched and complex fluorinated alkyl, branched and complex chlorinated alkyl groups, and any combination thereof, and wherein the alkyl group is selected from methyl, ethyl, propyl, butyl, iso-butyl and tert-butyl groups, and the aryl group is selected from phenyl, benzyl and naphthyl groups or siloxane, and/or polyethylene glycol as linear or branched chains.

In some embodiments, at least one electrically resistive substitute (R2) of the composite organic compound is $C_XQ_{2X+1}$, where $X \geq 1$ and Q is hydrogen (H), fluorine (F), or chlorine (Cl). In another embodiment of the composite organic compound, at least one electrically resistive substitute (R2) is selected from the list comprising —$(CH_2)_n$—$CH_3$, —$CH((CH_2)_nCH_3)_2$) (where $n \geq 1$), alkyl, aryl, substituted alkyl, substituted aryl, branched alkyl, branched aryl, and any combination thereof and wherein the alkyl group is selected from methyl, ethyl, propyl, butyl, iso-butyl and tert-butyl groups, and the aryl group is selected from phenyl, benzyl and naphthyl groups. In yet another embodiment of the composite organic compound.

In some embodiments, the substitute R1 and/or R2 is connected to the aromatic polycyclic conjugated molecule (Core) via at least one connecting group. The at least one connecting group may be selected from the list comprising the following structures: ether, amine, ester, amide, substituted amide, alkenyl, alkynyl, sulfonyl, sulfonate, sulfonamide, or substituted sulfonamide.

In some embodiments, the substitute R3 and/or R4 may be connected to the aromatic polycyclic conjugated molecule (Core) via at least one connecting group. The at least one connecting group may be selected from the list comprising $CH_2$, $CF_2$, $SiR_2O$, $CH_2CH_2O$, wherein R is selected from the list comprising H, alkyl, and fluorine. In another embodiment of the composite organic compound, the one or more ionic groups include at least one ionic group selected from the list comprising $[NR_4]^+$, $[PR_4]^+$ as cation and $[—CO_2]^-$, $[—SO_3]^-$, $[—SR_5]^-$, $[—PO_3R]^-$, $[—PR_5]^-$ as anion, wherein R is selected from the list comprising H, alkyl, and fluorine.

In some implementations, the aromatic polycyclic conjugated molecule (Core) comprises rylene fragments. In another embodiment of the composite organic compound, the rylene fragments are selected from structures 1 to 13 as given in Table 1.

TABLE 1

Examples of the polycyclic organic molecule (Core) comprising rylene fragments

1

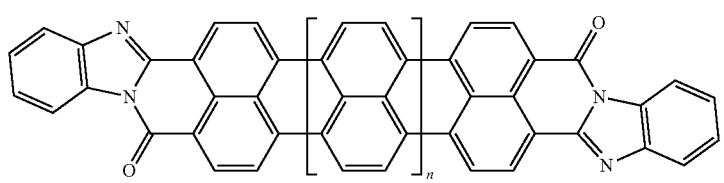

TABLE 1-continued
Examples of the polycyclic organic molecule (Core) comprising rylene fragments
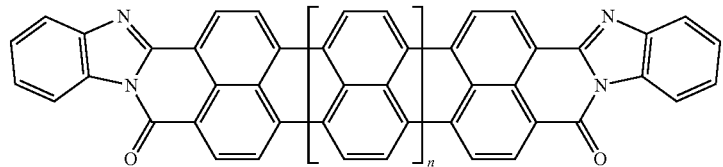
2
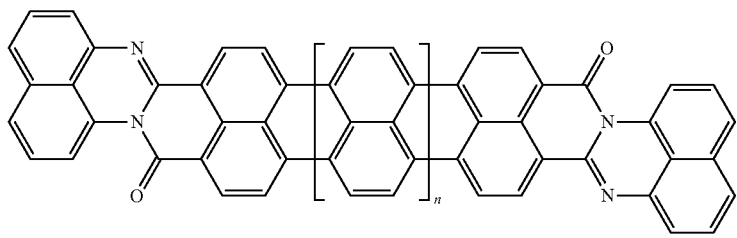
3
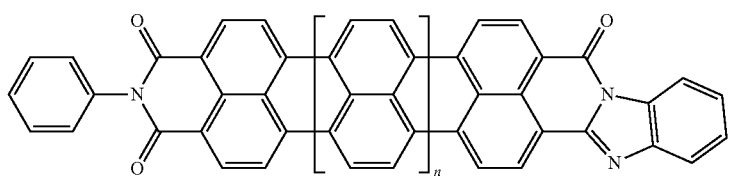
4
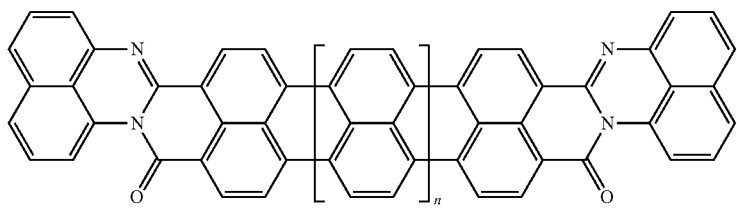
5
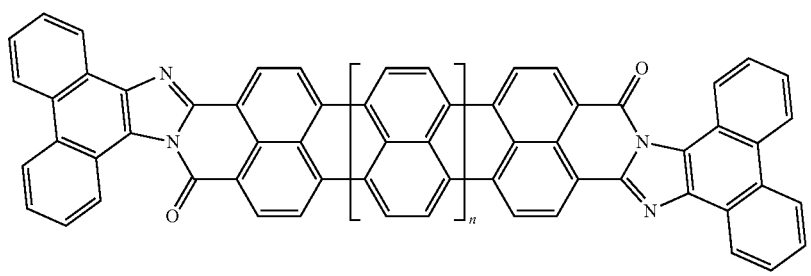
6
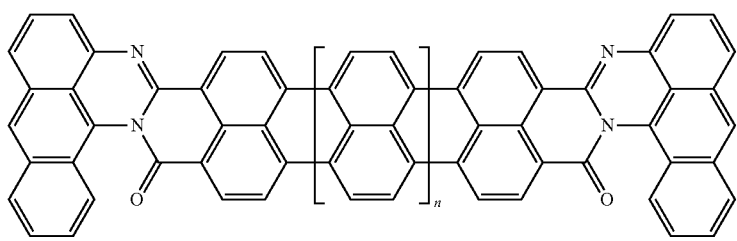
7
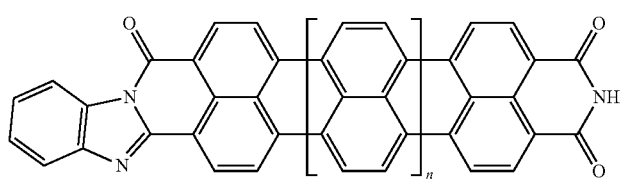
8

TABLE 1-continued

Examples of the polycyclic organic molecule (Core) comprising rylene fragments

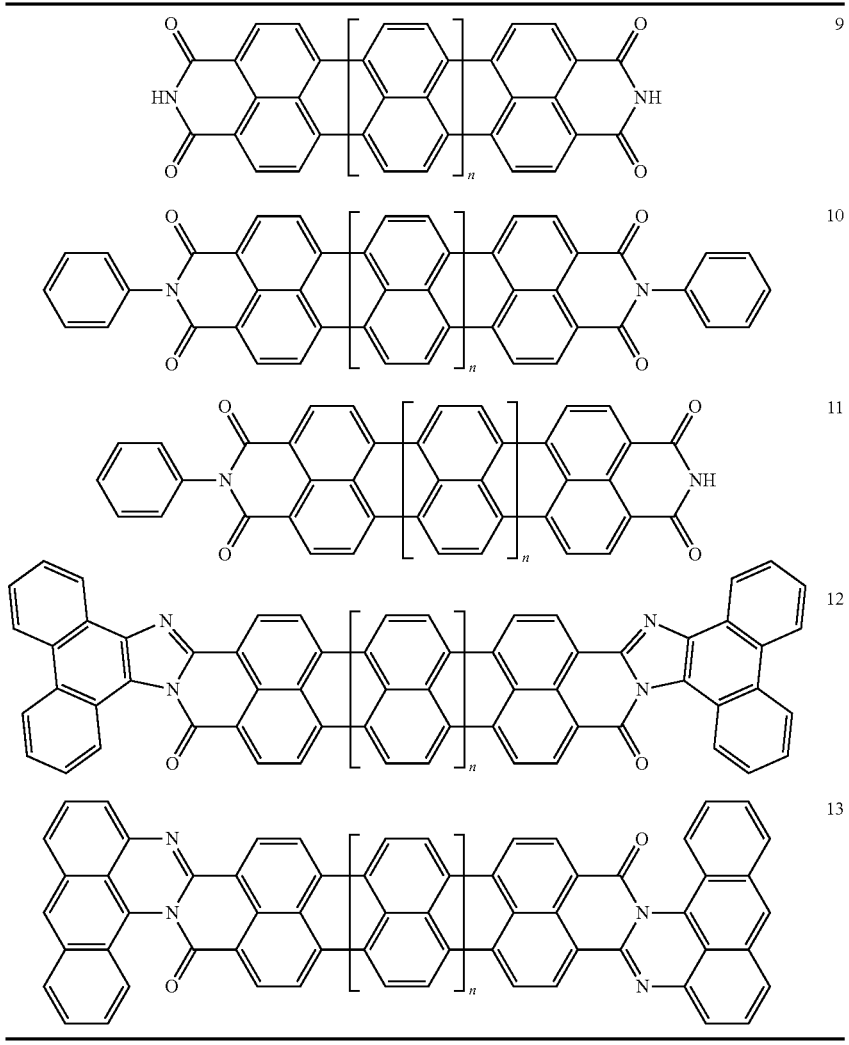

In other implementations, the aromatic polycyclic conjugated molecule comprises an electro-conductive oligomer, such as a phenylene, thiophene, or polyacene quinine radical oligomer or combinations of two or more of these. In yet another embodiment of the composite organic compound, the electro-conductive oligomer is selected from structures 22 to 30 as given in Table 2, wherein I=2, 3, 4, 5, 6, 7, 8, 9, 10, 11 or 12, Z is =O, =S or =NR5, and R5 is selected from the group consisting of unsubstituted or substituted $C_1$-$C_{18}$alkyl, unsubstituted or substituted $C_2$-$C_{18}$alkenyl, unsubstituted or substituted $C_2$-$C_{18}$alkynyl, and unsubstituted or substituted $C_4$-$C_{18}$aryl:

TABLE 2

Examples of the polycyclic organic molecule (Core) comprising electro-conductive oligomer

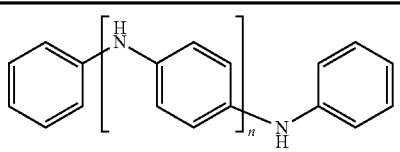

22

TABLE 2-continued

Examples of the polycyclic organic molecule (Core) comprising electro-conductive oligomer

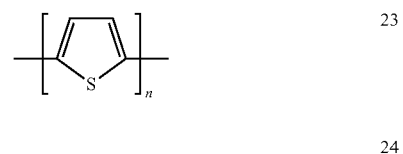

23

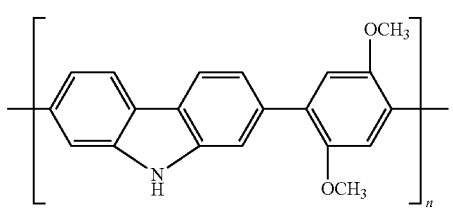

24

TABLE 2-continued

Examples of the polycyclic organic molecule (Core) comprising electro-conductive oligomer

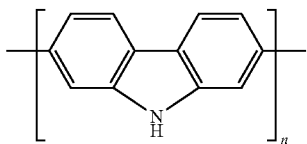
25

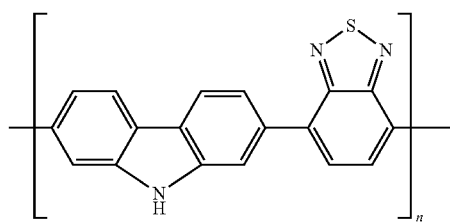
26

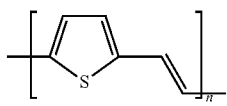
27

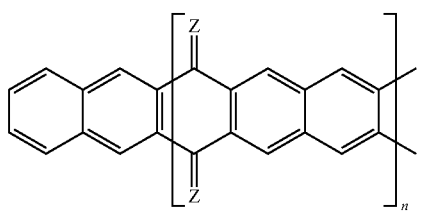
28

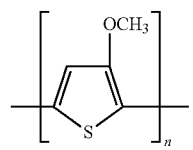
29

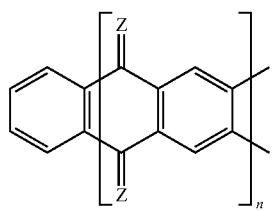
30

In some implementations, the substitute providing solubility (R1) of the composite organic compound is $C_XQ_{2X+1}$, where i≥1 and Q is hydrogen (H), fluorine (F), or chlorine (Cl). In still another embodiment of the composite organic compound, the substitute providing solubility (R1) of the composite organic compound is independently selected from alkyl, aryl, substituted alkyl, substituted aryl, fluorinated alkyl, chlorinated alkyl, branched and complex alkyl, branched and complex fluorinated alkyl, branched and complex chlorinated alkyl groups, and any combination thereof, and wherein the alkyl group is selected from methyl, ethyl, propyl, butyl, iso-butyl and tert-butyl groups, and the aryl group is selected from phenyl, benzyl and naphthyl groups or siloxane, and/or polyethyleneglycol as linear or branched chains.

In one embodiment of the composite organic compound, the solvent is selected from benzene, toluene, xylenes, acetone, acetic acid, methylethylketone, hydrocarbons, chloroform, carbontetrachloride, methylenechloride, dichlorethane, chlorobenzene, alcohols, nitromethan, acetonitrile, dimethylforamide, 1,4-dioxane, tetrahydrofuran (THF), methylcyclohexane (MCH), and any combination thereof.

In some embodiments, at least one electrically resistive substitute (R2) of the composite organic compound is $C_XQ_{2X+1}$, where i≥1 and Q is hydrogen (H), fluorine (F), or chlorine (Cl). In another embodiment of the composite organic compound, at least one electrically resistive substitute (R2) is selected from the list comprising —$(CH_2)_n$—$CH_3$, —$CH((CH_2)_nCH_3)_2$) (where n≥1), alkyl, aryl, substituted alkyl, substituted aryl, branched alkyl, branched aryl, and any combination thereof and wherein the alkyl group is selected from methyl, ethyl, propyl, butyl, iso-butyl and tert-butyl groups, and the aryl group is selected from phenyl, benzyl and naphthyl groups. In yet another embodiment of the composite organic compound.

In some embodiments, at least one electrically resistive substitute (R2) is selected from the group of alkyl, aryl, substituted alkyl, substituted aryl, fluorinated alkyl, chlorinated alkyl, branched and complex alkyl, branched and complex fluorinated alkyl, branched and complex chlorinated alkyl groups, and any combination thereof, and wherein the alkyl group is selected from methyl, ethyl, propyl, n-butyl, iso-butyl and tert-butyl groups, and the aryl group is selected from phenyl, benzyl and naphthyl groups or siloxane, and/or polyethyleneglycol as linear or branched chains.

In some embodiments, the substitute R1 and/or R2 is connected to the aromatic polycyclic conjugated molecule (Core) via at least one connecting group. The at least one connecting group may be selected from the list comprising the following structures: 31-41 as given in Table 3, where W is hydrogen (H) or an alkyl group.

TABLE 3

Examples of the connecting group

 31

 32

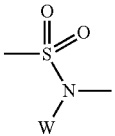 33

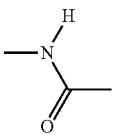 34

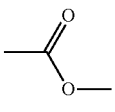 35

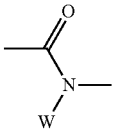 36

TABLE 3-continued

Examples of the connecting group

| | |
|---|---|
| ![structure] | 37 |
| ![structure] | 38 |
| ![structure] | 39 |
| ![structure] | 40 |
| ![structure] | 41 |

In some embodiments, the substitute R3 and/or R4 may be connected to the aromatic polycyclic conjugated molecule (Core) via at least one connecting group. The at least one connecting group may be selected from the list comprising $CH_2$, $CF_2$, $SiR_2O$, $CH_2CH_2O$, wherein R is selected from the list comprising H, alkyl, and fluorine. In another embodiment of the composite organic compound, the one or more ionic groups include at least one ionic group selected from the list comprising $[NR_4]^+$, $[PR_4]^+$ as cation and $[—CO_2]^-$, $[—SO_3]^-$, $[—SR_5]^-$, $[—PO_3R]^-$, $[—PR_5]^-$ as anion, wherein R is selected from the list comprising H, alkyl, and fluorine.

Sharp polymers have hyperelectronic or ionic type polarizability. "Hyperelectronic polarization may be considered due to the pliant interaction of charge pairs of excitons, localized temporarily on long, highly polarizable molecules, with an external electric field (Roger D. Hartman and Herbert A. Pohl, "Hyper-electronic Polarization in Macromolecular Solids", Journal of Polymer Science: Part A-1 Vol. 6, pp. 1135-1152 (1968))." Ionic type polarization can be achieved by limited mobility of ionic parts of the tethered/partially immobilized ionic liquid or zwitterion (Q). Additionally, other mechanisms of polarization such as dipole polarization and monomers and polymers possessing metal conductivity may be used independently or in combination with hyper-electronic and ionic polarization in aspects of the present disclosure.

In some implementations, the metadielectric may include one or more Sharp polymers in the form of a composite organic compound characterized by polarizability and resistivity having the above general structural formula.

Further, characteristics of metadielectrics include a relative permittivity greater than or equal to 1,000 and resistivity greater than or equal to $10^{16}$ ohm·cm. Individually, the Sharp Polymers in a metadielectric may form column like supramolecular structures by pi-pi interaction. Said supramolecules of Sharp polymers allow formation of crystal structures of the metadielectric material. By way of using Sharp polymers in a dielectric material, polarization units are incorporated to provide the molecular material with high dielectric permeability. There are several mechanisms of polarization such as dipole polarization, ionic polarization, and hyper-electronic polarization of molecules, monomers and polymers possessing metal conductivity. All polarization units with the listed types of polarization may be used in aspects of the present disclosure. Further, Sharp polymers are composite materials which incorporate an envelope of insulating substituent groups that electrically isolate the supramolecules from each other in the dielectric crystal layer and provide high breakdown voltage of the energy storage molecular material. Said insulating substituent groups are resistive alkyl or fluro-alkyl chains covalently bonded to a polarizable core, forming the resistive envelope.

In order that the invention may be more readily understood, reference is made to the following examples, which are intended to be illustrative of the invention, but are not intended to be limiting the scope.

EXAMPLE 2

This Example describes synthesis of one type of Sharp polymer according following structural scheme:

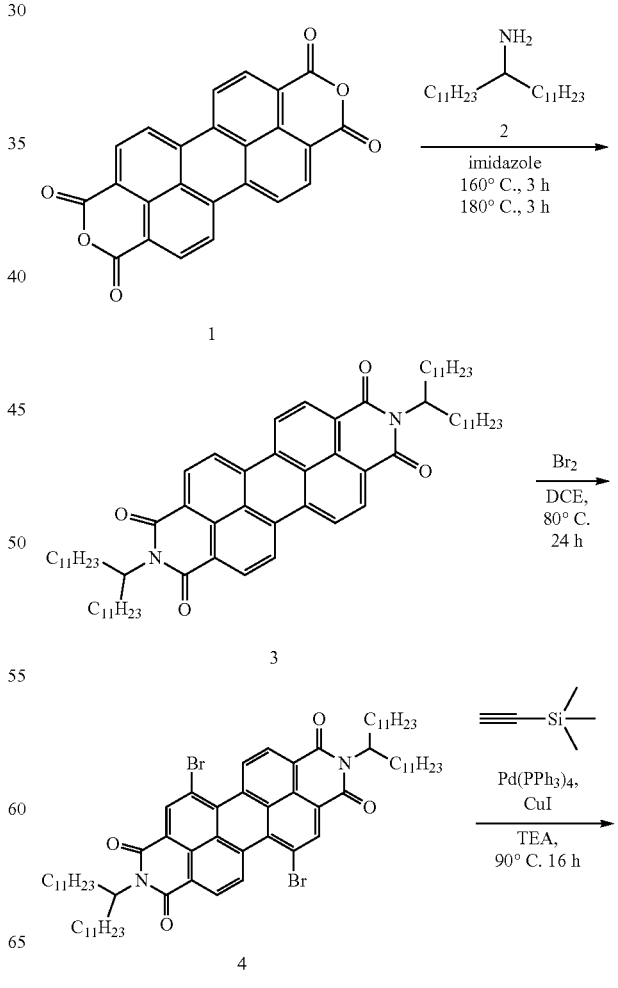

-continued

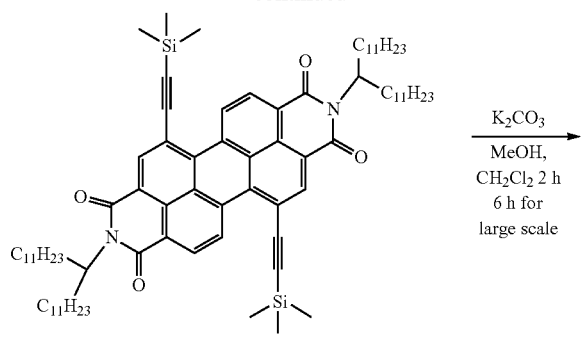

5

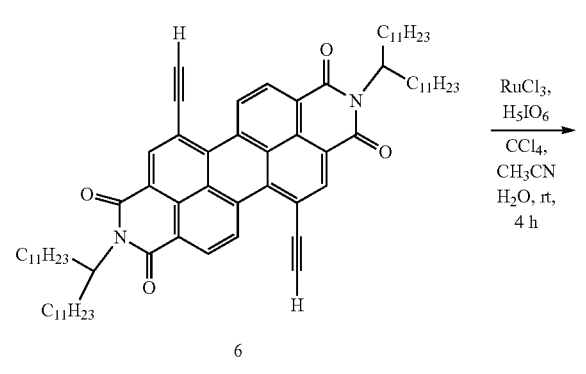

6

AB11405
K-085
7

The process involved in the synthesis in this example may be understood in terms of the following five steps.

a) First Step:

-continued

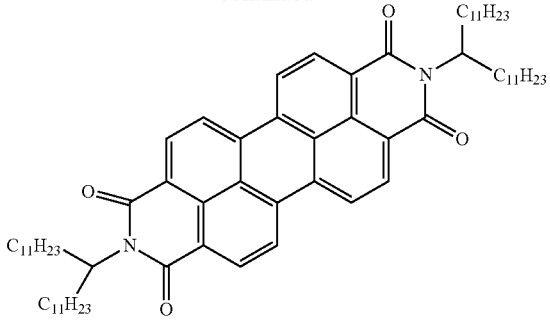

3

Anhydride 1 (60.0 g, 0.15 mol, 1.0 eq), amine 2 (114.4 g, 0.34 mol, 2.2 eq) and imidazole (686.0 g, 10.2 mol, 30 eq to 2) were mixed well into a 500 mL of round-bottom flask equipped with a bump-guarder. The mixture was degassed three times, stirred at 160° C. for 3 hr, 180° C. for 3 hr, and cooled to rt. The reaction mixture was crushed into water (1000 mL) with stirring. Precipitate was collected with filtration, washed with water (2×500 mL), methanol (2×300 mL) and dried on high vacuum. The crude product was purified by flash chromatography column ($CH_2Cl_2$/hexane=1/1) to give 77.2 g (48.7%) of the desired product 3 as an orange solid. $^1$H NMR (300 MHz, $CDCl_3$) δ 8.65-8.59 (m, 8H), 5.20-5.16 (m, 2H), 2.29-2.22 (m, 4H), 1.88-1.82 (m, 4H), 1.40-1.13 (m, 64H), 0.88-0.81 (t, 12H). Rf=0.68 ($CH_2Cl_2$/hexane=1/1).

b) Second Step:

To a solution of the diimide 3 (30.0 g, 29.0 mmol, 1.0 eq) in dichloroethane (1500 mL) was added bromine (312.0 g, 1.95 mol, 67.3 eq). The resulting mixture was stirred at 80° C. for 36 hr, cooled, washed with 10% NaOH (aq, 2×1000 mL), water (100 ml), dried over $Na_2SO_4$, filtered and concentrated. The crude product was purified by flash chromatography column ($CH_2Cl_2$/hexanes=1/1) to give 34.0 g (98.2%) of the desired product 4 as a red solid. $^1$H NMR (300 MHz, $CDCl_3$) δ 9.52 (d, 2H), 8.91 (bs, 2H), 8.68 (bs, 2H), 5.21-5.13 (m, 2H), 2.31-2.18 (m, 4H), 1.90-1.80 (m, 4H), 1.40-1.14 (m, 64H), 0.88-0.81 (t, 12H). Rf=0.52 ($CH_2Cl_2$/hexanes=1/1).

c) Third Step

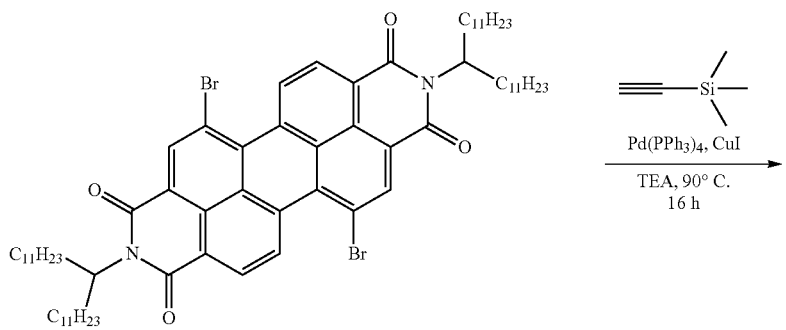

To a solution of the di-bromide 4 (2.0 g, 1.68 mmol, 1.0 eq) in triethylamine (84.0 mL) was added CuI (9.0 mg, 0.048 mmol, 2.8 mol %) and (trimethylsilyl)acetylene (80.49 g, 5.0 mmol, 3.0 eq). The mixture was degassed three times. Catalyst Pd(PPh$_3$)$_4$ (98.0 mg, 0.085 mmol, 5.0 mol %) was added. The mixture was degassed three times, stirred at 90° C. for 24 hr, cooled, passed through a pad of Celite, and concentrated. The crude product was purified by flash chromatography column (CH$_2$Cl$_2$/hexane=1/1) to give 1.8 g (87.2%) of the desired product 5 as a dark-red solid. $^1$H NMR (300 MHz, CDCl$_3$) δ 10.24-10.19 (m, 2H), 8.81 (bs, 2H), 8.65 (bs, 2H), 5.20-5.16 (m, 2H), 2.31-2.23 (m, 4H), 1.90-1.78 (m, 4H), 1.40-1.15 (m, 72H), 0.84-0.81 (t, 12H), 0.40 (s, 18H). Rf=0.72 (CH$_2$Cl$_2$/hexane=1/1).

d) Fourth Step

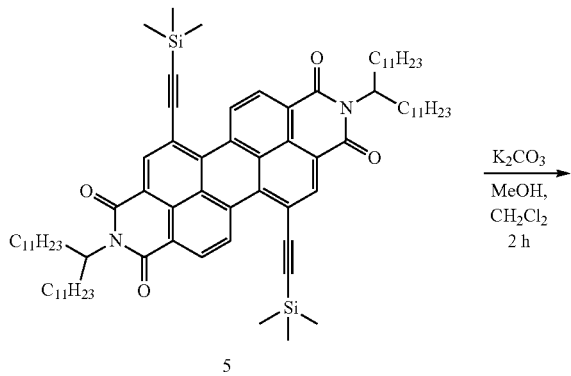

To a solution of diimide 5 (1.8 g, 1.5 mmol, 1.0 eq) in a mixture of MeOH/DCM (40.0 mL/40.0 mL) was added K$_2$CO$_3$ (0.81 g, 6.0 mmol, 4.0 eq). The mixture was stirred at room temperature for 1.5 hr, diluted with DCM (40.0 mL), washed with water, brine, dried over Na$_2$SO$_4$, filtered and concentrated. The crude product was purified by flash chromatography column (CH$_2$Cl$_2$) to give 1.4 g (86.1%) of the desired product 6 as a dark-red solid. $^1$H NMR (300 MHz, CDCl$_3$) δ 10.04-10.00 (m, 2H), 8.88-8.78 (m, 2H), 8.72-8.60 (m, 2H), 5.19-5.14 (m, 2H), 3.82-3.80 (m, 2H), 2.31-2.23 (m, 4H), 1.90-1.78 (m, 4H), 1.40-1.05 (m, 72H), 0.85-0.41 (t, 12H). Rf=0.62 (CH$_2$Cl$_2$).

e) Fifth Step

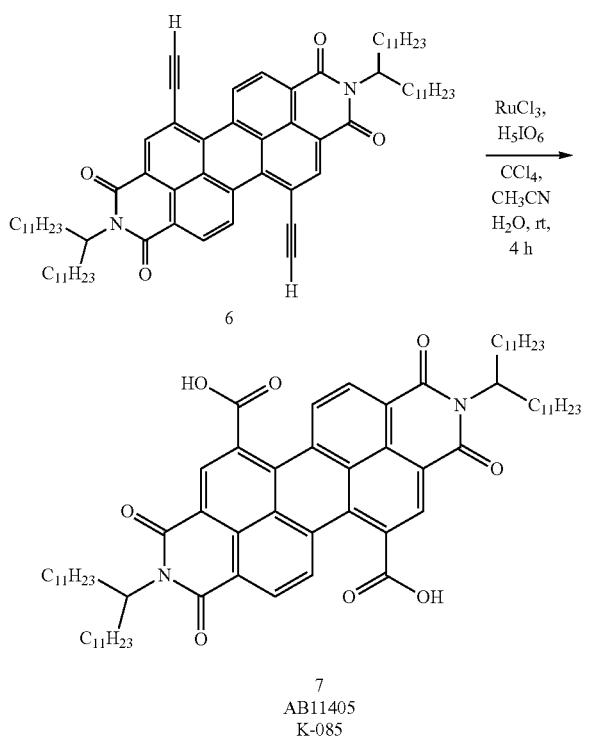

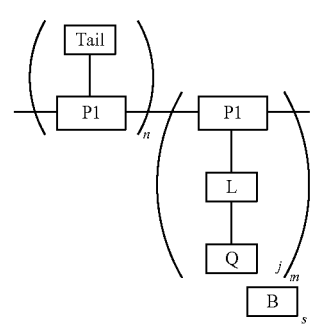

7
AB11405
K-085

To a suspension of alkyne 6 (1.4 g, 1.3 mmol, 1.0 eq) in a mixture of CCl$_4$/CH$_3$CN/H$_2$O (6 mL/6 mL/12 mL) was added periodic acid (2.94 g, 12.9 mmol, 10.0 eq) and RuCl$_3$ (28.0 mg, 0.13 mmol, 10 mol %). The mixture was stirred at room temperature under nitrogen for 4 hours, diluted with DCM (50 mL), washed with water, brine, dried over Na$_2$SO$_4$, filtered and concentrated. The crude product was purified by flash chromatography column (10% MeOH/CH$_2$Cl$_2$) to give 1.0 g (68.5%) of the desired product 7 as a dark-red solid. $^1$H NMR (300 MHz, CDCl$_3$) □ 8.90-8.40 (m, 6H), 5.17-5.00 (m, 2H), 2.22-2.10 (m, 4H), 1.84-1.60 (m, 4H), 1.41-0.90 (m, 72H), 0.86-0.65 (t, 12H). Rf=0.51 (10% MeOH/CH$_2$Cl$_2$).

Furuta co-polymers and para-Furuta polymers (herein referred to collectively as Furuta Polymers unless otherwise specified) are polymeric compounds with insulating tails, and linked/tethered/partially immobilized polarizable ionic groups. The insulating tails are hydrocarbon (saturated and/or unsaturated), fluorocarbon, siloxane, and/or polyethylene glycol linear or branched chains covalently bonded to the co-polymer backbone. The tails act to insulate the polarizable tethered/partially immobilized ionic molecular components and ionic pairs from other ionic groups and ionic group pairs on the same or parallel co-polymers, which favorably allows discrete polarization of counter ionic liquid pairs or counter Q groups (i.e. polarization of cationic liquid and anionic liquid tethered/partially immobilized to parallel Furuta polymers) with limited or no interaction of ionic fields or polarization moments of other counter ionic group pairs partially immobilized on the same or parallel co-polymer chains. Further, the insulating tails electrically insulate supra-structures of Furuta polymers from each other. Parallel Furuta polymers may arrange or be arranged such that counter ionic groups (i.e. tethered/partially immobilized ionic groups (Qs) of cation and anion types (sometimes known as cationic Furuta polymers and anionic Furuta polymers)) are aligned opposite from one another. In some implementations, the metadielectric layer may include two or more Furuta polymers, including a Furuta polymer having an immobilized ion liquid group of a cationic or anionic type.

A Furuta co-polymer has the following general structural formula:

$$\left( \left( \begin{array}{c} \text{Tail} \\ \text{P1} \end{array} \right)_n \left( \begin{array}{c} \text{P1} \\ \text{L} \\ \text{Q} \end{array} \right)_j \right)_m \text{B} \right)_s$$

wherein backbone structure of the co-polymer comprises structural units of first type P1 and structural units of second type P2 both of which randomly repeat and are independently selected from the list comprising acrylic acid, methacrylate, repeat units of polypropylene (—[CH$_2$—CH(CH$_3$)]—), repeat units of polyethylene (—[CH$_2$]—), siloxane, or repeat units of polyethylene terephthalate (sometimes written poly(ethylene terephthalate)) for which the repeat unit may be expressed as —CH$_2$—CH$_2$—O—CO—C$_6$H$_4$—CO—O—. Parameter n is the number of the P1 structural units in the backbone structure which is in the range from 3 to 100,000 and m is number of the P2 structural units in the backbone structure which is in the range from 3 to 100,000. Further, the first type structural unit (P1) has a resistive substitute Tail which is oligomers of polymeric material with HOMO-LUMO gap no less than 2 eV. Additionally, the second type of structural units (P2) has an ionic functional group Q which is connected to P2 via a linker group L. The parameter j is a number of functional groups Q attached to the linker group L, which may range from 0 to 5. Wherein the ionic functional group Q comprises one or more ionic liquid ions (from the class of ionic compounds that are used in ionic liquids), zwitterions, or polymeric acids. Further, an energy interaction of the ionic Q groups may be less than kT, where k is Boltzmann constant and T is the temperature of environment. Still further, parameter B is a counter ion which is a molecule or molecules or oligomers that can supply the opposite charge to balance the charge of the co-polymer. Wherein, s is the number of the counter ions.

The present disclosure provides an organic co-polymeric compound having the structure described above. In one embodiment of the organic co-polymeric compound, the resistive substitute Tails are independently selected from the list comprising oligomers of polypropylene (PP), oligomers of polyethylene terephthalate (PET), oligomers of polyphenylene sulfide (PPS), oligomers of polyethylene naphthalate (PEN), oligomers of polycarbonate (PP), polystyrene (PS), and oligomers of polytetrafluoroethylene (PTFE). In another embodiment of the organic co-polymeric compound, the resistive substitutes Tail are independently selected from alkyl, aryl, substituted alkyl, substituted aryl, fluorinated alkyl, chlorinated alkyl, branched and complex alkyl, branched and complex fluorinated alkyl, branched and complex chlorinated alkyl groups, and any combination thereof, and wherein the alkyl group is selected from methyl, ethyl, propyl, butyl, iso-butyl and tert-butyl groups, and the aryl group is selected from phenyl, benzyl and naphthyl groups. The resistive substitute Tail may be added after polymerization.

In yet another aspect of the present disclosure, it is preferable that the HOMO-LUMO gap is no less than 4 eV. In still another aspect of the present disclosure, it is even more preferable that the HOMO-LUMO gap is no less than 5 eV. The ionic functional group Q comprises one or more ionic liquid ions from the class of ionic compounds that are used in ionic liquids, zwitterions, or polymeric acids. The energy of interaction between Q group ions on discrete $P_2$ structural units may be less than kT, where k is Boltzmann constant and T is the temperature of environment. The temperature of environment may be in range between −60° C. of and 150° C. The preferable range of temperatures is between −40° C. and 100° C. Energy interaction of the ions depends on the effective radius of ions. Therefore, by increasing the steric hindrance between ions it is possible to reduce energy of interaction of ions. In one embodiment of the present invention, at least one ionic liquid ion is selected from the list comprising $[NR_4]^+$, $[PR_4]^+$ as cation and $[-CO_2]^-$, $[-SO_3]^-$, $[-SR_5]^-$, $[-PO_3R]^-$, $[-PR_5]^-$ as anion, wherein R is selected from the list comprising H, alkyl, and fluorine. The functional group Q may be charged after or before polymerization. In another embodiment of the present invention, the linker group L is oligomer selected from structures 42 to 46 as given in Table 4.

TABLE 4

Examples of the oligomer linker group

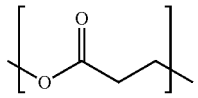 42

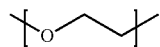 43

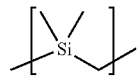 44

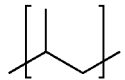 45

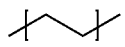 46

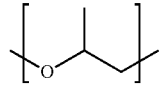 47

In yet another embodiment of the present invention, the linker group L is selected from structures 48 to 57 as given in Table 5.

TABLE 5

Examples of the linker group

 48

 49

TABLE 5-continued

Examples of the linker group

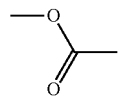 50

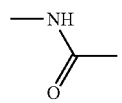 51

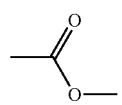 52

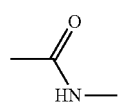 53

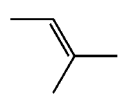 54

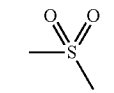 55

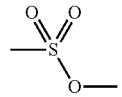 56

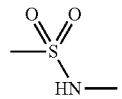 57

In yet another embodiment of the present invention, the linker group L may be selected from the list comprising $CH_2$, $CF_2$, $SiR_2O$, and CH2CH2O, wherein R is selected from the list comprising H, alkyl, and fluorine. The ionic functional group Q and the linker groups L may be added after polymerization.

In another aspect, the present disclosure provides a dielectric material (sometimes called a metadielectric) comprising of one or more of the class of Furuta polymers comprising protected or hindered ions of zwitterion, cation, anion, or polymeric acid types described hereinabove. The metadielectric material may be a mixture of zwitterion type Furuta polymers, or positively charged (cation) Furuta polymers and negatively charged (anion) Furuta polymers, polymeric acid Furuta polymers, or any combination thereof. The mixture of Furuta polymers may form or be induced to form supra-structures via hydrophobic and ionic interactions. By way of example, but not limiting in scope, the cation on a positively charged Furuta polymer replaces the B counter ions of the anion on a negatively charged Furuta polymer parallel to the positively charged Furuta polymer and vice versa; and the resistive Tails of neighboring Furuta polymers further encourages stacking via van der Waals forces, which increases ionic group isolation. Metadielectrics comprising both cationic and anionic Furuta polymers have a 1:1 ratio of cationic and anionic Furuta polymers.

The Tails of hydrocarbon (saturated and/or unsaturated), fluorocarbon, siloxane, and/or polyethylene glycol linear or branched act to insulate linked/tethered/partially immobilized polarizable ionic liquids, zwitterions, or polymeric acids (ionic Q groups). The Tails insulate the ionic Q groups from other ionic Q groups on the same or parallel Furuta polymer via steric hindrance of the ionic Q groups' energy of interaction, which favorably allows discrete polarization of the ionic Q groups (i.e. polarization of cationic liquid and anionic liquid tethered/partially immobilized to parallel Furuta polymers). Further, the Tails insulate the ionic groups of supra-structures from each other. Parallel Furuta polymers may arrange or be arranged such that counter ionic liquids (i.e. tethered/partially immobilized ionic liquids (Qs) of cation and anion types) are aligned opposite from one another (sometimes known as cationic Furuta polymers and anionic Furuta polymers).

The Furuta polymers have hyperelectronic or ionic type polarizability. "Hyperelectronic polarization may be considered due to the pliant interaction of charge pairs of excitons, localized temporarily on long, highly polarizable molecules, with an external electric field (Roger D. Hartman and Herbert A. Pohl, "Hyper-electronic Polarization in Macromolecular Solids", Journal of Polymer Science: Part A-1 Vol. 6, pp. 1135-1152 (1968))." Ionic type polarization can be achieved by limited mobility of ionic parts of the tethered/partially immobilized ionic liquid or zwitterion (Q). Additionally, other mechanisms of polarization such as dipole polarization and monomers and polymers possessing metal conductivity may be used independently or in combination with hyper-electronic and ionic polarization in aspects of the present disclosure.

Further, a metadielectric layer may be comprised of one or more types of zwitterion Furuta polymer and/or selected from the anionic $Q^+$ group types and cationic $Q^-$ group types and/or polymeric acids, having the general configuration of Furuta polymers:

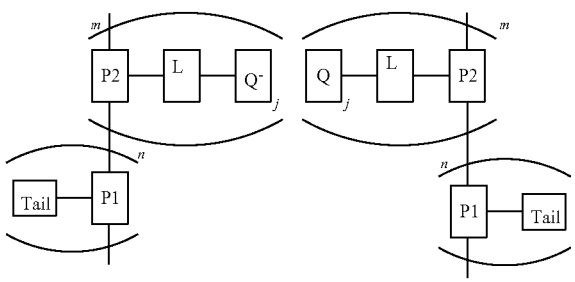

In order that the invention may be more readily understood, reference is made to the following examples of synthesis of Furuta co-polymers, which are intended to be illustrative of the invention, but are not intended to be limiting the scope.

EXAMPLE 3

Carboxylic acid co-polymer P002. To a solution of 1.02 g (11.81 mmol) of methacrylic acid and 4.00 g (11.81 mmol) of stearylmethacrylate in 2.0 g isopropanol was added a solution of 0.030 g 2,2'-azobis(2-methylpropionitrile) (AIBN) in 5.0 g of toluene. The resulting solution was heated to 80° C. for 20 hours in a sealed vial, after which it became noticeably viscous. NMR shows <2% remaining monomer. The solution was used without further purification in film formulations and other mixtures.

EXAMPLE 4

Amine co-polymer P011. To a solution of 2.52 g (11.79 mmol) of 2-(diisopropylamino)ethyl methacrylate and 3.00 g (11.79 mmol) of laurylmethacrylate in 2.0 g toluene was added a solution of 0.030 g 2,2'-azobis(2-methylpropionitrile) (AIBN) in 4.0 g of toluene. The resulting solution was heated to 80° C. for 20 hours in a sealed vial, after which it became noticeably viscous. NMR shows <2% remaining monomer. The solution was used without further purification in film formulations and other mixtures.

EXAMPLE 5

Carboxylic acid co-polymer and amine co-polymer mixture. 1.50 g of a 42 wt % by solids solution of P002 was added to 1.24 g of a 56 wt % solution of P011 with 1 g of isopropanol and mixed at 40° C. for 30 minutes. The solution was used without further purification.

A para-Furuta polymer has repeat units of the following general structural formula:

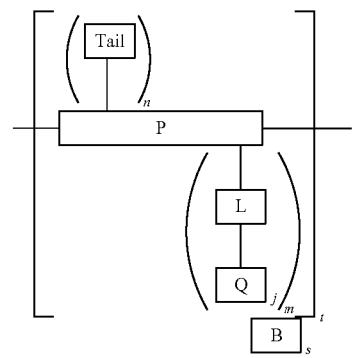

wherein a structural unit P comprises a backbone of the copolymer, which is independently selected from the list comprising acrylic acid, methacrylate, repeat units for polypropylene (PP) (—[$CH_2$—$CH(CH_3)$]—), repeat units for polyethylene (PE) (—[$CH_2$]—), siloxane, or repeat units of polyethylene terephthalate (sometimes written poly(ethylene terephthalate)) for which the repeat unit may be expressed as —$CH_2$—$CH_2$—O—CO—$C_6H_4$—CO—O—. Wherein the first type of repeat unit (Tail) is a resistive substitute in the form of an oligomer of a polymeric material. The resistive substitute preferably has a HOMO-LUMO gap no less than 2 eV. The parameter n is a number of Tail repeat units on the backbone P structural unit, and is in the range from 3 to 100,000. Further, the second type of repeat units (-L-Q) include an ionic functional group Q which is connected to the structural backbone unit (P) via a linker group L, and m is number of the -L-Q repeat units in the backbone structure which is in the range from 3 to 100,000. Additionally, the ionic functional group Q comprises one or more ionic liquid ions (from the class of ionic compounds that are used in ionic liquids), zwitterions, or polymeric acids. An energy of interaction of the ionic Q groups may be less than kT, where k is Boltzmann constant and T is the temperature of environment. Still further, the parameter t is average of para-Furuta polymer repeat units, ranging from 6 to 200,000. Wherein B's are counter ions which are molecules or oligomers that can supply the opposite charge to balance the charge of the co-polymer, s is the number of the counter ions.

In some implementations, the resistive substitute Tails are independently selected from the list comprising polypropylene (PP), polyethylene terephthalate (PET), polyphenylene sulfide (PPS), polyethylene naphthalate (PEN), polycarbonate (PP), polystyrene (PS), and polytetrafluoroethylene (PTFE). In another embodiment of the organic polymeric compound, the resistive substitutes Tail are independently selected from alkyl, aryl, substituted alkyl, substituted aryl, fluorinated alkyl, chlorinated alkyl, branched and complex alkyl, branched and complex fluorinated alkyl, branched and complex chlorinated alkyl groups, and any combination thereof, and wherein the alkyl group is selected from methyl, ethyl, propyl, butyl, iso-butyl and tert-butyl groups, and the aryl group is selected from phenyl, benzyl and naphthyl groups. The resistive substitute Tail may be added after polymerization. In yet another embodiment of the present disclosure, it is preferable that the HOMO-LUMO gap is no less than 4 eV. In still another embodiment of the present disclosure, it is even more preferable that the HOMO-LUMO gap is no less than 5 eV. The ionic functional group Q comprises one or more ionic liquid ions from the class of ionic compounds that are used in ionic liquids, zwitterions, or polymeric acids. Energy of interaction between Q group ions on discrete P structural units may be less than kT, where k is Boltzmann constant and T is the temperature of environment. The temperature of environment may be in range between −60° C. and 150° C. The preferable range of temperatures is between −40° C. and 100° C. Energy interaction of the ions depends on the effective radius of ions. Therefore, by increasing the steric hindrance between ions it is possible to reduce energy of interaction of ions. In one embodiment of the present invention, at least one ionic liquid ion is selected from the list comprising $[NR_4]^+$, $[PR_4]^+$ as cation and $[-CO_2]^-$, $[-SO_3]^-$, $[-SR_5]^-$, $[-PO_3R]^-$, $[-PR_5]^-$ as anion, wherein R is selected from the list comprising H, alkyl, and fluorine. The functional group Q may be charged after or before polymerization. In another embodiment of the present invention, the linker group L is oligomer selected from structures 42 to 47 as given in Table 3 or structures 48 to 57 in Table 4.

In some implementations, the linker group L is selected from the list comprising $CH_2$, $CF_2$, $SiR_2O$, and $CH_2CH_2O$, wherein R is selected from the list comprising H, alkyl, and fluorine. The ionic functional group Q and the linker groups L may be added after polymerization.

In some implementations, the metadielectric includes one or more of the class of para-Furuta polymers comprising protected or hindered ions of zwitterion, cationic liquid ions, anionic liquid ions, or polymeric acid types described hereinabove. The metadielectric material may be a mixture of zwitterion type para-Furuta polymers, or positively charged (cation) para-Furuta polymers and negatively charged (anion) para-Furuta polymers, polymeric acid para-Furuta polymers, or any combination thereof. The mixture of para-Furuta polymers may form or be induced to form supra-structures via hydrophobic and ionic interactions. By way of example, but not limiting in scope, the cation(s) on a positively charged para-Furuta polymer replaces the B counter ions of the anion(s) on a negatively charged para-Furuta polymer parallel to the positively charged para-Furuta polymer and vice versa; and the resistive Tails of neighboring para-Furuta polymers further encourages stacking via van der Waals forces, which increases ionic group isolation. Metadielectrics comprising both cationic and anionic para-Furuta polymers preferably have a 1:1 ratio of cationic and anionic para-Furuta polymers.

The Tails of hydrocarbon (saturated and/or unsaturated), fluorocarbon, siloxane, and/or polyethylene glycol linear or branched act to insulate linked/tethered/partially immobilized polarizable ionic liquids, zwitterions, or polymeric acids (ionic Q groups). The Tails insulate the ionic Q groups from other ionic Q groups on the same or parallel para-Furuta polymer via steric hindrance of the ionic Q groups' energy of interaction, which favorably allows discrete polarization of the ionic Q groups (i.e. polarization of cationic liquid and anionic liquid tethered/partially immobilized to parallel para-Furuta polymers). Further, the Tails insulate the ionic groups of supra-structures from each other. Parallel para-Furuta polymers may arrange or be arranged such that counter ionic liquids (i.e. tethered/partially immobilized ionic liquids (Qs) of cation and anion types) are aligned opposite from one another (sometimes known as cationic para-Furuta polymers and anionic para-Furuta polymers).

The para-Furuta polymers have hyperelectronic or ionic type polarizability. "Hyperelectronic polarization may be considered due to the pliant interaction of charge pairs of excitons, localized temporarily on long, highly polarizable molecules, with an external electric field [.] (Roger D. Hartman and Herbert A. Pohl, "Hyper-electronic Polarization in Macromolecular Solids", Journal of Polymer Science: Part A-1 Vol. 6, pp. 1135-1152 (1968))." Ionic type polarization can be achieved by limited mobility of ionic parts of the tethered/partially immobilized ionic liquid or zwitterion (Q). Additionally, other mechanisms of polarization such as dipole polarization and monomers and polymers possessing metal conductivity may be used independently or in combination with hyper-electronic and ionic polarization in aspects of the present disclosure.

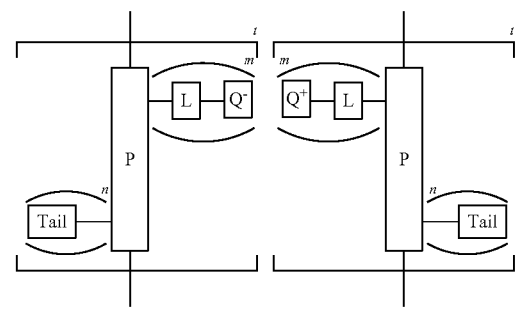

Further, a metadielectric layer may be comprised of one or more types of zwitterion para-Furuta polymer and/or selected from the anionic Q group types and cationic Q group types and/or polymeric acids, which may have the following general arrangement of para-Furuta polymers:

A metadielectric is defined here as a dielectric material comprised of one or more types of structured polymeric materials (SPMs) having a relative permittivity greater than or equal to 1000 and resistivity greater than or equal to $10^{13}$ ohm·cm. Individually, the SPMs in a metadielectric may form column like supramolecular structures by pi-pi interaction or hydrophilic and hydrophobic interactions. Said supramolecules of SPMs may permit formation of crystal structures of the metadielectric material. By way of using SPMs in a dielectric material, polarization units are incorporated to provide the molecular material with high dielectric permeability. There are several mechanisms of polarization such as dipole polarization, ionic polarization, and hyper-electronic polarization of molecules, monomers and polymers possessing metal conductivity. All polarization units with the listed types of polarization may be used in aspects of the present disclosure. Further, SPMs are composite materials which incorporate an envelope of insulating substituent groups that electrically isolate the supramolecules from each other in the dielectric layer and provide high breakdown voltage of the energy storage molecular material. Said insulating substituent groups are hydrocarbon (saturated and/or unsaturated), fluorocarbon, siloxane, and/or polyethylene glycol linear or branched chains covalently bonded to a polarizable core or co-polymer backbone, forming the resistive envelope.

In general, a YanLi polymer is a composite oligomeric material comprised of monomers that have polarizable and insulating components. The monomers may include a polarizable unit having a non-linear polarizable core that includes a conjugated ring system and at least one dopant group. The monomers also include an insulating tail as a side chain on the polarizable unit, on the handle linking a polarizable unit to the monomer backbone, or directly attached to the backbone. In some embodiments, a YanLi polymer may be a co-polymer wherein one monomer unit includes an insulating tail and a second monomer unit includes a polarizable unit having a non-linear polarizable core that includes a conjugated ring system and at least one dopant group. In some embodiments, the polarizable unit may be partially or fully incorporated into the monomer backbone. Additionally, the polarizable unit may be partially or fully incorporated into the monomer backbone.

A metadielectric layer may be a film made from composite polymers referred to herein as YanLi materials. A particular subclass of YanLi materials are referred to herein as YanLi dielectrics, which are materials of one or more YanLi polymers, of one or more YanLi oligomer, or any combination thereof. Such a composite polymeric material is characterized by a chemical structure that includes a repeating backbone unit, a polarizable unit, and a resistive tail. The polarizable unit must possess a high degree of conjugation. Herein, we define "polarizable unit" to mean any multicyclic arrangement where electrons are delocalized over the entire portion of the polarizable unit structure via conjugated single and double bonds. Herein, anisometric is defined as the condition of a molecule possessing charge or partial charge asymmetry along an axis. Possible, non-limiting, forms of this conjugation are polycyclic fused aromatic systems or a conjugated bridge where aromatic systems are connected by alternating single and double bonds.

YanLi materials include composite polymeric materials of the following general formula:

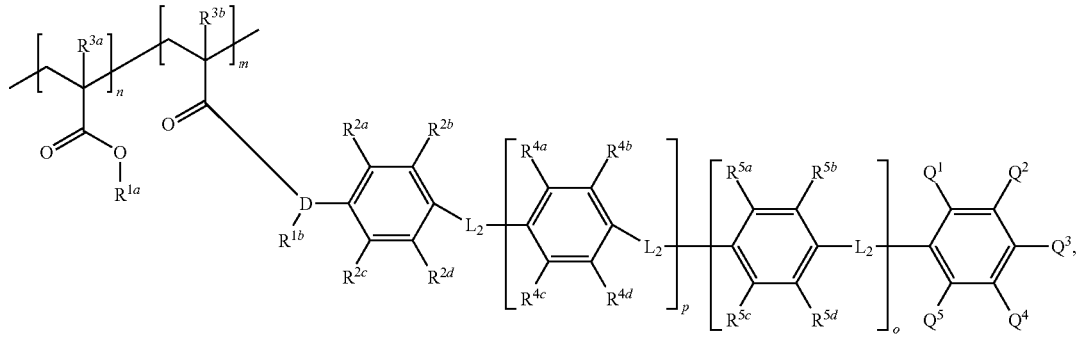

wherein D is

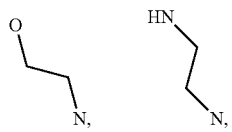

N, or a hydrocarbon chain, wherein $R^{1a}$, $R^{1b}$, $R^{2a}$, $R^{2b}$, $R^{2c}$, $R^{2d}$, $R^{3a}$, $R^{3b}$, $R^{4a}$, $R^{4b}$, $R^{4c}$, $R^{4d}$, $R^{5a}$, $R^{5b}$, $R^{5c}$, $R^{5d}$ are independently selected from —H, —OH, -Ak, -Ak-$X_j$, —OAk, or —OAk-$X_j$; $L_2$ is a heteroatom bridge in conjugation with the ring system containing $R^{2a}$, $R^{2b}$, $R^{2c}$, $R^{2d}$, $Q^1$, $Q^2$, $Q^3$, $Q^4$, wherein $R^{2a}$, $R^{2b}$, $R^{2c}$, $R^{2d}$, $Q^1$, $Q^2$, $Q^3$, $Q^4$, $Q^5$ are each independently selected from —H and any electron withdrawing or electron donating group; wherein Ak is alkyl, X is any halogen, n is 0-150, m is 1-300, l is 1-51, o is 0-10, p is 0-1 when o is less than or equal to one and 1 when o is greater than 1, wherein $R^{1a}$ or $R^{1b}$ is an insulating resistive tail or both $R^{1a}$ and $R^{2a}$ are insulating resistive tails.

In some implementations of composite polymeric materials of the above general formula, the value of n may be equal to or greater than 1.

In some implementations of composite polymeric materials of the above general formula, the value of n may be equal to zero. In such implementations, $R^{1a}$, $R^{1b}$, $R^{3a}$ or $R^{3b}$ may possesses at least 7 carbon atoms.

In some implementations of composite polymeric materials of the above general formula, $R^{1a}$, $R^{1b}$, $R^{3a}$, and $R^{3b}$ may be insulating resistive tails are independently selected from the group consisting of saturated hydrocarbon, saturated halogenated hydrocarbon, partially halogenated hydrocarbon, aryl chain, and cycloalkyl, and X—RR'R"; wherein X is selected from C, O, N, and S, and R, R', and R" are independently selected from H and $C_{5-50}$, wherein one or more of R, R', and R" is $C_{5-50}$. As used in the present disclosure, the notation $C_{5-50}$ means a chain of 5 to 50 carbon atoms. In such implementations a chain may be monounsaturated or partially unsaturated, yet the unsaturated bonds are not conjugated. In such implementations all insulating resistive tails may be selected independently from the group consisting of non-aromatic carbocycles and non-aromatic heterocycles.

In some implementations of composite polymeric materials of the above general formula, all insulating resistive tails may be rigid.

In some implementations of composite polymeric materials of the above general formula, $Q_1$, $Q_2$, $Q_3$, $Q_4$ and $Q_5$ may each be independently selected from —$NO_2$, —$NH_3^+$ and —$NRR'R''^+$ (quaternary nitrogen salts) with counterion $Cl^-$ or $Br^-$, —CHO (aldehyde), —CRO (keto group), —$SO_3H$ (sulfonic acids), —$SO_3R$ (sulfonates), $SO_2NH_2$ (sulfonamides), —COOH (carboxylic acid), —COOR (esters, from carboxylic acid side), —COCl (carboxylic acid chlorides), —$CONH_2$ (amides, from carboxylic acid side), —$CF_3$, —$CCl_3$, —CN, —$O^-$ (phenoxides) with counter ion $Na^+$ or $K^+$, —$NH_2$, —NHR, —$NR_2$, —OH, OR (ethers), —NHCOR (amides, from amine side), —OCOR (esters, from alcohol side), alkyls, —$C_6H_5$, vinyls, wherein R and R' and R" are radicals selected from the list comprising hydrogen, alkyl (methyl, ethyl, isopropyl, tert-butyl, neopentyl, cyclohexyl etc.), allyl (—CH2-CH═CH2), benzyl (—CH2C6H5) groups, phenyl (+substituted phenyl) and other aryl (aromatic) groups. In some such implementations, one or more of $Q^1$, $Q^2$, $Q^3$, $Q^4$, and $Q^5$ may be —$NO_2$.

In some implementations of composite polymeric materials of the above general formula, D may be a hydrocarbon chain that is interrupted by heteroatoms at the point of backbone attachment and side chain attachment.

In some implementations of composite polymeric materials of the above general formula, $L_2$ may be an azo-bridge or —N═N—, an alkene bridge or —HC═CH—, and alkyne bridge or —C≡C—. In addition, aspects of the present disclosure include composite polymeric materials of the following general formula:

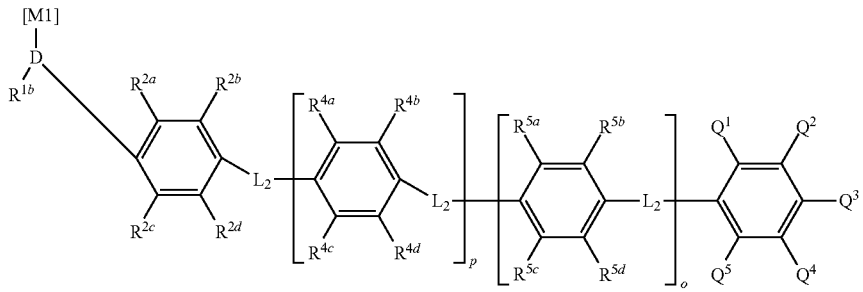

In the above general formula [M1] is:

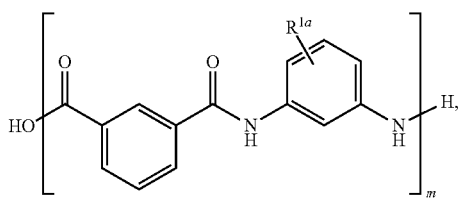

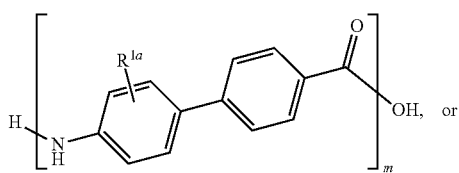

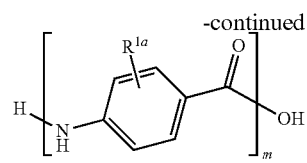

$R^{1a}$, $R^{1b}$, $R^{2a}$, $R^{2b}$, $R^{2c}$, $R^{2d}$, $R^{4a}$, $R^{4b}$, $R^{4c}$, $R^{4d}$, $R^{5a}$, $R^{5b}$, $R^{5c}$, $R^{5d}$ are independently selected from —H, —OH, -Ak, -Ak-$X_l$, —OAk, or —OAk-$X_l$, $L_2$ is a heteroatom bridge in conjugation with the ring system containing $R^{2a}$, $R^{2b}$, $R^{2c}$, $R^{2d}$, $Q^1$, $Q^2$, $Q^3$, $Q^4$, $Q^5$; wherein $R^{2a}$, $R^{2b}$, $R^{2c}$, $R^{2d}$, $Q^1$, $Q^2$, $Q^3$, $Q^4$, $Q^5$ are each independently selected from —H and any electron withdrawing or electron donating group, wherein D is a hydrocarbon chain, wherein Ak is alkyl, X is any halogen, m is 1-300, l is 1-51, o is 0-10, p is 0-1 when o is less than or equal to one and 1 when o is greater than 1, wherein $R^{1a}$ or $R^{1b}$ is an insulating resistive tail or both $R^{1a}$ and $R^{1b}$ are insulating resistive tails.

In some implementations of composite polymeric materials of the above general formula, $R^{1a}$, $R^{1b}$, $R^{3a}$ or $R^{3b}$ may possess at least 7 carbon atoms.

In some implementations of composite polymeric materials of the above general formula, $R^{1a}$, $R^{1b}$, $R^{3a}$, and $R^{3b}$ are insulating resistive tails are independently selected from the group consisting of saturated hydrocarbon, saturated halogenated hydrocarbon, partially halogenated hydrocarbon, aryl chain, and cycloalkyl, and X—RR'R"; wherein X is selected from C, O, N, and S, and R, R', and R" are independently selected from H and $C_{5-50}$, wherein one or more of R, R', and R" is $C_{5-50}$.

In some implementations of composite polymeric materials of the above general formula, the insulating resistive tails may be selected independently from the group consisting of non-aromatic carbocycles and non-aromatic heterocycles.

In some implementations of composite polymeric materials of the above general formula all insulating resistive tails may be rigid.

In some implementations of composite polymeric materials of the above general formula, $Q_1$, $Q_2$, $Q_3$, $Q_4$ and $Q_5$ are each independently selected from —$NO_2$, —$NH_3^+$ and —$NRR'R''^+$ (quaternary nitrogen salts) with counterion $Cl^-$ or $Br^-$, —CHO (aldehyde), —CRO (keto group), —$SO_3H$ (sulfonic acids), —$SO_3R$ (sulfonates), $SO_2NH_2$ (sulfonamides), —COOH (carboxylic acid), —COOR (esters, from carboxylic acid side), —COCl (carboxylic acid chlorides), —$CONH_2$ (amides, from carboxylic acid side), —$CF_3$, —$CCl_3$, —CN, —$O^-$ (phenoxides) with counter ion $Na^+$ or $K^+$, —$NH_2$, —NHR, —$NR_2$, —OH, OR (ethers), —NHCOR (amides, from amine side), —OCOR (esters, from alcohol side), alkyls, —C$_6$H$_5$, vinyls, wherein R and R' and R" are radicals selected from the list comprising hydrogen, alkyl (methyl, ethyl, isopropyl, tert-butyl, neopentyl, cyclohexyl etc.), allyl (—CH2-CH=CH2), benzyl (—CH2C6H5) groups, phenyl (+substituted phenyl) and other aryl (aromatic) groups. In some such implementations, one or more of Q$^1$, Q$^2$, Q$^3$, Q$^4$, and Q$^5$ may be —NO$_2$.

In some implementations of composite polymeric materials of the above general formula, D may be a hydrocarbon chain that is interrupted by heteroatoms at the point of backbone attachment and side chain attachment.

In some implementations of composite polymeric materials of the above general formula, L$_2$ may be an azo-bridge or —N=N—, an alkene bridge or —HC=CH—, and alkyne bridge or —C≡C—.

In some implementations of composite polymeric materials of the above general formula, D may be a hydrocarbon chain interrupted by heteroatoms at the point of backbone attachment and side chain attachment.

In some implementations of composite polymeric materials of the above general formula, L$_2$ may be an azo-bridge or —N=N—, an alkene bridge or —HC=CH—, and alkyne bridge or —C≡C—.

Furthermore, aspects of the present disclosure include composite polymeric materials of the following general formula:

In the foregoing general formula R$^{1a}$ and R$^{1b}$ are independently selected from —H, —OH, -Ak, -Ak-X$_l$, —OAk, and —OAk-X$_l$, Ak is alkyl, X is any halogen, m is 1-300, l is 1-51, and wherein R$^{1a}$ or R$^{1b}$ is an insulating resistive tail or wherein R$^{1a}$ and R$^{1b}$ are both insulating resistive tails.

In some implementations of composite polymeric materials of the above general formula, R$^{1a}$ or R$^{1b}$ may possesses at least 7 carbon atoms.

In some implementations of composite polymeric materials of the above general formula, R$^{1a}$ and R$^{1b}$ may be insulating resistive tails are independently selected from the group consisting of saturated hydrocarbon, saturated halogenated hydrocarbon, partially halogenated hydrocarbon, aryl chain, and cycloalkyl, and X—RR'R"; wherein X is selected from C, O, N, and S, and R, R', and R" are independently selected from H and C$_{5-50}$, wherein one or more of R, R', and R" is C$_{5-50}$. In some such implementations, the insulating resistive tails may be selected independently from the group consisting of non-aromatic carbocycles and non-aromatic heterocycles.

In some implementations of composite polymeric materials of the above general formula, all insulating resistive tails may be rigid.

In some implementations of composite polymeric materials of the above general formula, the composite polymeric material may have structure 78 as shown below:

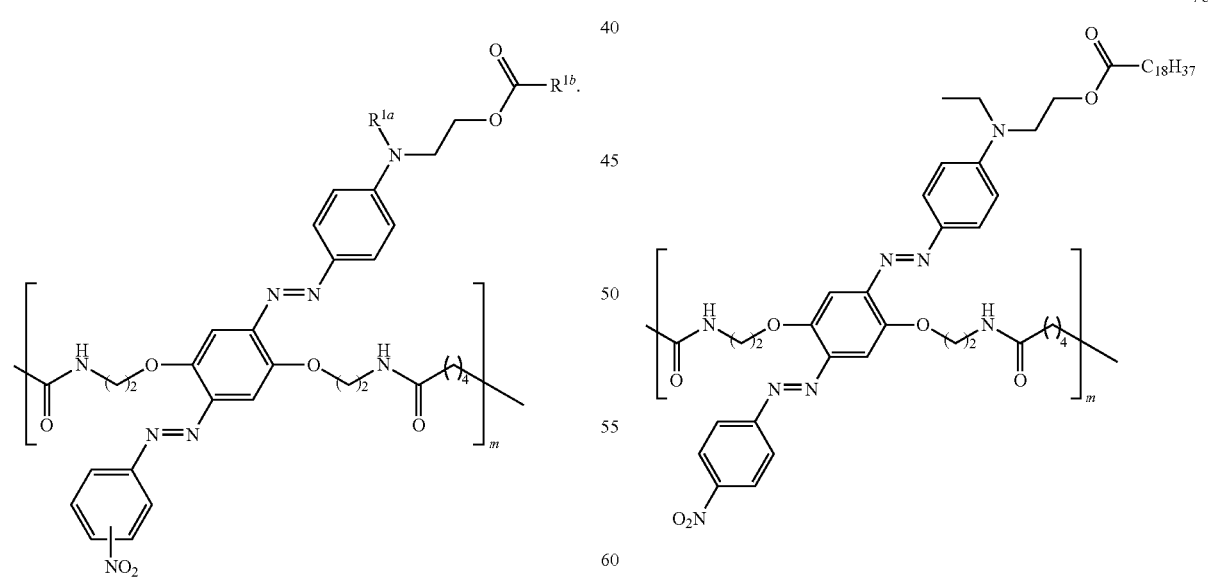

wherein m ranges from 1-300.

Additional aspects of the present disclosure include composite polymeric materials of the following general formula:

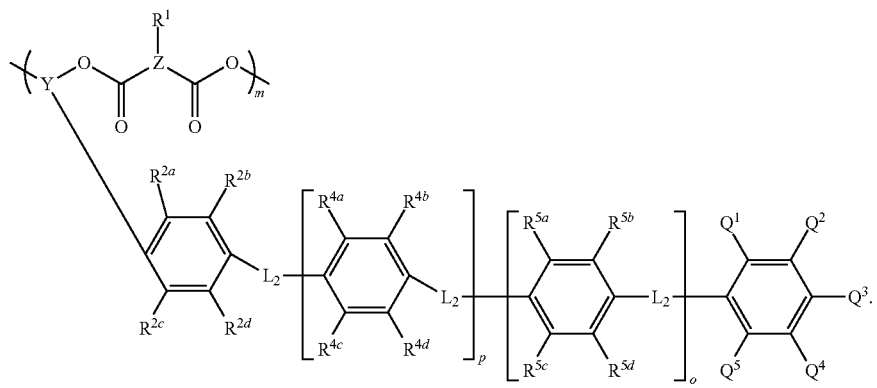

In the foregoing general formula $R^1$, $R^{2a}$, $R^{2b}$, $R^{2c}$, $R^{2d}$, $R^{4a}$, $R^{4b}$, $R^{4c}$, $R^{4d}$, $R^{5a}$, $R^{5b}$, $R^{5c}$, $R^{5d}$ are independently selected from —H, —OH, -Ak, -Ak-$X_l$, —OAk, or —OAk-$X_l$, $L_2$ is a heteroatom bridge in conjugation with the ring system containing $R^{2a}$, $R^{2b}$, $R^{2c}$, $R^{2d}$, $Q^1$, $Q^2$, $Q^3$, $Q^4$, $Q^5$; wherein $R^{2a}$, $R^{2b}$, $R^{2c}$, $R^{2d}$, $Q^1$, $Q^2$, $Q^3$, $Q^4$, $Q^5$ are each independently selected from —H and any electron withdrawing or electron donating group, wherein Ak is alkyl, X is any halogen, wherein o is 0-10, p is 0-1 when o is less than or equal to one and 1 when o is greater than 1, wherein $R^1$ is an insulating resistive tail; wherein Z is substituted or unsubstituted hydrocarbon cyclic or chain linkage, Y is any hydrocarbon chain which may be interrupted by a hetero atom at the point of attachment.

In some implementations of composite polymeric materials of the above general formula, the composite polymeric material may have structure 79 as shown below:

79

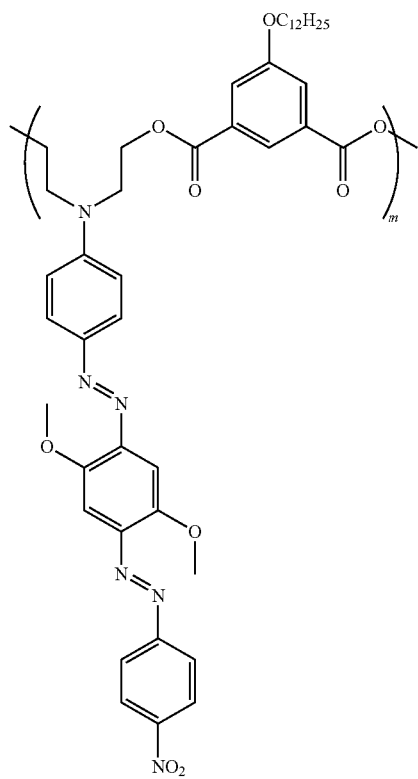

wherein m ranges from 1-300.

In some implementations of composite polymeric materials of the above general formula, $R^1$ may possess at least 7 carbon atoms.

In some implementations of composite polymeric materials of the above general formula, $R^1$ may be an insulating resistive tail selected from the group consisting of saturated hydrocarbon, saturated halogenated hydrocarbon, partially halogenated hydrocarbon, aryl chain, and cycloalkyl, and X—RR'R"; wherein X is selected from C, O, N, and S, and R, R', and R" are independently selected from H and $C_{5-50}$, wherein one or more of R, R', and R" is $C_{5-50}$.

In some implementations of composite polymeric materials of the above general formula, $R^1$ may be a rigid insulating resistive tail. In some such implementations, the rigid insulating resistive tail may be selected from the group consisting of non-aromatic carbocycles and non-aromatic heterocycles.

In some implementations of composite polymeric materials of the above general formula, $Q^1$, $Q^2$, $Q^3$, $Q^4$ and $Q^5$ may each be independently selected from —$NO_2$, —$NH_3^+$ and —NRR'R"+ (quaternary nitrogen salts) with counterion Cl− or Br−, —CHO (aldehyde), —CRO (keto group), —$SO_3H$ (sulfonic acids), —$SO_3R$ (sulfonates), $SO_2NH_2$ (sulfonamides), —COOH (carboxylic acid), —COOR (esters, from carboxylic acid side), —COCl (carboxylic acid chlorides), —$CONH_2$ (amides, from carboxylic acid side), —$CF_3$, —$CCl_3$, —CN, —O− (phenoxides) with counter ion Na+ or K+, —$NH_2$, —NHR, —$NR_2$, —OH, OR (ethers), —NHCOR (amides, from amine side), —OCOR (esters, from alcohol side), alkyls, —$C_6H_5$, vinyls, wherein R and R' and R" are radicals selected from the list comprising hydrogen, alkyl (methyl, ethyl, isopropyl, tert-butyl, neopentyl, cyclohexyl etc.), allyl (—CH2-CH=CH2), benzyl (—CH2C6H5) groups, phenyl (+substituted phenyl) and other aryl (aromatic) groups. In some such implementations, one or more of $Q^1$, $Q^2$, $Q^3$, $Q^4$, and $Q^5$ may be —$NO_2$.

By way of example, and not by way of limitation, according to aspects of the present disclosure, a metadielectric film may include a polymer matrix and at least one material of any of the four general formulae discussed above or any specific implementations mentioned above or discussed further below.

In some embodiments, the metadielectric layer may be comprised of a mixture or YanLi materials selected from at least one YanLi material of the four general formulae discussed above or a mixture of any specific implementations mentioned above.

Alternatively, in some embodiments the metadielectric layer may be comprised of the aforementioned YanLi materials and the aforementioned oligomers, compounds, polymers, monomers or polymers of the backbone units of said YanLi materials, one or more plasticizers (phthalates or non-phthalates), or any combination thereof. Use of non-ionic plasticizers can improve the metadielectric layer's resistivity through smoothing out electric field lines. This phenomenon occurs when the plasticizers fill voids and/or assists in supramolecular alignment. Additionally, plasticizers can improve the material's mechanical properties by reducing brittleness of the material during and post processing.

In one embodiment, the composite polymer comprises more than one type of resistive tails. In another embodiment, the composite polymer comprises more than one type of ordered resistive tails. In yet another embodiment, the composite polymer comprises at least one resistive tail or at least one type of ordered resistive tails.

In order that the invention may be more readily understood, reference is made to the following examples, which are intended to be illustrative of the invention, but are not intended to limit the scope.

In one embodiment, a liquid or solid composite polymer is placed between the first and second electrodes. A solid chromophore is, for example, pressed into a pellet and placed between the first electrode and the second electrode. The chromophore can be ground into a powder before pressing.

In another embodiment, at least one type of YanLi polymer or YanLi oligomer may be dissolved or suspended in a solvent. The resultant material can be spin coated, extruded via slot die, roll-to-roll coated, or pulled and dried to form a dielectric film.

In another embodiment, a composite oligomer may be dissolved or suspended in a polymer. This is termed a "guest-host" system where the oligomer is the guest and the polymer is the host. Polymer hosts include, but are not limited to, poly(methyl methacrylate), polyimides, polycarbonates and poly(ε-caprolactone). These systems are cross-linked or non-cross-linked. In some instances, it may be beneficial to use tailless composite oligomers.

In another embodiment, a composite oligomer may be attached to a polymer. This is termed a "side-chain polymer" system. This system has the advantages over guest-host systems because high composite oligomer concentrations are incorporated into the polymer with high order and regularity and without phase separation or concentration gradients. Side chain polymers include, but are not limited to, poly[4-(2,2-dicyanovinyl)-N-bis(hydroxyethyl)aniline-alt-(4,4'-methylenebis(phenylisocyanate))]urethane, poly[4-(2,2-dicyanovinyl)-N-bis(hydroxyethyl)aniline-alt-(isophoronediisocyanate)]urethane, poly(9H-carbazole-9-ethyl acrylate), poly(9H-carbazole-9-ethyl methacrylate), poly(Disperse Orange 3 acrylamide), poly(Disperse Orange 3 methacrylamide), poly(Disperse Red 1 acrylate), poly(Disperse Red 13 acrylate), poly(Disperse Red 1 methacrylate), poly(Disperse Red 13 methacrylate), poly[(Disperse Red 19)-alt-(1,4-diphenylmethane urethane)], poly(Disperse Red 19-p-phenylene diacrylate), poly(Disperse Yellow 7 acrylate), poly(Disperse Yellow 7 methacrylate), poly[(methyl methacrylate)-co-(9-H-carbazole-9-ethyl acrylate)], poly[(methyl methacrylate)-co-(9-H-carbazole-9-ethyl methacrylate)], poly[methyl methacrylate-co-(Disperse Orange 3 acrylamide)], poly[methyl methacrylate-co-(Disperse Orange 3 methacrylamide)], poly[(methyl methacrylate)-co-(Disperse Red 1 acrylate)], poly[(methyl methacrylate)-co-(Disperse Red 1 methacrylate)], poly[(methyl methacrylate)-co-(Disperse Red 13 acrylate)], poly[(methyl methacrylate)-co-(Disperse Red 13 methacrylate)], poly[methyl methacrylate-co-(Disperse Yellow 7 acrylate)], poly[methyl methacrylate-co-(Disperse Yellow 7 methacrylate)], poly [[(S)-1-(4-nitrophenyl)-2-pyrrolidinemethyl]acrylate], poly[((S)-(–)-1-(4-nitrophenyl)-2-pyrrolidinemethyl)acrylate-co-methyl methacrylate], poly [[(S)-1-(4-nitrophenyl)-2-pyrrolidinemethyl]methacrylate] and poly[((S)-(–)-1-(4-nitrophenyl)-2-pyrrolidinemethyl)methacrylate-co-methyl methacrylate]. These systems are cross-linked or non-cross-linked.

In another embodiment, composite oligomers may be embedded in matrices such as oxides, halides, salts and organic glasses. An example of a matrix is inorganic glasses comprising the oxides of aluminum, boron, silicon, titanium, vanadium and zirconium.

According to aspects of the present disclosure, the polymers that make up a YanLi dielectric may be aligned, partially aligned or unaligned. The composite polymer is preferably aligned for optimal geometric configuration of polarizing units as this results in higher capacitance values in the capacitor. One method of alignment is to apply a DC electric field to the composite polymer at a temperature at which the polarizable units can be oriented. This method is termed "poling." Poling is generally performed near the glass transition temperature of polymeric and glassy systems. One possible method of poling is corona poling. Other methods of alignment could be roll-to-roll, Meyer bar, dip, slot die, and air knife coating of solutions and liquid crystal solutions of said side-chain polymers or composite oligomers.

In some instances, the side-chain polymer or composite oligomers may form liquid crystals in solution or solvent and with or without external influence. Non-limiting examples of liquid crystals include lyotropic and thermotropic liquid crystals. Non-limiting examples of external influences include heat, electric field, mechanical disturbances (e.g. vibration or sonication), and electromagnetic radiation. Said liquid crystals are supramolecular structures comprised of said side-chain polymers or composite oligomer in solution or solvent and are ordered and aligned or partially ordered or partially aligned. Such liquid crystal materials may be coated onto a substrate, e.g., by roll-to-roll, Meyer bar, dip, slot die, or air knife coating in a process that includes mechanical ordering of the liquid crystals, and drying of the liquid crystal solution or evaporation of the solvent such that the liquid crystals form a crystalline or semi-crystalline layer or film of metadielectric material. Alternatively, such liquid crystal materials may be extruded as a film such that the liquid crystals form a crystalline or semi-crystalline film of metadielectric material. In some instances, extrusion of such liquid crystal materials may be coextruded as a multilayer film. Such multilayer films may include alternating layers of conducting layers and insulating layers, wherein the insulating layers may be the aforementioned crystalline or semi-crystalline layer of metadielectric material.

Preferred polymer embodiments are polyester, polyalkylacrylate (preferably methacrylic and acrylic), polyamide, and polyaramid. This resistive tail may be attached to the polarizable side chain or may be its own independent side chain interspersed in any pattern or random assortment with the polarizable side chains or a mixture thereof. These species can be represented by one of the following formula.

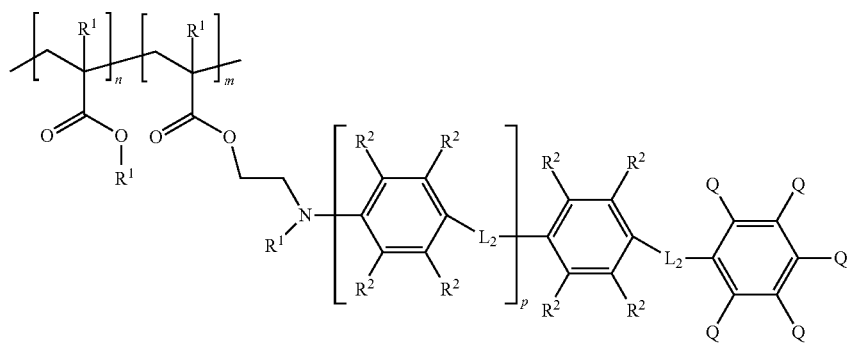
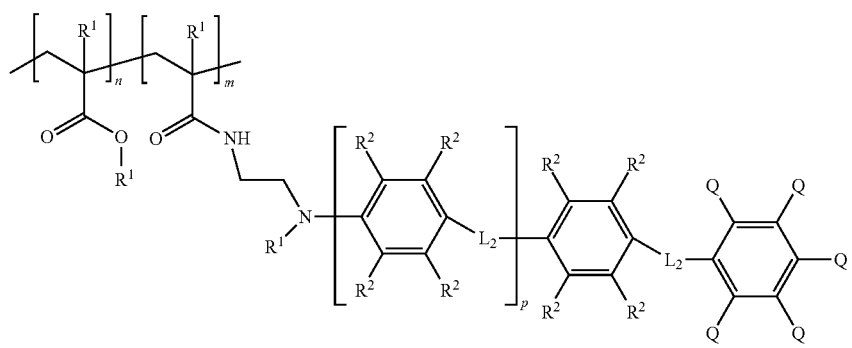
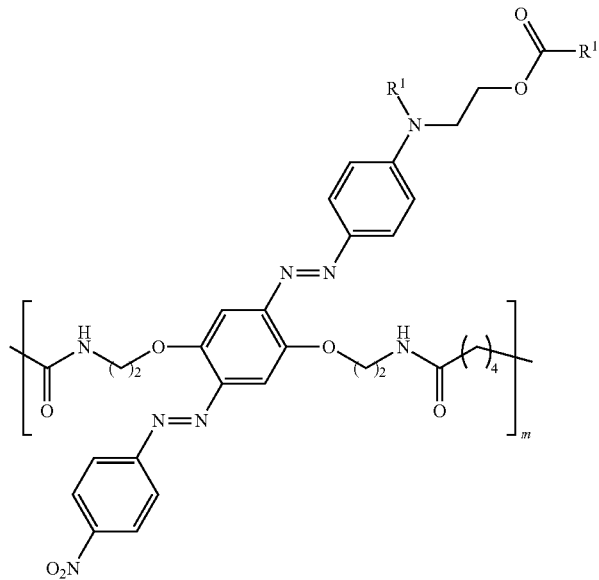
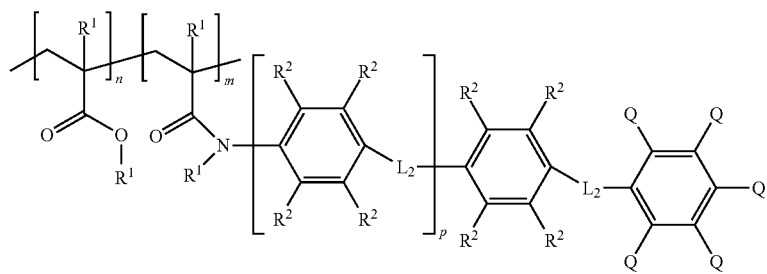

-continued
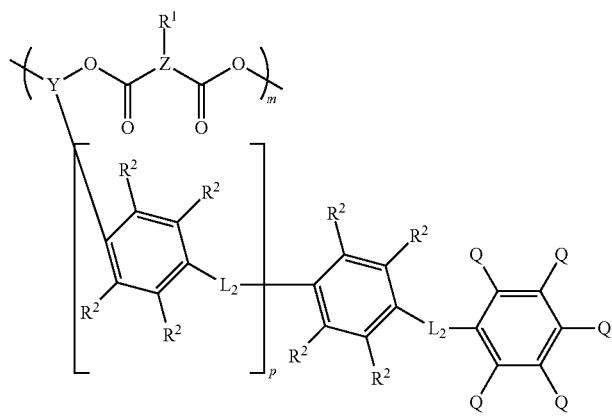
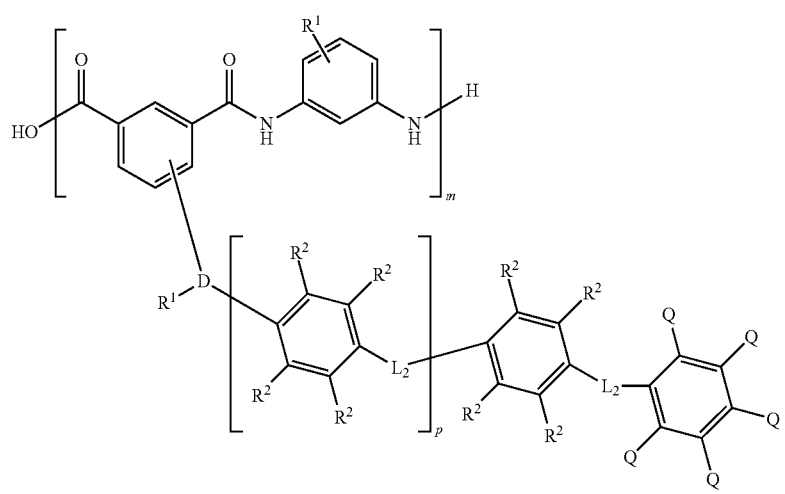
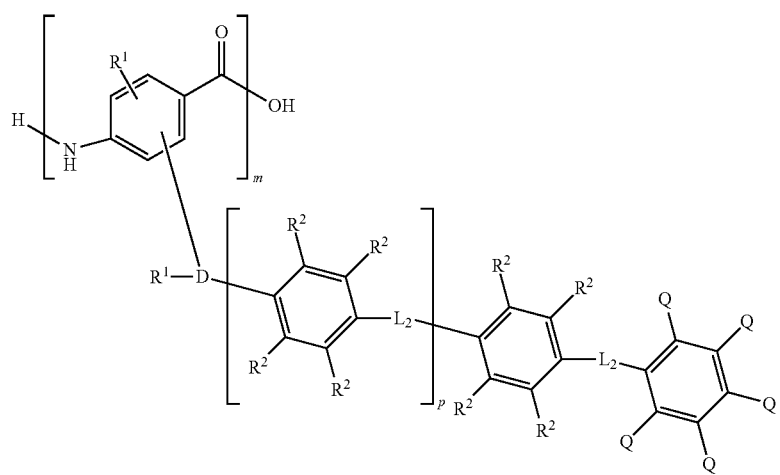

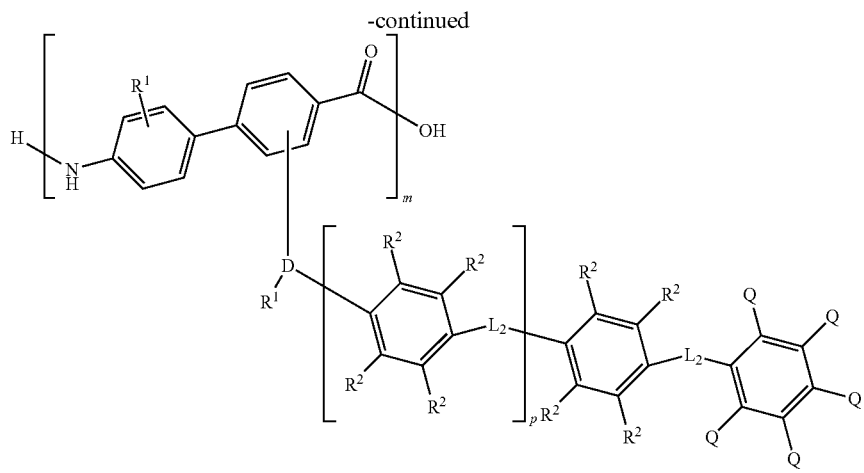

-continued

Wherein, each instance of $R^1$ is independently selected from —H, —OH, -Ak, alkoxy, —OAk-$X_o$, or -Ak-$X_o$, each instance of $R^2$ is independently selected from —H, —OH, —OAk, or —OAk-$X_o$; D is any hydrocarbon chain which may be interrupted by hetero atoms at the point of backbone attachment and side chain attachment, $L_2$ is a heteroatom bridge in conjugation with the ring system of the side chain (e.g. azo-bridge, alkene bridge, and alkyne bridge), each instance of Q is independently selected from any electron donating or electron withdrawing group or H, Z is substituted or unsubstituted hydrocarbon cyclic or chain linkage, Y is any hydrocarbon chain which may be interrupted by a hetero atom at the point of attachment to the side chain, Ak is alkyl, X is any halogen, n is 0-150, m is 1-300, o is 1-51, p is 0-10, q is 0-4, and r is 0-4, with the provisio that at least one instance of $R^1$ must be a resistive tail. Preferred, but not limiting, embodiments of resistive tails include hydrocarbon and halohydrocarbon chains, non-aromatic hydrocarbocycles, and non-aromatic heterocycles. In some embodiments, it may be preferable for the resistive tails to be ridged. In such embodiments, rigid resistive tails maybe non-aromatic carbocycles or non-aromatic heterocycles.

The conjugated aromatic ring system may be made further polarizable by adding a variety of functional groups to various cyclic positions of the structure. Incorporating electron donors and electron acceptors is one way to enhance the polarizability. Electrophilic groups (electron acceptors) are selected from —$NO_2$, —$NH_3^+$ and —$NR_3^+$ (quaternary nitrogen salts), counterion $Cl^-$ or $Br^-$, —CHO (aldehyde), —CRO (keto group), —$SO_3H$ (sulfonic acids), —$SO_3R$ (sulfonates), $SO_2NH_2$ (sulfonamides), —COOH (carboxylic acid), —COOR (esters, from carboxylic acid side), —COCl (carboxylic acid chlorides), —$CONH_2$ (amides, from carboxylic acid side), —$CF_3$, —$CCl_3$, —CN, wherein R is radical selected from the list comprising alkyl (methyl, ethyl, isopropyl, tert-butyl, neopentyl, cyclohexyl etc.), allyl (—$CH_2$—CH=$CH_2$), benzyl (—$CH_2C_6H_5$) groups, phenyl (+substituted phenyl) and other aryl (aromatic) groups. Nucleophilic groups (electron donors) are selected from —$O^-$ (phenoxides, like —ONa or —OK), —$NH_2$, —NHR, —$NR_2$, —NRR', —OH, OR (ethers), —NHCOR (amides, from amine side), —OCOR (esters, from alcohol side), alkyls, —$C_6H_5$, vinyls, wherein R and R' are radicals independently selected from the list comprising alkyl (methyl, ethyl, isopropyl, tert-butyl, neopentyl, cyclohexyl etc.), allyl (—CH2-CH=CH2), benzyl (—CH2C6H5) groups, phenyl (+substituted phenyl) and other aryl (aromatic) groups. Preferred electron donors include, but are not limited to, amino and phosphino groups and combinations thereof. Preferred electron acceptors include, but are not limited to, nitro, carbonyl, oxo, thioxo, sulfonyl, malononitrile, isoxazolone, cyano, dicyano, tricyano, tetracycano, nitrile, dicarbonitrile, tricarbonitrile, thioxodihydropyrimidinedione groups and combinations thereof. More conjugated bridges include, but are not limited to, 1,2-diphenylethene, 1,2-diphenyldiazene, styrene, hexa-1,3,5-trienylbenzene and 1,4-di(thiophen-2-yl)buta-1,3-diene, alkenes, dienes, trienes, polyenes, diazenes and combinations thereof.

Existence of the electrophilic groups (acceptors) and the nucleophilic groups (donors) in the aromatic polycyclic conjugated molecule promotes increase of electronic polarizability of these molecules. Under the influence of external electric field electrons are displaced across the polarizable unit to compensate the electric field. The nucleophilic groups (donors) and the electrophilic groups (acceptors) add to the electron density of the polarizable unit, which increases polarizability of such molecules and ability to form compensating electric field counter in the presence of an electric field. Thus a distribution of electronic density in the molecules is non-uniform. The presence of the polarizable units leads to increasing of polarization ability of the disclosed material because of electronic conductivity of the polarizable units.

Figure 1:
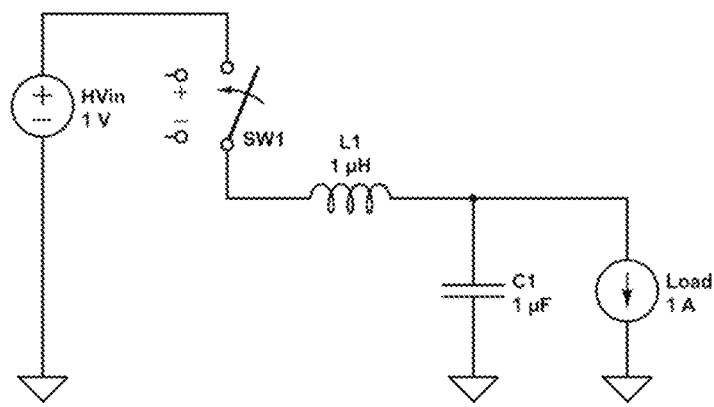
FIG. 1 schematically shows the buck conversion device based on the switched LC filter.
Figure 2:
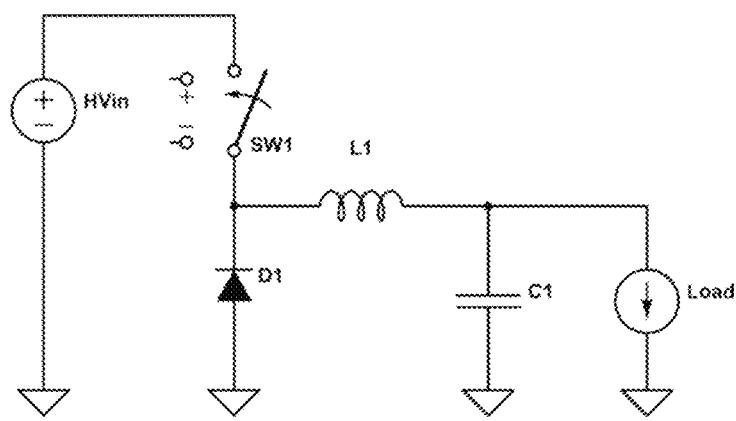
FIG. 2 schematically shows the non-synchronous buck conversion device.
Figure 3:
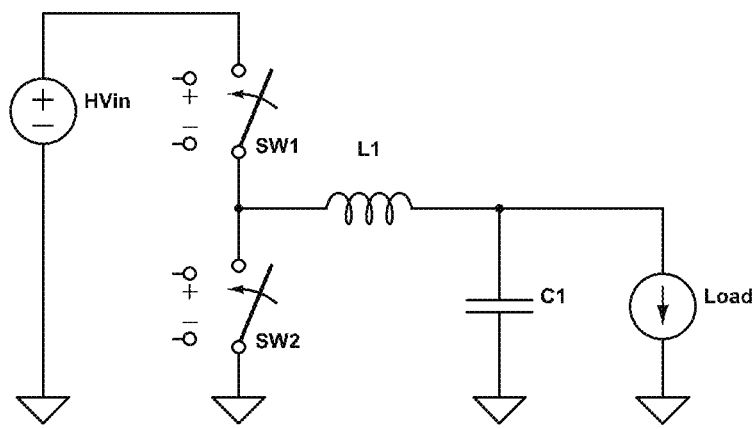
FIG. 3 schematically shows the synchronous buck conversion device.
Figure 4:
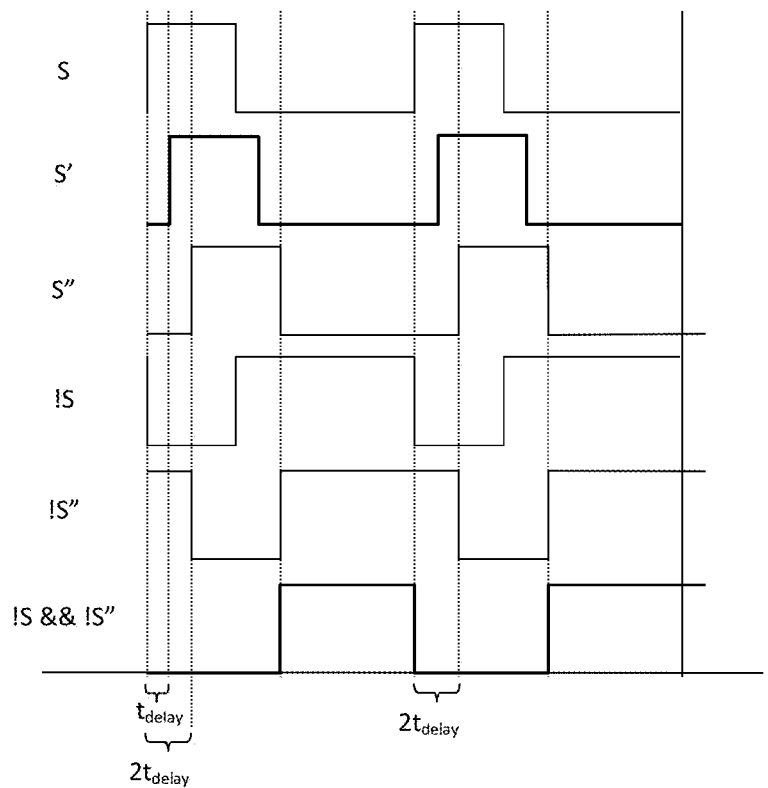
FIG. 4 demonstrates the signal treatment required to generate a pair of signals with the required time delay spacing.
Figure 5:
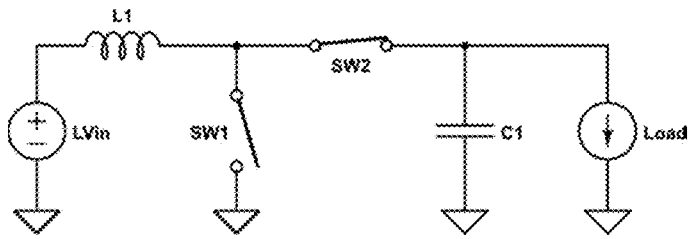
FIG. 5 schematically shows a boost converter in an "on state".
Figure 6:
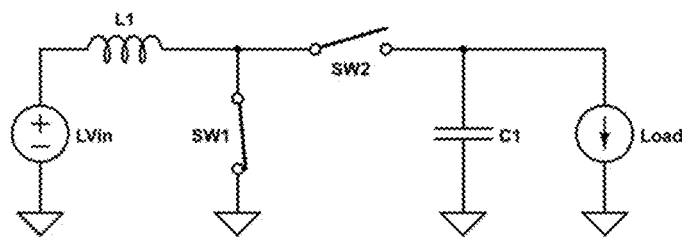
FIG. 6 schematically shows a boost converter in an "off state".
Figure 7:
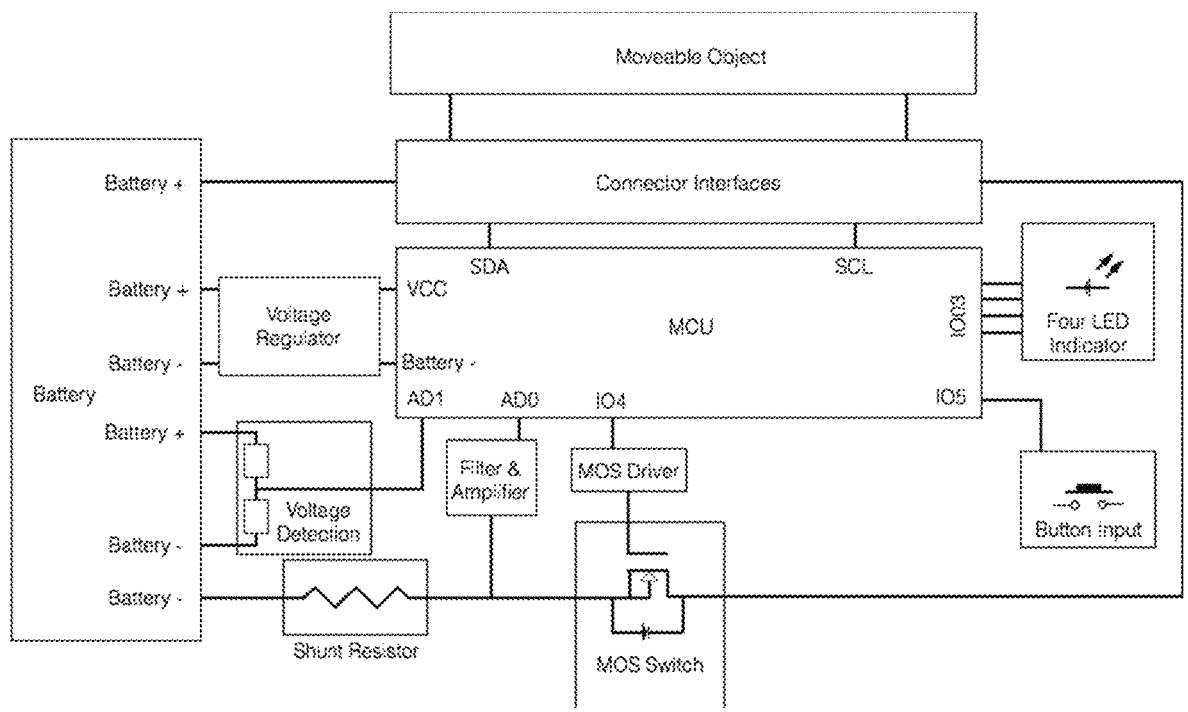
FIG. 7 schematically shows a battery and micro-controller unit of a moveable object.
Figure 8A:
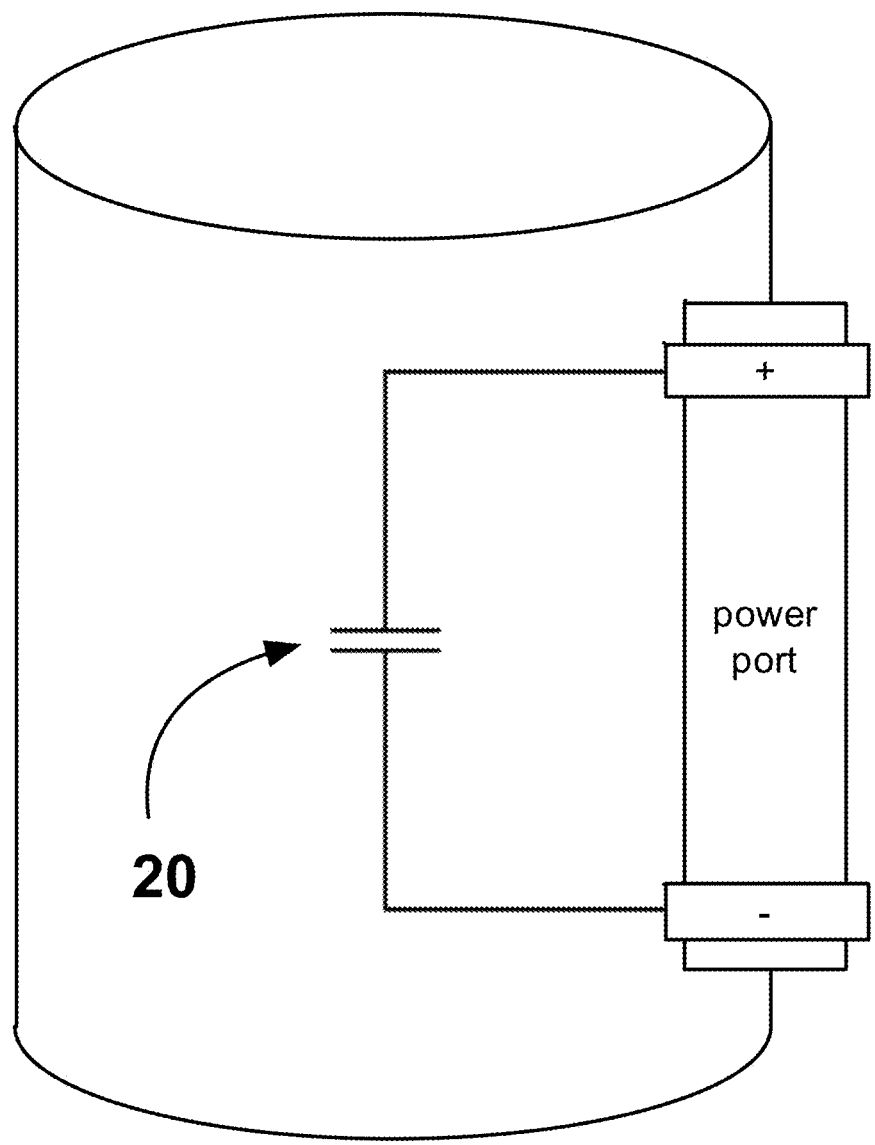
FIG. 8A shows a capacitive energy storage device containing a single capacitive element connected to a two terminal port.
Figure 8B:
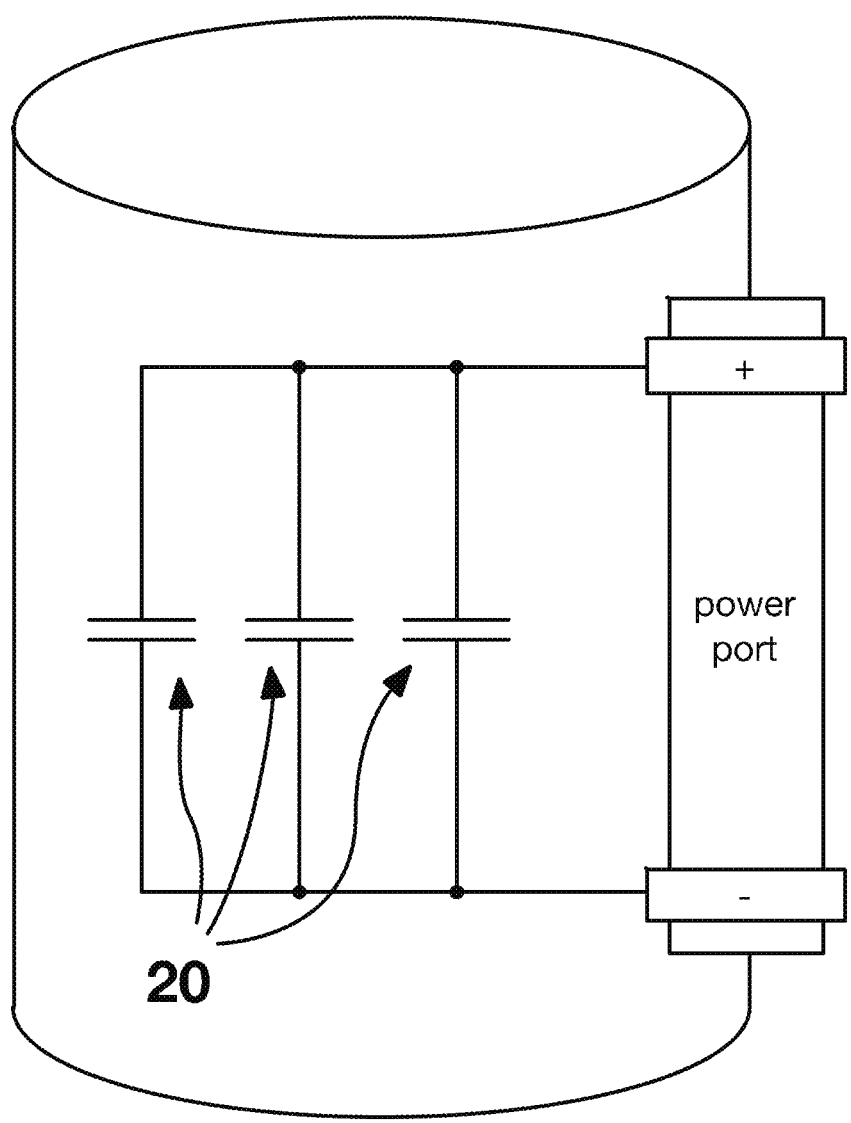
FIG. 8B shows an alternative configuration of a capacitive energy storage device containing multiple elements connected to a two terminal port.
Figure 8C:
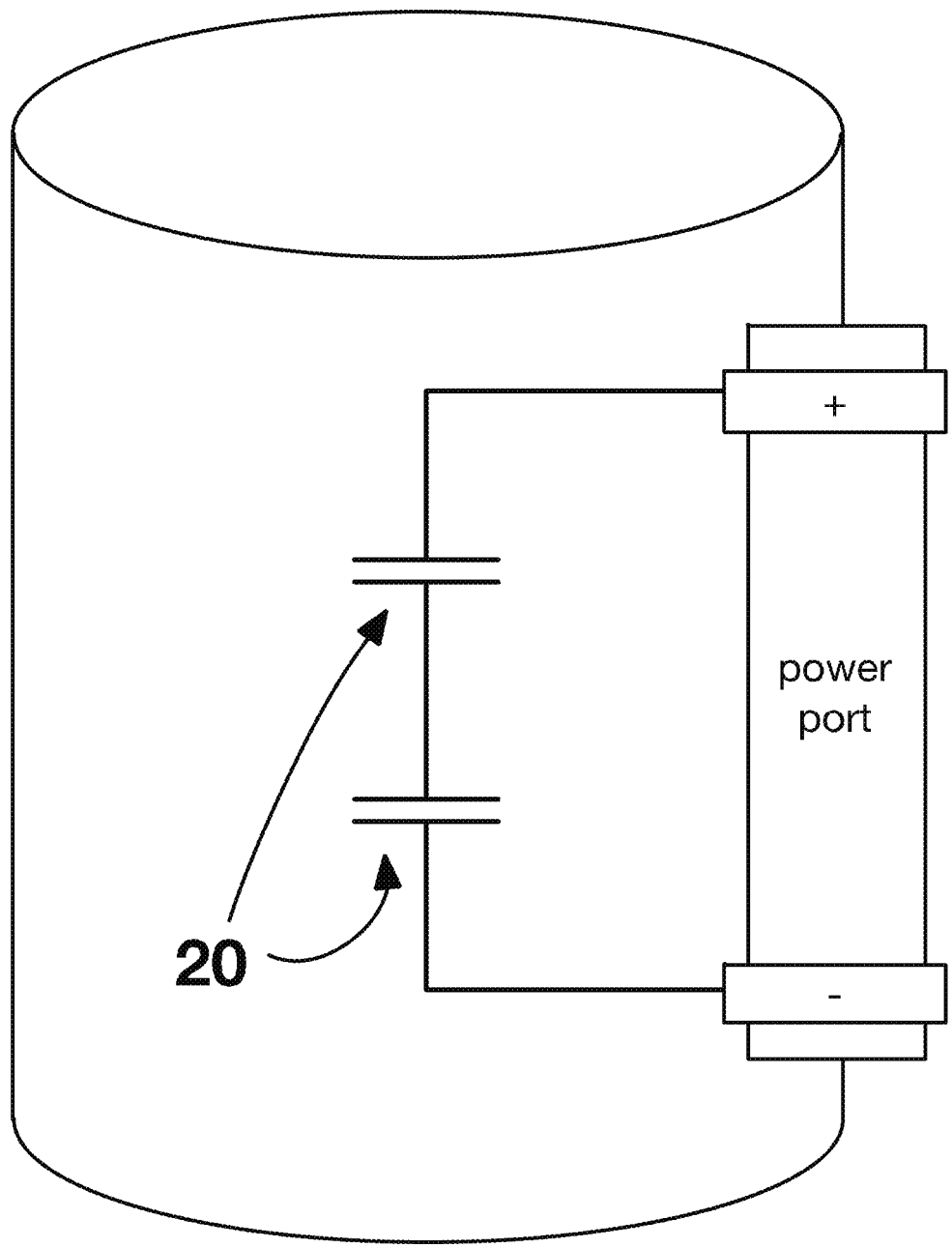
FIG. 8C shows an alternative configuration of a capacitive energy storage device containing multiple elements connected to a two terminal port.
Figure 8D:
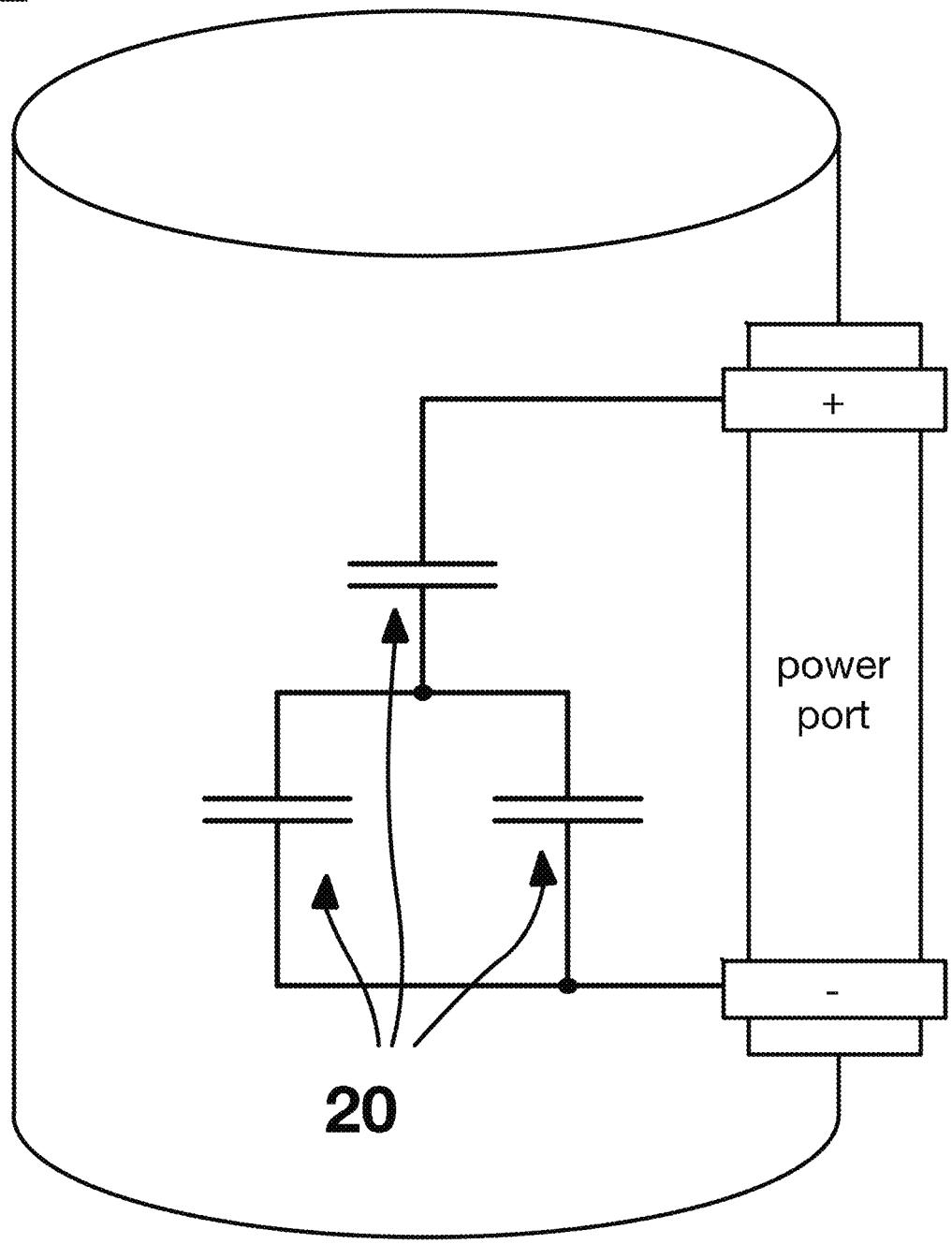
FIG. 8D shows an alternative configuration of a capacitive energy storage device containing multiple elements connected to a two terminal port.

Increasing the number of phenyl rings 'p' can increase the linear polarizability ($\alpha$) and the nonlinear polarizability ($\beta$) of the conjugated side chain, as seen in the graphs '$\alpha$ vs p' (depicted in FIG. 4A) and '$\beta$ vs p' (depicted in FIG. 4B), and corresponding Table 1 below, which lists comparative values of $\alpha$ and $\beta$ for chromophores having different numbers of phenyl rings. However, increasing the number of conjugated aromatic rings reduces the side chains solubility. Addition of alkoxy groups to at least one of the side chain rings can improve solubility of the choromophores while maintaining high non-linear polarization or slightly improving it. One preferential embodiment is placement of two methoxy groups on a ring that is separated by one conjugated bridge and ring from an electron donating group.

TABLE 7

Impact of number of rings on polarizability

| p | α | β |
|---|-----|--------|
| 2 | 427 | 16067 |
| 3 | 900 | 71292 |
| 4 | 1343 | 121801 |
| 5 | 1699 | 148208 |
| 6 | 2103 | 161156 |

Ionic groups may increase polarization of the disclosed YanLi material when zwitterionic groups are covalently attached to YanLi polymer sidechains. The polarizable units can be nonlinearly polarizable and may be comprised of an aromatic polycyclic conjugated molecule with at least one dopant group, the polarizable units and are placed into a resistive dielectric envelope formed by resistive substituents. In some instances, the resistive substituents provide solubility of the organic compound in a solvent and act to electrically insulate supramolecular structures comprised of YanLi polymers from neighboring supramolecular structures of YanLi polymers. Additionally, said resistive substituents may act to electrically insulate intra-polymer side chains from one another. A non-centrosymmetric arrangement of the dopant group(s) can lead to a strong nonlinear response of the compound's electronic polarization in the presence of an electric field. Additionally, an anisometric molecule or polarizing unit can lead to a strong nonlinear response of the compound's electronic polarization in the presence of an electric field. Resistive substituents (e.g. resistive tails described above) increase the electric strength of these polarizable compounds and breakdown voltage of the dielectric layers made on their basis. Co-polymer variants are preferentially alternating more or less one-to-one, or more-or-less randomly. Di-block co-polymer embodiments being less preferential to alternating monomers one-to-one and random or near random arrangements.

In many embodiments the composite polymer may include a repeating backbone linked to a polarizable unit in the form of one or more azo-dye chromophores. The azo-dye chromophores may consist of phenyl groups in conjugated connection via a conjugated bridge of two heteroatoms (e.g. an azo-bridge), such that there are "n" phenyl groups and "n–1" conjugated bridges where n is an integer between 2 and 16. Side chains may be added to the final backbone product or incorporated into individual monomers that are then polymerized.

These chromophores impart high polarizability due to delocalization of electrons. This polarizability may be enhanced by dopant groups. The composite polymer may further include resistive tails that will provide insulation within the material. In some embodiments, the resistive tails are can be substituted or unsubstituted carbon chains ($C_n X_{n+1}$, where "X" represents hydrogen, fluorine, chlorine, or any combination thereof). In some embodiments, the resistive tails may be rigid fused polycyclic aryl groups in order to limit the motion of the side chains, potential stabilizing van der waals interactions between side chains while simultaneously making the material more stable by eliminating voids. In some embodiments, the resistive tails may be rigid in order to limit voids within the material. The synthetic scheme for demonstrative, but not exclusive, species are shown below and are expected to be adaptable to the claimed variations.

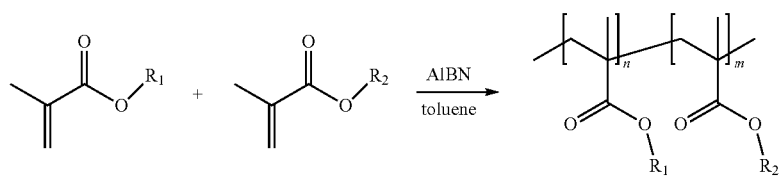

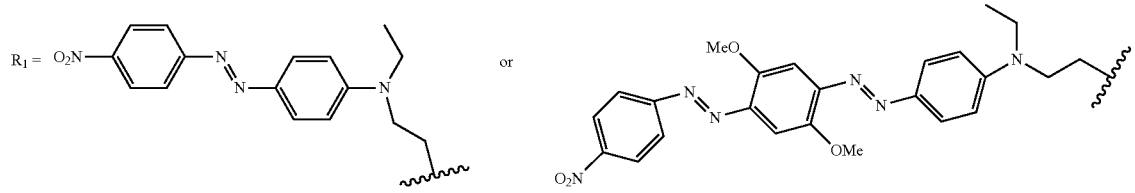

$R_2 = C_nH_{2n+1}, C_nF_{2n+1}$

65
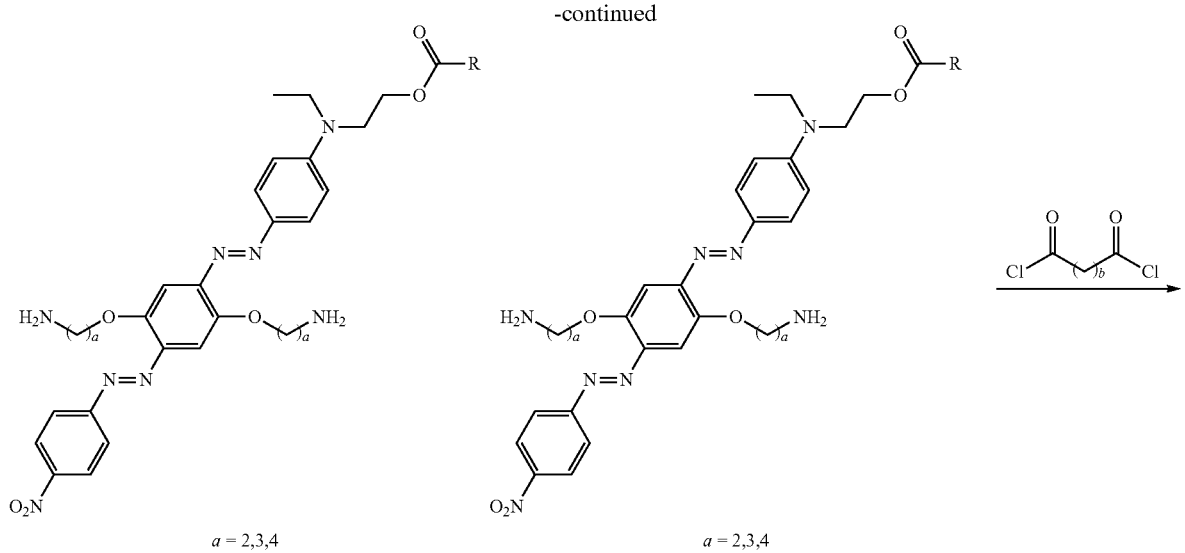
a = 2,3,4
-continued
66
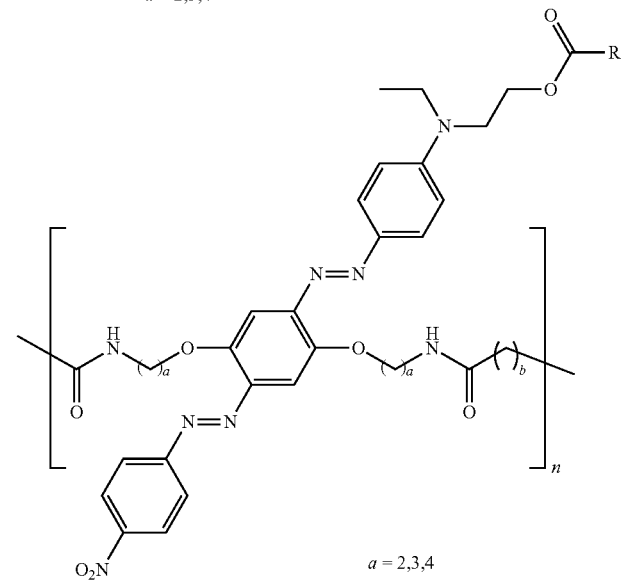
a = 2,3,4
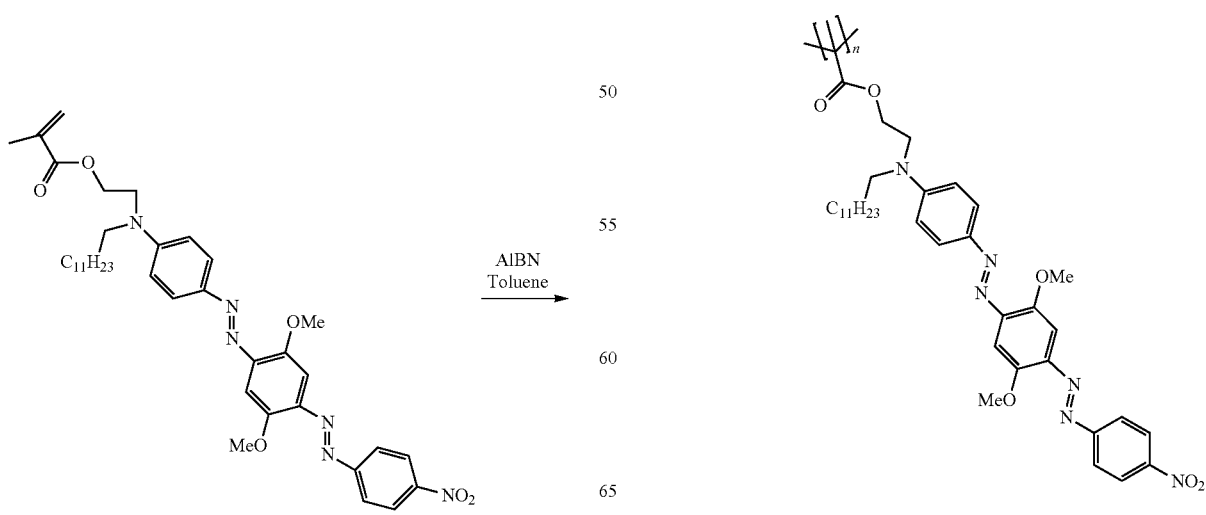

No technical complications are expected in adapting these syntheses to monomers bearing both chromophore and resistive tail, as in structures 80, 81, 84, 87, 88, 91, 92, and 96 from Table 8.

Examples of suitable chromophores include, but are not limited to, Disperse Red-1, Black Hole Quencher-1, and Black Hole Quencher-2. In many of the embodiments it may not be necessary for all monomer units to bear a chromophore, and in some it may be desirable to possess other side chains or sites within the repeating backbone that impart other qualities to the material such as stability, ease of purification, flexibility of finished film, etc.

For embodiments where the chromophores are incorporated as side chains, the resistive tails may be added before the side chains are attached to a finished polymer, after side chains have been chemically added to a finished polymer, or incorporated into the polymer during synthesis by incorporation into monomer units.

For embodiments where the chromophore is part of the backbone the tails may be attached to the finished composite polymer or incorporated into monomer units and added during composite synthesis.

Non-limiting examples of suitable tails are alkyl, haloalkyl, cycloakyl, cyclohaloalkyl, and polyether.

Syntheses of eight different YanLi polymers described herein will be further explained below.

EXAMPLE 6

Synthesis of Polymer 1

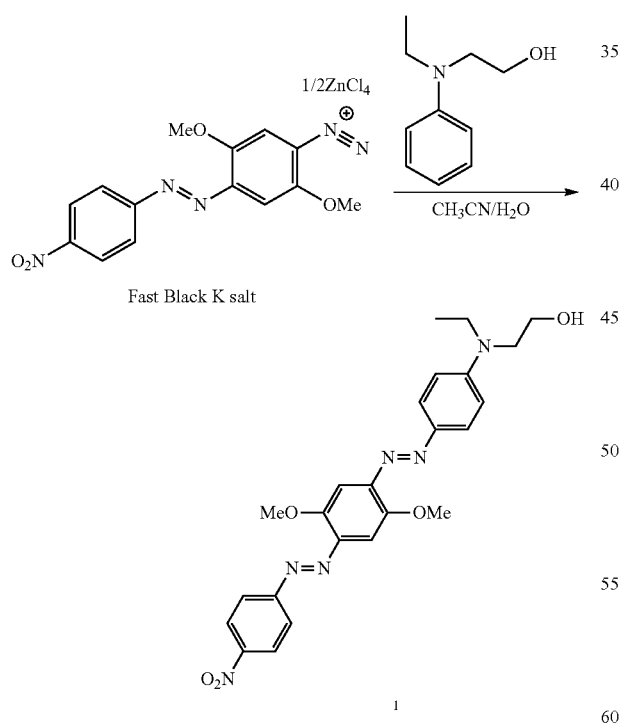

First compound 1-2-((4-((E)-(2,5-dimethoxy-4-((E)-(4-nitrophenyl) diazenyl)phenyl) diazenyl)phenyl)(ethyl) amino)ethan-1-ol was synthesized from Fast Black K Salt (2,5-Dimethoxy-4-(4-nitrophenylazo)benzenediazonium chloride zinc double salt, Fast Black K Salt (25%, 30 g) was dissolved in 250 mL acetonitrile and 250 mL NaOAc buffer solution (pH=4) and the resulting solution was stirred for 1 hour and then sonicated for 15 min, followed by vacuum filtration. The filtrate was dropwise added to a solution of 2-(ethyl(phenyl)amino)ethan-1-ol (4.1 g in 65 mL acetonitrile) at 0° C. The resultant solution was stirred at room temperature for 16 hours and the precipitate was filtered out and washed with mix solvent of acetonitrile/water (1:1) and dried under vacuum. The product was obtained as a black powder.

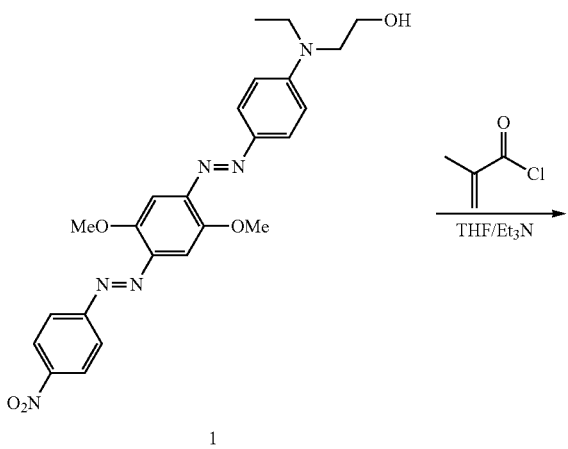

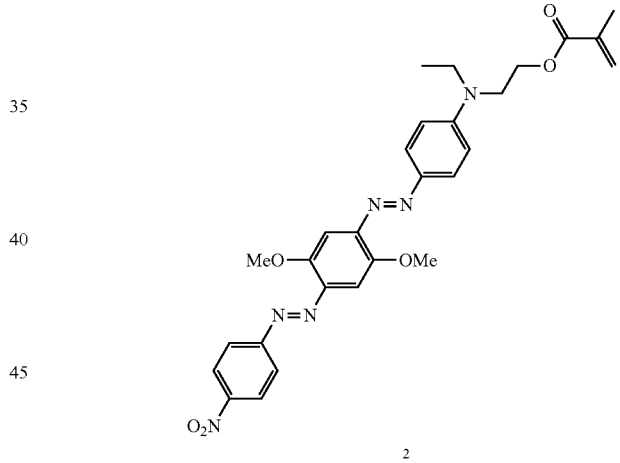

2-((4-((E)-(2,5-dimethoxy-4-((E)-(4-nitrophenyl)diazenyl) phenyl)diazenyl)phenyl)(ethyl) amino)ethyl methacrylate (Compound 2) is then synthesized from compound 1. To the solution of compound 1 (5.0 g) and triethylamine (4.4 mL) in 70 mL THF (anhydrous) at 0° C., was dropwise added a solution of methacryloyl chloride (3.1 mL) in THF (anhydrous, 10 mL). The resulting solution was warmed up to room temperature and was stirred overnight at room temperature. The reaction solution was filtered and THF was used to wash the insoluble; the filtrate was concentrated under vacuum and diluted in dichloromethane. The diluted solution was washed with water and the solvent was removed under vacuum. The crude product was purified with column chromatography and 3.2 g pure product was isolated as a black powder.

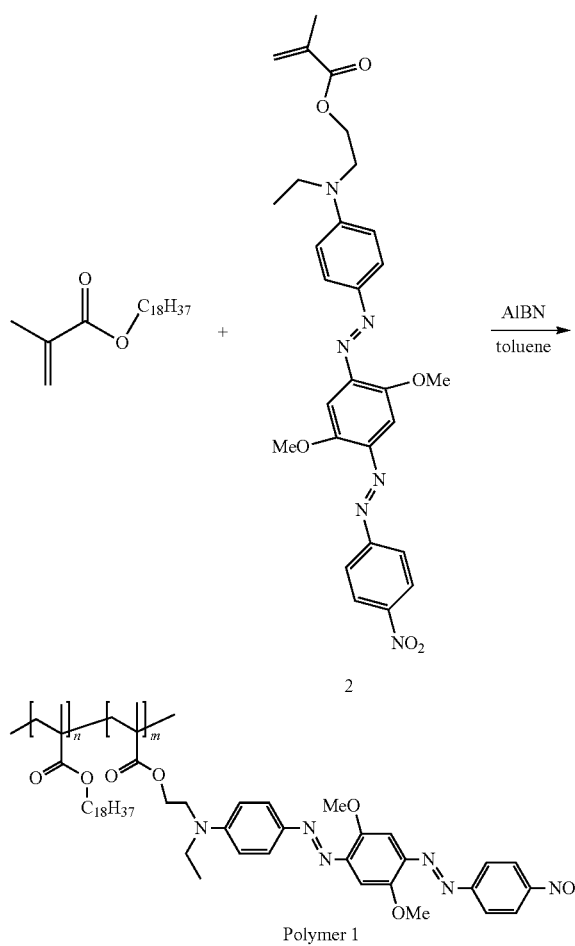

Polymer 1 was then formed from compound 2 as follows. Compound 2 (2.0 g), stearylmethacrylate (1.2 g) and AIBN (160 mg) were dissolved in anhydrous toluene (12 mL) in a sealed flask and the resulting solution was heated to 85° C. for 18 hours and then cooled to room temperature. The polymer was obtained by precipitating in isopropanol.

EXAMPLE 7

Synthesis of Polymer 2

Polymer 2 was synthesized using (E)-2-(ethyl(4-((4-nitrophenyl)diazenyl)phenyl)amino)ethyl methacrylate (compound 3). Compound 3 was synthesized from Disperse Red-1 (2-[N-ethyl-4-[(4-nitrophenyl)diazenyl]anilino] ethanol or $C_{16}H_{18}N_4O_3$) and methacryloyl chloride using preparation procedure of compound 2.

Polymer 2. Polymer 2 was synthesized from compound 3 and stearylmethacrylate using preparation procedure of polymer 1.

EXAMPLE 8

Synthesis of Polymer 3

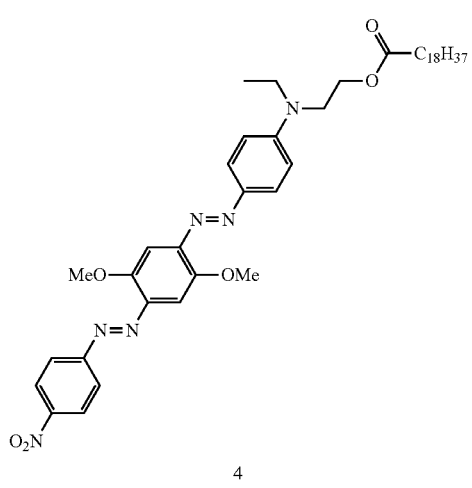

4

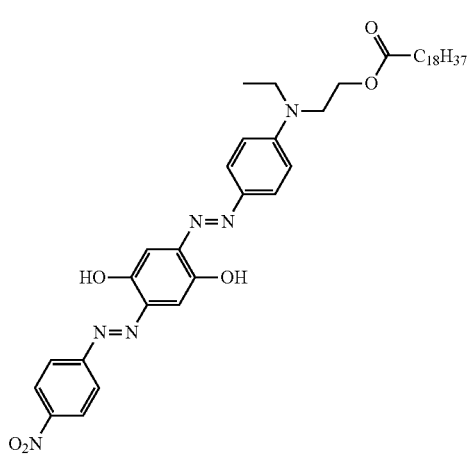

5

Polymer 3 was synthesized using 2-((4-((E)-(2,5-dimethoxy-4-((E)-(4-nitrophenyl)diazenyl)phenyl)diazenyl)phenyl) (ethyl)amino) ethyl nonadecanoate (compound 4), which was synthesized from compound 1 described above: To a solution of compound 1 (0.5 g) and triethylamine (0.46 mL) in 15 mL THF at 0° C., was dropwise added a solution of stearoyl chloride (1.12 mL) in THF. The resulting solution was warmed up to room temperature and was stirred overnight at room temperature. The reaction solution was filtered and THF was used to wash the insoluble; the filtrate was concentrated under vacuum and residue was taken in dichloromethane. The crude product solution was washed with water and the solvent was removed under vacuum. The crude product was purified with column chromatography.

Compound 4 was then used to synthesize 2-((4-((E)-(2,5-dimethoxy-4-((E)-(4-nitrophenyl)diazenyl)phenyl)diazenyl)phenyl)(ethyl) amino)ethyl nonadecanoate (compound 5). Specifically, compound 4 (1.0 g) was dissolved in dichloromethane (30 mL) and cooled to −78° C.; BBr$_3$ (0.72 g) was slowly added into the solution. The resulting reaction mixture was slowly warmed to room temperature and was kept at room temperature with stirring for 12 hours. Sodium bicarbonate aqueous solution was injected in the reaction mixture at 0° C. and diluted with dichloromethane. The solution was washed with water and brine, and then concentrated under vacuum. The product was purified via flash column chromatography.

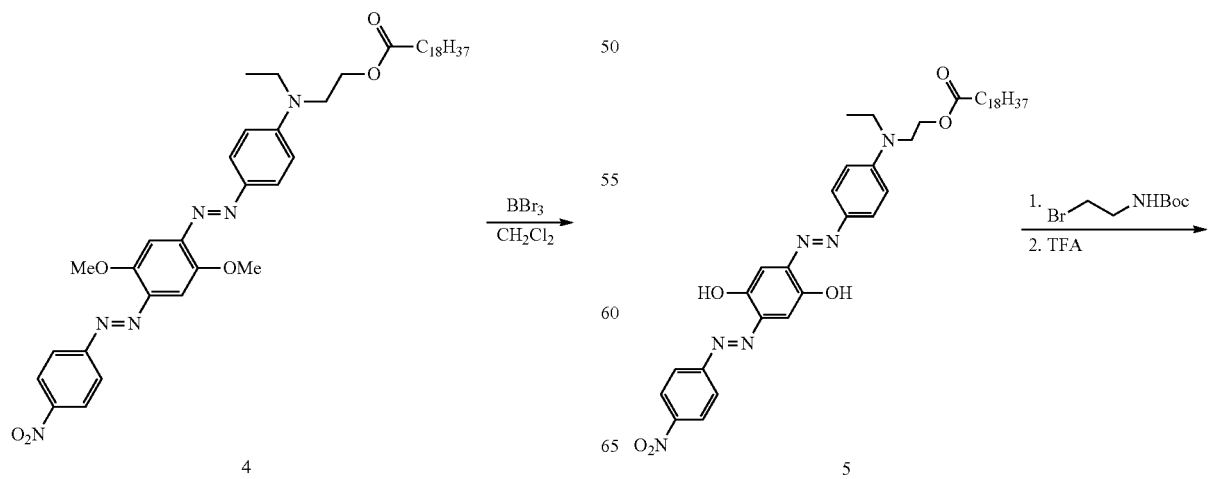

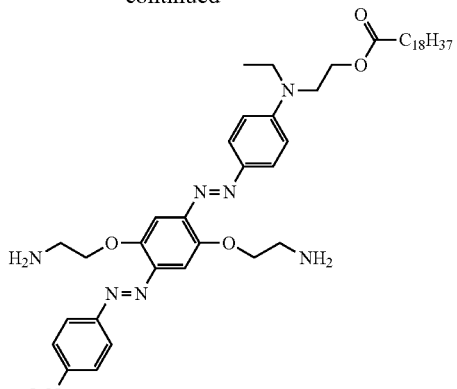

Compound 5 was then used to synthesize compound 6 (2-((4-((E)-(2,5-bis(2-aminoethoxy)-4-((E)-(4-nitrophenyl)diazenyl)phenyl)diazenyl)phenyl) (ethyl)amino)ethyl nonadecanoate). Compound 5 (0.73 g), K$_2$CO$_3$ (1.38 g) and tert-butyl (2-bromoethyl)carbamate (0.44 g) were added to dimethylformamide (DMF) (15 mL), and the resulting mixture was stirred at 65° C. overnight. H$_2$O (400 mL) was added to the reaction mixture and the aqueous layer was extracted with EtOAc (200 mL×2). The combined organic layer was washed with H$_2$O (100 mL×2) and brine (50 mL), dried over Na$_2$SO$_4$, filtered, and concentrated under reduced pressure. The crude product was purified by silica column chromatography. The pure product was dissolved in dichloromethane (10 mL) and TFA (trifluoroacetic acid) (3 mL) and the solution was stirred at room temperature for 2 hours. Then excess reagent and solvent were removed under vacuum. The resulting crude product was neutralized by NaHCO$_3$ solution, extracted with CH$_2$Cl$_2$ (3×50 mL), dried over MgSO$_4$ and evaporated. The crude product (compound 6) was purified by silica column chromatography.

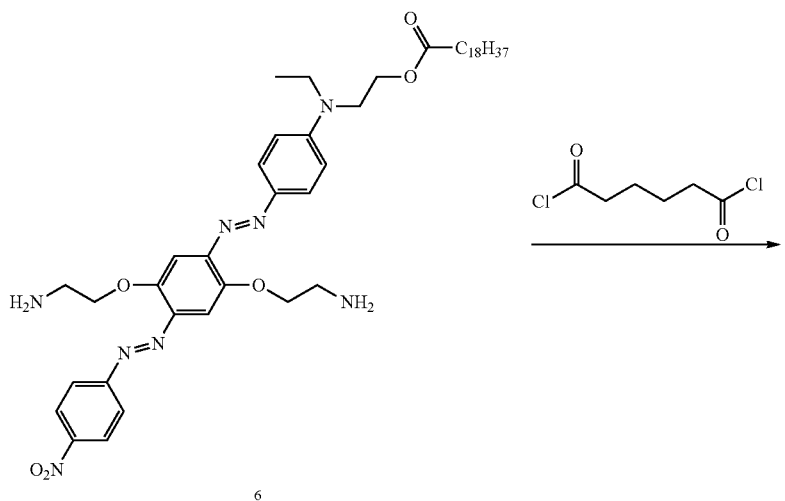

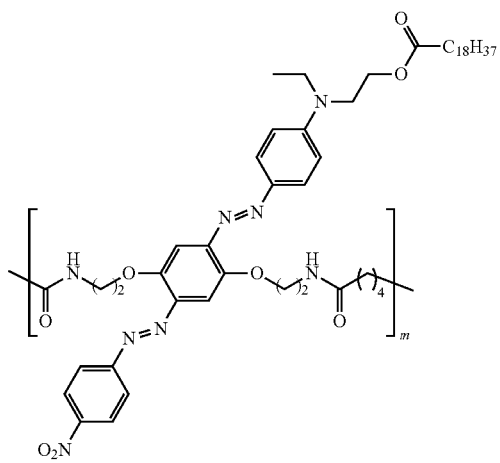

Polymer 3

Polymer 3. To the solution of compound 6 (4.1 g) in CH$_2$Cl$_2$ (15 mL), was slowly added adipoyl dichloride (0.9 g) at 0° C. After the addition, the solution was allowed to warm to room temperature and stir for 2 hours. The resulting solution was concentrated and dropwise added into isopropanol to precipitate the polymer 3.

EXAMPLE 9

Synthesis of Polymer 4

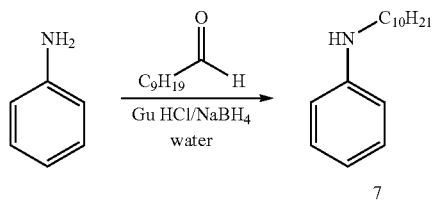

The synthesis of polymer 4 begins by synthesizing N-decylaniline (compound 7).

To a solution containing GuHCl (10 mg, 5 mol %) in H$_2$O (4 mL), was added decanal (2 mmol) and aniline (2.2 mmol) and the mixture vigorously stirred for 15 min at room temperature. After, NaBH$_4$ (20 mg, 2.1 mmol) was added, the mixture was stirred for additional 10 min. The reaction mixture was extracted with CH$_2$Cl$_2$, dried over Na$_2$SO$_4$, concentrated under vacuum and the crude mixture was purified by column chromatography on silica gel to afford the pure products.

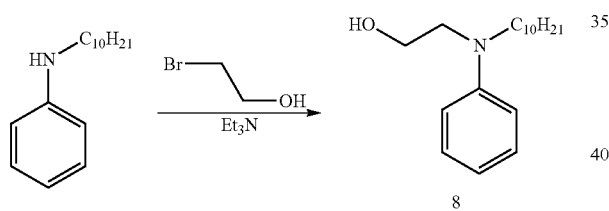

2-(Decyl(phenyl)amino)ethan-1-ol (compound 8) is then synthesized from compound 7.

To a solution of 7 (470 mg, 2.00 mmol) in toluene (5 ml) was added triethylamine (405 mg, 4.00 mmol) and 2-bromoethanol (501 mg, 4.01 mmol), and the mixture was refluxed for 2 h. The resulting mixture was diluted with saturated NH$_4$Cl and extracted with ethyl acetate. The extract was washed with brine, dried over anhydrous MgSO4, filtered, and concentrated in vacuo. The crude product was purified by silica gel chromatography to give 8.

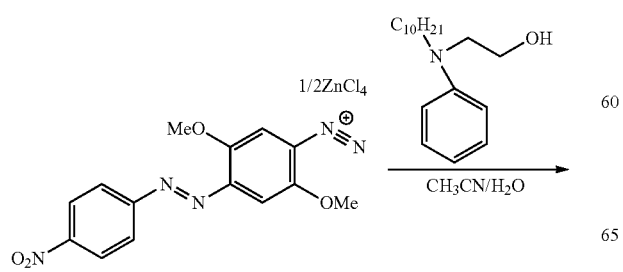

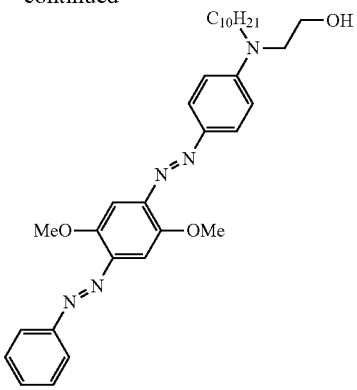

2-(Decyl(4-((E)-(2,5-dimethoxy-4-((E)-(4-nitrophenyl)diazenyl)phenyl)diazenyl) phenyl) amino)ethan-1-ol (compound 9) was then synthesized from Fast Black K Salt and compound 8.

Fast Black K Salt (25%, 30 g) was dissolved in 250 mL acetonitrile and 250 mL NaOAc buffer solution (pH=4) and the resulting solution was stirred for 1 hour and then sonicated for 15 min, followed by vacuum filtration. The filtrate was dropwise added to a solution of compound 8 (6.8 g in 65 mL acetonitrile) at 0° C. The resultant solution was stirred at room temperature for 16 hours and the precipitate was filtered out and washed with mix solvent of acetonitrile/water (1:1) and dried under vacuum. The product was obtained as a black powder.

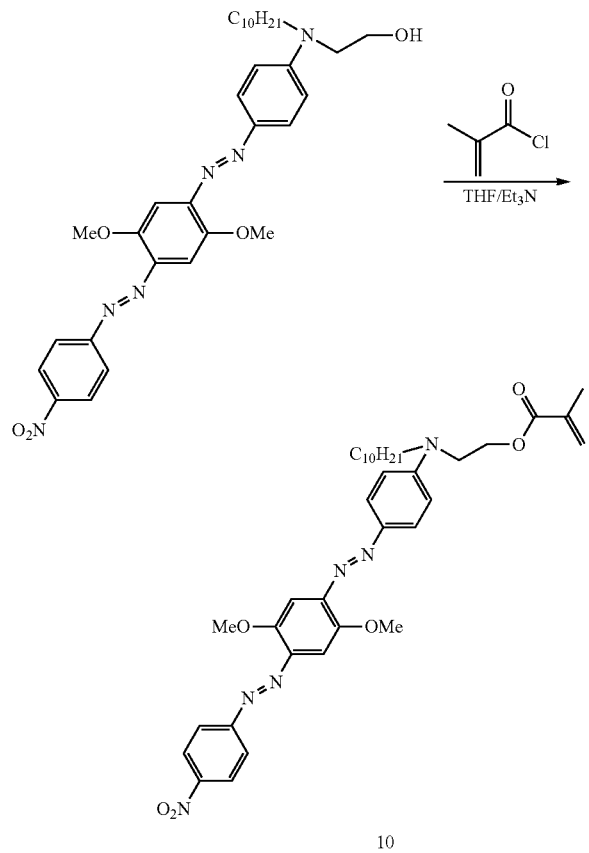

2-(decyl(4-((E)-(2,5-dimethoxy-4-((E)-(4-nitrophenyl)diazenyl)phenyl)diazenyl) phenyl) amino)ethyl methacrylate (Compound 10)

To the solution of compound 9 (5.0 g) and triethylamine (3.5 mL) in 70 mL THF (anhydrous) at 0° C., was dropwise added a solution of methacryloyl chloride (2.5 mL) in THF (anhydrous, 10 mL). The resulting solution was warmed up to room temperature and was stirred overnight at room temperature. The reaction solution was filtered and THF was used to wash the insoluble; the filtrate was concentrated under vacuum and diluted in dichloromethane. The diluted solution was washed with water and the solvent was removed under vacuum. The crude product was purified with column chromatography and 3.3 g pure product (compound 10) was isolated as a black powder.

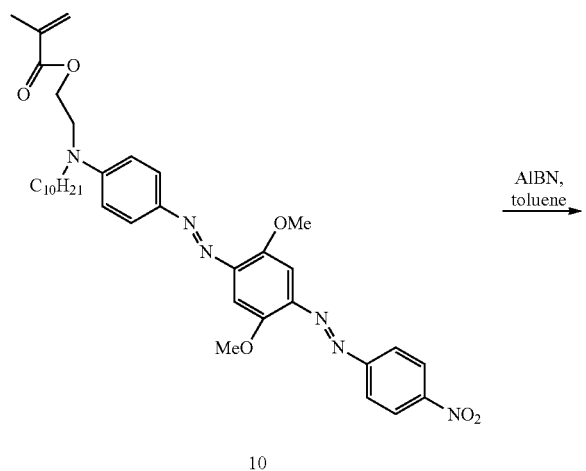

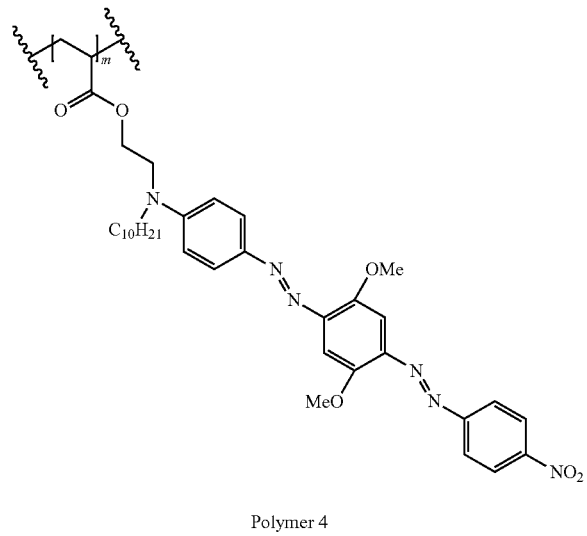

Polymer 4

Poly 2-(decyl(4-((E)-(2,5-dimethoxy-4-((E)-(4-nitrophenyl) diazenyl)phenyl)diazenyl) phenyl) amino)ethyl methacrylate (4) (Polymer 4) was then synthesized from compound 10.

Compound 10 (2.0 g) and AIBN (40 mg) were dissolved in anhydrous toluene (6 mL) in a sealed flask and the resulting solution was heated to 85° C. for 18 hours and then cooled to room temperature. The polymer (1.4 g) was obtained by precipitating and washing in 2-isopropanol.

Certain preferred implementations meet one of the following formulae.

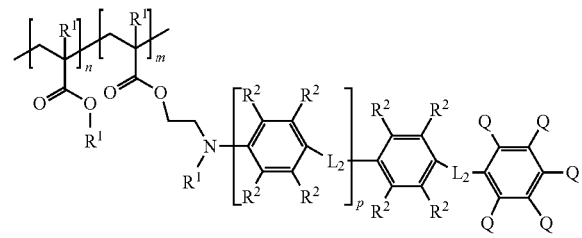

Wherein, each instance of $R^1$ is independently selected from —H, —OH, -Ak, —OAk, —OAk-$X_o$, or -Ak-$X_o$, or alkoxy; each instance of $R^2$ is independently selected from H, —OH, —OAk, —OAk-$X_o$, or Ak; $L_2$ is a heteroatom bridge in conjugation with the ring system of the side chain (e.g. azo-bridge or —N=N—, alkene bridge or —HC=CH—, and alkyne or —C≡C— bridge), each instance of Q is independently selected from any electron withdrawing group or H, Ak is alkyl or branched alkyl or aryl, X is any halogen, n is 0-150, m is 1-300, o is 1-51, p is 0-10, with the provisio that at least one instance of $R^1$ must be a resistive tail. Preferred, but not limiting, embodiments of resistive tails include hydrocarbon and halohydrocarbon chains, non-aromatic hydrocarbocycles, and non-aromatic heterocycles. In some embodiments, it may be preferable for the resistive tails to be ridged. In such embodiments, rigid resistive tails maybe non-aromatic carbocycles or non-aromatic heterocycles.

Other embodiments of the invention possess a polyester backbone where resistive tail and Polarizable Unit are each simultaneously side chains to the same monomer. A sample scheme for polyester embodiments is depicted below.

EXAMPLE 10

Synthesis of Polymer 5

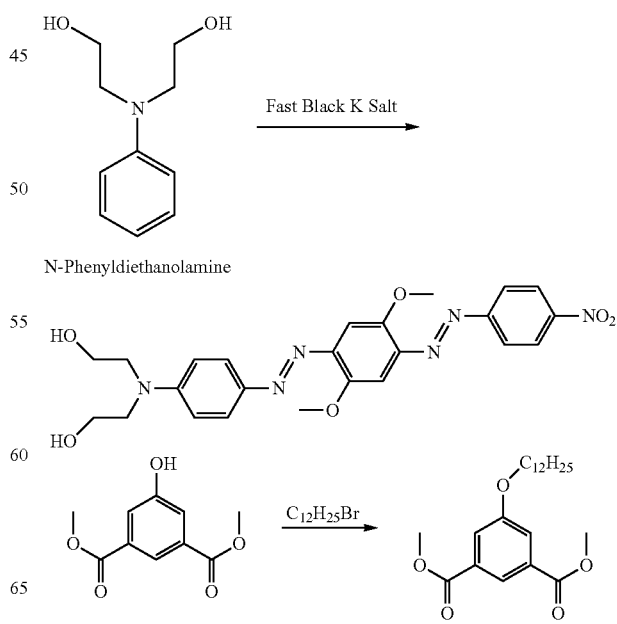

-continued

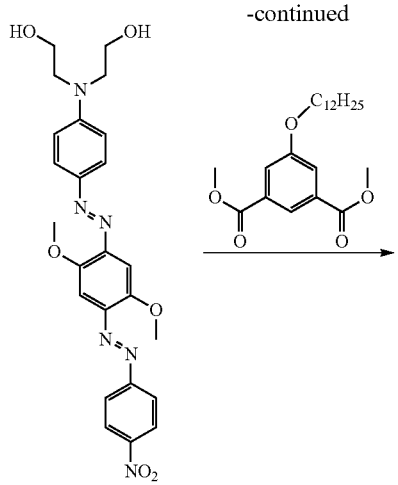

Polymer 5

This scheme should be widely adaptable to accommodate a variety of backbones and polarizable units. Such species would meet the following formula.

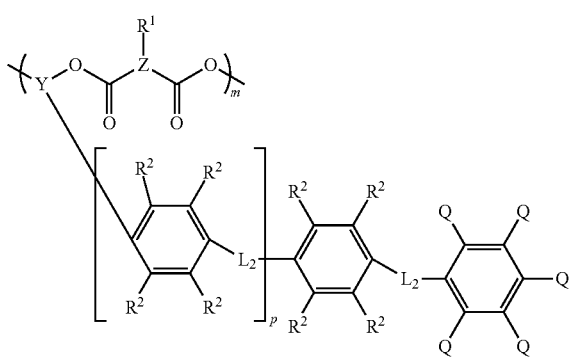

Where each instance of $R^1$ is independently selected from any alkyl group, each instance of $R^2$ is independently selected from —H, —OH, —OAk, or —OAk-$X_o$, $L_2$ is a heteroatom bridge in conjugation with the ring system of the side chain (e.g. azo-bridge or —N=N—, alkene bridge or —HC=CH—, and alkyne or —C≡C— bridge), each instance of Q is independently selected from any electron donating or electron withdrawing group, Z is substituted or unsubstituted hydrocarbon cyclic or chain linkage, Y is any hydrocarbon chain which may be interrupted by a hetero atom at the point of attachment, m is 1-300, o is 1-51, p is 0-10. Preferred embodiments include m between 60 and 270, and p between 1 and 4.

Other embodiments of the invention possess alternative backbones where resistive tail and Polarizable Unit are each simultaneously side chains to the same monomer. A sample scheme for polyaramid embodiments is depicted below.

EXAMPLE 11

Synthesis of Polymer 6

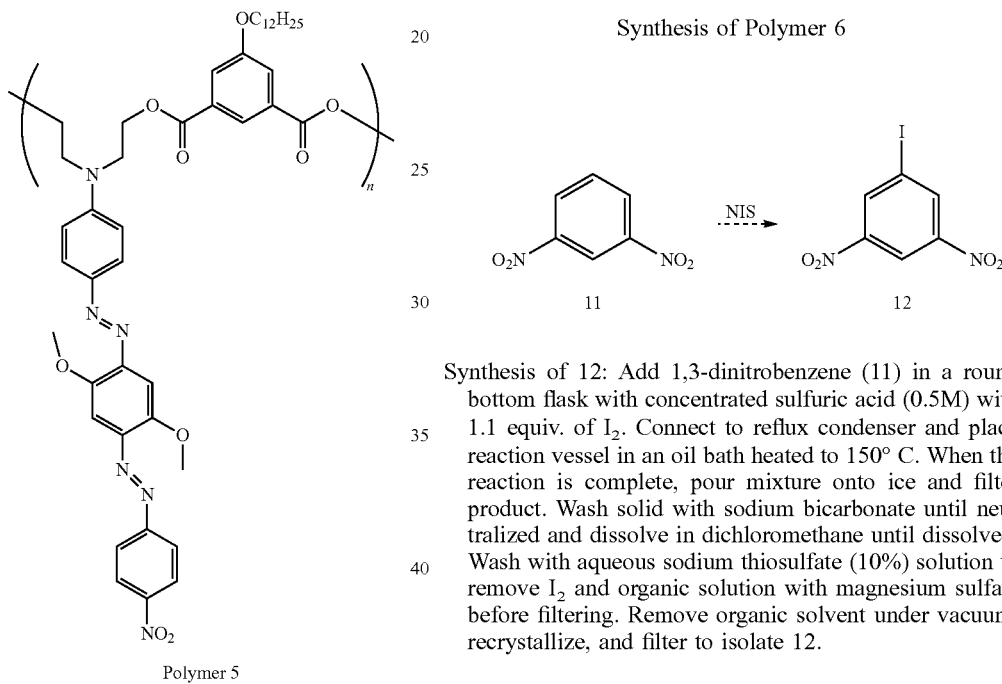

Synthesis of 12: Add 1,3-dinitrobenzene (11) in a round bottom flask with concentrated sulfuric acid (0.5M) with 1.1 equiv. of $I_2$. Connect to reflux condenser and place reaction vessel in an oil bath heated to 150° C. When the reaction is complete, pour mixture onto ice and filter product. Wash solid with sodium bicarbonate until neutralized and dissolve in dichloromethane until dissolved. Wash with aqueous sodium thiosulfate (10%) solution to remove $I_2$ and organic solution with magnesium sulfate before filtering. Remove organic solvent under vacuum, recrystallize, and filter to isolate 12.

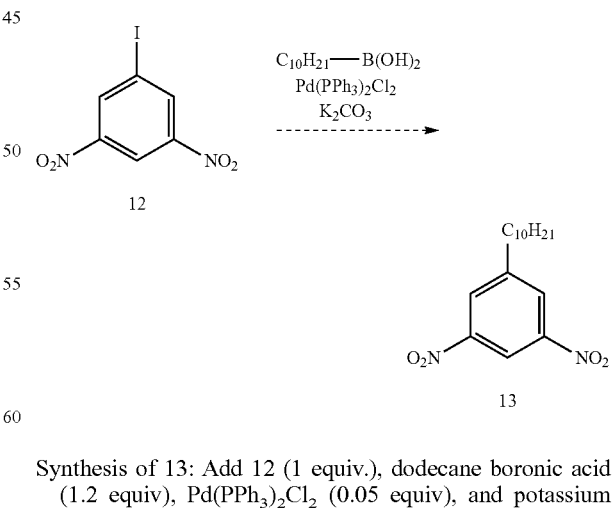

Synthesis of 13: Add 12 (1 equiv.), dodecane boronic acid (1.2 equiv), Pd(PPh$_3$)$_2$Cl$_2$ (0.05 equiv), and potassium carbonate (2 equiv.) into a reaction vessel. Evacuate and backfill with $N_2$ three times. Add a degassed mixture of toluene and water (10:1) and heat to 80° C. When the reaction is complete, slowly add 1 M aqueous solution of HCl until the aqueous layer is acidic. Extract with dichloromethane (3×) and dry organic fractions with MgSO$_4$ before filtering.

Concentrate the crude reaction mixture and filter through celite before recrystallizing. Filter to isolate product 13.

(5:1, 0.1 M). Add a solution of 10 (1.1 equiv, 0.5 M) in dichloromethane to the solution of 15. When the reaction is complete, wash with 1M aqueous HCl until acidic and extract with dichloromethane (3 times). Dry organic fractions with MgSO$_4$, filter, and concentrate under vacuum. Purify through crystallization or SiO$_2$ column chromatography to isolate 16.

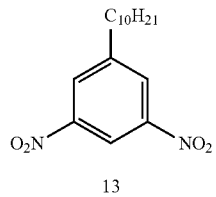
13

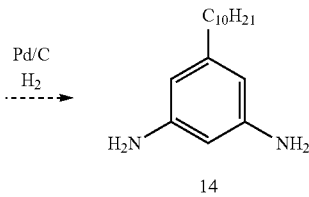
14

Synthesis of 14: Add 3 (1 equiv) to reaction flask with palladium on carbon (0.1 equiv). Evacuate and backfill with N$_2$ before adding ethanol (0.1 M). Fill a balloon and needle with H$_2$ gas and connect to reaction vessel and heat to 80° C. When the reaction is completed, filter through celite making sure the palladium on carbon does not dry. Remove solvent under reduced pressure and recrystallize to purify product 14.

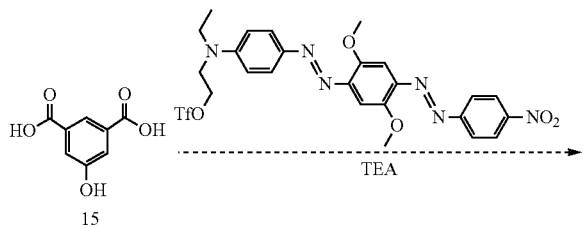
15

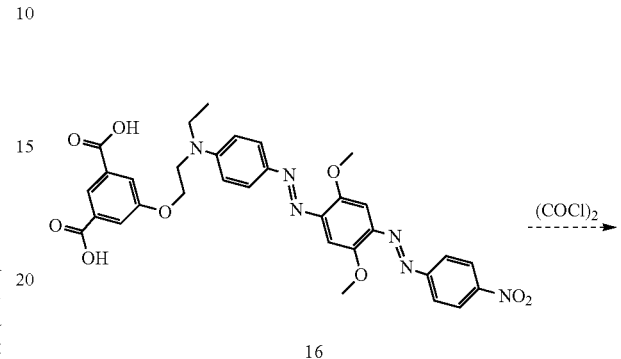
16

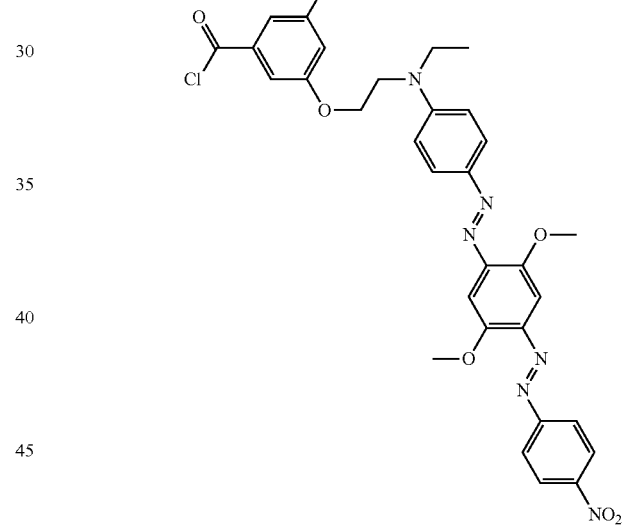
17

Synthesis of 17: Dissolve 16 (1 equiv.) in dichloromethane (0.1 M) and add oxalyl chloride (2.1 equiv) with a drop of dimethylformamide as catalyst. Let reaction stir at room temperature until bubbling stops. Remove solvent under vacuum to isolate 7.

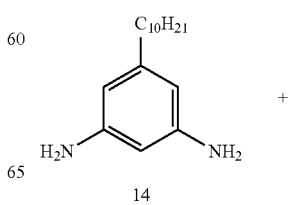
14

+

Synthesis of 16: Add 15 (1 equiv.) into a round bottom flask and dissolve in solution of dichloromethane/triethylamine

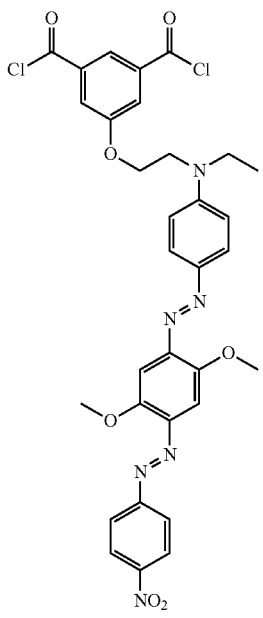

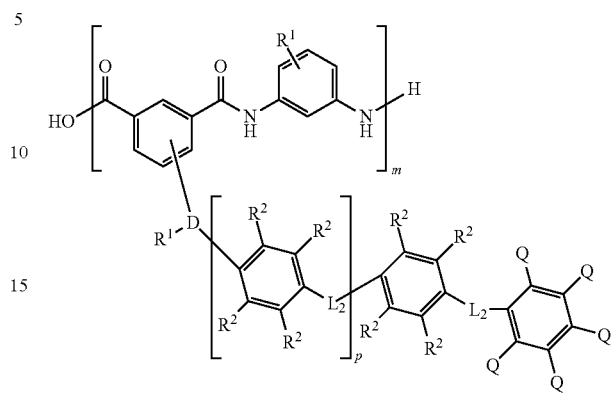

Where each instance of $R^1$ is independently selected from any alkyl or alkoxyl group or —H, each instance of $R^2$ is independently selected from —H, —OH, —OAk, or —OAk-$X_o$, $L_2$ is a heteroatom bridge in conjugation with the ring system of the side chain (e.g. azo-bridge or —N=N—, alkene bridge or —HC=CH—, and alkyne or —C≡C— bridge), Q is selected from any electron withdrawing group, D is any hydrocarbon chain which may be interrupted by hetero atoms at the point of backbone attachment and side chain attachment, m is 1-300, o is 1-51, p is 0-10. Preferred embodiments include m between 60 and 270, and p between 1 and 4.

EXAMPLES 2 & 12b

Synthesis of Polymers 7a & 7b

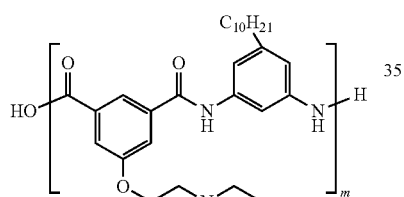

Polymer 6
18

Synthesis of 18: Add 14 (1.0 equiv.) and 17 (1.0 equiv.) to a reaction vessel before adding a mixture of anhydrous tetrahydrofuran and triethylamine (5:1, 0.1 M). When the reaction is complete, concentrate under reduced pressure and precipitate to isolate 18.

The scheme for Polymer 6 should be widely adaptable to accommodate a variety of backbones and polarizable units. Such species would meet the following formula.

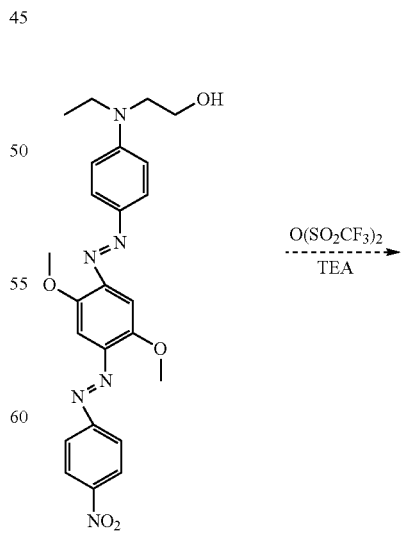

1

-continued

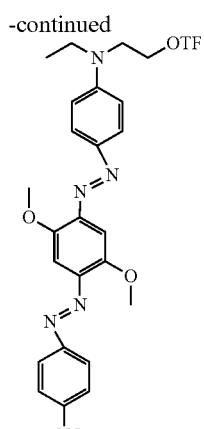

= Tfo—Azo

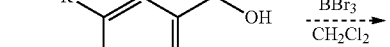

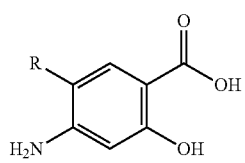

R = C$_{12}$H$_{25}$; 22a
R = C$_{18}$H$_{37}$; 22b

Synthesis of 20: Dissolve 1 (1 equiv.) in a solution of CH$_2$Cl$_2$ (0.1 M) and triethyl amine (1 equiv.) and let stir for 10 min. Add trifluoromethanesulfonic anhydride (1.1 equiv.) slowly and let stir for 30 min. Wash reaction mixture with aqueous HCl (1M), extract with dichloromethane, and dry with MgSO$_4$. Remove solvent to isolate 20.

Synthesis of 22a-22b: Dissolve 21a or 21b in anhydrous CH$_2$Cl$_2$ (0.3M) in an oven dried round bottom flask. Cool this solution to 0° C. in an ice bath and add boron tribromide (1M in CH$_2$Cl$_2$) slowly. Once addition of BBr$_3$ is complete, remove the ice bath and let the reaction mixture to warm up to ambient temperature for 12 hours. When the reaction is completed, cool it back to 0° C. and slowly add methanol to quench any excess BBr$_3$ present. Wash this reaction with distilled water and collect the organic fraction. Dry with MgSO$_3$, filter, then remove solvent under vacuum. Purify by either recrystallization or silica gel chromatography to isolate 22a or 22b

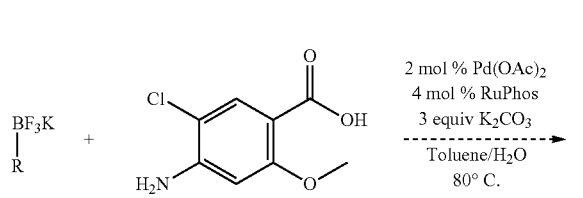

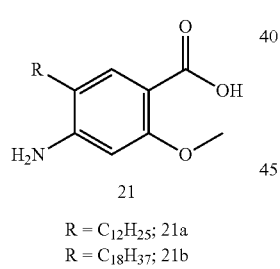

21

R = C$_{12}$H$_{25}$; 21a
R = C$_{18}$H$_{37}$; 21b

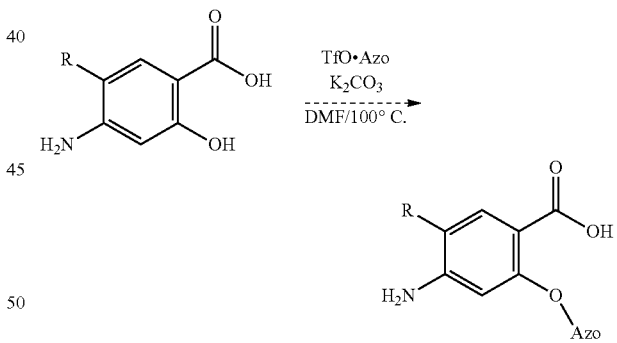

R = C$_{12}$H$_{25}$; 23a
R = C$_{18}$H$_{37}$; 23b

Synthesis of 21a-21b: Add 4-amino-5-chloro-2-methoxybenzoic acid, alkyl potassium trifluoroborate salt, Pd(OAc)$_2$ (0.02 equiv.), RuPhos (0.04 equiv.), and K$_2$CO$_3$ (3 equiv.) to a reaction flask. Evacuate this flask and backfill with N$_2$ three times. In a separate flask, combine toluene and water (0.3 M; 10:1) and sparge with N$_2$ for 60 minutes. Transfer this solution mixture to the reaction flask and place this into a preheated oil bath at 80° C. When the reaction is complete, it should cool to room temperature before carefully adding 1M HCl until the aqueous layer has been acidified. Extract this with CH$_2$Cl$_2$ and dry the organic fractions with MgSO$_4$ before filtering. Remove the organic solvent under reduced pressure and isolate the product by silica gel chromatography to isolate 21a or 21b.

The procedure below is adapted from: Molander G A, Sandrock D L. "Potassium trifluoroborate salts as convenient, stable reagents for difficult alkyl transfers", *Current Opinion In Drug Discovery & Development* 2009; 12(6): pages 811-823;

Synthesis of 23a-23b: Add either 22a or 22b (1 equiv.) and K$_2$CO$_3$ (2 equiv) into a round bottom flask and dissolve in solution of anhydrous DMF (0.1 M). Dissolve 20 (1.1 equiv, 0.5 M) in DMF and add this to the previous reaction mixture. Place the reaction mixture in a preheated 100° C. oil bath and stir until the reaction is completed. When the reaction is complete, wash with 1M aqueous HCl until acidic and extract with CH$_2$Cl$_2$ (3 times). Dry organic fractions with MgSO$_4$, filter, and concentrate under vacuum. Purify through crystallization or SiO$_2$ column chromatography to isolate 23a or 23b.

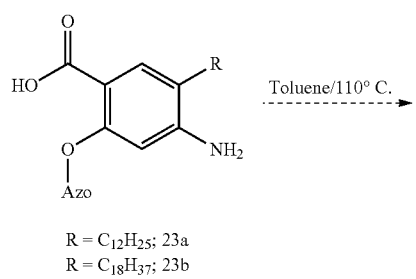

R = C₁₂H₂₅; 23a
R = C₁₈H₃₇; 23b

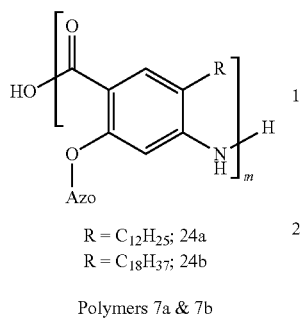

R = C₁₂H₂₅; 24a
R = C₁₈H₃₇; 24b

Polymers 7a & 7b

Synthesis of 24a-24b: Dissolve monomers 23b or 23b in toluene (0.4 M) in a round bottom flask equipped with a Dean Stark trap to remove water formed during the reaction and stir at 110° C. in a preheated oil bath. When the reaction is complete, purify the polymer through precipitation and isolate through filtration or centrifugation.

The scheme for Polymers 7a and 7b should be widely adaptable to accommodate a variety of backbones and polarizable units. Such species would meet the following formula.

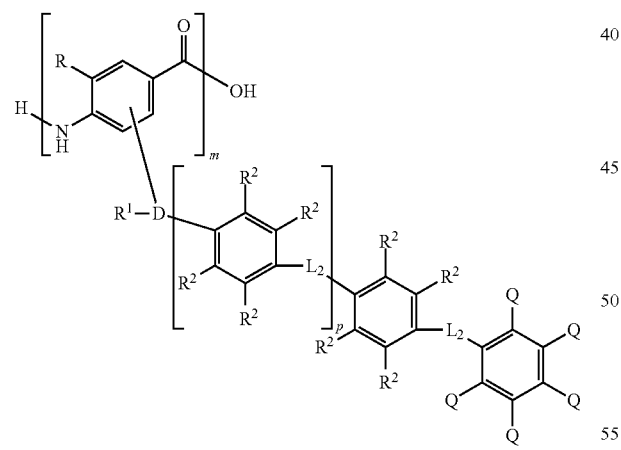

Where each instance of $R^1$ is independently selected from —H or any alkyl or alkoxyl group, each instance of $R^2$ is independently selected from —H, —OH, —OAk, or —OAk-$X_o$, $L_2$ is a heteroatom bridge in conjugation with the ring system of the side chain (e.g. azo-bridge or —N=N—, alkene bridge or —HC=CH—, and alkyne or —C≡C— bridge), Q is selected from any electron withdrawing group, D is any hydrocarbon chain which may be interrupted by hetero atoms at the point of backbone attachment and side chain attachment, m is 1-300, o is 1-51, p is 0-10. Preferred embodiments include m between 60 and 270, and p between 1 and 4.

EXAMPLE 13

Synthesis of Polymer 8

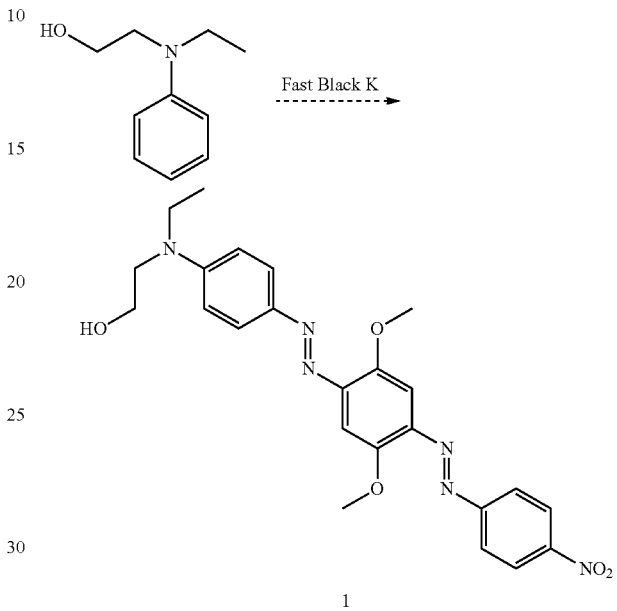

Synthesis of 1: Dissolve Fast Black K Salt in acetonitrile and NaOAc buffer solution (pH=4) and stir the resulting solution for 1 hour, followed by vacuum filtration. Add the filtrate dropwise to a solution of 2-(ethyl(phenyl)amino)ethan-1-ol at 0~5° C. Stir the solution at room temperature for 16 hours before filtering the precipitate and wash with a mixture of acetonitrile/water (1:1) and dried under vacuum.

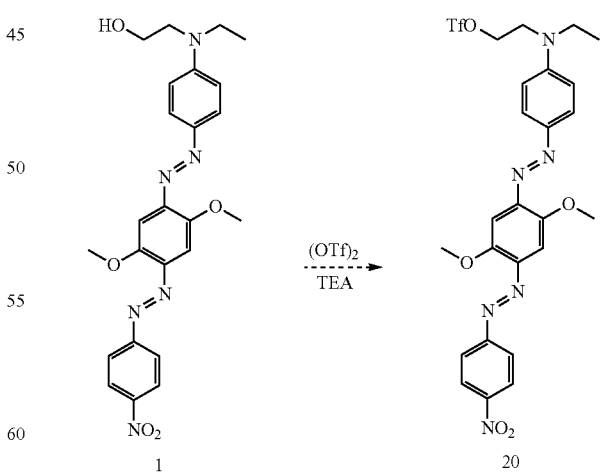

Synthesis of 20: Dissolve 1 (1 equiv.) in a solution of dichloromethane (0.1 M) and triethyl amine (1 equiv.) and let stir for 10 min. Add trifluoromethanesulfonic anhydride (1.1 equiv.) slowly and let stir for 30 min. Wash reaction mixture with aqueous HCl (1M), extract with dichloromethane, and dry with MgSO$_4$. Remove solvent to isolate 20.

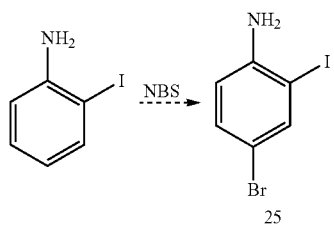

Synthesis of 25: Add 1-iodo-2-aminobenzene to a round bottom flask dissolved in dichloromethane (0.1 M) with 1.1 equiv. of N-bromosuccinimide. Let the reaction stir at room temperature for one hour. When the reaction is complete, wash with aqueous HCl (1 M) and extract with dichloromethane. Dry using MgSO$_4$, filter, and remove organic solvent under reduced pressure to isolate 25.

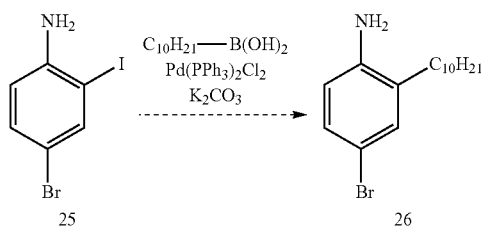

Synthesis of 26: Add 25 (1 equiv.), dodecane boronic acid (1.2 equiv), Pd(PPh$_3$)$_2$Cl$_2$ (0.05 equiv), and potassium carbonate (2 equiv.) into a reaction vessel. Evacuate and backfill with N$_2$ three times. Add a degassed mixture of toluene and water (10:1) and heat to 80° C. When the reaction is complete, slowly add 1 M aqueous solution of HCl until the aqueous layer is acidic. Extract with dichloromethane (3×) and dry organic fractions with MgSO$_4$ before filtering. Concentrate the crude reaction mixture and filter through celite before recrystallizing. Filter to isolate product 26.

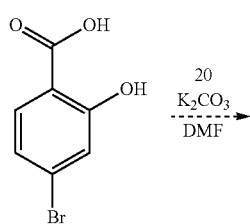

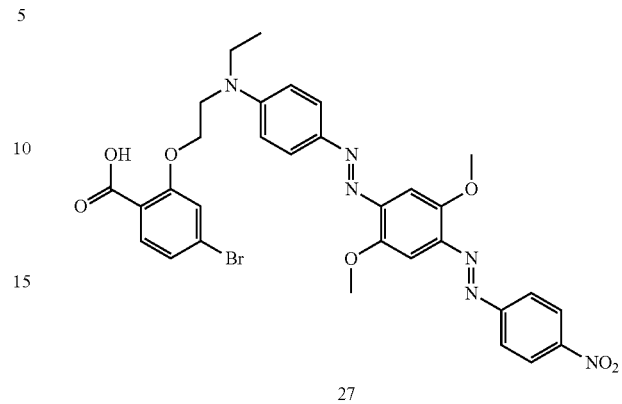

Synthesis of 27: Add 4-bromosalicylic acid (1 equiv.) into a round bottom flask with potassium carbonate (1.5 equiv.) and dissolve in solution of dimethylformamide (0.1 M) and heat the reaction to 100° C. for 2 hours. When the reaction is complete, wash with 1M aqueous HCl until acidic and extract with dichloromethane (3 times). Dry organic fractions with MgSO$_4$, filter, and concentrate under vacuum. Purify through crystallization or SiO$_2$ column chromatography to isolate 27.

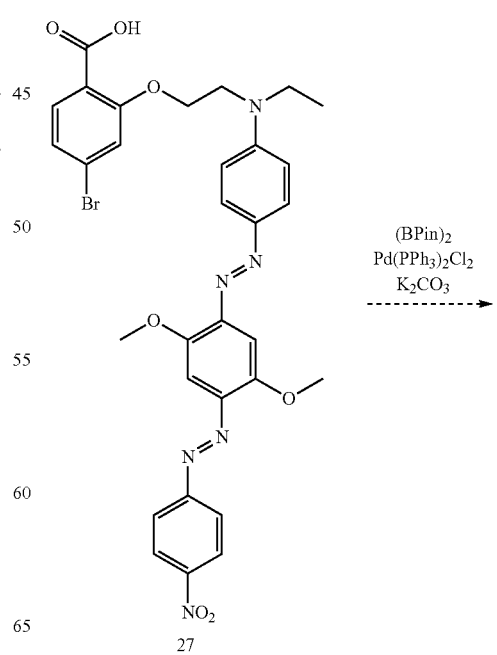

-continued

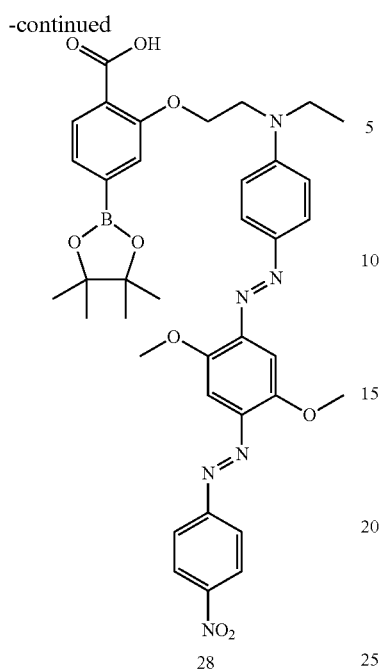

28

Synthesis of 28: Add 27 (1 equiv.), bispinacolborane (1.5 equiv), Pd(PPh$_3$)$_2$Cl$_2$ (0.05 equiv), and potassium carbonate (2 equiv.) into a reaction vessel. Evacuate and backfill with N$_2$ three times. Add a degassed mixture of toluene and water (10:1) and heat to 80° C. When the reaction is complete, slowly add 1 M aqueous solution of HCl until the aqueous layer is acidic. Extract with dichloromethane (3×) and dry organic fractions with MgSO$_4$ before filtering. Concentrate the crude reaction mixture and filter through celite before recrystallizing. Filter to isolate product 28.

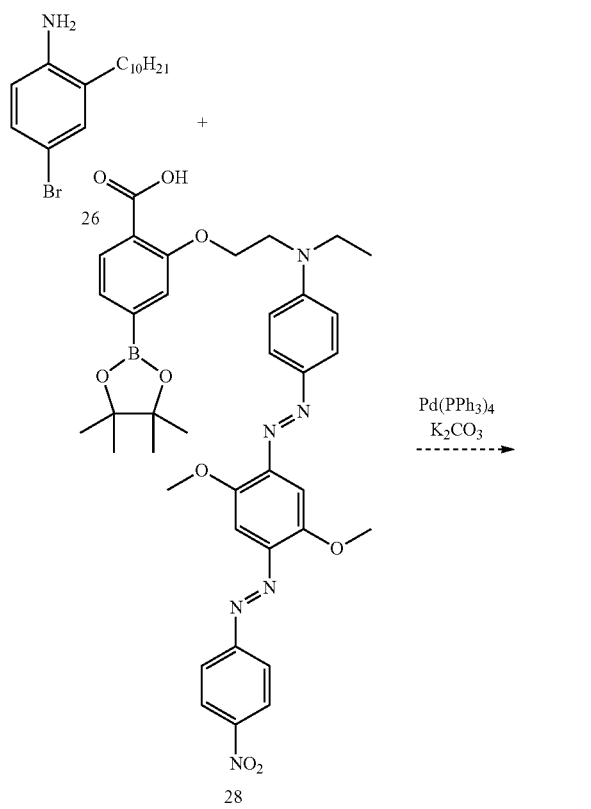

28

-continued

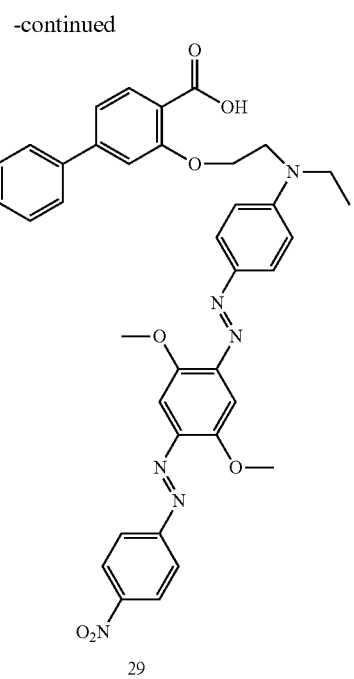

29

Synthesis of 29: Add 28 (1 equiv.), 26 (1 equiv), Pd(PPh$_3$)$_4$ (0.05 equiv), and potassium carbonate (2 equiv.) into a reaction vessel. Evacuate and backfill with N$_2$ three times. Add a degassed mixture of toluene and water (10:1) and heat to 80° C. When the reaction is complete, slowly add 1 M aqueous solution of HCl until the aqueous layer is acidic. Extract with dichloromethane (3×) and dry organic fractions with MgSO$_4$ before filtering. Concentrate the crude reaction mixture and filter through celite before recrystallizing. Filter to isolate product 29.

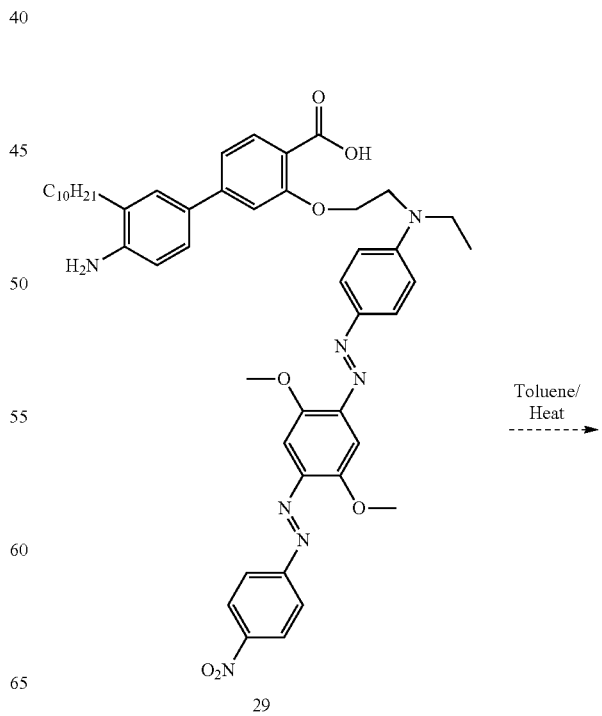

29

-continued

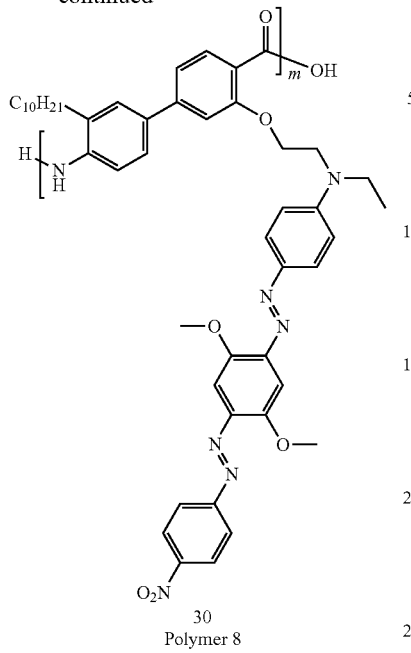

30
Polymer 8

Synthesis of 30: Add 29 (1.0 equiv.) to a reaction vessel before adding toluene and (0.1 M). Connect the reaction vessel to a and dean-stark apparatus and reflux condenser and heat to 150° C. When the reaction is complete, concentrate the crude reaction mixture under reduced pressure and precipitate polymer into hexane to isolate 30.

The scheme for Polymer 8 should be widely adaptable to accommodate a variety of backbones and polarizable units. Such species would meet the following formula.

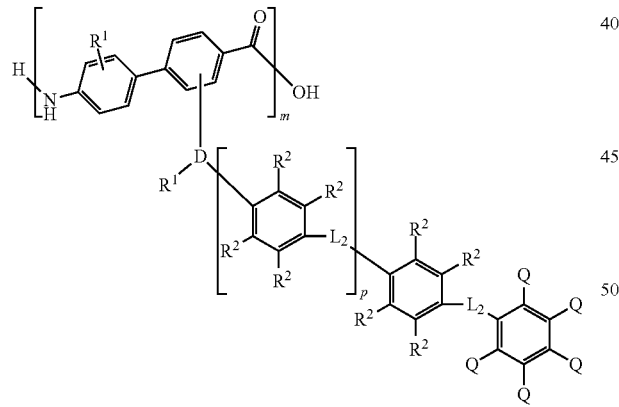

Where each instance of $R^1$ is independently selected from —H or any alkyl or alkoxyl group, each instance of $R^2$ is independently selected from —H, —OH, —OAk, or —OAk-$X_o$, $L_2$ is a heteroatom bridge in conjugation with the ring system of the side chain (e.g. azo-bridge or —N=N—, alkene bridge or —HC=CH—, and alkyne or —C≡C— bridge), Q is selected from any electron withdrawing group, D is any hydrocarbon chain which may be interrupted by hetero atoms at the point of backbone attachment and side chain attachment, m is 1-300, o is 1-51, p is 0-10. Preferred embodiments include m between about 60 and 270, and p between 1 and 4. composite organic compound characterized by polarizability and resistivity has a general structural formula:

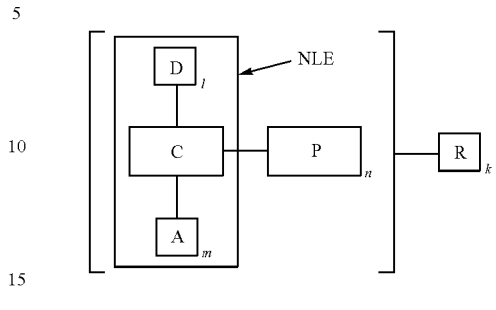

C is a chromophore fragment comprising an aromatic substituent independently selected from the group consisting of six-membered aromatic rings, five-membered heteroaromatic rings, fused ring systems containing at least one six-membered aromatic ring, and fused ring systems containing at least one five-membered heteroaromatic ring having one heteroatom selected from the group consisting of O, N, S and Se, C has the general structure:

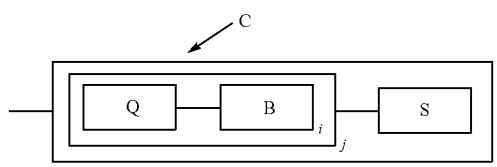

each Q comprises an aromatic substituent independently selected from the group consisting of six-membered aromatic rings, five-membered heteroaromatic rings, fused ring systems of at least one six-membered aromatic ring, and fused ring systems of at least one five-membered heteroaromatic ring having one heteroatom selected from the group consisting of O, N, S and Se, B comprises a conjugated functional group, the value of i for each B is an integer between zero and three, inclusively, and j is from one to nine, inclusive; and R, D, A, and B may independently be attached to a member of a heteroaromatic ring alpha to a heteroatom, and when Q is an aromatic ring, B is attached to a member of said aromatic ring para to R or another B, and D and A can independently be ortho, meta, or para to B on Q.

D comprises an electron donating group capable of releasing electrons into said conjugated aromatic system; l is an integer between zero and three, inclusively, A comprises an electron accepting group capable of pulling electrons from said conjugated aromatic system; m is an integer between zero and three, inclusively, R is selected from the group consisting of straight-chained or branched alkyl, alkoxy, alkylthio, alkylamino, and fluoro-alkyl group containing from one to thirty carbon atoms attached to said composite organic compound wherein R may independently be attached to C and P by an alkyl moiety or connecting group, k is the number of R groups attached to the composite organic compound wherein R may independently be attached to C and P by an alkyl moiety or a connecting group, the value of k is an integer between 0 and 15, inclusively, S comprises a heteroaromatic substituent selected from the group consisting of five-membered heteroaromatic rings having one heteroatom selected from the group consisting of O, N, S and Se, fused ring systems containing at least one five-membered heteroaromatic ring having one heteroatom selected from the group consisting of O, S and Se, fused ring systems containing at least one five-membered heteroaromatic ring having two to four N heteroatoms, fused ring systems containing all five-membered heteroaromatic rings having one heteroatom selected from the group consisting of O, N, S and Se, pyrimidine and purine, so that S is tricyanovinylated at a ring position alpha to a heteroatom;

P is a polycyclic conjugated molecular fragments having two-dimensional flat form and self-assembling by pi-pi stacking in a column-like supramolecule, n is the number of the polycyclic conjugated molecular fragments which is equal to 0, 2, or 4.

EXAMPLE 14

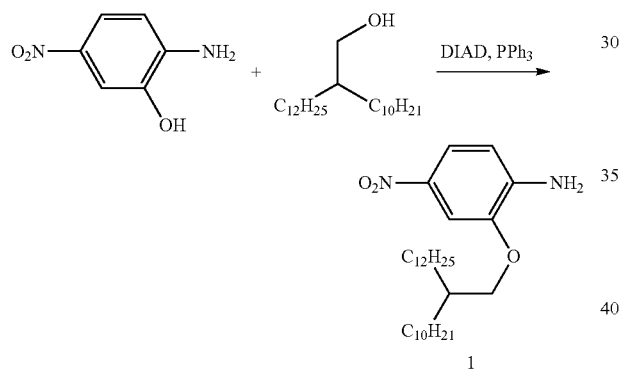

2-decyl-1-tetradecanol (1 equiv.), PPh₃ (2 equiv.), and DIAD (2.3 equiv.) were dissolved in THF and stirred in an ice bath. Then, 2-amino-5-nitrophenol was added and the reaction was allowed to warm to ambient temperature and stirred for 24 h. The reaction mixture was diluted with hexanes and filtered through diatomaceous earth. The filtrate was concentrated and purified on silica gel to give 1.

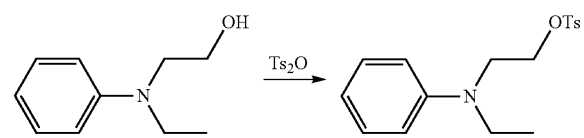 [SMILES: "Ts2O" ; CCN(CCO)c1ccccc1 ; CCN(CCOS(=O)(=O)c1ccc(C)cc1)c1ccccc1]

2-(N-ethylanilino)ethanol (1 equiv.), NaH (2 equiv.), and tosyl chloride (1.2 equiv.) were dissolved in DMF and stirred at room temperature for 18 h. The solution was processed through an aqueous workup. The organics were dried over MgSO₄ and the solvents were removed en vacuo.

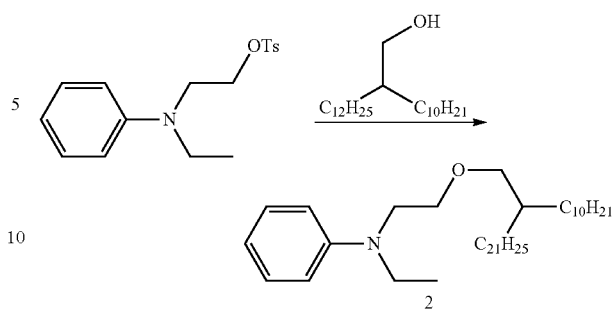

2-decyl-1-tetradecanol (1 equiv.), NaH (2 equiv.), and tosylated 2-(N-ethylanilino)ethanol (1 equiv.) were dissolved in THF and stirred at room temperature for 18 h. The solution was processed through an aqueous workup. The organics were dried over MgSO₄ and the solvents were removed en vacuo to give 2.

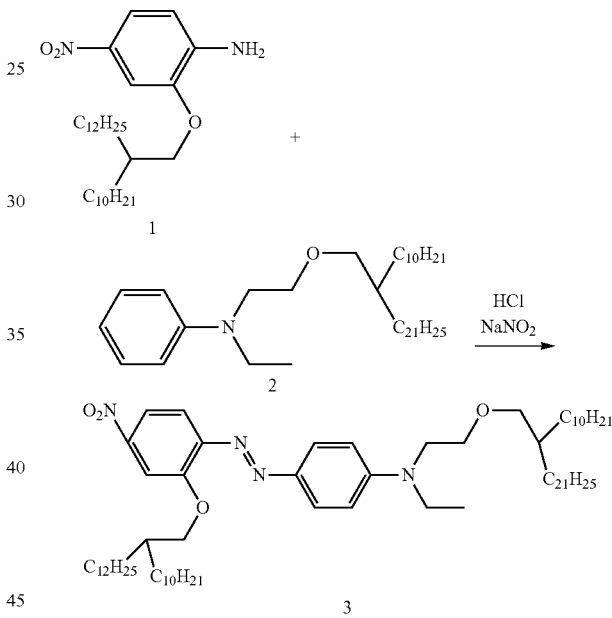

Compound 1 (20 mmol) was dissolved in a solution of 35% hydrochloric acid and the mixture was stirred in an ice bath. Subsequently, a water solution of sodium nitrite (20 mmol) was added slowly and the resulting solution was stirred in the ice bath for 30 min, a solution of 2 (24 mmol) in distilled ethanol was added dropwise and stirred for 1 h. After pH of the resulting solution was adjusted to 7.0 with potassium carbonate, the reaction was stirred for another 30 min. The red solution was diluted with CH₂Cl₂ and washed with brine and deionized water. The crude product was purified by recrystallization.

While preferable embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein can be employed in practicing the invention. Any feature, whether preferred or not, may be combined with any other feature. It is to be understood that the above described embodiment of the invention is illustrative only and that modifications thereof may occur to those skilled in the art. Accordingly, this invention is not to be regarded as limited to the embodiment disclosed herein, but is to be limited only as defined by the appended claims.

Alternatively, a metadielectric may be defined as a dielectric material comprised of one or more types of structured polymeric materials (SPMs). Individually, the SPMs in a metadielectric may be column like supramolecular structures formed by pi-pi interaction or hydrophilic and hydrophobic interactions. Said supramolecules of SPMs may be previously listed liquid crystal derived structures. Use of SPMs or supramolecular structures incorporates polarization units to provide the molecular material with high dielectric permitivity, and therefore permits formation of highly ordered dielectric films that may be considered crystalline. Formation of such films can be achieved using Cascade Crystallization; a method of thin crystal film (or thin crystal layer) manufacturing known as the Optiva-Process, and described in U.S. Pat. Nos. 5,739,296 and 6,049,428; and P. Lazarev et al., "X-ray Diffraction by Large Area Organic Crystalline Nano-films", Molecular Materials, 14 (4), 303-311 (2001); and Bobrov, "Spectral Properties of Thin Crystal Film Polarizers", Molecular Materials, 14 (3), 191-203 (2001). There are several mechanisms of polarization such as dipole polarization, ionic polarization, and hyper-electronic polarization of molecules, oligomers and polymers possessing metal conductivity, and non-linear polarization.

"Hyperelectronic polarization may be considered due to the pliant interaction of charge pairs of excitons, localized temporarily on long, highly polarizable molecules, with an external electric field (Roger D. Hartman and Herbert A. Pohl, "Hyper-electronic Polarization in Macromolecular Solids", Journal of Polymer Science: Part A-1 Vol. 6, pp. 1135-1152 (1968))." Ionic type polarization can be achieved by limited mobility of ionic parts of the core molecular fragment.

All polarization units with the listed types of polarization may be used in aspects of the present disclosure. Further, SPMs and supramolecular structures consist of composite materials which incorporate an envelope of insulating substituent groups that electrically isolate the supramolecules from each other in the dielectric layer and provide high breakdown voltage and resistivity of the dielectric material. Said insulating substituent groups are described hereinabove chains covalently bonded directly to or via a connecting group to a polarizable core or co-polymer backbone, forming the resistive envelope.

FIG. 11 depicts one embodiment of an energy storage cell 1, each of the one or more metacapacitors 20 comprises a first electrode 21, a second electrode 22, and a metadielectric material layer 23 disposed between said first and second electrodes. The electrodes 21, 22 may be made of a metal, such as copper, zinc, or aluminum or other conductive material and are generally planar in shape. In one implementation, the electrodes and metadielectric material layer 23 are in the form of long strips of material that are sandwiched together and wound into a coil along with an insulating material, e.g., a plastic film such as polypropylene or polyester to prevent electrical shorting between the electrodes 21, 22. Non-limiting examples of such coiled capacitor energy storage devices are described in detail in commonly-assigned U.S. patent application Ser. No. 14/752,600, filed Jun. 26, 2015, the entire contents of which are incorporated herein by reference.

A characteristic electric field known as the breakdown strength $E_{bd}$, is an electric field in which the dielectric layer in a capacitor becomes conductive. The voltage at which this occurs is called the breakdown voltage of the device, and is given by the product of dielectric strength and separation between the electrodes, $$V_{bd}=E_{bd}d \qquad (IV)$$

In another aspect, by way of example and not by way of limitation, a spacing d between the electrodes 21, 22 which may correspond to the thickness of the metadielectric film layer 23 beign at least 3 nm. As noted in Equation (4) above, the maximum voltage $V_{bd}$ between the electrodes 21, 22 is approximately the product of the breakdown field and the electrode spacing d.

The electrodes 21, 22 may have the same shape as each other, the same dimensions, and the same area A. By way of example, and not by way of limitation, the area A of each electrode 21, 22 may range from about 0.01 m$^2$ to about 10,000 m$^2$. By way of example and not by way of limitation, for rolled metacapacitors, electrodes up to, for example 10,000 m long and 1 m wide.

These ranges are non-limiting. Other ranges of the electrode spacing d and area A are within the scope of the aspects of the present disclosure.

If the spacing d is small compared to the characteristic linear dimensions of electrodes (e.g., length and/or width), the capacitance C of the metacapacitor may be approximated by the formula:

$$C=\kappa\varepsilon_o A/d, \qquad (V)$$

where $\varepsilon_o$ is the permittivity of free space (8.85×10$^{-12}$ Coulombs$^2$/(Newton·meter$^2$)) and K is the dielectric constant of the metadielectric layer. The energy storage capacity U of the capacitor may be approximated as:

$$U=1/2CV_{bd}^2 \qquad (VI)$$

which may be rewritten using equations (2) and (3) as:

$$U=1/2\kappa\varepsilon_o AdE_{bd}^2 \qquad (VII)$$

Or the volumetric energy density for the metadielectric material can be written as:

$$U/Ad=1/2\kappa\varepsilon_o E_{bd}^2 \qquad (VIII)$$

The energy storage capacity U is determined by the metadielectric constant κ, the area A, and the breakdown field $E_{bd}$. By appropriate engineering, a metacapacitor may be designed to have any desired energy storage capacity U. By way of example, and not by way of limitation, given the above ranges for the dielectric constant κ, electrode area A, and breakdown field $E_{bd}$ a metacapacitor in accordance with parameters in Table 1 may have an energy storage capacity U ranging from about 4.4 Joules to about 8.5×10$^9$ Joules.

TABLE 1

Example calculated energy storage of bulk metadielectric material

| Parameter | Lower Value | |
|---|---|---|
| $\varepsilon_o$ | 8.85 × 10$^{-12}$ | 8.85 × 10$^{-12}$ |
| Area (m$^2$) | 0.01 | 10 000 |
| Thickness (m) | 1.00 × 10$^{-4}$ | 3.00 × 10$^{-9}$ |
| κ | 100 | 1000 000 |
| $E_{bd}$ (v/nm) | 0.1 | 0.5 |
| $E_{bd}$ (v/m) | 100 000 000 | 500 000 000 |
| U (Joules) | 4.43 | 3.32 × 10$^7$ |

Although a single metacapacitor 20 is shown for convenience in FIG. 11, aspects of the present disclosure are not limited to such implementations. As illustrated in FIGS. 8A, 8B, 8C, 8D, those skilled in the art will recognize that the capacitive energy storage device 2 may include multiple metacapacitors 20 connected in parallel, as in FIG. 8B, to provide a desired amount of energy storage capacity that scales roughly with the number of metacapacitors in parallel. Alternatively, the capacitive energy storage device 2 may include two or more metacapacitors connected in series to accommodate a desired voltage level, as in FIG. 8C. In addition, the capacitive energy storage device 2 may include combinations of three or more metacapacitors in a capacitor network involving various series and parallel combinations, as in FIG. 8D. For example, there may be three capacitor combinations connected in parallel with each other with each combination having two capacitors connected in series.

In still another implementation, the capacitive energy storage cell may further comprise a cooling mechanism 30. In some implementations, the cooling can be passive, e.g., using radiative cooling fins on the capacitive energy storage device 2 and DC-voltage conversion device 3. Alternatively, a fluid such as air, water or ethylene glycol can be used as a coolant in an active cooling system. By way of example, and not by way of limitation, the cooling system 30 may include conduits in thermal contact with the capacitive energy storage device 2 and DC-voltage conversion device 3. The conduits are filled with a heat exchange medium, which may be a solid, liquid or gas. In some implementations, the cooling mechanism may include a heat exchanger configured to extract heat from the heat exchange medium. In other implementations, the cooling mechanism 30 may include conduits in the form of cooling fins on the capacitive energy storage device 2 and DC-voltage conversion device 3 and the heat exchange medium is air that is blown over the cooling fins, e.g., by a fan. In another embodiment of the present invention, the heat exchanger 32 may include a phase-change heat pipe configured to carry out cooling. The cooling carried out by the phase-change heat pipe may involve a solid to liquid phase change (e.g., using melting of ice or other solid) or liquid to gas phase change (e.g., by evaporation of water or alcohol) of a phase change material. In yet another implementation, the conduits or heat exchanger 32 may include a reservoir containing a solid to liquid phase change material, such as paraffin wax.

In some embodiments the capacitor energy storage devices have specific energy densities ranging from less than or equal to about 250 Wh/kg to less than or equal to about 1250 Wh/kg. In some embodiments said capacitor energy storage devices may have an specific energy density greater than 1250 Wh/kg.

In addition to a CESD, a CESC is comprised of a DC-voltage conversion device. Referring again to FIGS. 11, 12 and 13 the DC-voltage conversion device 3 may include a buck converter for applications in which $V_{out} < V_{in}$, a boost converter for applications in which $V_{out} > V_{in}$, or a bidirectional buck/boost converter for applications in which $V_{out} < V_{in}$ in certain situations and $V_{out} > V_{in}$ in other situations.

In still another embodiment of the energy storage cell (see, FIG. 12) the DC-voltage conversion device 3 may be connected to a control board 4 containing suitable logic circuitry, e.g., microprocessor, microcontroller, application specific integrated circuit (ASIC), field programmable gate array (FPGA), a complex programmable logic device (CPLD), capable of implementing closed loop control processes 90 and (optionally) a communication interface 5, as well as an analog to digital converter coupled to sensors on the DC-voltage conversion device 3, e.g., voltage sensors V for the input voltage $V_{in}$ and the output voltage $V_{out}$, current sensors A for current $I_{sd}$ to/from the capacitive energy storage device 2 and/or current $I_{vc}$ to/from the DC-voltage conversion device 3, temperature sensors T on the capacitive energy storage device and/or DC-voltage conversion device. In some implementations, the control board 4 may be integrated into the DC-voltage conversion device 3. The conversion device 3 may contain a buck regulator, a boost regulator, buck and boost regulators with separate input/outputs, a bi-directional boost/buck regulator, or a split-pi converter and the control board 4 may be configured to maintain a constant output voltage $V_{out}$ from the DC-voltage conversion device during discharge, and/or charge the capacitor at a more-or-less constant current from an AC or DC charger while maintaining a stable input voltage.

By way of example, and not by way of limitation, the control board 4 may be based on a controller for a bidirectional buck/boost converter. In such a configuration, the control board 4 stabilizes the output voltage of the DC-voltage conversion device according to the following algorithm forming the control loop 90:

a) determining a target output voltage level for the energy storage system,
b) measuring the voltage of a capacitive energy storage device,
c) configuring a bidirectional buck/boost converter to buck down the voltage and direct current in the output direction if the voltage on the capacitive energy storage device is higher than the desired output voltage and the desired outcome is to discharge the device,
d) configuring a bidirectional buck/boost converter to boost up the voltage and direct current in the output direction IF the voltage on the capacitive energy storage device is lower than the desired output voltage and the desired outcome is to discharge the device,
e) configuring a bidirectional buck/boost converter to buck down the voltage and direct current in the input direction IF the voltage on the capacitive energy storage device is lower than the desired input voltage and the desired outcome is to charge the device,
f) configuring a bidirectional buck/boost converter to boost up the voltage and direct current in the input direction IF the voltage on the capacitive energy storage device is higher than the desired output voltage and the desired outcome is to charge the device,
g) configuring a bidirectional buck/boost converter to stop outputting power if the voltage on the capacitive energy storage device falls below a predetermined level,
h) configuring a bidirectional buck/boost converter to stop inputting power if the voltage on the capacitive energy storage device exceeds a predetermined level,
i) repeating steps (a) through (f) as necessary.

Figure 16A:
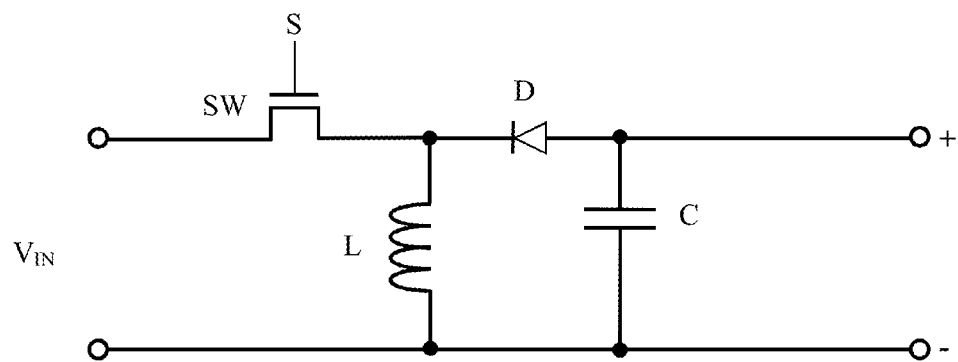
FIG. 16A shows an example of a single switch buck-boost converter that may be implemented in a switch-mode voltage converter, which could be selected for use in a DC voltage conversion device in an energy storage cell according to aspects of the present disclosure.
Figure 16B:
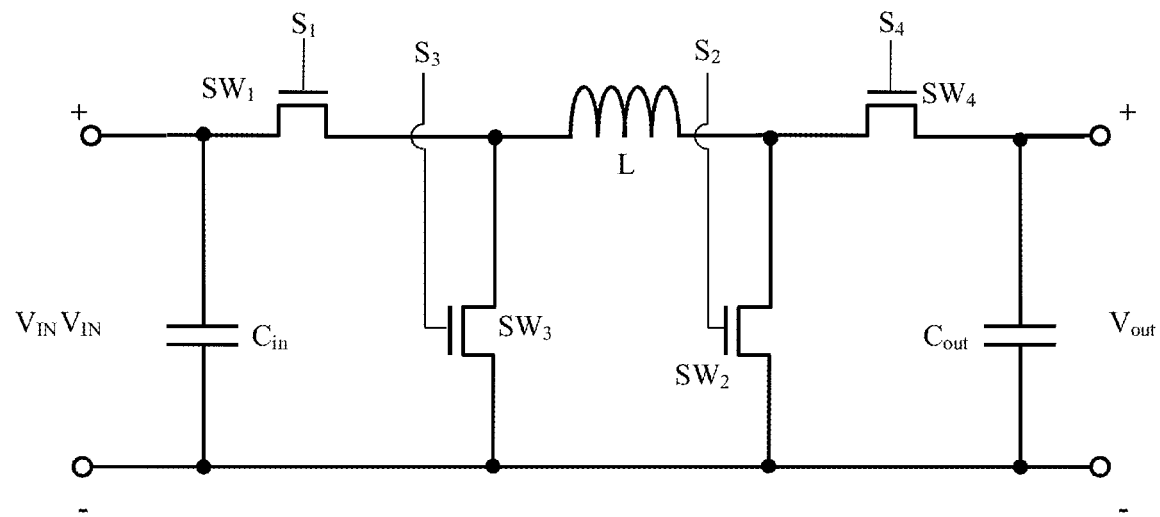
FIG. 16B shows an example of a four switch buck-boost converter that may be implemented in a switch-mode voltage converter, which could be selected for use in a DC voltage conversion device in an energy storage cell according to aspects of the present disclosure.

The specifics of operation of the control board 4 are somewhat dependent on the type of buck/boost converter(s) used in the DC-voltage conversion device 3. For example, a buck/boost converter may be a single switch converter of the type shown in FIG. 16A. This type of converter includes a high-side switch SW having an input side coupled to the input voltage $V_{in}$ and an output side coupled to one side of an inductor L, the other side of which is connected to the ground or common voltage (−). A capacitor C is coupled across the output voltage Vout. A pulsed switching signal S turns the switch on and off. The output voltage depends on the duty cycle of the switching signal S. By way of example, the switches may be implanted as gated switch devices, e.g., MOSFET devices, stacked MOSFET devices, IGCT devices, high drain-source voltage SiC MOSFET devices, and the like depending on the voltage and/or current requirements of the DC-voltage converter for the energy storage cell. In the case of gated switching devices, the control board provides the signals to the gate terminals of the switching devices. The control board 4 can configure this type of buck/boost converter to buck or boost by adjusting the duty cycle of the switching signal S.

Figure 9A:
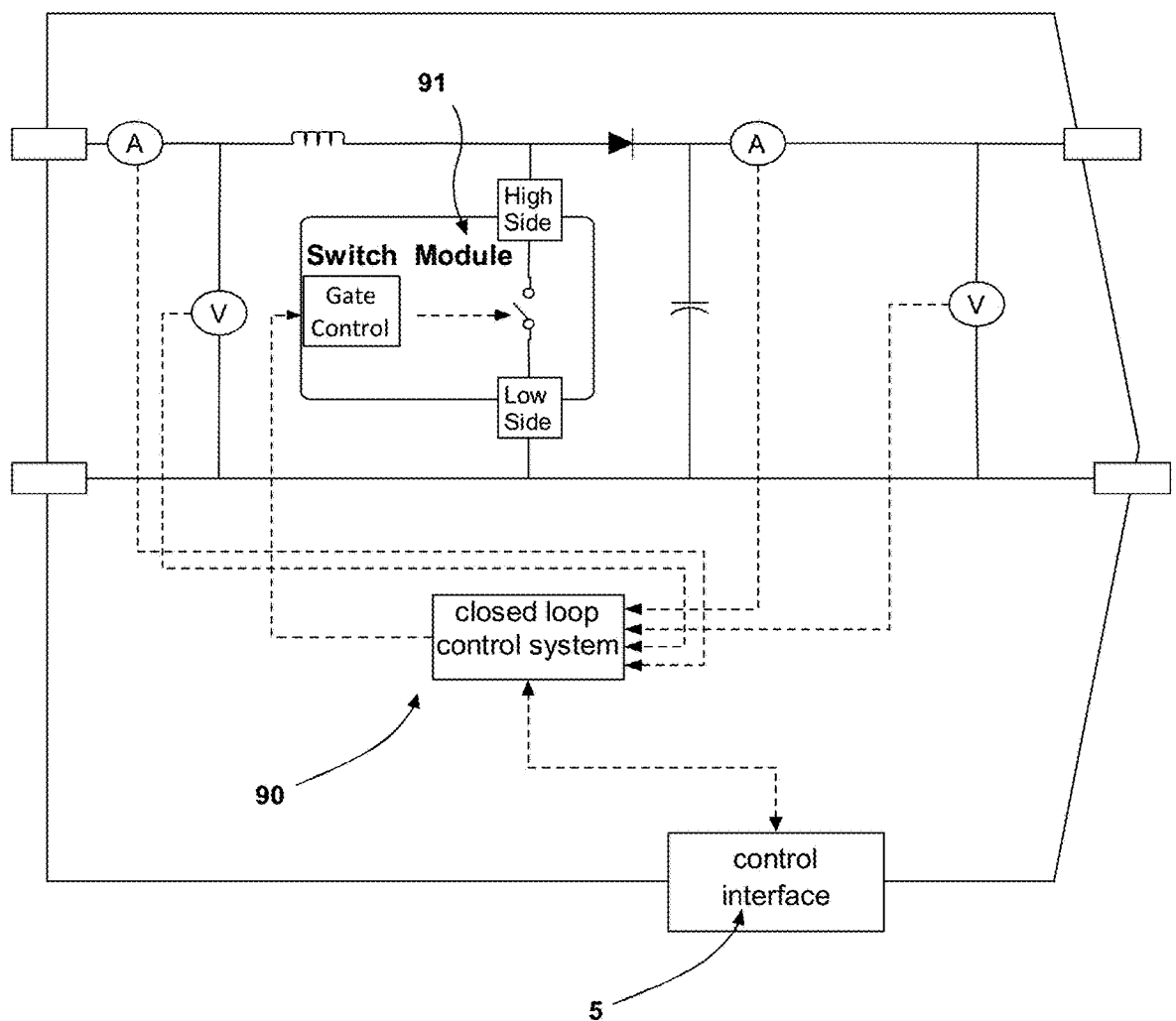
FIG. 9A schematically shows a switch-mode voltage converter implementing a standard boost circuit.
Figure 9B:
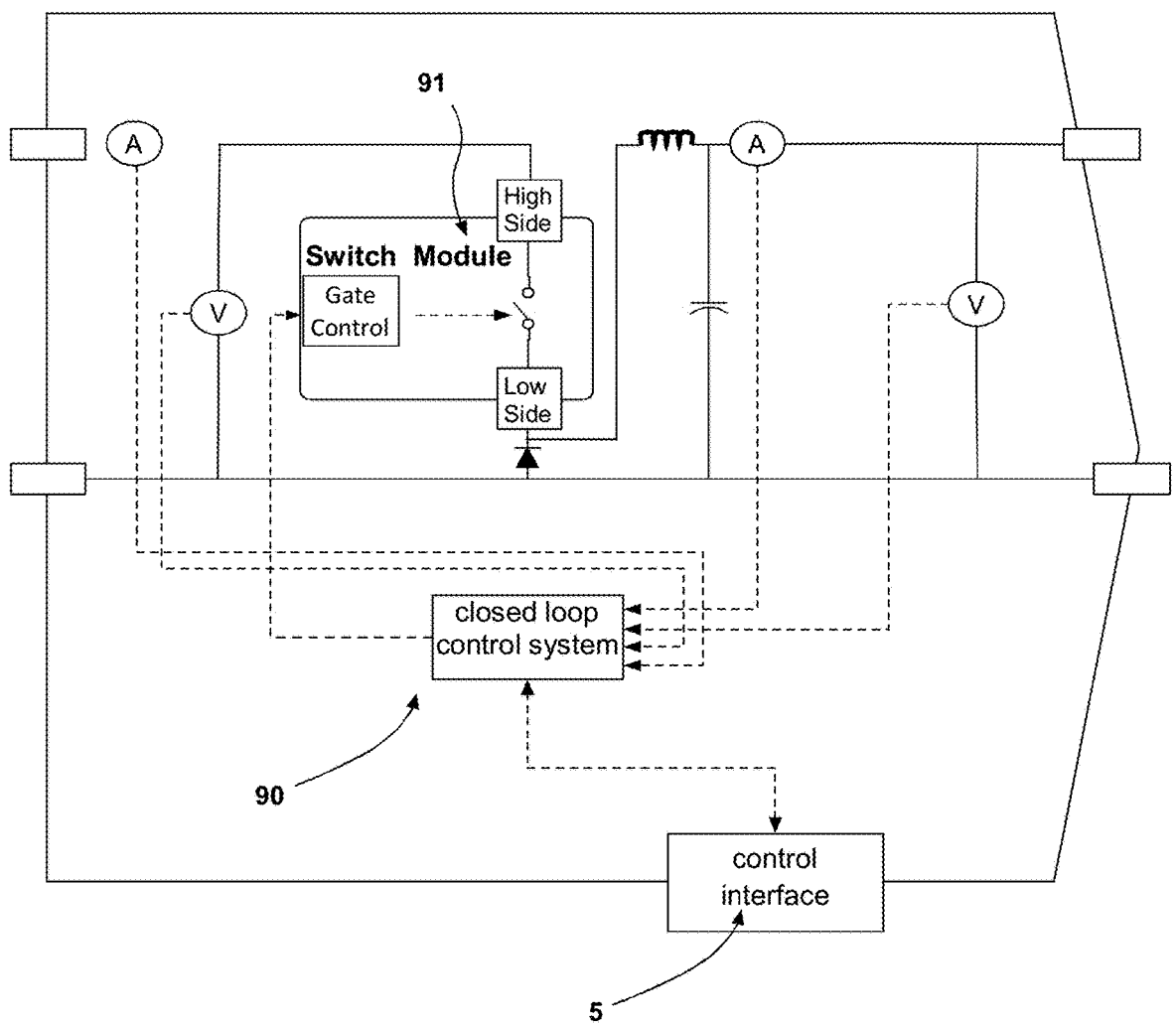
FIG. 9B schematically shows a switch-mode voltage converter implementing a standard buck circuit.
Figure 9C:
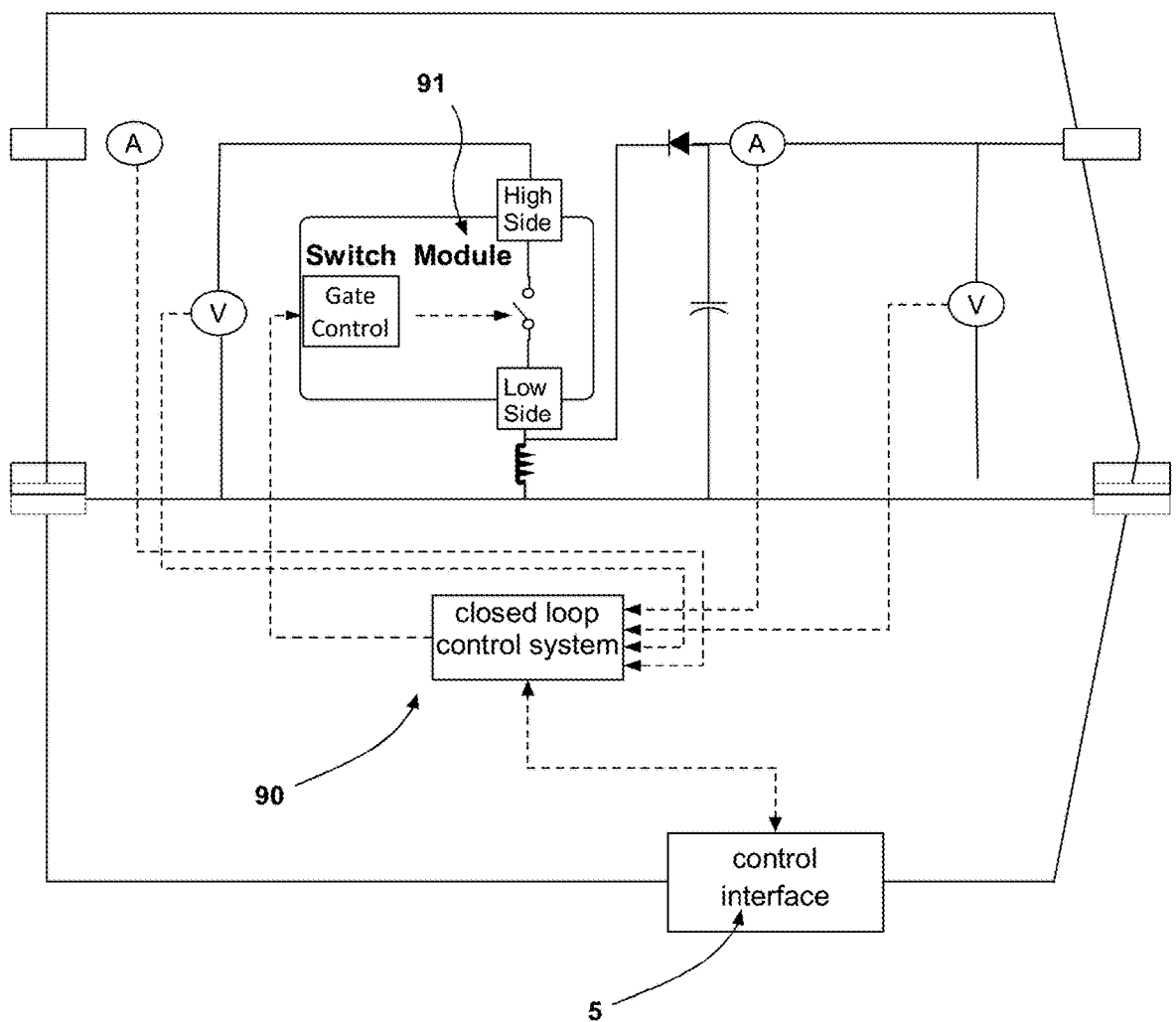
FIG. 9C schematically shows a switch-mode voltage converter implementing a standard inverting buck/boost circuit.
Figure 9D:
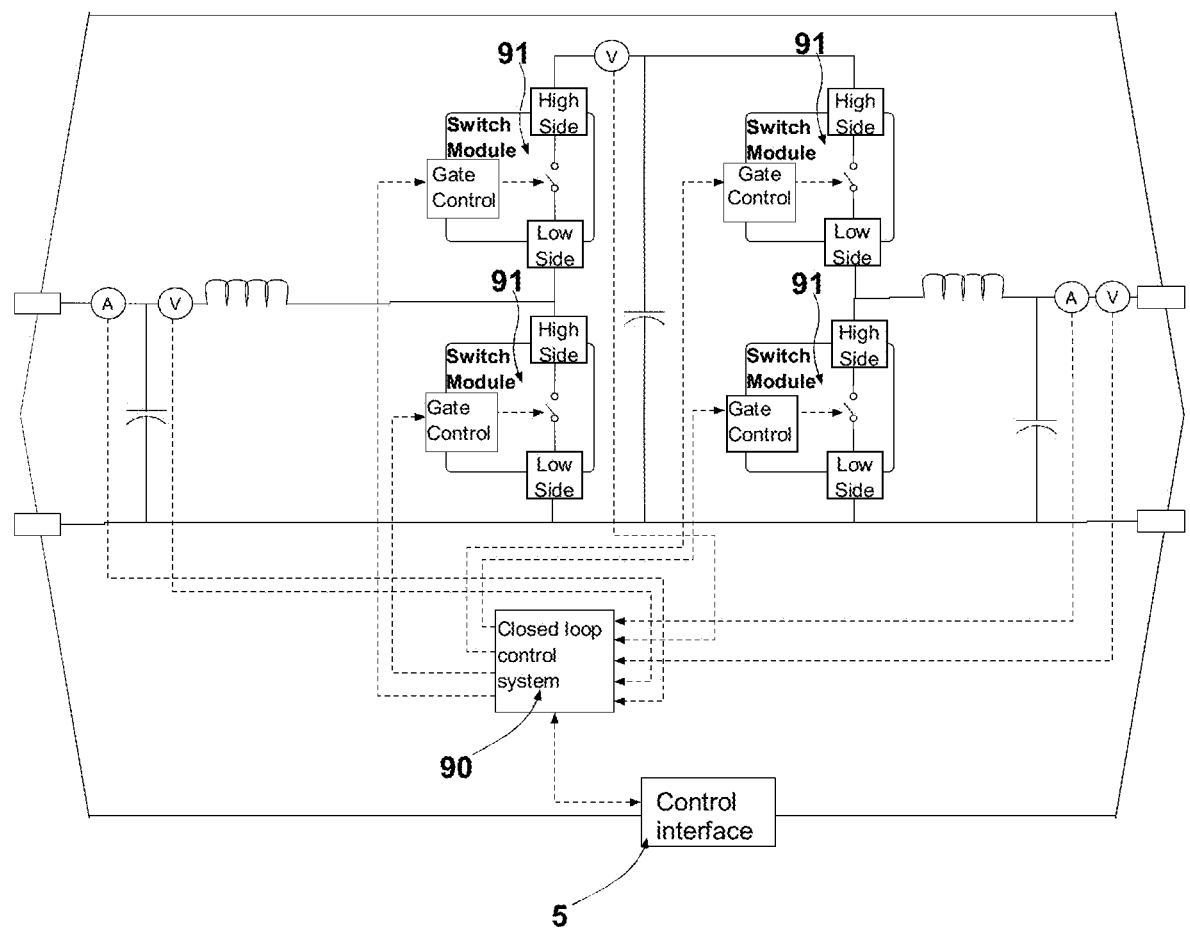
FIG. 9D schematically shows a switch-mode voltage converter implementing a standard non-inverting and bi-directional buck/boost circuit.
Figure 10A:
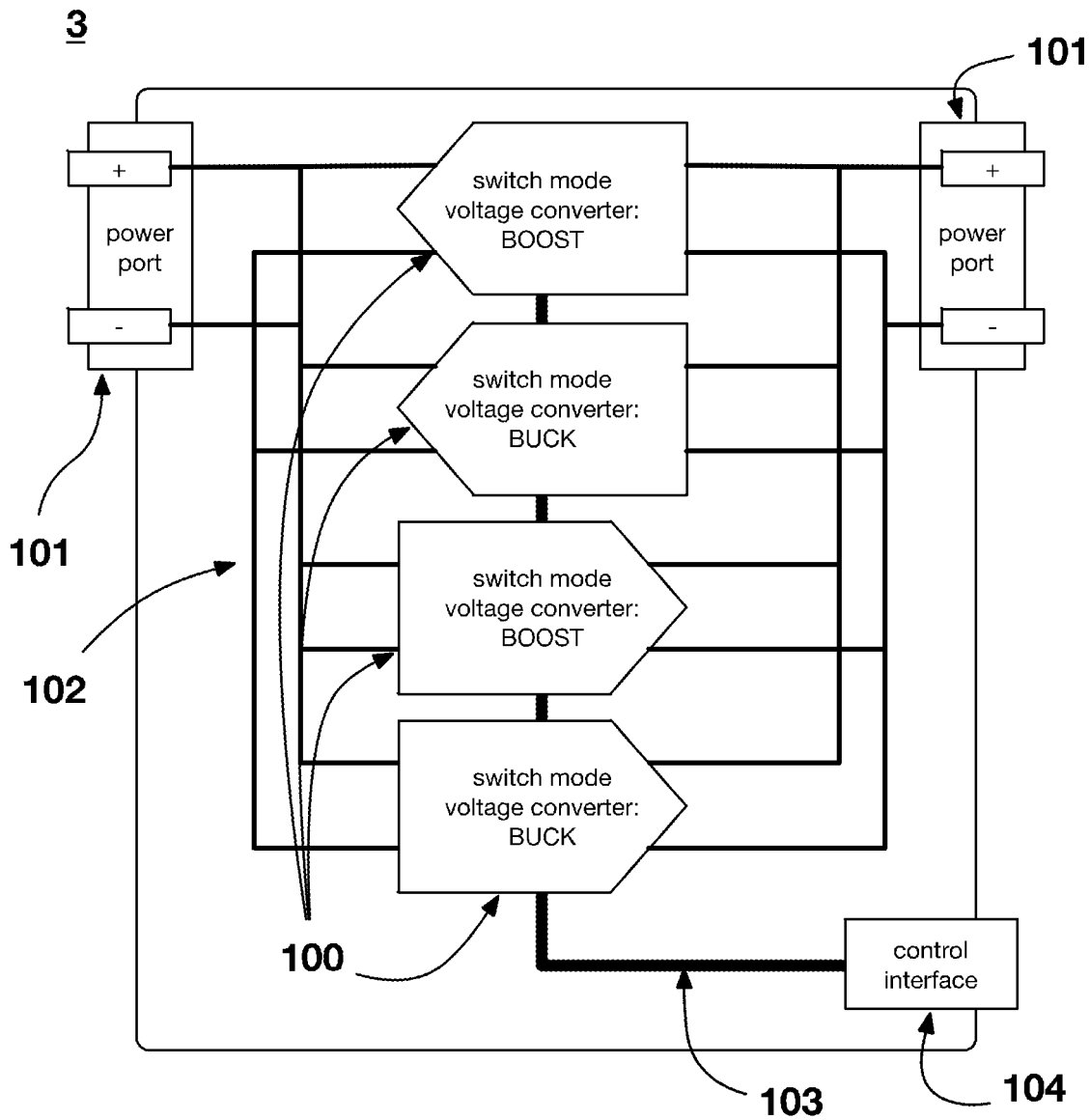
FIG. 10A schematically shows a DC-voltage conversion device having two power ports and separate one or more boost and one or more buck converters for charging a meta-capacitor and separate one or more boost and one or more buck converters for discharging the metacapacitor.
Figure 10B:
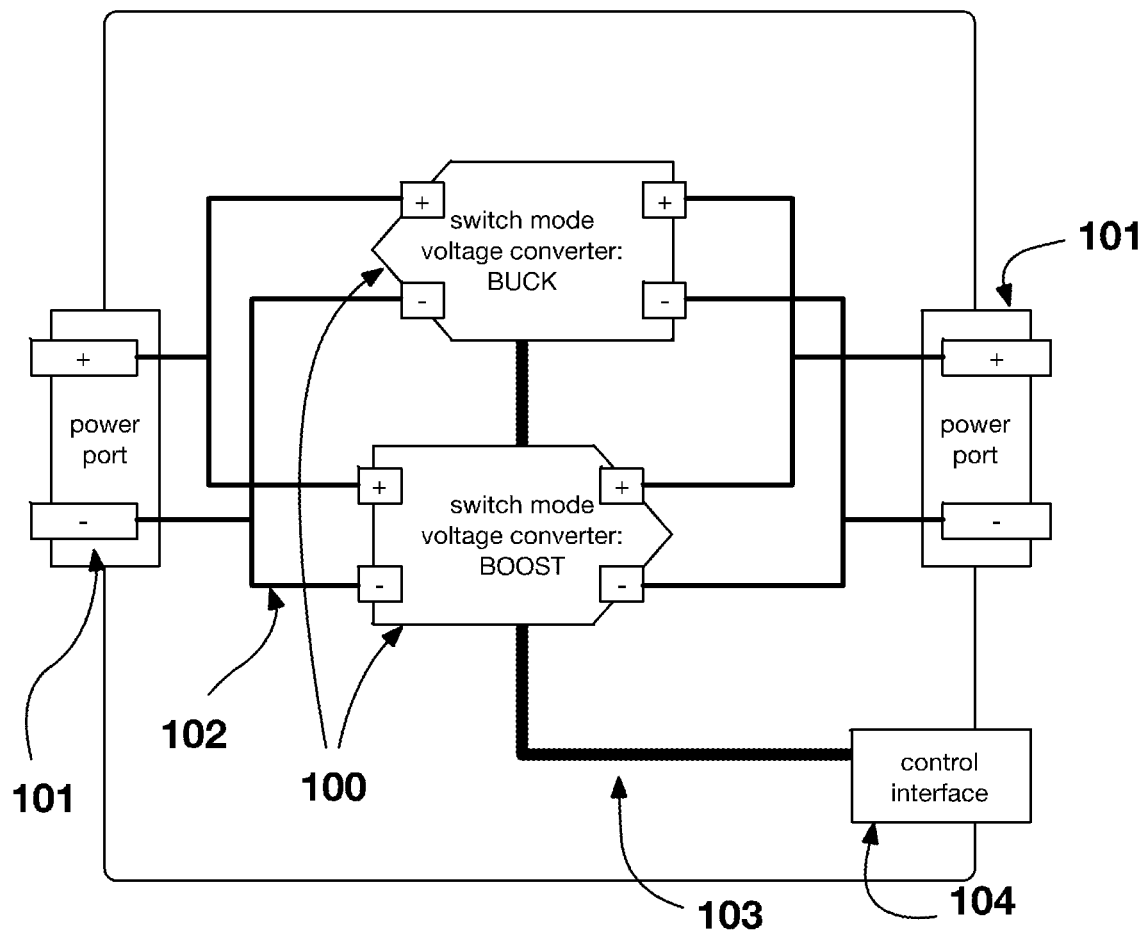
FIG. 10B schematically shows an alternative DC-voltage conversion device having two power ports and a one or more buck converters for charging a meta-capacitor and one or more buck boost converter for the discharging the meta-capacitor.
Figure 10C:
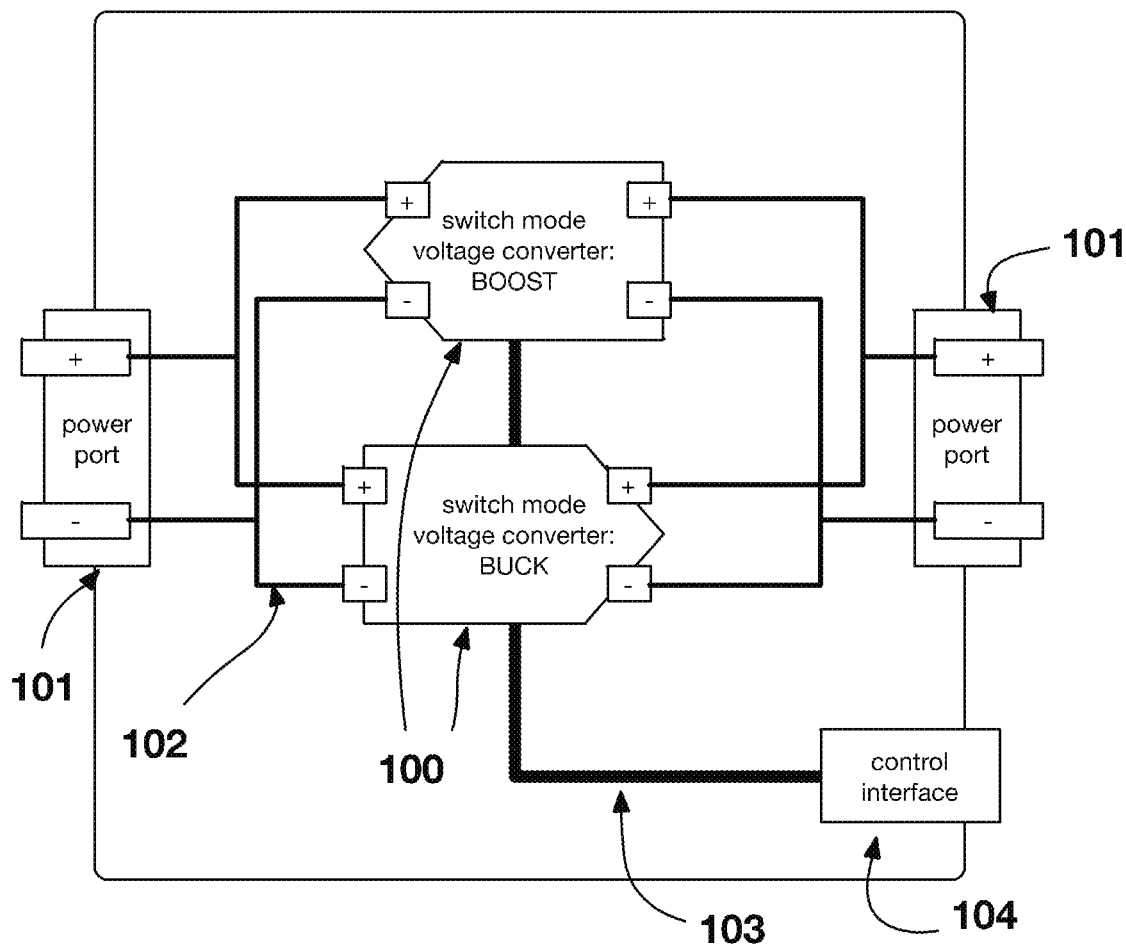
FIG. 10C schematically shows another alternative DC-voltage conversion device having two power ports and one or more boost converters for the charge and one or more buck converters for discharging a meta-capacitor.
Figure 10D:
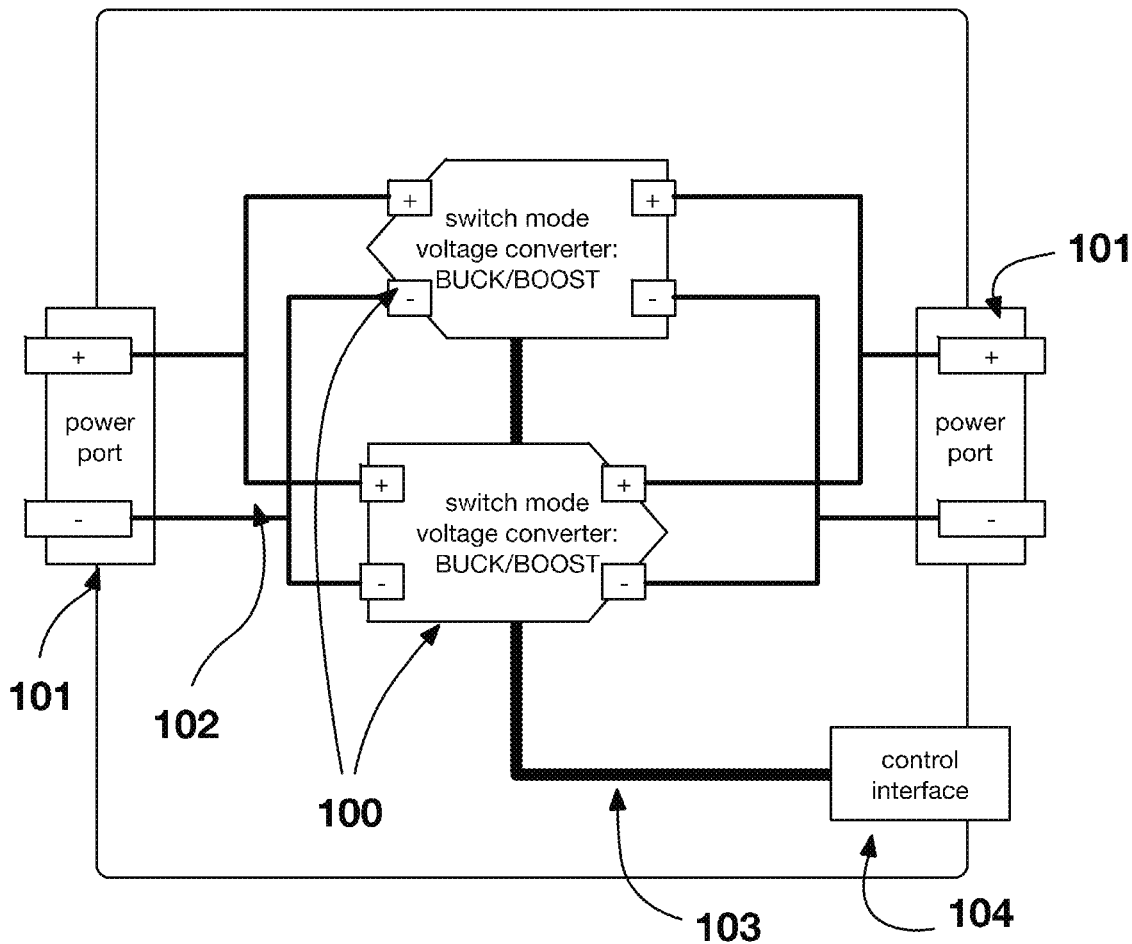
FIG. 10D schematically shows another alternative DC-voltage conversion device having two power ports and one or more buck/boost converters for charging a meta-capacitor and one or more buck/boost converters for discharging the meta-capacitor.
Figure 10E:
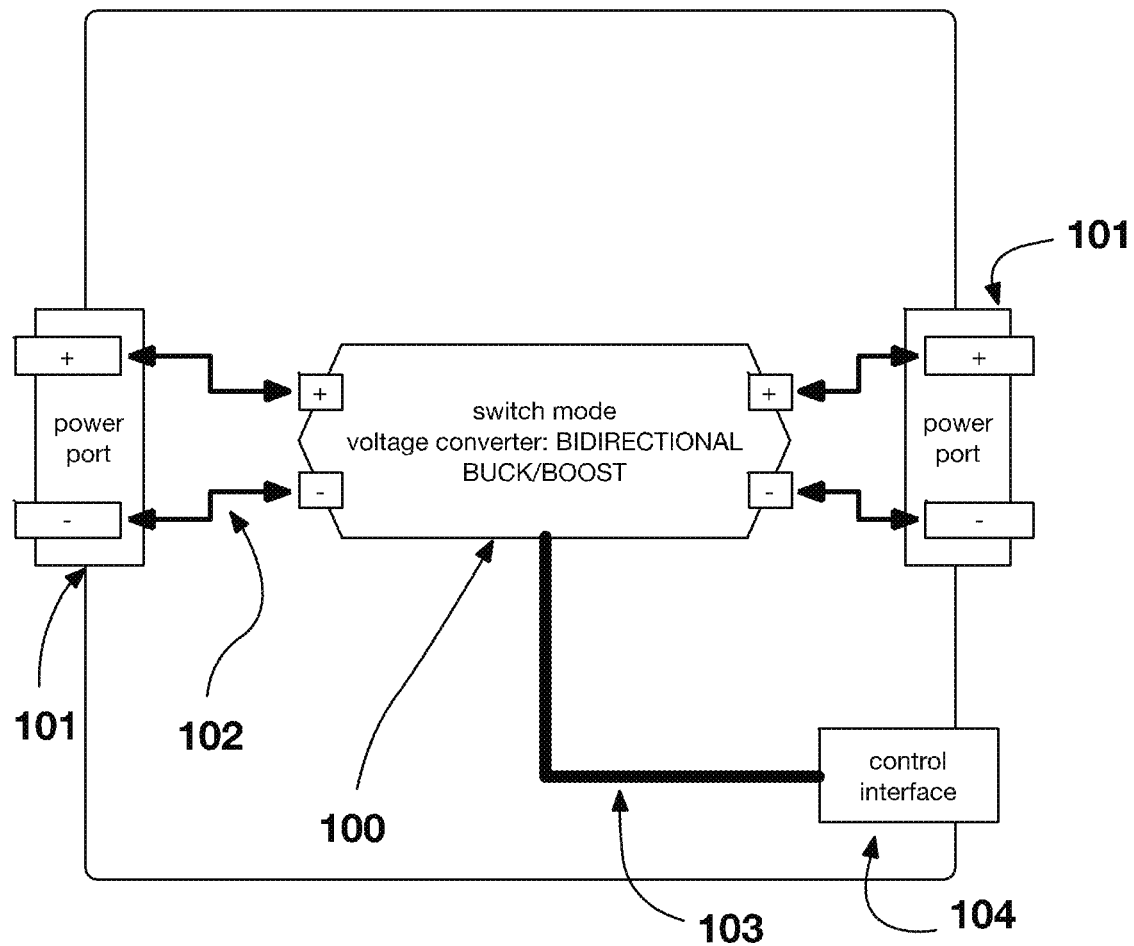
FIG. 10E schematically shows yet another DC-voltage conversion device having two power ports and one or more bidirectional boost/buck converters for the charging and discharging a meta-capacitor.
Figure 10F:
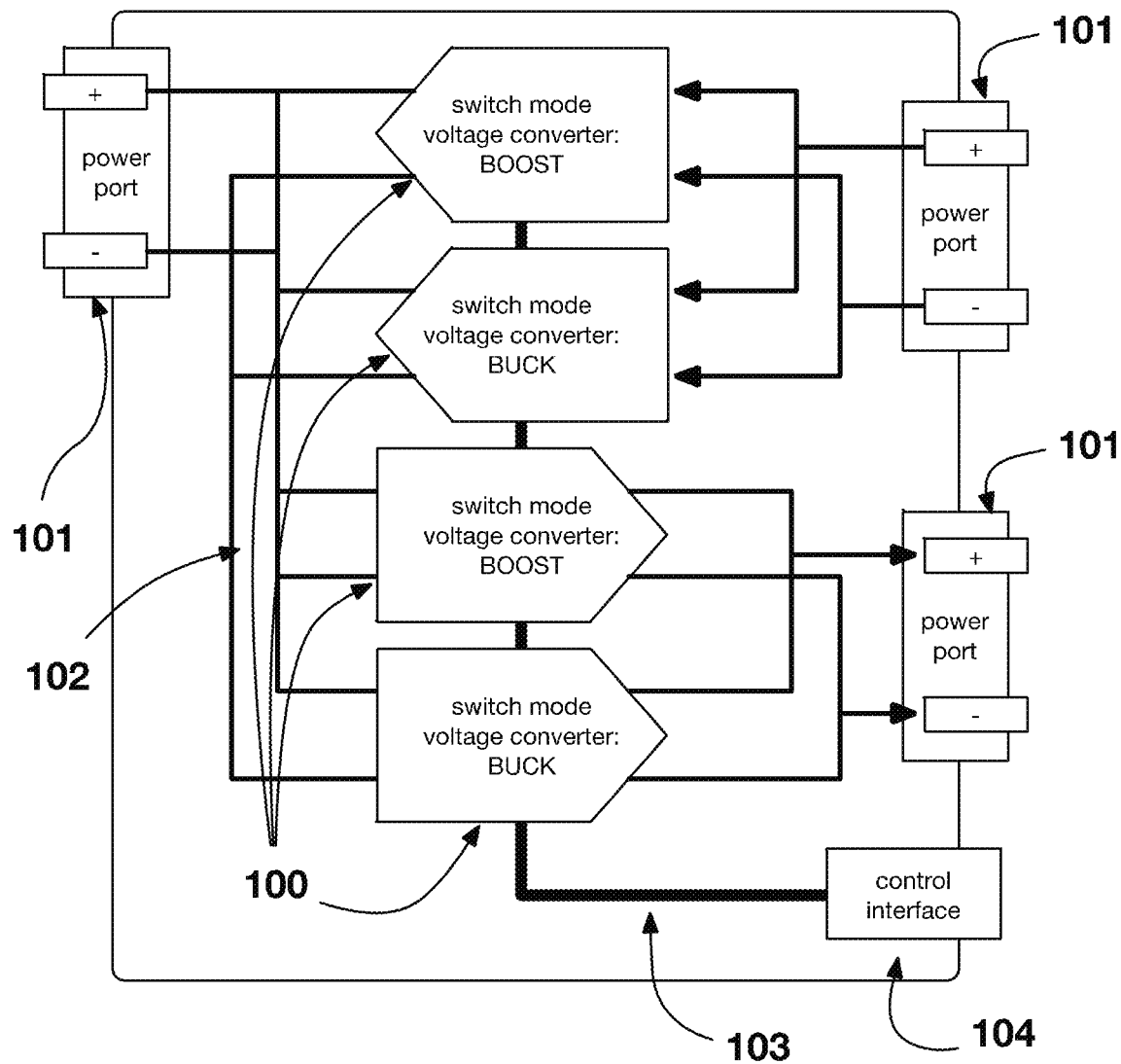
FIG. 10F schematically shows still another DC-voltage conversion device having three power ports and separate one or more boost and one or more buck converters for charging a meta-capacitor and separate one or more boost and one or more buck converters for discharging the meta-capacitor.
Figure 10G:
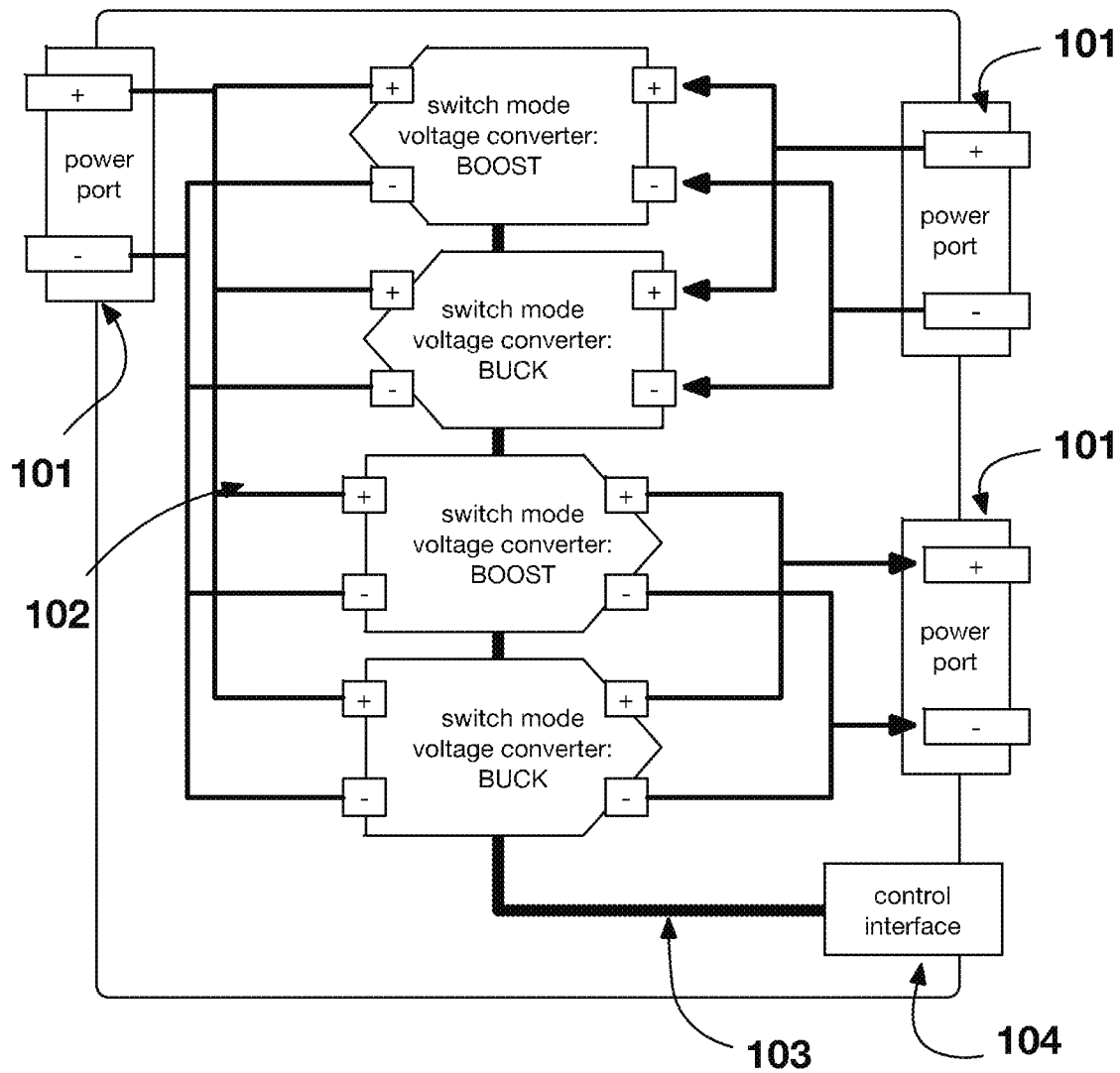
FIG. 10G schematically shows another DC-voltage conversion device having three power ports and a one or more buck converters for charging a meta-capacitor and one or more buck boost converter for discharging the meta-capacitor.
Figure 10H:
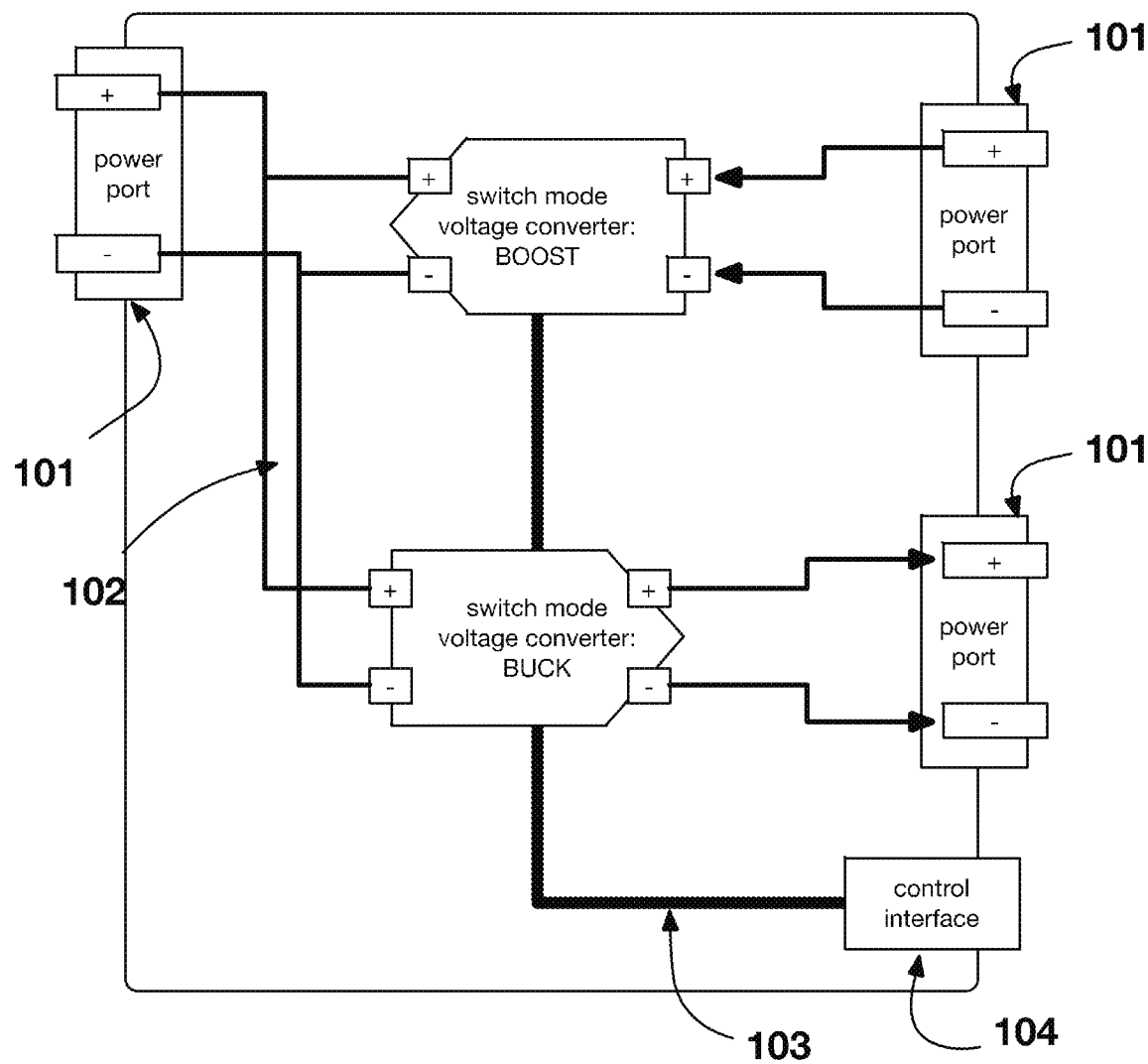
FIG. 10H schematically shows another DC-voltage conversion device having three power ports and one or more buck/boost converters for charging a meta-capacitor and one or more buck/boost converters for discharging a meta-capacitor.
Figure 10I:
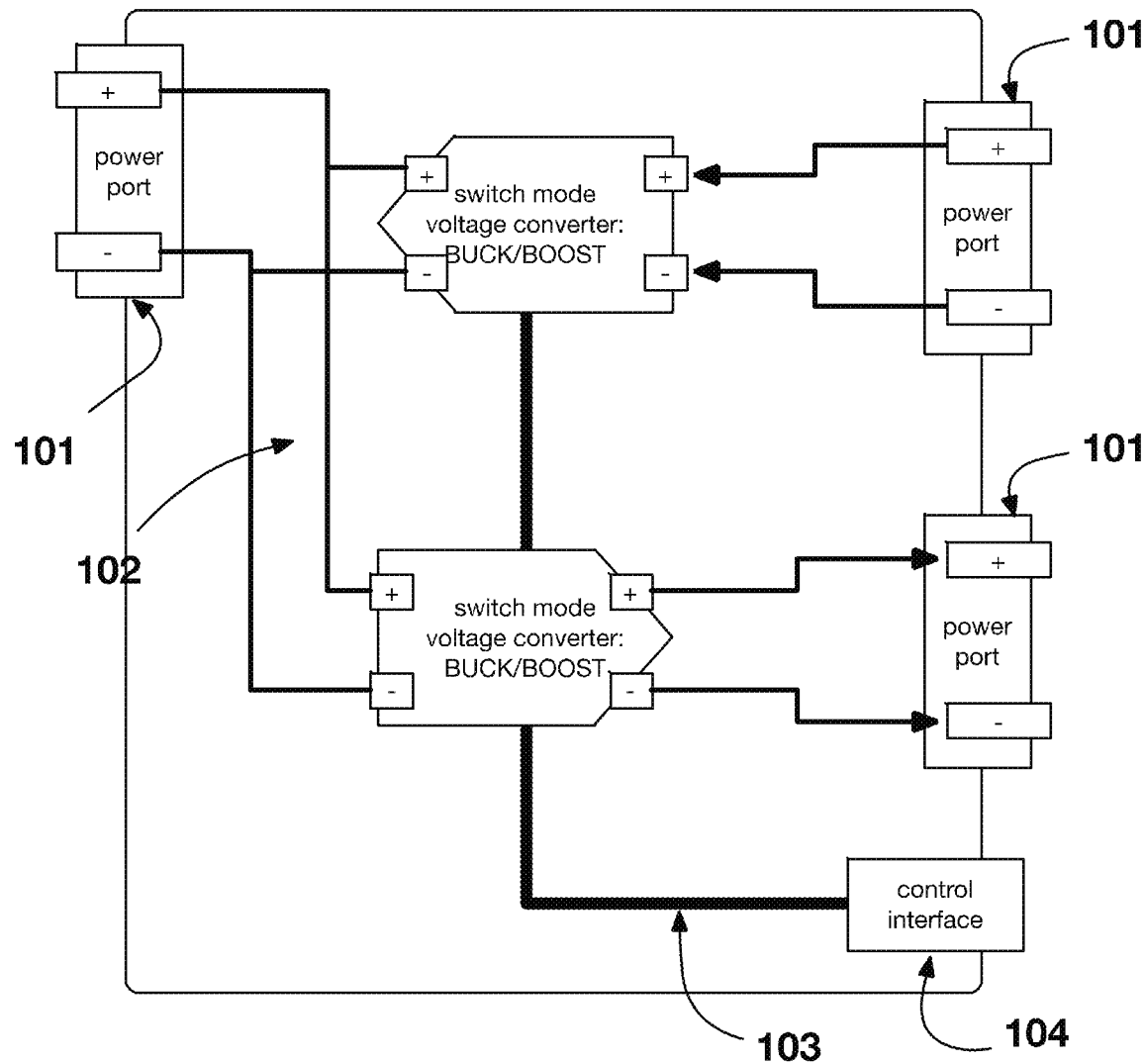
FIG. 10I schematically shows yet another DC-voltage conversion device having three power ports and one or more bidirectional boost/buck converters for the charging and discharging a meta-capacitor.
Figure 12:
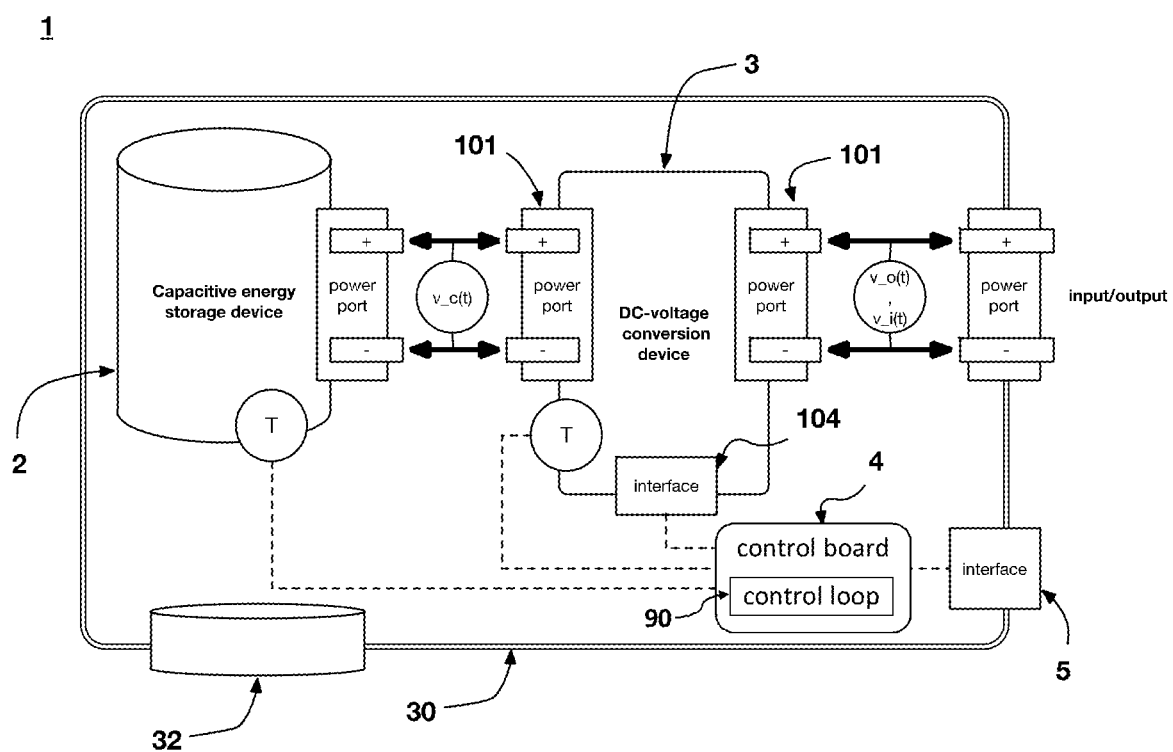
FIG. 12 schematically shows an energy storage cell according to an alternative aspect of the present disclosure.
Figure 13:
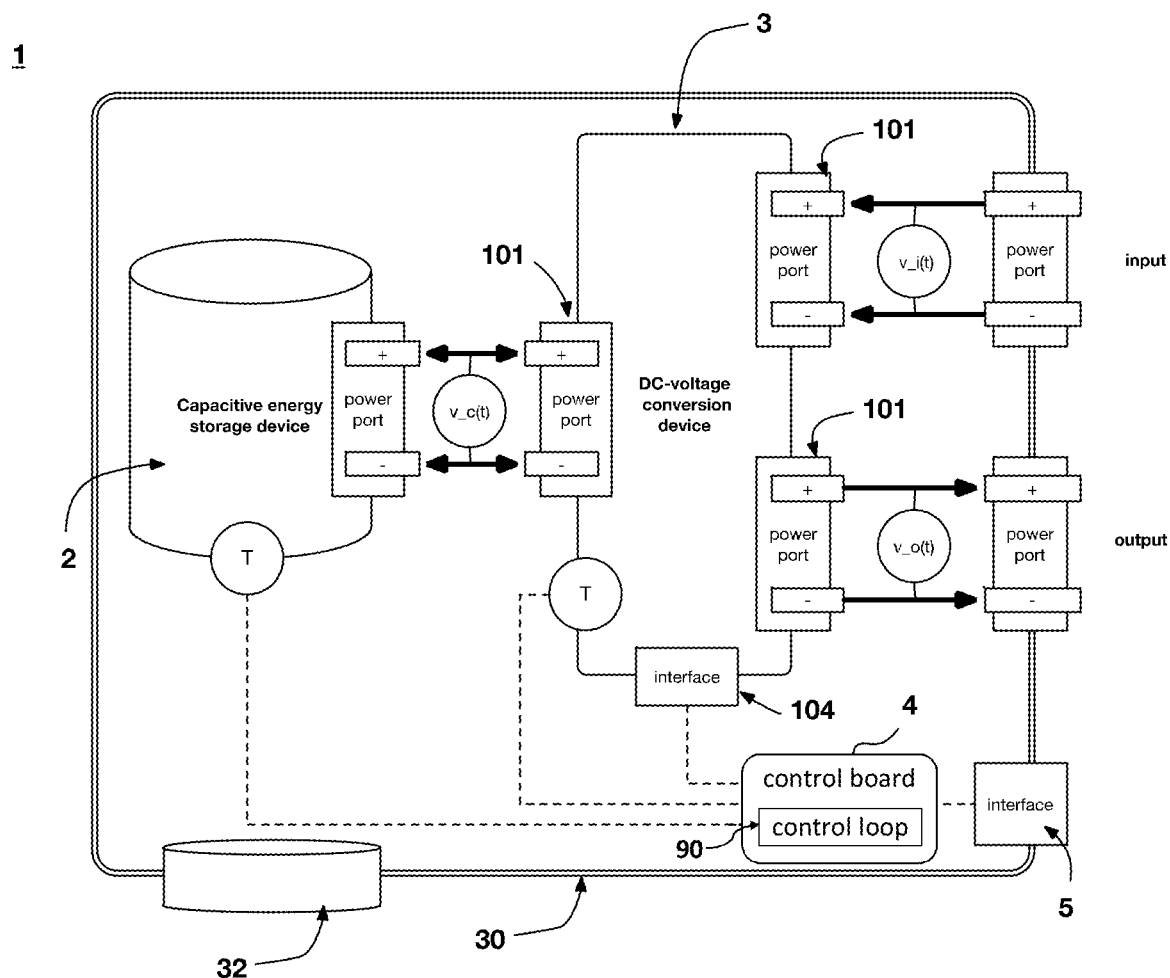
FIG. 13 schematically shows an energy storage cell according to an alternative aspect of the present disclosure.
Figure 14A:
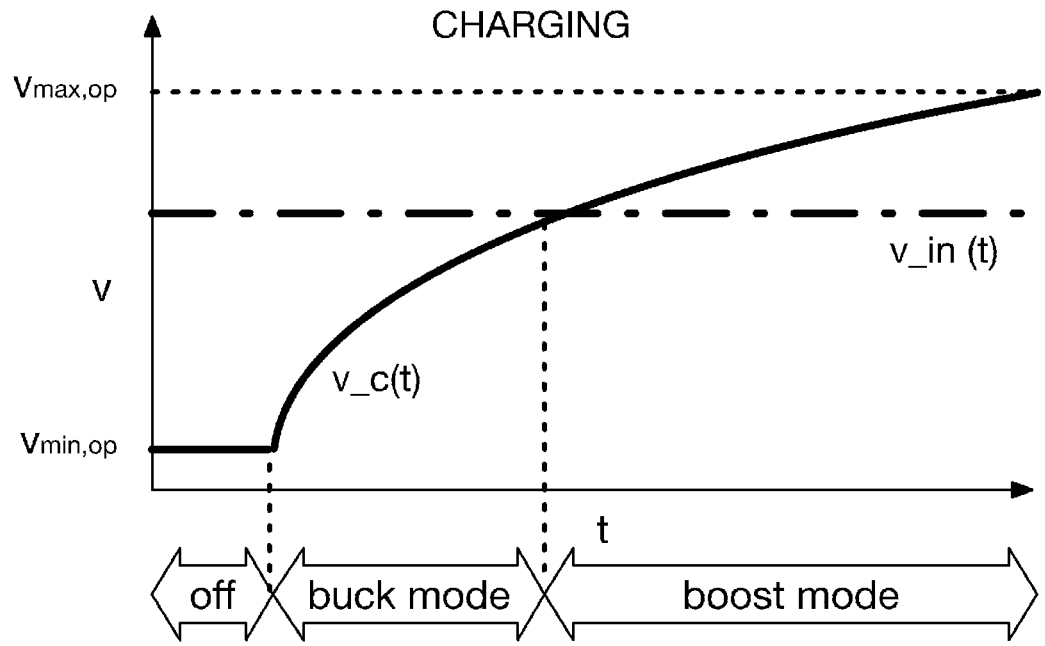
FIG. 14A shows a constant voltage Vi(t) feeding the input of a converter and voltage Vc(t) on the capacitive energy storage device during charge as the converter transitions from buck to boost in accordance with aspects of the present disclosure.
Figure 14B:
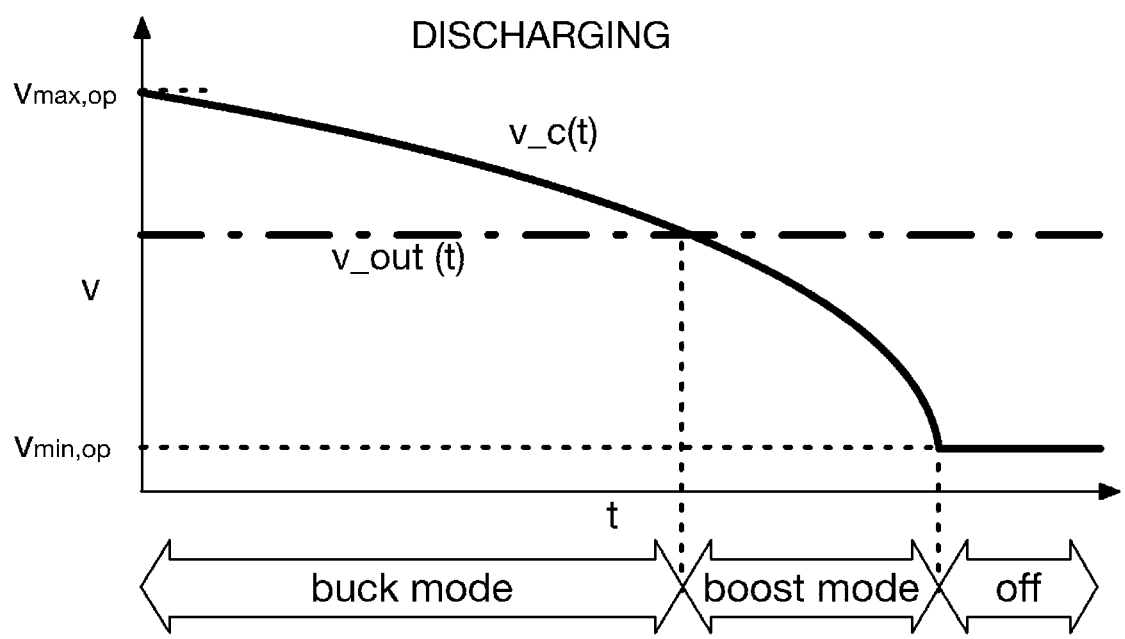
FIG. 14B shows a constant voltage Vo(t) extracted from the output side of a converter and voltage Vc(t) on the capacitive energy storage device during discharge as the converter transitions from buck to boost in accordance with aspects of the present disclosure.
Figure 15A:
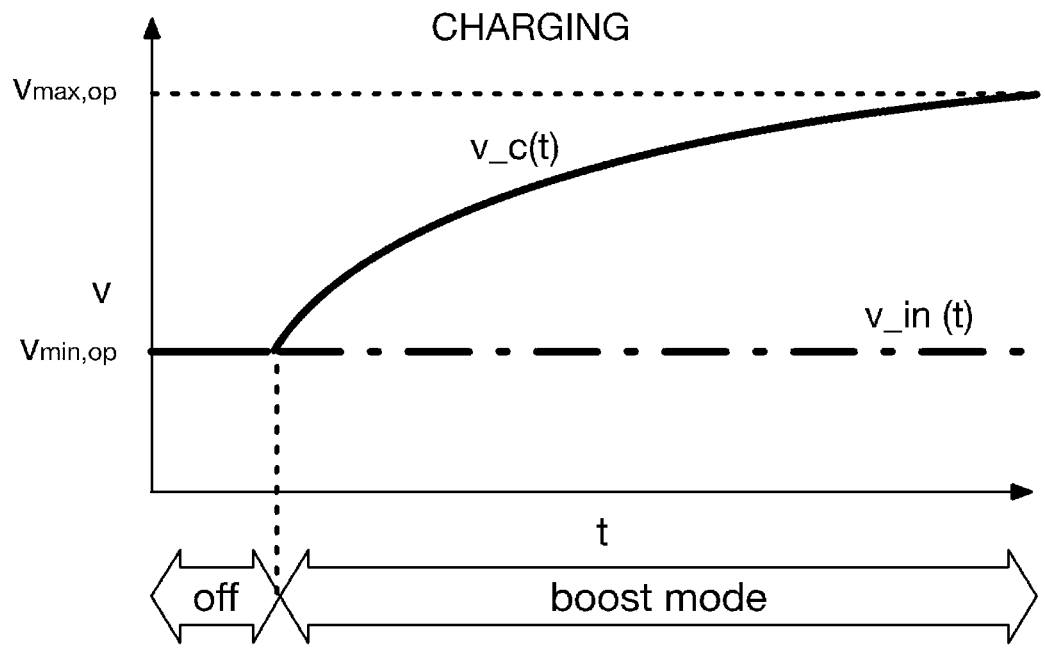
FIG. 15A shows a constant voltage Vi(t) feeding the input of a converter and voltage Vc(t) on the capacitive energy storage device during charge when Vmin,op=Vi(t) in accordance with aspects of the present disclosure.
Figure 15B:
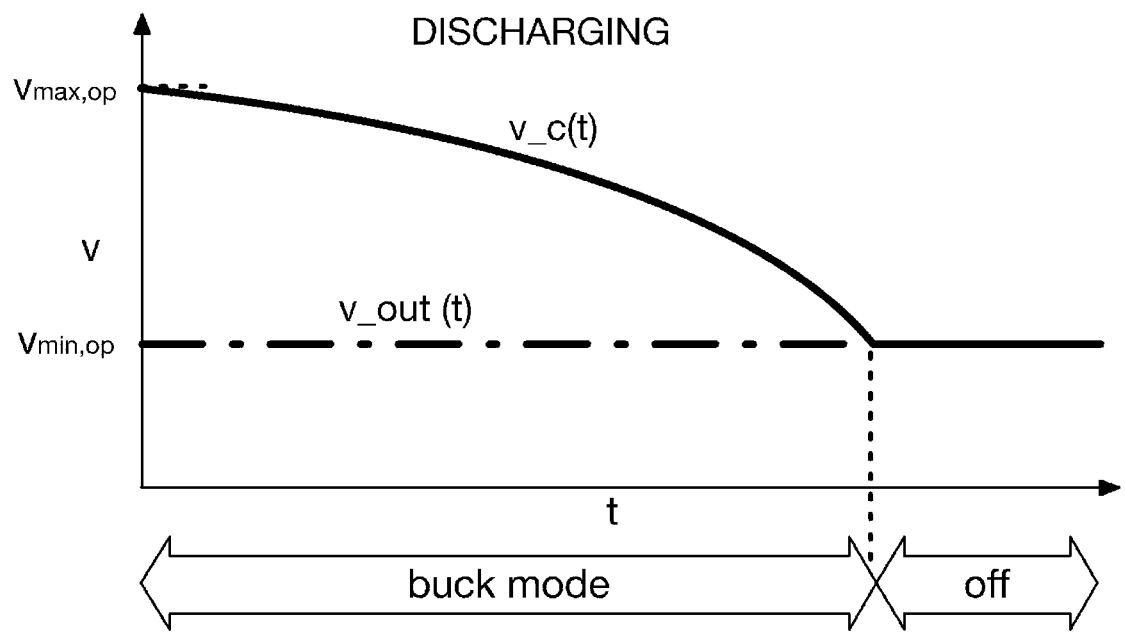
FIG. 15B shows a constant voltage Vo(t) extracted from the output side of a converter and voltage Vc(t) on the capacitive energy storage device during discharge when Vmin,op=Vi(t) in accordance with aspects of the present disclosure.

By way of example and not by limitation, the DC-voltage conversion device 3 as depicted in FIGS. 10A, 10B, 10C, 10D, 10E, 10F, 10G, 10H, 10I may include one or more switch-mode voltage converters 100, arranged to boost/or buck the input/output voltages as necessary to achieve the charge and discharge modalities depicted in FIGS. 14A, 14B, 15A and 15B corresponding to the voltage labels vc(t), vi(t) and vo(t) on the capacitive energy storage cell 3 of FIGS. 12 and 13. As shown in FIGS. 10F, 10G, 10H, 10I, the input/output port may be split into a separate input and output. These separate inputs and outputs may have different bus voltages. For example, there may be an input DC bus from a solar inverter which is at a different voltage than an output DC bus meant to transmit power or feed a DC to AC converter. The switch-mode voltage converters 100 may have circuitry selected from the following list: a buck converter (as show in FIG. 9B), boost converter (as show in FIG. 9A), buck/boost converter, bi-directional buck/boost (split-pi) converter (as show in FIG. 9D), Ćuk converter, single-ended primary inductor converter (SEPIC), inverting buck/boost converter (as show in FIG. 9C), or four-switch buck/boost converters.

In FIGS. 10A, 10B, 10C, 10D, 10E, 10F, 10G, 10H, 10I, the switch mode voltage converters 100 are connected to power ports 101, by an interconnect system 102. The power ports 101 include a positive terminal and negative terminal intended to work together to transmit power in either direction. A power port can be an input, output or bidirectional. A control interface 104 is connected to all of the control interfaces on the switch mode voltage converters 100 through a control network 103. The control network may carry target voltages, target currents, observed voltages, observed currents, temperatures and other parameters necessary to control the system. The control network 103, control interfaces 104, control board 4, and control loops 90 may or may not be combined in a single discrete physical package. For example, one implementation may have all aforementioned elements distributed throughout a system and another implementation may contain all elements in a single microprocessor unit.

In one implementation the control board 4 may control the DC-voltage converter 3 in a way that maintains the output voltage of the energy storage cell, e.g., the output voltage of the DC-voltage converter $V_{out}$, at a constant level during a discharge of the metacapacitor (s) (see, FIGS. 14B and 15B) from an initial charge state ((Vc(t)) to a minimum charge state (Vc(t)=Vmin,op), wherein the minimum charge state (Vmin,op), is defined by a voltage on the metacapacitor (s) which corresponds to the residual energy equal to from 0% to 20% of the initial reserved energy, where the reserved energy of the metacapacitor (s) can be calculated by $E=1/2CV^2$ where E is energy, C is capacitance, and V is voltage. In implementations where the control board 4 is a programmable device, the constant output voltage of the energy storage cell can be a programmable value. In some embodiments, the control board 4 is also configurable to match the variable power output demands of a movable object. Examples of variable power output demands of a CESS (FIG. 18A and FIG. 18B) includes propulsion and acceleration of a movable object (e.g. a UAV).

In still another implementation of the energy storage cell, wherein the output voltage is made constant by the DC-voltage conversion device selected from the list comprising a buck regulator, a boost regulator, buck and boost regulators with separate input/outputs, bi-directional boost/buck regulator, split-pi converter.

In some implementations, the cell 1 includes circuitry configured to enable observation of parameters selected from the following list: the voltage on the metacapacitor, the current going into or out of the metacapacitor, the current flowing into or out of the DC-voltage conversion device, the output voltage of the DC-voltage conversion device, the temperature at one or more points within the metacapacitor, the temperature at one or more points within the DC-voltage conversion device. In another implementation, the energy storage cell further comprises an AC-inverter to create AC output voltage, wherein the DC output voltage of the DC-voltage conversion device is the input voltage of the AC-inverter. In yet another implementation, energy storage cell further comprises power electronics switches which are based on Si insulated-gate bipolar transistors (IGBTs), SiC MOSFETs, GaN MOSFETs, Graphene or comprising organic molecular switches. In one embodiment of the energy storage cell, the power electronics switches comprise multiple switch elements stacked in series to enable switching of voltages higher than the breakdown voltage of individual switch components.

Figure 17A:
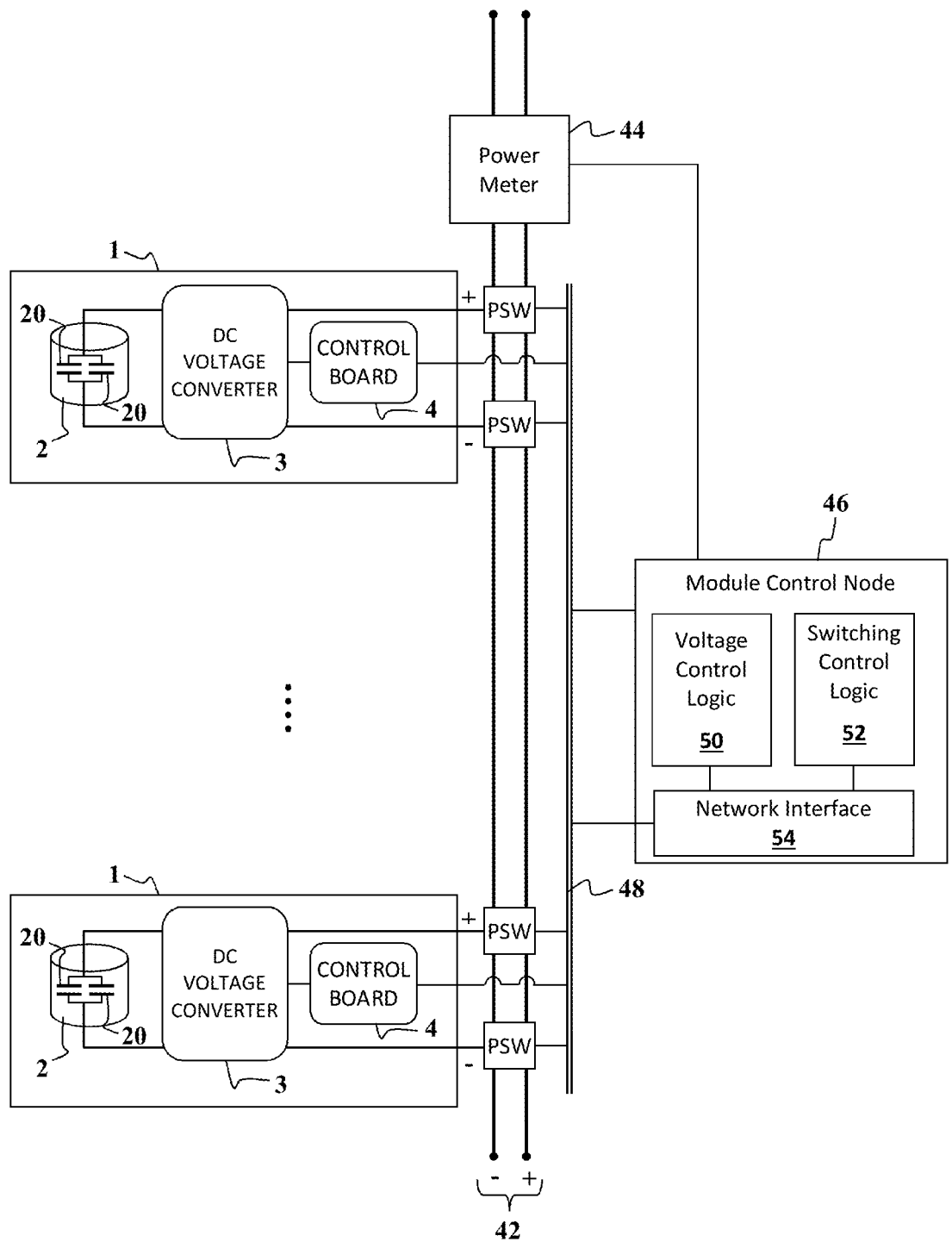
FIG. 17A shows an example of a capacitive energy storage module having two or more networked energy storage cells according to an alternative aspect of the present disclosure.

In another aspect of the present disclosure, a capacitor energy storage module 40, e.g., as illustrated in FIG. 17A. In the illustrated example, the energy storage module 40 includes one or more energy storage cells 1 of the type described above. Each energy storage cell includes a capacitive energy storage device 2 having one or more metacapacitors 20 and a DC-voltage converter 3, which may be a buck converter, boost converter, or buck/boost converter. In addition, each module may include a control board 4 of the type described above with respect to FIGS. 11, 12, 13 and an (optional) cooling mechanism (not shown). The module 40 may further include an interconnection system that connects the anodes and cathodes of the one or more individual energy storage cells to create a common anode and common cathode of the capacitor energy storage module.

In yet another aspect, some implementations, the interconnection system of a module includes a parameter bus 42 and power switches PSW as seen in FIG. 17A. Each energy storage cell 1 in the module 40 may be coupled to the parameter bus 42 via the power switches PSW. These switches allow two or more modules to be selectively coupled in parallel or in series via two or more rails that can serve as the common anode and common cathode. The power switches can also allow one or more energy storage cells to be disconnected from the module, e.g., to allow for redundancy and/or maintenance of cells without interrupting operation of the module. The power switches PSW may be based on solid state power switching technology or may be implemented by electromechanical switches (e.g., relays) or some combination of the two.

In some implementations, the energy storage module further comprises a power meter 44 to monitor power input or output to the module, as seen in FIG. 17A. In some implementations, the energy storage module further comprises a networked control node 46 configured to control power output from and power input to the module. The networked control node 46 allows each module to talk with a system control computer over a high speed network. The networked control node 46 includes voltage control logic circuitry 50 configured to selectively control the operation of each of voltage controller 3 in each of the energy storage cells 2, e.g., via their respective control boards 4. The control node 46 may also include switch control logic circuitry 52 configured to control operation of the power switches PSW. The control boards 4 and power switches PSW may be connected to the control node 46 via a data bus 48. The voltage control and switching logic circuitry in the networked control node 46 may be implemented by one or more microprocessors, microcontrollers, application specific integrated circuits (ASICs), field programmable gate arrays (FPGAs), or complex programmable logic devices (CPLDs). The control node 46 may include a network interface 54 to facilitate transfer of signals between the voltage control logic circuitry 50 and the control boards 4 on the individual energy storage cells 2 and also to transfer signals between the switching logic circuitry 52 and the power switches PSW, e.g., via the data bus 48.

Figure 17B:
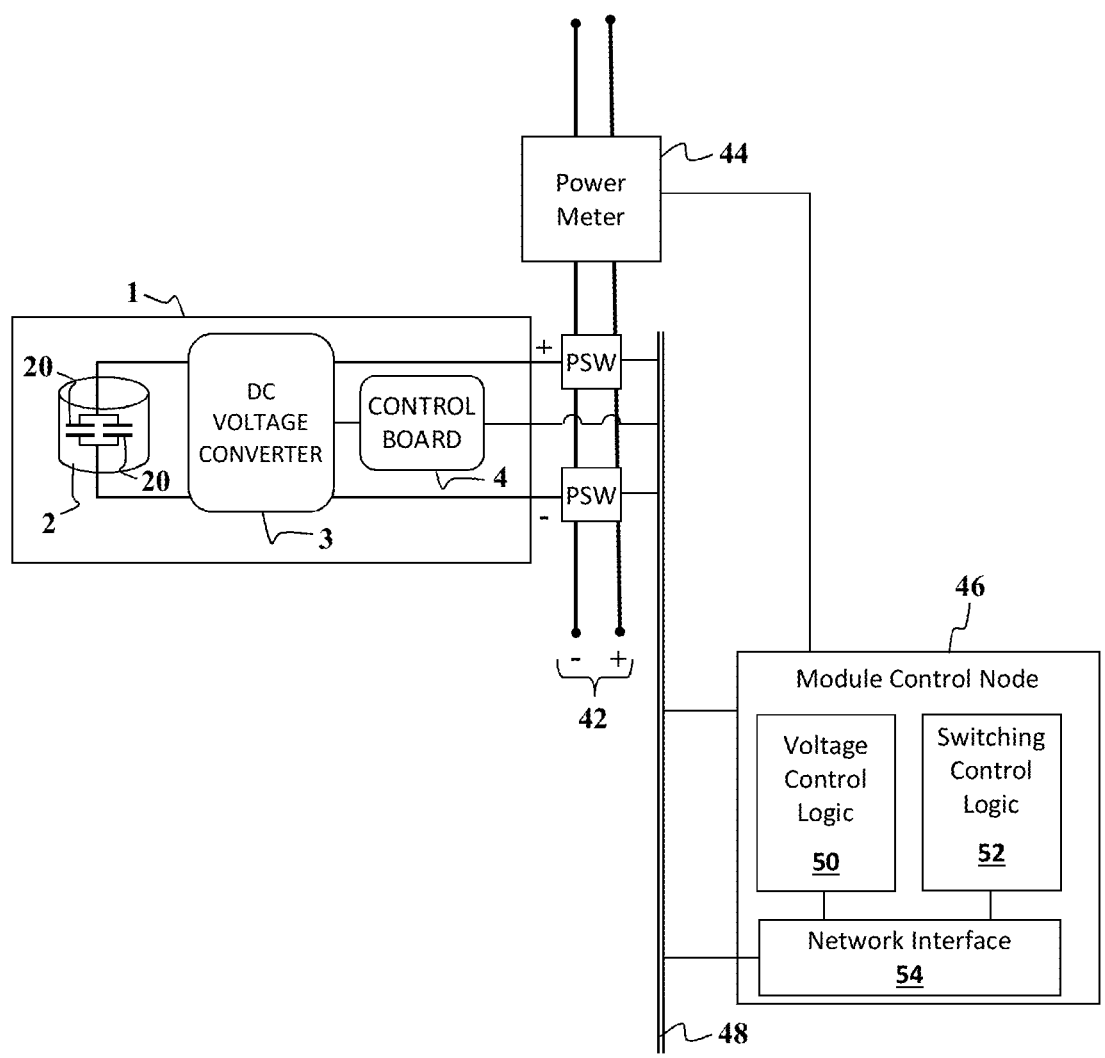
FIG. 17B shows an example of a capacitive energy storage module having one or more networked energy storage cells according to an alternative aspect of the present disclosure.
Figure 18A:
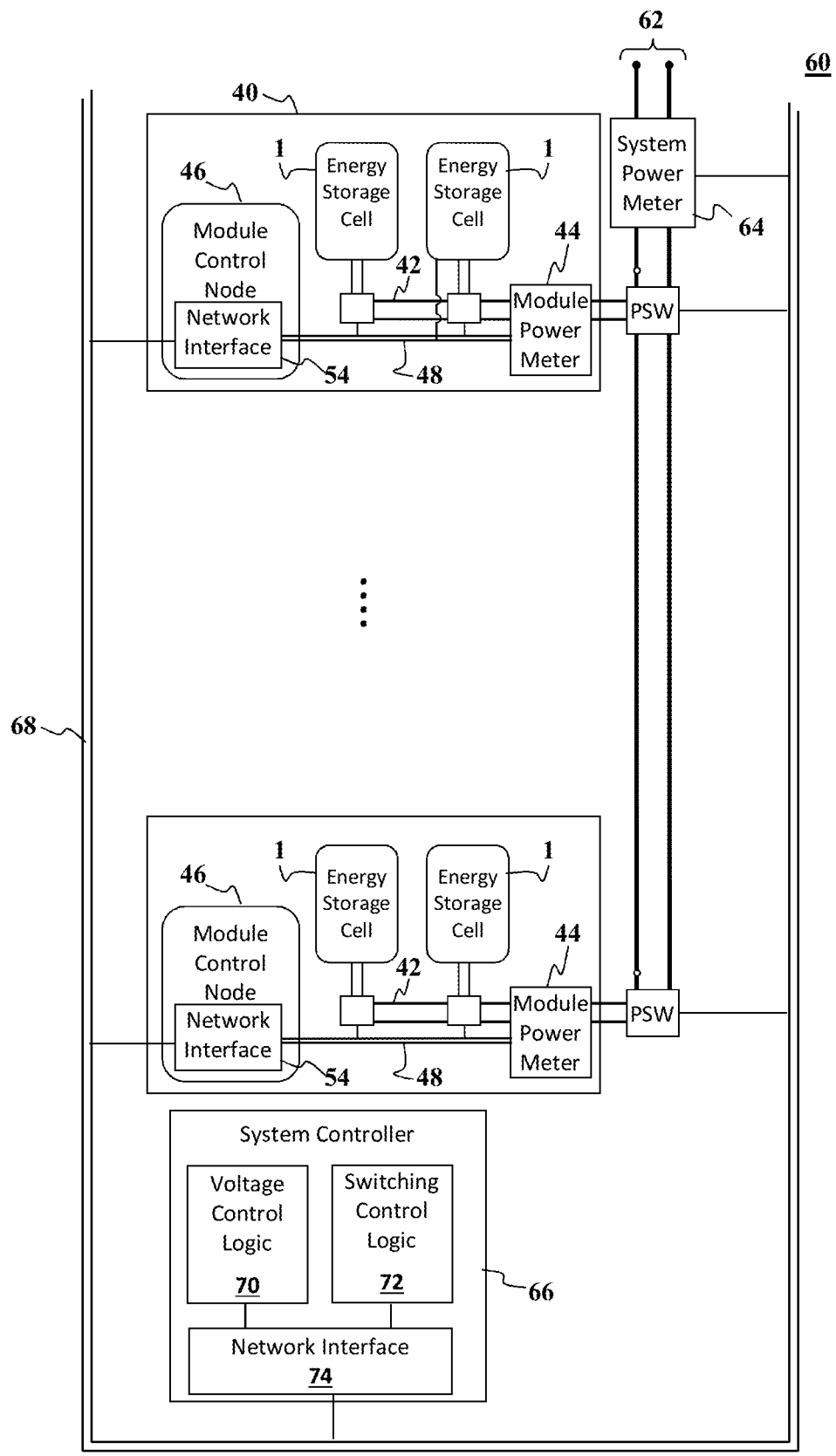
FIG. 18A shows an example of a capacitive energy storage system having two or more energy storage networked modules according to an alternative aspect of the present disclosure.
Figure 18B:
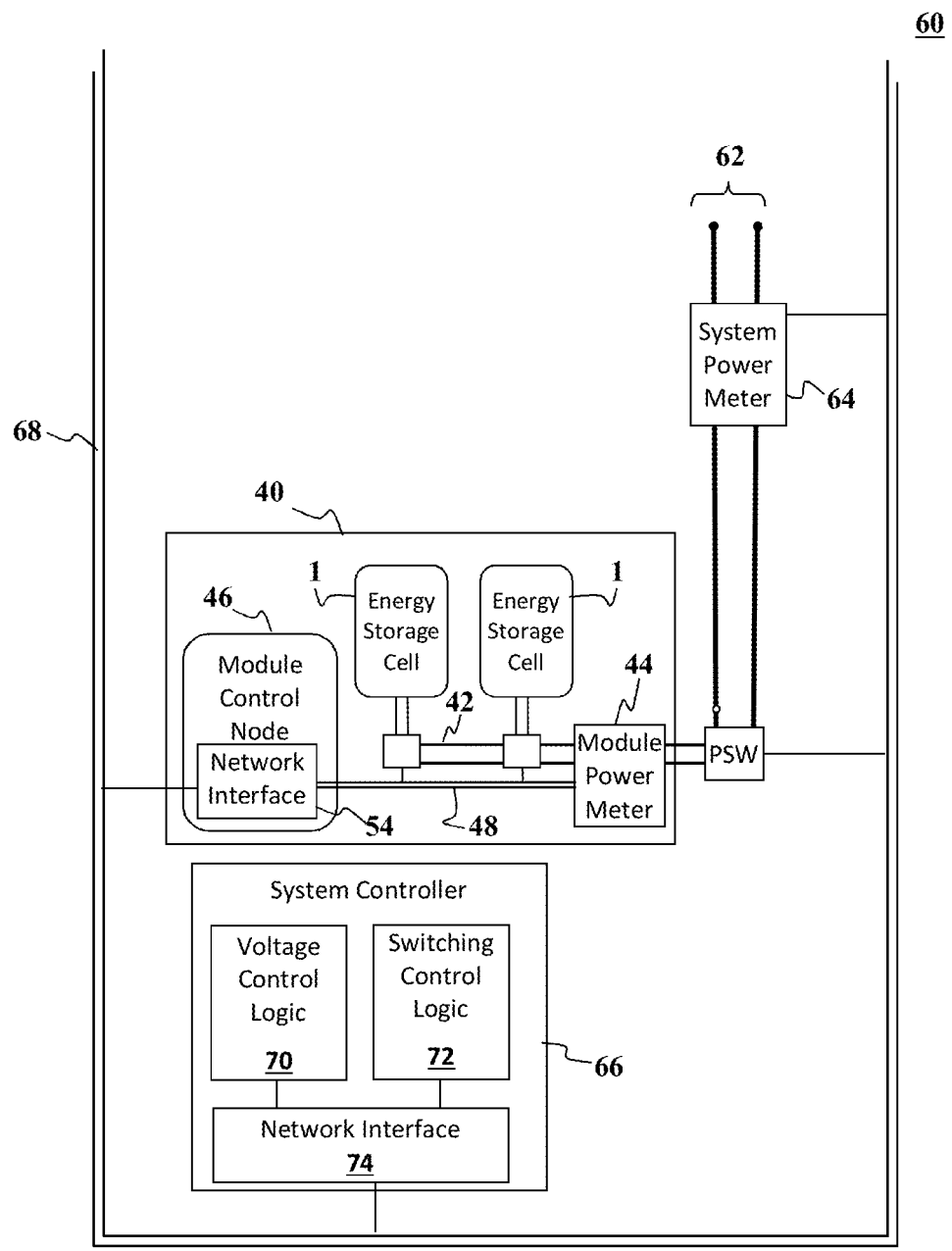
FIG. 18B shows an example of a capacitive energy storage system having one or more energy storage networked modules according to an alternative aspect of the present disclosure.

According to yet another aspect of the present disclosure a capacitor energy storage system may include one or a plurality of networked capacitor energy storage modules, e.g., of the type shown in FIG. 17A and FIG. 17B. One embodiment of such a capacitive energy storage system 60 is shown in FIG. 18A and FIG. 18B. The system 60 includes one or more energy storage modules 40 of the type shown in FIG. 17A and FIG. 17B. Each capacitive energy storage module 40 includes one or more capacitive energy storage cells 1, e.g., of the type shown in FIGS. 11, 12, 13, connected by an interconnection system 42 and controlled by a control node 46. Each capacitive energy storage module may also include a module power meter 44. Although it is not shown in FIG. 17A or FIG. 17B, each control node 46 may include voltage control logic circuitry 50 to control voltage controllers within the individual capacitive energy storage cells 1 and switching logic circuitry 52 to control internal power switches with the module, as described above. In addition, each control node 46 includes an internal data bus 48 and a network interface 54, which may be connected as described above. Power to and from capacitive energy storage modules 40 is coupled to a system power bus 62 via system power switches SPSW, which may be based on solid state power switching technology or may be implemented by electro-mechanical switches (e.g., relays) or some combination of the two. In some implementations, there may be an inverter (not shown) coupled between each capacitive energy storage module 40 and the system power bus 62 to convert DC power from the module to AC power or vice versa.

The system 60 includes a system controller 66 connected to a system data bus 68. The system controller may include switching control logic 70, voltage control logic 72, and system network interface 74. The voltage control logic 70 may be configured to control the operation of individual DC-voltage controllers within individual cells 1 of individual modules 40. The switching control logic 72 may be configured to control operation of the system power switches SPSW and also the power switches PSW within individual capacitive energy storage modules 40. Voltage control signals may be sent from the voltage control logic 72 to a specific DC-voltage control device 3 within a specific capacitive energy storage cell 1 of a specific capacitive energy storage module through the network interface 74, the system data bus 68, the module network interface 54 of the control node 46 for the specific module, the module data bus 48, and the control board 4 of the individual cell 1.

By way of example, and not by way of limitation, the system controller 66 may be a deterministic controller, an asynchronous controller, or a controller having distributed clock. In one particular embodiment of the capacitive energy storage system 60, the system controller 66 may include a distributed clock configured to synchronize several independent voltage conversion devices in one or more capacitive energy storage cells of one or more of the capacitive energy storage modules 40.

In the case of UAVs, current can be relatively high. The current from the power supply as described in U.S. patent application Ser. No. 14/262,478 filed on Apr. 25, 2014 is between 10 mA and 40 A at minimum, and a maximum current between 100 mA and 100 A. It is an advance to reduce the maximum current applied while maintaining high power output by using a higher voltage power source such as a capacitor energy storage system (CESS). By way of example and not of limitation, a 1000 V rated CESD and a maximum allowed current of 40 A, the power output can have a maximum of 40 kW.

In accordance with an aspect of the invention, the CESS configuration can prevent the formation of a spark upon power-on or power-off of the device. In the case of UAVs commonly using a battery pack, current from the battery pack can be greater than or equal to about 10 mA, 50 mA, 75 mA, 100 mA, 150 mA, 200 mA, 300 mA, 500 mA, 750 mA, 1 A, 2 A, 5 A, 10 A, 15 A, 20 A, 30 A. The maximum current supplied from such a battery pack may be less than or equal to about 20 mA, 100 mA, 150 mA, 200 mA, 300 mA, 500 mA, 750 mA, 1 A, 2 A, 5 A, 10 A, 15 A, 20 A, 30 A, 40 A. However, the CESS may be configured to supplying current having a maximum or minimum value having any of the values described hereinabove, or falling within a range defined by any of the values described hereinabove. The current from the CESS used to power a movable object such as a UAV, may be greater than or equal to a current used to power another electronic device, such as a personal computer or laptop.

The capacitor energy storage system can have a number of useful features, or can interact with or be part of a UAV having a number of useful features. In some embodiments, connectors can make plugging the CESS into another power source easy (e.g., as depicted in FIG. 19B. For example, a CESS may be connected to an external power supply that may charge the CESS. In some cases, a CESS state of charge or level of charge checker is integrated in the device. The CESS state of charge checker can display the CESS charge level whenever the user desires, without the need of a multimeter or separate CESS level detector device. For example, a visual indicator may be provided that shows the CESS level of charge upon request or continuously. The CESS may include short protection and protection against high current levels, which can be both integrated into the system controller 66 (FIG. 18A).

In some embodiments, the voltage control logic in the computer of the CESS may be programmed to modulate power output of the CESS to accelerate the UAV or provide sufficient power to the UAV to cause lift of the UAV. For example, in some heavy embodiments, this may be achieved by controlling switches of at least one reserve CESM for specifically take-off power and acceleration, and that the at least one reserve CESM consists of CESD configured to include a plurality of metacapacitors connected in parallel with voltage ratings of at least 400 V, 500 V, 600 V, 700 V, 800 V, 900 V, 1000 V, or 1500 V. In yet another example, at least one reserve CESC consisting of CESD having multiple metacapacitors connected in parallel or parallel and series are switched to discharge mode via the voltage control logic communicating with the at least one reserve CESC control board.

In some embodiments, the power supply control assembly can achieve precise estimation of the amount of remaining charge in the CESS when a device to be powered is in operation, such as when a UAV is flying, there can be a large voltage drop when the motors are spinning and the measurement based on voltage can be inaccurate. In contrast, the power supply system disclosed herein may determine the remaining CESS charge level by monitoring the total energy that is consumed, which results in a more precise CESS charge level indication. In some embodiments, the power supply control assembly may calculate the remaining energy level based on measurements by power meters 44 and 64 as seen in FIGS. 17B and 18A respectively.

In some cases, the present power supply control assembly may be faster to recharge than battery designs. Optionally, all of the balancing circuits and protection circuits are integrated inside the CESS assembly. The power supply control assembly, including the balancing circuits and protection circuits, may be packaged with a CESS. For example, a housing may partially or completely enclose the CESS and CESS control assembly, such that a user can connect the charger to a CESS package which may include the CESS and power supply control assembly.

Optionally, the CESS described hereinabove has a slower charge leakage rate than existing battery technology due to energy stored as an electric field rather than in electrochemical form. A low voltage protection circuit inside the CESS package turns the CESS and device off once the charge is lower than a certain threshold.

A UAV powered by the CESS and power supply control assembly may be able to fly for a long period of time and may be capable of flying a long distance. In some cases, the UAV can fly for at least 5 minutes, at least 10 minutes, at least 15 minutes, at least 20 minutes, at least 25 minutes, at least 30 minutes, at least 35 minutes, at least 45 minutes, at least 60 minutes, at least 90 minutes, at least 120 minutes, at least 150 minutes, at least 180 minutes, at least 200 minutes, or at least 250 minutes. Such times the UAV may be capable of flying may include a period of time of continuous flight with a fully charged CESS. In some cases, the UAV can fly a distance of at least 0.5 km, at least 1 km, at least 2 km, at least 3 km, at least 4 km, at least 5 km, at least 6 km, at least 7 km, at least 8 km, at least 9 km, at least 10 km, at least 12 km, at least 14 km, at least 16 km, at least 18 km, at least 20 km, at least 30 km, at least 40 km, at least 50 km, at least 75 km, at least 100 km, or at least 150 km. Such distance the UAV may be capable of flying may include a distance of continuous flight with a fully charge CESS.

Figure 19A:
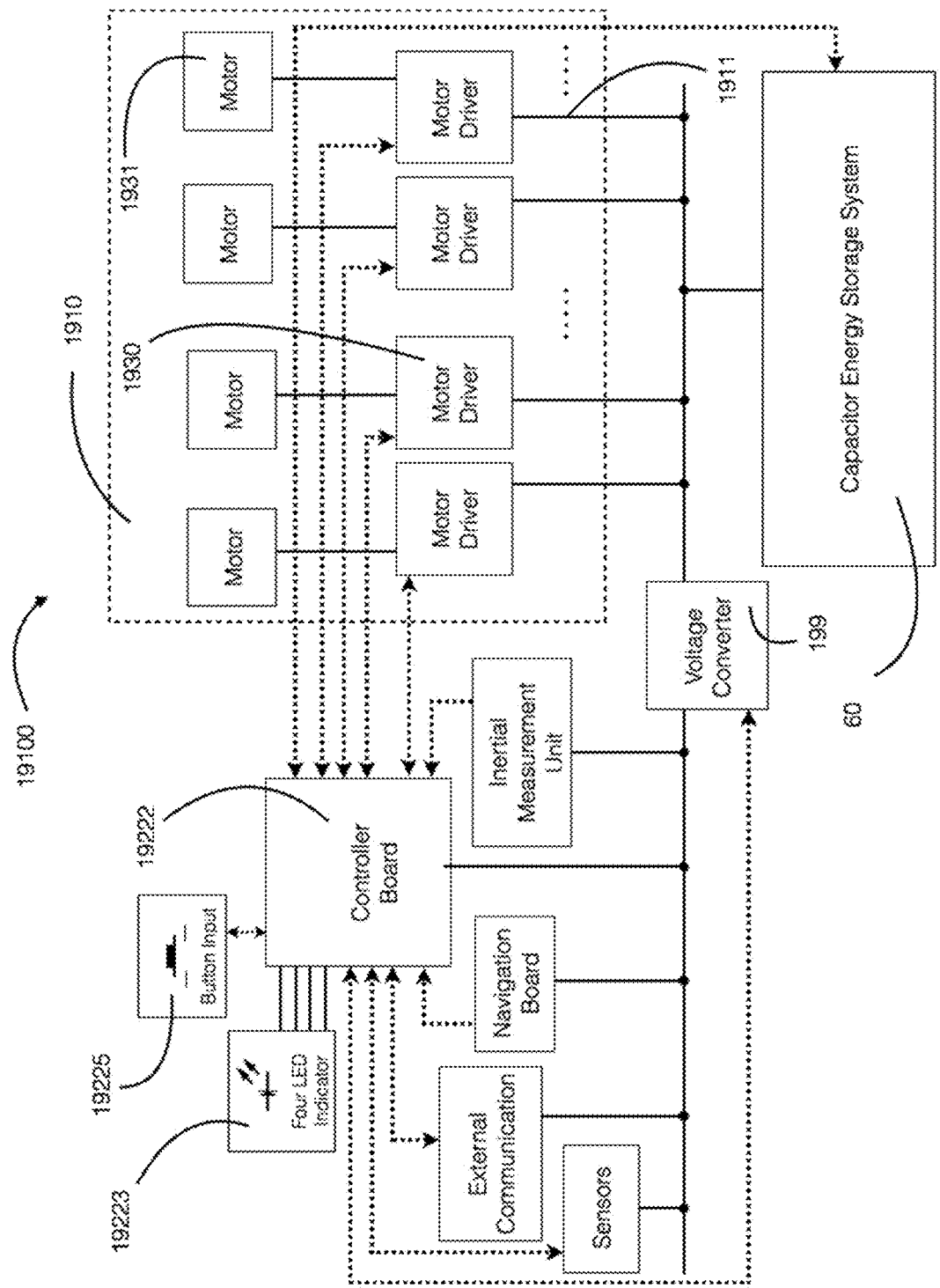
FIG. 19A is a schematic diagram of a vehicle of the disclosure.
Figure 19B:
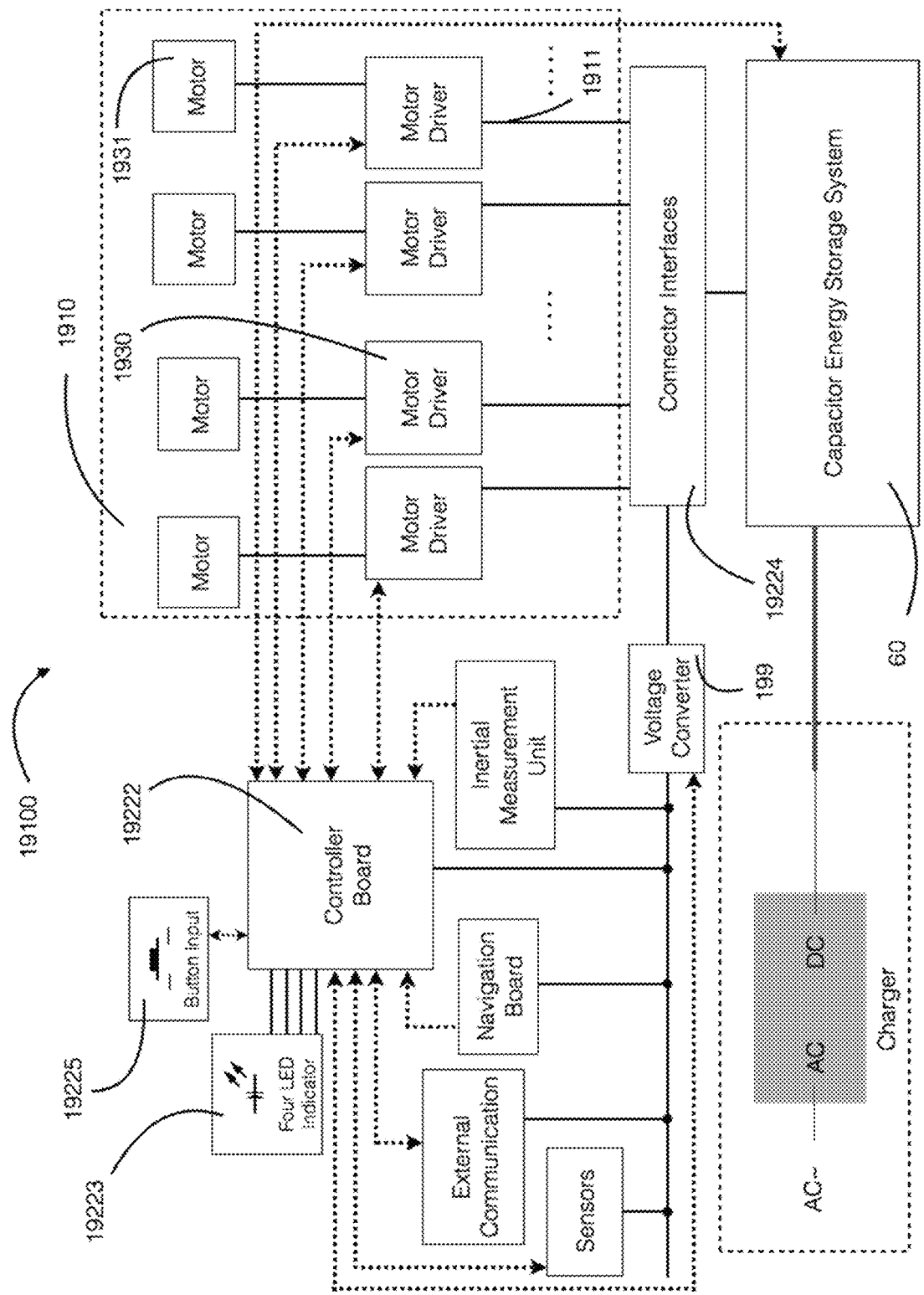
FIG. 19B is a schematic diagram of a vehicle of the disclosure with voltage detection.
Figure 19C:
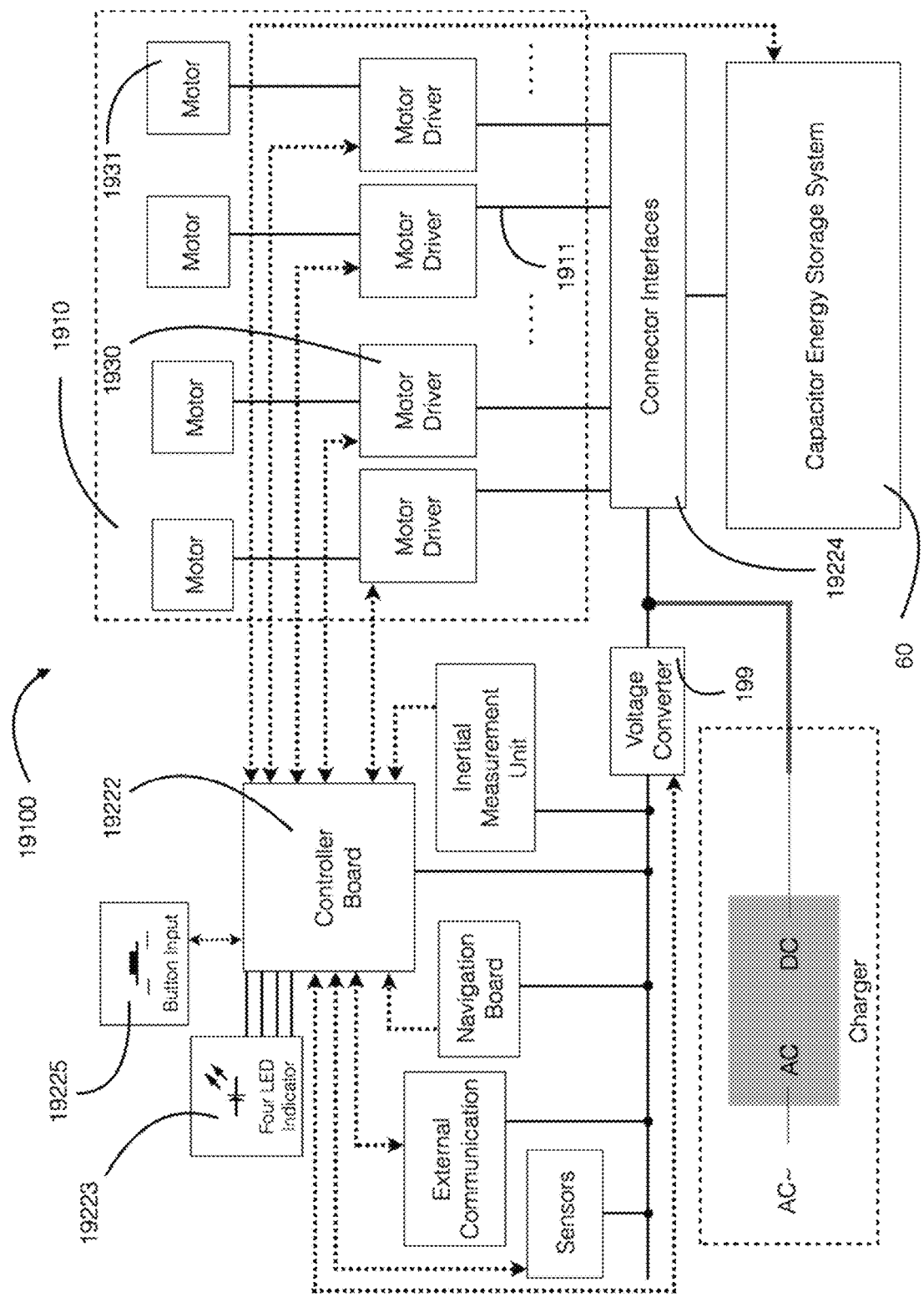
FIG. 19C is a schematic diagram of a vehicle of the disclosure with voltage detection.
Figure 19D:
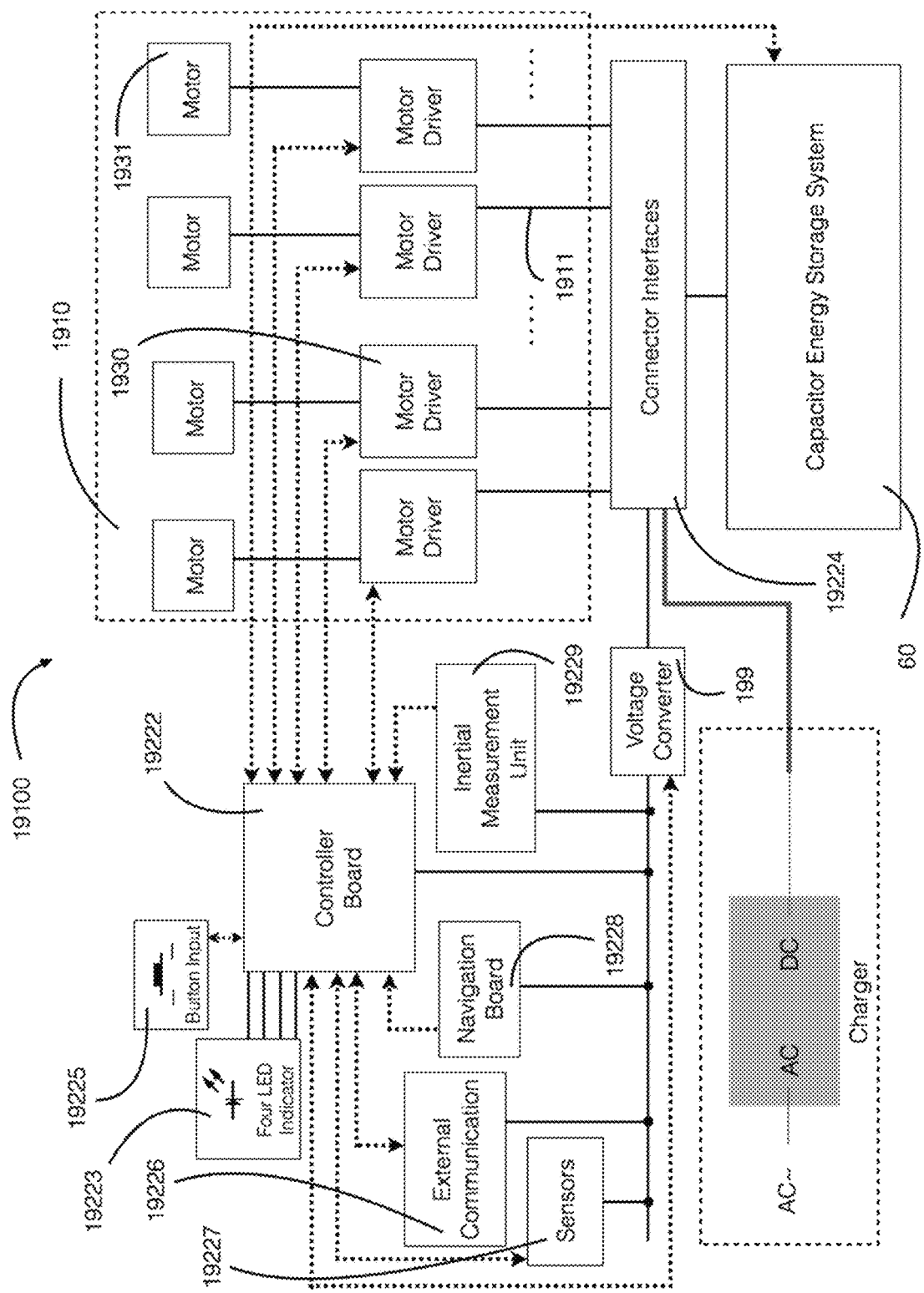
FIG. 19D is a schematic diagram of a vehicle of the disclosure with voltage detection.
Figure 19E:
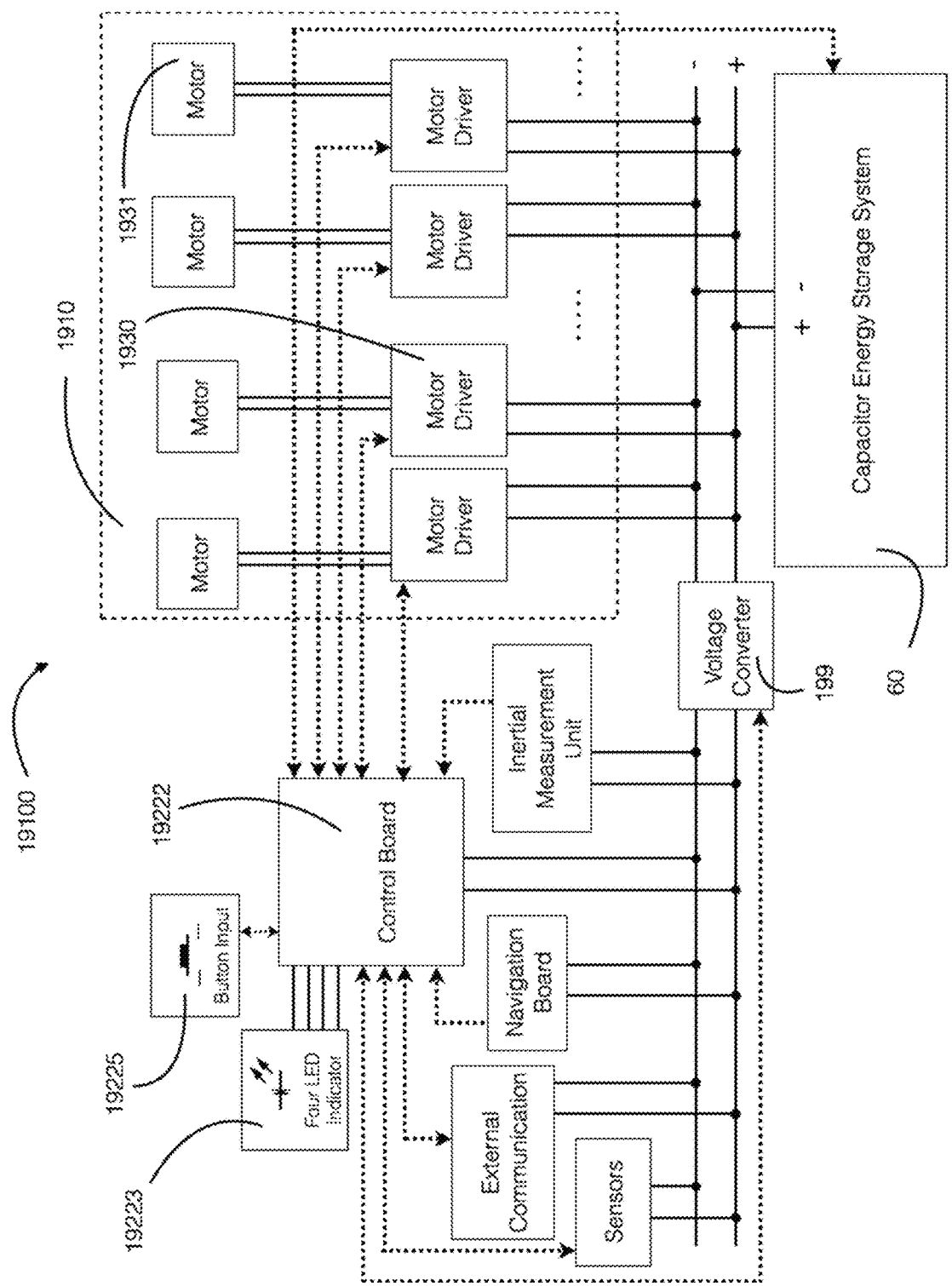
FIG. 19E is a schematic diagram of a vehicle of the disclosure.

In some cases, the CESS 60 further comprises a system power meter 64 (FIG. 18A) in communication with an indication device 19223 (FIG. 19A). The system power meter 64 can be electrically connected to the one or more CESM 40 and configured to calculate the total remaining capacity of the CESS 60. The indication device 19223 can be electrically connected to the controller board 19222 and configured to indicate a percentage of the remaining charge of the CESS 60.

In some cases, the system power meter 64 as depicted in FIG. 18A comprises a power measurement device and indication device. The power measurement device can be electrically connected to the one or more CESM 40 and configured to calculate the total remaining capacity of the CESS 60. The indication device can be electrically connected to the system power meter 64 and configured to indicate a percentage of the remaining charge of the CESS 60.

The power measurement device may comprise a current sampling device. The current sampling device can be configured to collect current data during discharge of the CESS 60. The level of charge measurement device can be configured to collect the current collected by the current sampling device and measure voltage via a voltage detector (such as a voltage regulator), and perform calculations of the current collected by the current sampling device and voltage measured by the voltage detector to obtain the remaining capacity of the CESS 60. Alternatively, level of charge of the CESS 60 can be determined by the system power meter 64 and system controller 66.

Alternatively, the level of charge of the CESS 60 can be determined by the voltage on each CESD, and computed by a pre-calibrated voltage vs charge curve. Equation VI:

$$U = 1/2 C V_{bd}^2 \qquad \text{(VI)}$$

when rewritten, gives $$U = 1/2 C V^2 \qquad \text{(IX)}$$

which can be used to accurately calculate the charge of the CESS 60.

The indication device 19223 (FIG. 19A) may comprise a plurality of indicator lights. The controller board 19222 can be configured to divide the remaining capacity of the CESS 60 by the total capacity of the CESS 60 to obtain a percentage of the remaining capacity. In some embodiments, the number of simultaneously lit indicator lights corresponds to the percentage of the remaining capacity of the CESS 60. Unlit indicator lights may correspond to a percentage capacity of the CESS 60 that has been used or discharged.

A CESS 60 pack may include an interface configured to provide access to the remaining charge information and voltage information of the CESS 60.

A control device may be provided as part of a power control system, where the control device is electrically connected to the CESS 60, electronic switch, input device and indication device.

Aspects of the invention may include a movable object, such as an aircraft (e.g. UAV), comprising equipment to-be-powered (e.g. aircraft) and a CESS, wherein the to-be-powered equipment is electrically connected to the CESS and houses the CESS.

The CESS, as described herein can use electronic switches to control power, thereby avoiding the generation of sparks during power-on, allowing for the normal use of the CESS and safety of the aircraft.

With reference to FIG. 19, an object to be powered such as a movable object 19100 (e.g. a vehicle such as a UAV) may be provided in accordance with an embodiment of the invention. An example of a capacitor energy storage system of the disclosure is depicted in FIG. 18A, FIG. 18B.

The movable objects and CESS of the disclosure can have CESS power indication and discharge control. FIG. 19A is a block diagram of the movable object and a CESS pack having various parts including a CESS 60, a controller board 19222, a voltage converter 199, a button 19225, four LED power indicator lights 19223, a microcontroller unit (MCU) 18222b, and a CESS connector interface 1910.

A CESS may be provided to power the movable object or a portion of the movable object. The CESS may power one or more propulsion units of the movable object. For example, the CESS may power one or more motor drivers 1930 and motors 1931 attached to rotors of a UAV that may provide lift to the UAV and enable it to fly. The CESS may power one or more communication systems (e.g. communication system with a remote control) or the movable object. The CESS may power a carrier that may be part of the movable object or coupled to the movable object. The CESS may include a configuration of at least one metacapacitor integrated in a capacitor energy storage device (CESD) 20 of a CESC in FIG. 11. Wherein, one such CESC is a CESC 1 of a CESM in FIG. 17A and FIG. 17B. And, wherein CESM 40 of FIG. 17A and FIG. 17B can be 40 in FIG. 18A and FIG. 18B. The metacapacitor having any metadielectric chemistry known or later developed in the art may be used. A plurality of CESCs may be connected in series, in parallel, or any combination thereof. The plurality of CESCs may be packaged together as a single unit or multiple units.

In some embodiments, a MOSFET power element is used as a power switch (PSW) for controlling the output of the capacitor energy storage system 60. In alternative embodiments, any electronic switch may be provided for controlling output of the CESS. An electronic switch may utilize solid state electronics to control charge and discharge of the CESS. In some instances, an electronic switch has no moving parts and does not utilize an electromechanical device (e.g. traditional relays or switches with moving parts). In some instances, electrons or other charge carriers of the electronic switch are confined to a solid device. The electronic switch may optionally have a binary state (e.g. switched-on or switched-off). The use of an electronic switch may help prevent sparking which can cause damage to the CESS and movable object. The electronic switch may be used to control charge and discharge of the CESS.

In some embodiments, a DC voltage converter (e.g. 3 in FIGS. 11, 12, 13, 17A, 17B) and control board (e.g. 4 in FIGS. 11, 12, 13, 17A, 17B) are used as devices for controlling the output power and voltage in coordination with module control node (e.g. 46 FIGS. 17A, 17B, 18A, 18B) and system controller (e.g. 66 FIGS. 18A and 18B) of the CESS 60. A DC voltage converter may utilize solid state electronics to control charge and discharge of the CESS with voltage profiles similar to FIG. 15A and FIG. 15B. In some instances, an electronic switch has no moving parts and does not utilize an electromechanical device (e.g. traditional relays or switches with moving parts). In some instances, electrons or other charge carriers of the electronic switch are confined to a solid device. The electronic switch may optionally have a binary state (e.g. switched-on or switched-off). The use of an electronic switch may help prevent sparking which can cause damage to the CESD and movable object. The electronic switch may be used to control charge and discharge of the CESS.

The button 19225 may be used to control a state of the electronic switch. Any type of input device may be used in place of a button. The input device may be button switch, mechanical switch, potentiometer, or sensor. The input device may have a binary state (e.g. on or off), or may have three or more states (e.g. on, off, or standby). The input device may accept an input directly from a user. For example, a user may manually interact with the input device (e.g. pressing a button, flipping a switch, turning a knob or dial, touching a touch interface such as a touchscreen, speaking to a microphone). Alternatively, the input device may receive a signal indicative of a user input. For example, a user may interact with a remote control that may relay a signal (e.g. wired or wireless signal) to the input device, which may in turn control a state of the electronic switch. For example, the input device may be in communication with the electronic switch to control a switched-on or switched-off state of the electronic switch. In some instances, an input device may function as an interface between a user input and control of the electronic switch which may selectively cause discharge of the CESS.

A controller board 19222 can be the control unit for achieving the overall functionality. It can connect to the input device (e.g. button input 19225) to determine if the user intends to turn on or off the CESS 60. The on or off of the CESS 60 can be controlled by the signals from the controller board 19222. In some embodiments, the controller board 19222 may receive an input from the input device, and may use the input from the input device to generate a signal to control the state of the controller board.

Referring to FIGS. 18A and 18B, the system power meter 64, there can be a current sampling resistor (e.g., about 0.01Ω) to capture the current during the charge and discharge process. The system controller 66 can capture the current signal at a high frequency and use an integration process to calculate the CESS 60 capacity. When the system power meter 64 current sampling frequency is low, the accuracy of the calculated CESS 60 capacity may be reduced. When the system power meter 64 current sampling frequency is high, the accuracy of the calculated CESS capacity may be increased. In some implementations, the system power meter 64 current sampling frequency may be about 0.3 Hz-100 kHz. For example, the system power meter 64 current sampling frequency may be greater than or equal to about 0.3 Hz, 0.5 Hz, 1 Hz, 2 Hz, 3 Hz, 5 Hz, 7 Hz, 10 Hz, 15 Hz, 20 Hz, 25 Hz, 30 Hz, 40 Hz, 50 Hz, 75 Hz, 100 Hz, 200 Hz, 500 Hz, 1 kHz, 2 kHz, 3 kHz, 5 kHz, 10 kHz, 20 kHz, 50 kHz, 75 kHz, or 100 kHz. The system power meter 64 current sampling frequency may be less than or equal to about 10 Hz, 15 Hz, 20 Hz, 25 Hz, 30 Hz, 40 Hz, 50 Hz, 75 Hz, 100 Hz, 200 Hz, 500 Hz, 1 kHz, 2 kHz, 3 kHz, 5 kHz, 10 kHz, 20 kHz, 50 kHz, 75 kHz, 100 kHz, or 200 kHz.

In some embodiments, a level of a CESS may be determined as a percentage of the CESS capacity. The percentage of the CESS capacity can be calculated by dividing the capacity of the power capacity that remains by the total CESS capacity. In other embodiments, the CESS capacity may be expressed in other terms, such as continuous-time-of use remaining (e.g. the length of time the CESS can continue discharging at its discharge rate). The discharge rate may be the current rate of discharge, a previous rate of discharge, an average rate of discharge over a period of time, or any other rate of discharge.

A power level indication device may be provided. For example, a plurality of indicator lights may be provided, where the number of lit lights may correspond to a percentage of the CESS charge that remains. The number of unlit lights may correspond to a percentage of the CESS charge that has been used or discharged. Any number of indicator lights may be provided, which may determine the precision of the percentage ranges that can be established. For example, the use of four power indicator lights may provide indication of the remaining level charge within the 25% range. The use of 5 power indicator lights may provide indication of the remaining level of charge within the 20% range. The use of N power indicator lights may provide indication of the remaining level of charge within the 100/N percent range. In some embodiments, four LED power indicator lights 19223 indicates the approximate percentage of CESS charge remaining. For example, four lit lights can represent that the CESS has 75-100% charge remaining, three lit lights can represent 50-75% of the CESS charge remaining, two lit lights can represent 25-50% of the CESS charge remaining, and one lit light can represent 0-25% of CESS charge remaining. As such, the user can approximate the CESS charge at a present moment in time. In other embodiments, other types of power level indicators may be provided. For example, an output may be provided showing a numerical value indicative of the charge level. For example, the charge level indication device may say 83%, when 83% of the charge level remains, or may provide a range (e.g. 80-90%, when 83% of the charge level remains). Other graphical indicators, such as colors, bars, levels, line graphs, icons ay be used to provide a visual indication of the charge level.

Positioning the CESS indicator LED lights through a light guide member passing to the outside of the CESS pack can result in user-friendly operation. The CESS indicator LED lights can be numbered in order. Light can be provided outside the CESS via a light guide member to facilitate user observation.

The charge level may be displayed continuously, so the user may be able to view the charge level at any moment in time. Alternatively, the user may be able to view the charge level in response to a signal to show the charge level (e.g. the user presses a button that causes the charge level to light up, the user provides a voice command that causes the charge level to be displayed, a motion sensor detects the presence of a user and causes the charge level to be displayed). The charge level may be displayed on an external surface of a CESS, or on an object to be powered by the CESS. For example, a user may be able to view an external portion of a UAV and see the charge level remaining for the CESS for the UAV. The user may be able to view the charge level without requiring the use of any other external device. The user may be able to view the charge level without taking apart any portion of the UAV. The charge level indicator may be self-contained within a capacitor based charge supply pack. The charge level may be displayed on the CESS pack when the CESS pack is connected or installed on the UAV. In some embodiments, the charge level may be displayed on the CESS pack even when the CESS pack is not connected to or installed on the UAV.

The device can also be equipped with a data communication interface. Other electronic devices can obtain, through the interface, the current CESS level of charge information, voltage information and other information. Such information can be used to provide CESS operational and protection functionalities.

With reference to FIGS. 19A, 19B, 19C, 19D, and 19E the movable object 19100 includes a device 1910 to be powered and a CESS 60. The device to be powered 1910 and the CESS 60 can be electrically connected. In some embodiments, the CESS 60 can be configured as seen in FIG. 18A or FIG. 18B. In some embodiments, the device 1910 to be powered may include an input interface 1911. The CESS 60 may be electrically connected to the input interface 1911 to supply power to the device 1910, the controller board 19222, and associated systems (e.g. inertial measurement unit, navigation board, external communication, sensors. In this embodiment, the movable object 19100 may be an aircraft, such as an UAV.

The CESS 60 can comprise any combined configuration of metacapacitors, CESD, CESC, and CESM. In some embodiments, the CESS 60 may comprise two or more different configurations of capacitor energy storage modules (CESM). One configuration of CESM may be for low power output to be used primarily for energy storage and constant voltage operation of the device to be powered 1910. A second configuration of CESM may be for high power output, and primarily for acceleration vertically and horizontally. For example, a CESM or a plurality of CESC may be configured such that the plurality of CESC may be electrically connected in parallel to form common electrodes in electrical contact with a DC voltage converter with an ampere rating between 20 mA and 10000 A, or an ampere rating greater than 10000 A.

The connector interface 19224 can be used to obtain signals of the currently remaining charge or voltage drop of the CESS. In the present embodiment, the interface 19224 is connected in parallel between the electrode 1 and the electrode 2 of the CESS 60. Other electronic devices can obtain, via the connector interfaces 19224, the current charge information, voltage information.

The connector interface 19224 may be in electrical communication with the input interface 1911. This may provide electrical connection and communication with a device 1910 to be powered. In some embodiments, a CESS may be a self-contained package that may be inserted into (or attached to) a movable object or removed from the movable object. Different CESS may be swapped. Inserting the CESS into the movable object (or attaching the CESS to the movable object) may automatically cause the electrical connections to come into contact with one another so that the CESS can power a device to be powered on the movable object.

A power electronic switch (PSW) can be electrically connected to the CESM 40. In the present embodiment, the PSW can be selected from any insulated gate bipolar transistor (IGBT), power GaN MOSFET, power SiC MOSFET, JFET, or a solid state relay, a power transistor. Specifically, the PSW is connected in series between the electrodes 62 of the CESS 60 and the CESM 40. The PSW is in series with the system controller 66. The gate of the PSW is controlled by the system controller 66. The system controller 66 may be controlled by the controller board 19222. The input interface 1911 of the to-be-powered device 1910 is electrically connected to the CESS 60 via the interface 19224. In some embodiments, the PSW can also use other forms of mechanical relay or non-mechanical contact switch.

The system power meter 64 is electrically connected to the system controller 66, for calculating the charge of the CESS 60. The system power meter 64 may include a current sampling device and voltage regulator and voltage detection. The current sampling device may be configured to measure the current during discharge of the CESS 60, the system power meter 64 is used to obtain the current measured by the current sampling device, calculate the current measured by the current sampling device using integration, to obtain the present remaining charge of the CESS 60. Specifically, the current sampling device can be a 0.01 Ohm ($\Omega$) resistor, but not limited to 0.01 ohm. The current sampling device may be connected in series between the PSW and the connector interface 19224.

Alternatively, level of charge may be determined by sampling module power management devices (e.g. referring to FIGS. 17A and 17B power meter 44, the DC voltage converter 3, control board 4, and module control node 46) to calculate individual CESC and CESM level of charge, and from which the system power meter 64 and system controller 66 may integrate calculated values to determine CESS 60 level of charge.

Alternatively, level of charge may be determined by measuring the voltage and referencing to a pre-calibrated look-up table. Although in standard capacitors energy is determined according to equation 9, metacapacitors often have non-linearities that would make it advantageous to have a calibrated look-up table.

The indication device 19223 is electrically connected to the controller board 19222 to indicate a percentage of the currently remaining charge of the CESS 60. The indication device 19223 includes a plurality of indicator lights (not shown). The system controller 66 is also used to divide the currently remaining charge of the CESS 60 by a total charge capacity of the CESS 60 to obtain a percentage of the currently remain charge. The number of simultaneously-lit indicator lights correspond to the percentage of the currently remaining charge of the CESS 66. Specifically, in this embodiment, the indicating device 19223 includes four level of charge indicators, which are LED lights. One lit light indicates that the percentage of the remaining charge is 25%. When all four of the power indicator lights are on, it means that the CESS 60 has 75-100% remaining charge. Three lit indicator lights means that the CESS 60 has 50-75% remaining charge. Two lit indicator lights means that the CESS 60 has 25-50% remaining charge. One lit indicator light means that the CESS 60 has 0-25% remaining charge. This allows users to roughly understand how much remaining charge the CESS has.

In other embodiments of the present invention, the indication device 19223 includes an LCD monitor or other display device for indicating the current percentage of remaining charge.

Figure 20A:
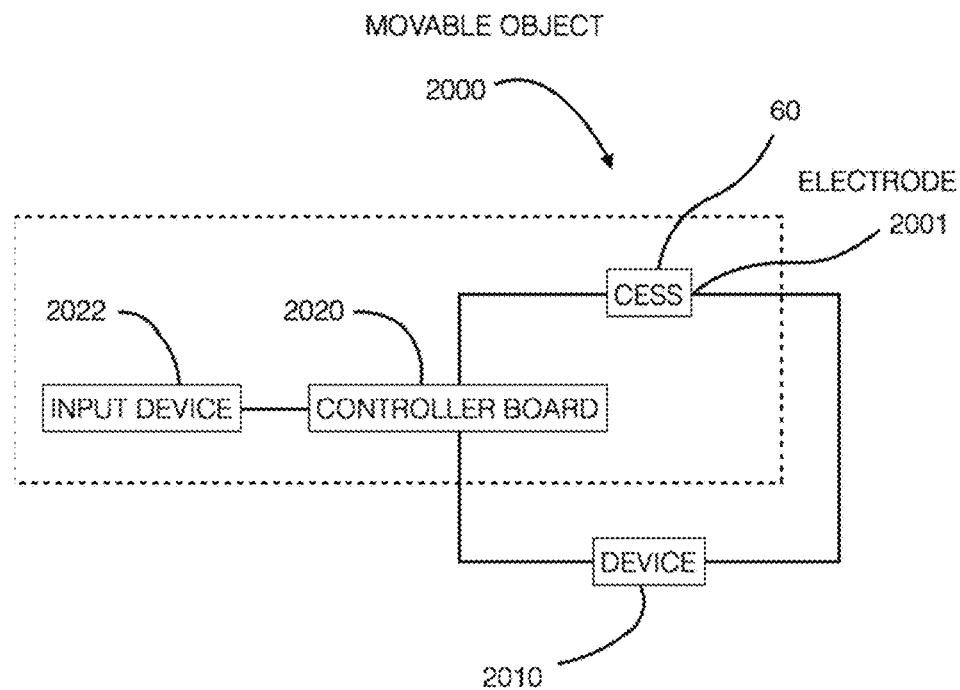
FIG. 20A is a schematic circuit diagram of a vehicle of the disclosure.

Referring to FIG. 20, a movable object 2000, such as a vehicle (e.g. UAV), is provided in accordance with another embodiment of the invention. The movable object 2000 may be similar to the movable object 19100 of other embodiments. Optionally, the to-be-powered device 2010 may be directly connected between an electrode 2001 of the CESS 60 coupled to a controller board 2020. The controller board 2020 may be directly or indirectly controlled by the input device 2022.

Figure 20B:
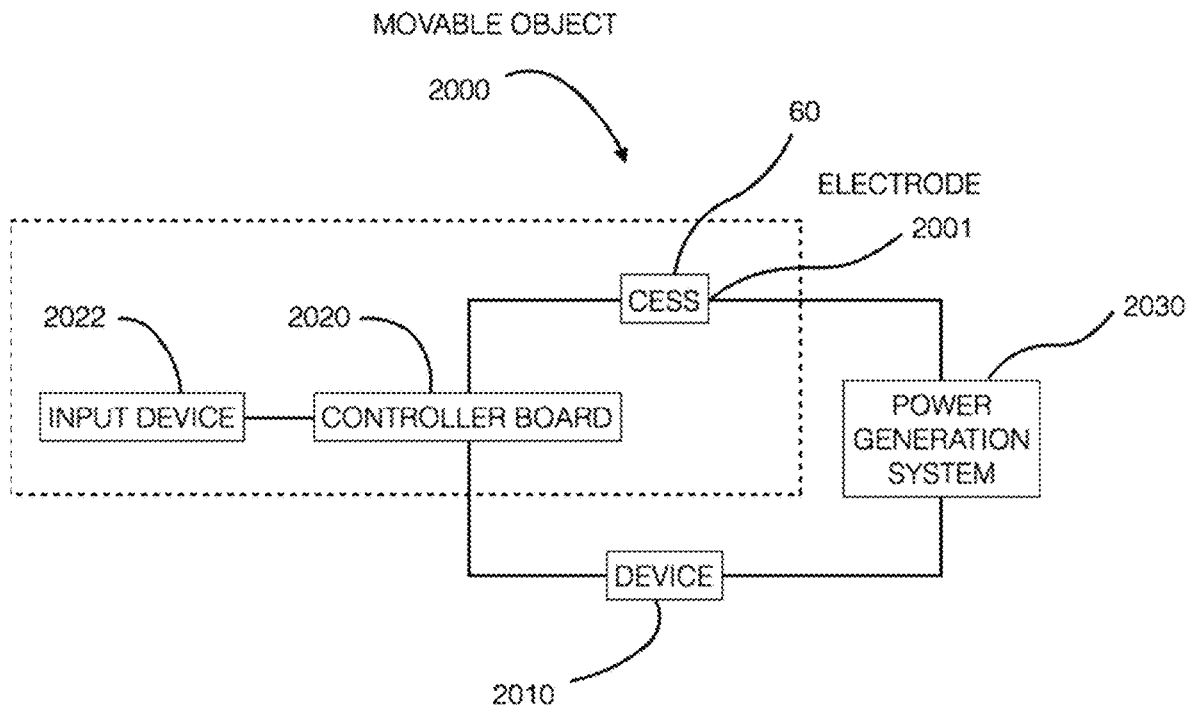
FIG. 20B is a schematic circuit diagram of a vehicle of the disclosure with a power generation unit electrically connected to both the CESS and the device to be powered.

Referring to FIG. 20B, a movable object 2000, such as a vehicle (e.g. UAV), is provided in accordance with another embodiment of the invention. The movable object 2000 may be similar to the movable object 19100 of other embodiments. Optionally, the to-be-powered device 2010 may be directly connected between a power generation unit 2030 and coupled to the controller board 2020, both of which may be directly connected to the CESS 60. The controller board 2020 may be directly or indirectly controlled by the input device 2022. In some embodiments the power generation unit 2030 may be physically part of the movable object 2000. In another embodiment, the power generation unit 2030 may be separate and detachable from the movable object 1900.

Figure 20C:
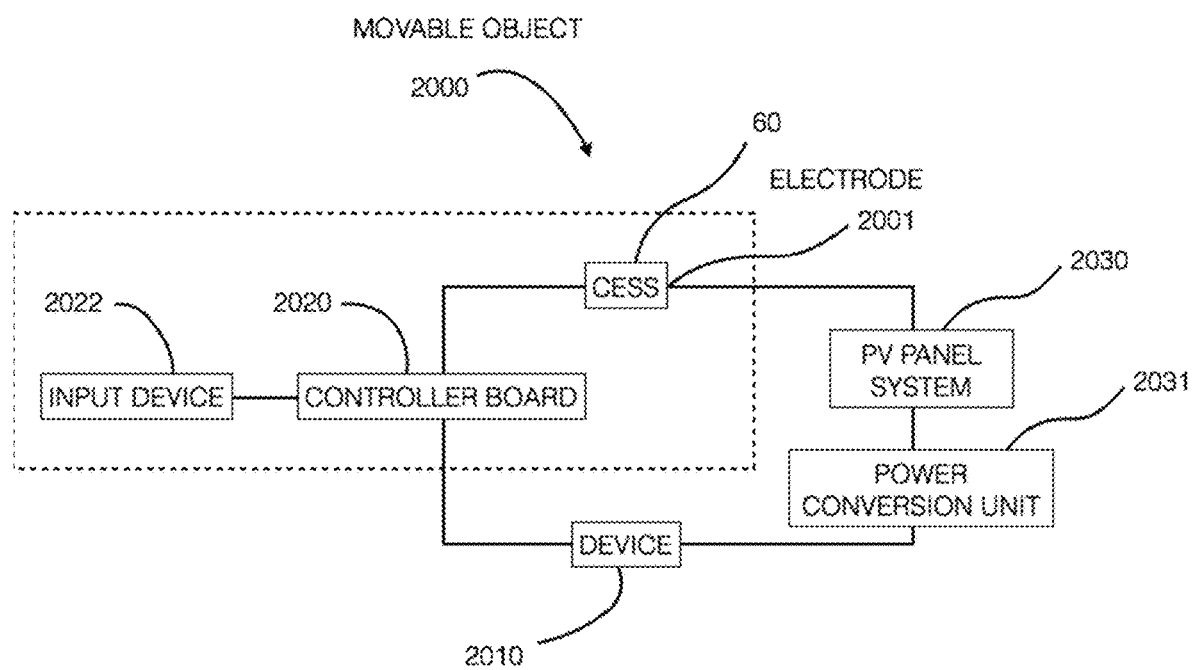
FIG. 20C is a schematic circuit diagram of a vehicle of the disclosure with a photovoltaic power generation system electrically connected to both the CESS and a power conversion unit which is connected to the device to be powered.

Referring to FIG. 20C, a movable object 2000, such as a
  vehicle (e.g. UAV), is provided in accordance with
  another embodiment of the invention. The movable object
  2000 may be similar to the movable object 19100 of other
  embodiments. Optionally, the to-be-powered device 2010
  may be directly connected between a power conversion
  unit 2031 and coupled to the controller board 2020. The
  power conversion unit 2031 being electrically connected
  to photovoltaic (PV) panel system 2030 which is also
  electrically connected to and capable of charging the
  CESS 60. The controller board 2020 may be directly or
  indirectly connected to the CESS 60 and directly or
  indirectly controlled by the input device 2022. In some
  embodiments the PV panel system 2030 and power conversion unit 2031 may be physically part of the movable
  object 2000. In another embodiment, the PV panel system
  2030 and power conversion unit 2031 may be separate
  and detachable from the movable object 2000.

Without limitation, the controller board 19222 can be used to achieve any one or more of the following nine functions: (a) motor driver control, (b) navigation control, (c) indication of charge percentage, (d) charge control, (e) discharge control, (f) sensor control, (g) core voltage balancing, (h) communication with other devices, and (i) charging temperature protection. In some instances, the controller board may include an MCU that may be capable of performing one or more of the nine functions described. In some instances, the MCU may be capable of performing two or more, three or more, four or more, five or more, six or more, seven or more, eight or more, or all nine of the functions described. The MCU may be able to effect any combination of the nine function, such as but not limited to: (a) motor driver control, (b) navigation control, (c) indication of charge percentage, (d) charge control, (e) discharge control, (f) sensor control, (g) core voltage balancing, (h) communication with other devices, and (i) charging temperature protection., or any other combination of the functions.

The electronic device for DC-conversion installed with the CESD comprising a CESC (as shown in FIG. 11) can use an electronic switch, such as a power MOSFET, as the control element for CESD discharge (e.g. the equivalent of a solid state relay). Since solid state relays are non-contact relays, no spark is generated during the on-off state switching process. The electronic device is also equipped with buttons and other input elements, and computer processor. A user can input operation information via the buttons. The signal collected by the processor can be used to control the on or off of the MOSFET, in order to achieve control of the CESM discharge. Switches and other similar elements can be used to directly control the on or off of the MOSFET to achieve power on without generation of sparks.

With this CESC problems related to burning and erosion of interface locations by sparks and the resulting increased resistance and poor connection are addressed, so that the system can provide a stable power supply.

Figure 21:
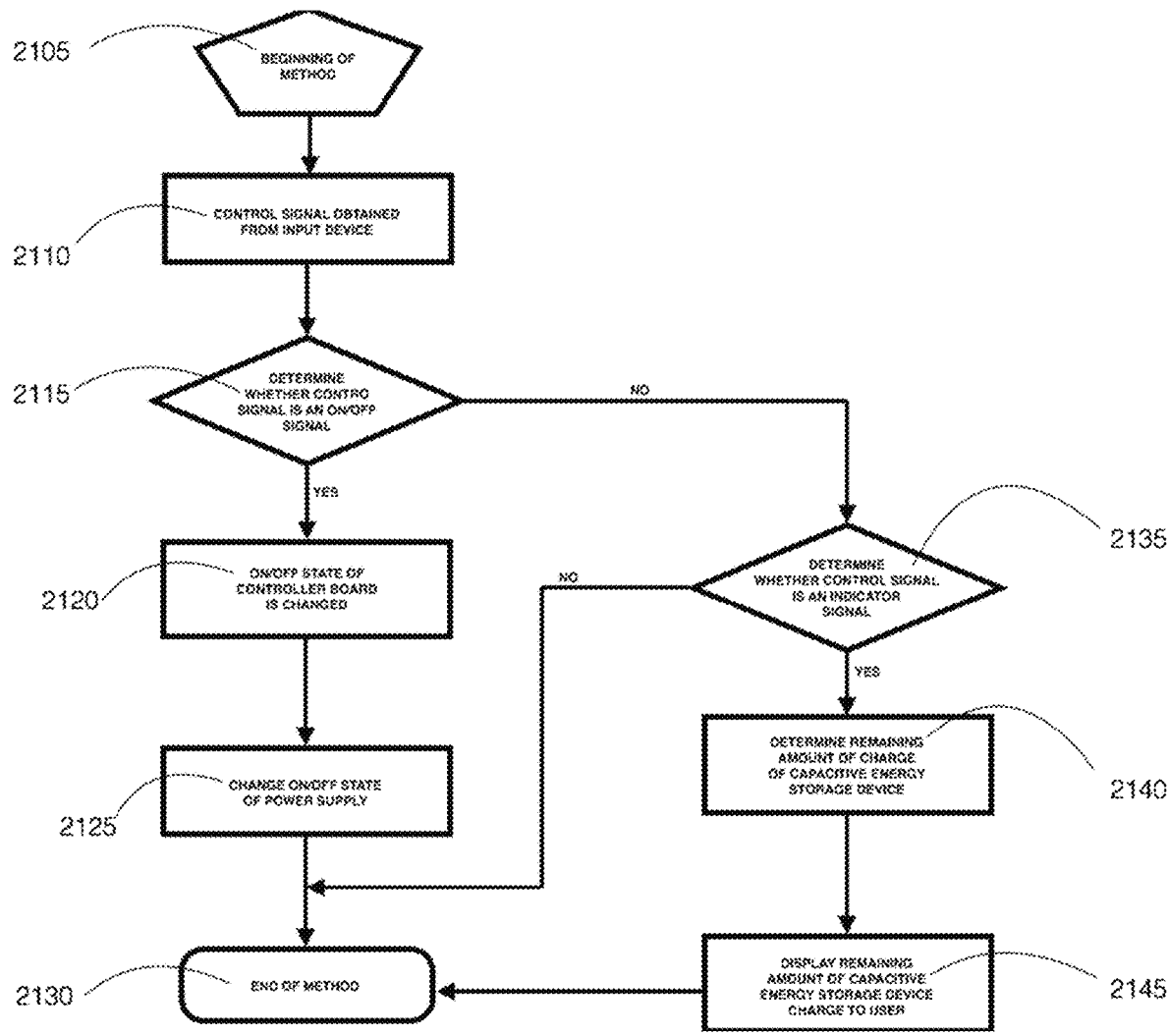
FIG. 21 is a flow-chart showing the steps of a method of the disclosure.

A flow-chart showing a method for operating the CESS is shown in FIG. 21. At the beginning of the method 2105, a control signal is obtained from an input device (e.g. a button) 2110. The control signal can be relayed to a decision point 2115 where it can be determined whether the control signal is an on/off signal. If the control signal is an on/off signal, the on/off state of the electronic switch is changed 2120 (e.g. from off to on, or from on to off). Changing the on/off state of the electronic switch then changes the on/off state of the CESS 2125. The method can then end 2130 until another control signal is obtained from the input device 2105. If it is determined that the control signal is not an on/off signal, it can then be determined whether the control signal is an indicator signal 2135 (e.g. the level of charge of the CESS is desired to be displayed). If the control signal is not an indicator signal, the method can be ended 2130. If the control signal is an indicator signal, the remaining amount of charge of the CESS can be determined 2140 and displayed to the user 2145 (e.g. by lighting 1, 2, 3, or 4 LED lights).

A CESS may be capable of operating in one or more modes. In some instances, a plurality of operational modes may be presented for a CESS. Different operational modes may cause different actions to be taken by a CESS. A user may be able to switch between the different operational modes by providing an input. The input may be provided to an input device of the CESS. For example, a user may depress a button on the CESS. Pressing the button may switch the operational mode of the CESS. The input may be provided manually and directly by the user. In another example, a user may provide an input to a remote control that may communicate with an input device of the CESS. The input may be provided indirectly by a user that need not interact manually with the input device. The user input may be indicative of which operational mode to switch to, or may provide an indication to switch to a next operational mode in a sequence of operational modes.

In one example, a plurality of operational modes may be available for a CESS. Providing a user input, such as a depression of an input device, may cause the CESS to cycle to the next operational mode in a series of operational modes. Optionally, when a CESS is first powered on or connected to a movable object, a default operational mode may be provided. A predetermined sequence of operational modes may be provided. A user may step to the next operational mode in the sequence by providing a user input. For example, the predetermined sequence may include Operational Mode A, Operational Mode B, Operational Mode C, and Operational Mode D which may cycle in order. If the CESS is currently operating under Operational Mode B, an input from a user may step to the next operational mode, Operational Mode C. For example, a user may depress a button input device to move to the next operational mode. Alternatively, a predetermined sequence need not be provided, or a user may be able to skip between desired operational modes by providing an input indicative of the desired operational mode. For example, a user may be presented with a menu of options (e.g. Operational Mode A, Operational Mode B, Operational Mode C, and Operational Mode D) and select the desired operational mode from the options.

Various examples of operational modes may include a mode of activating a display of a level of charge of the CESS, turning on or turning off the CESS by turning on or off an electronic switch in electrical communication with the CESS, communicating with an external device (e.g. providing state information associated with the CESS to an external device, receiving information from the external device), comparing an input signal with a predetermined signal pattern, or any other functions. In some instances, two or more, three or more, four or more, five or more, or six or more operational modes may be provided.

In response to an input signal, the CESS may switch between different operational modes. In response to the input signal, an operational mode may be selected from a plurality operational modes associated with the CESS. In some instances, the operational mode may be switched or selected based on a characteristic associated with the input signal. For example, the characteristic may include a length of time of the input signal. In another example, the characteristic may include the data conveyed in the input signal. The characteristic may include a pattern provided in the input signal. For example, if an input device is a button, depressing the button once quickly vs. holding it down for a long period of time may be different characteristics that may yield a switch to or selection of a different operational mode. For example, a quick depression of the button may cause the operational mode to switch between powering on and powering off. Holding the button down for an extended period of time may cause a level of charge of the CESS to be displayed or turned off.

The systems, devices, and methods described herein can be applied to a wide variety of movable objects. As previously mentioned, any description herein of an aerial vehicle such as UAV may apply to and be used for any movable object. A movable object of the present invention can be configured to move within any suitable environment, such as in air (e.g. a fixed-wing aircraft, a rotary-wing aircraft, or an aircraft having neither fixed wings nor rotary wings), in water (e.g. a ship, submarine, or R.O.V.), on ground (e.g. a motor vehicle, such as a car, truck, bus, van, motorcycle, single or multi-wheel gyroscopic balanced scooter, a movable structure or frame), above ground or water (e.g. hover craft or skateboard), underground (e.g. a subway), in space (e.g. a spaceplane, a Martian rover, a Martian drone, a satellite, or a probe), or any combination of these environments. In some embodiments, the movable object can be mounted on a living subject, such as a human or an animal. Suitable animals can include avians, canines, felines, equines, bovines, ovines, porcines, delphinidae, rodents, or insects.

The movable object may be capable of moving freely within the environment with respect to six degrees of freedom (e.g. three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The actuation mechanism may be powered by a CESS as described hereinabove. The CESS may optionally be coupled to a controller board. The movable object may be self-propelled via a propulsion system, as described elsewhere. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being. The propulsion unit may be powered by a CESS controlled in part or whole by a system control as described elsewhere.

In some instances, the movable object can be a vehicle. suitable vehicles may include water vehicles, aerial vehicles, space vehicles, or ground vehicles. For example, aerial vehicles may be fixed-wing aircraft (e.g. airplane, gliders), rotary-wing aircraft (e.g. helicopters, rotorcraft), aircraft having both fixed wings and rotary wings, or aircraft having neither (e.g. blimps, hot air balloons). A vehicle can be self-propelled, such as self-propelled through the air, on or in or above water, in space, or on or about or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g. hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g. a computer control system), or any suitable combination thereof. The movable object can be an autonomous or semiautonomous robot, such as a robot configured with an artificial intelligence.

The movable object can have any suitable size and dimensions. In some embodiments, the movable object may be of a size to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimension suitable for being lifted or carried by a human. In some instances, the movable object may have a maximum dimension (e.g. length, width, height, diameter, diagonal) of less than or equal to about: 10 cm, 50 cm, 1 m, 2 m, 5 m, or 10 m. The maximum dimension may be greater than or equal to about: 20 cm, 50 cm, 1 m, 2 m, 5 m, or 10 m. For example, the distance between shafts of opposite rotors of the movable object may be less than or equal to about: 10 cm, 50 cm, 1 m, 2 m, 5 m, or 10 m. Alternatively, the distance between shafts of opposite rotors may be greater than or equal to about: 10 cm, 50 cm, 1 m, 2 m, 5 m, or 10 m.

In some instances, the movable object may weigh more than 1000 kg. In some instances, the weight of the movable object may be between 0.01 kg to 1000 kg. Conversely, in some instances, the weight of the movable object may be less than 0.01 kg.

In some embodiments, a movable object may be small relatively to a load carried by the movable object. The load may include a payload and/or a carrier, as described in further detail below. In some examples, a ratio of a movable object weight to a load weight may be greater than, less than, or equal to about 1:1. Optionally, a ratio of a carrier weight to a load weight may be greater than, less than, or equal to about 1:1. When desired, the ratio of a movable e object weight to a load weight may be less than or equal to about 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have a low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less. The movable object, carrier, and or payload may be powered by CESS as described elsewhere hereinabove.

Figure 22:
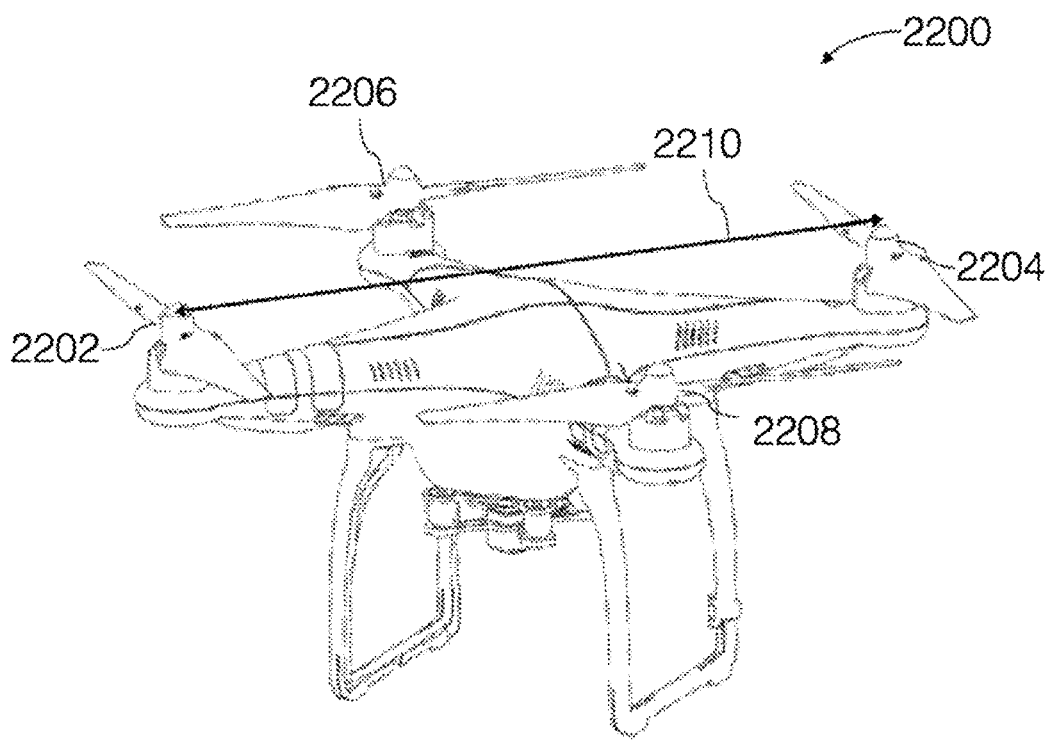
FIG. 22 illustrates an unmanned aerial vehicle in accordance with embodiments.

FIG. 22 illustrates an unmanned aerial vehicle (UAV) 2200, in accordance with embodiments of the present disclosure. The UAV may be an example of a movable object as described herein. The UAV 2200 can include a propulsion system having four rotors 2202, 2204, 2206, and 2208. Any number of rotors may be provided (e.g. one, two, three, four, five, six, or more). The rotors can be embodiments of the self-tightening rotors described elsewhere herein. The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 2210. For example, the length 2210 can be less than or equal to 2 m, or less than or equal to 5 m. In some embodiments, the length 2210 can be within a range from 40 cm to 7 m, 70 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g. translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g. camera), an audio capture device (e.g. a parabolic microphone), an infrared imaging device, an ultraviolet imaging device, a temperature sensing device (e.g. an electronic thermometer), a barometric pressure sensing device, a pH meter, or a spectrometer. The sensor can provide static sensing data (e.g. a photograph) or dynamic sensing data (e.g. a video). In some embodiments, the sensor provides sensing data for the target of the payload. Alternatively, or in combination, the payload can include one or more emitters for providing signals to one or more targets. Any suitable emitter can be used, such as an illumination source, radio signal, or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g. directly contacting the movable object) or indirectly (e.g. not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relatively to the movable object and/or the carrier, as described hereinabove.

The carrier can be integrally formed with the movable object. Alternatively, the carrier, can be releasably coupled to the movable object. The carrier can be coupled to the movable object directly or indirectly. The carrier can provide support to the payload (e.g. carry at least part of the weight of the payload). The carrier can include a suitable mounting structure (e.g. carry at least part of the weight of the payload). The carrier can include a suitable mounting structure (e.g. a gimbal platform) capable of stabilizing and/or directing the movement of the payload. In some embodiments, the carrier can be adapted to control the state of the payload (e.g. position and/or orientation) relative to the movable object. For example, the carrier can be configured to move relative to the movable object (e.g. with respect to one, two, or three degrees of translation and/or one, two, or three degrees of rotation) such that the payload maintains its position and/or orientation relative to a suitable reference frame regardless of the movement of the movable object. There reference frame can be a fixed reference frame (e.g.

the surrounding environment). Alternatively, the reference frame can be a moving reference frame (e.g. the movable object, a payload target).

In some embodiments, the carrier can be configured to permit movement of the payload relative to the carrier and/or movable object. The movement can be a translation with respect to up to three degrees of freedom (e.g. along one, two, or three axes) or a rotation with respect to up to three degrees of freedom (e.g. about one, two, or three axes), or any suitable combination thereof.

In some instances, the carrier can include a carrier frame assembly and a carrier actuation assembly. The carrier from assembly can provide structural support to the payload. The carrier frame assembly can include individual carrier frame components, some of which can be movable relative to one another. The carrier actuation assembly can include one or more actuators (e.g. motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g. roll axis, pitch axis, or yaw axis). The rotation of the one or more carrier frame components can cause a payload to rotate about one or more axes of rotation relative to the movable object. Alternatively, or in combination, the carrier actuation assembly can actuate a translation or one or more carrier frame components along one or more axes of translation, and thereby produce a translation of the payload along one or more corresponding axes relative to the movable object.

In some embodiments, the movement of the movable object, carrier, and payload relative to a fixed reference frame (e.g. the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be handheld or a wearable device. For example, the terminal can include a smartphone, tablet, laptop, computer, glasses, helmet, microphone, or suitable combination thereof. The terminal can include a user interface, such as a keyboard, mouse, joystick, touchscreen, or display. Any suitable user input can be used to interact with the terminal, such as manually entered commands, voice control, gesture control, or position control (e.g. via a movement, location or tilt of the terminal).

The terminal can be used to control any suitable state of the moveable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and payload, such as the actuation assembly of the carrier, a sensor of the payload, or an emitter of the payload. The terminal can include a wireless communication device adapted to communicate with one or more of the movable object, carrier, or payload.

The terminal can also be used to control any state of the CESS and/or operation of a CESS. For example, the terminal can be used to select or alter an operational mode of a CESS. The terminal can be used to remotely turn a CESS on or off, control charge or discharge of the CESS. The terminal can be used to cause a display of a level of charge for the CESS. Optionally, the level of charge for the CESS can be displayed on a CESS, and/or on the terminal. The terminal can include a wireless communication device adapted to communicate with the CESS.

The terminal can include a suitable display unit for viewing information of the movable object, carrier, and/or payload. For example, the terminal can be configured to display information of the movable object, carrier, and/or payload with respect to position, translational velocity, translation acceleration, orientation, angular velocity, angular acceleration, or any suitable combinations thereof. In some embodiments, the terminal can display information provided by the payload, such as data provided by a functional payload (e.g. images recorded by a camera or other image capturing device, temperature recorded by a thermometer).

Optionally, the same terminal may both control the movable object, carrier, and payload, or a state of the movable object, carrier and payload, as well as receive and display information from the movable object, carrier and display information from the movable object, carrier and payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and display information from the movable object, carrier, and payload. For example, a first terminal may be used to control the positioning of the payload relative to an environment while a second terminal displays image data captured by the payload. Various communication modes may be utilized between a movable object and an integrated terminal that both controls the movable object and receives data or between the movable object and multiple terminals that both control the movable object and receives data. For example, at least two different communication modes may be formed between the movable object and the terminal that both controls the movable object and receives data from the movable object.

Figure 23:
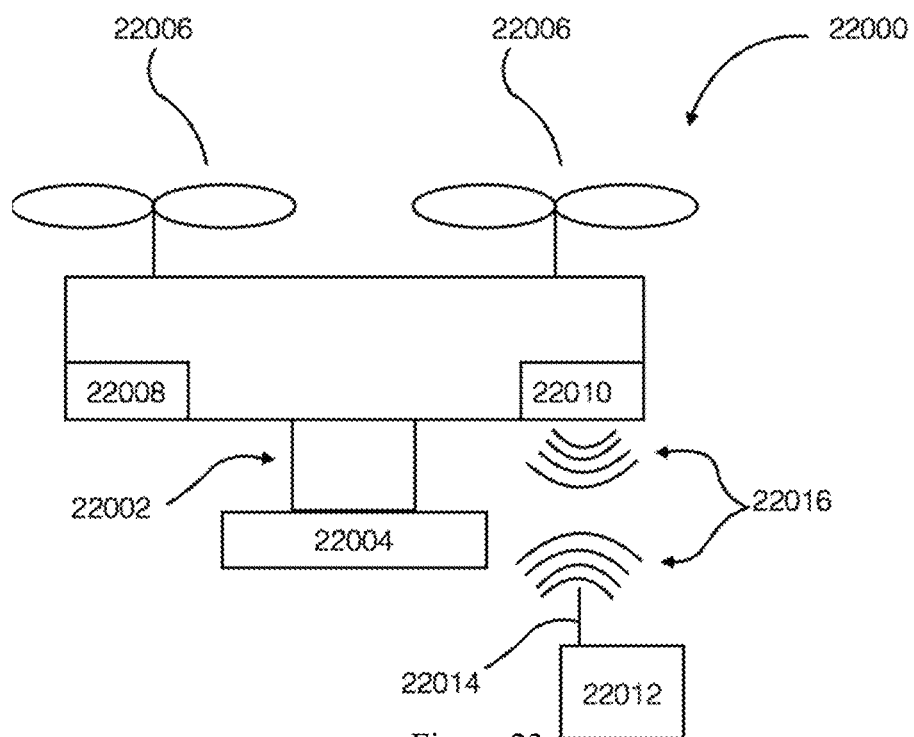
FIG. 23 illustrates a movable object including a carrier and payload, in accordance with embodiments.

FIG. 23 illustrates a movable object 23000 including a carrier 23002 and a payload 23004, in accordance with embodiments. Although the movable object 23000 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g. a UAV). In some instances, the payload 23004 may be provided on the movable object 23000 without requiring the carrier 23002. The movable object 23000 may include propulsion mechanisms 23006, a sensing system 23008, and a communication system 23010.

The propulsion mechanisms 23006 can include one or more of rotors, propellers, blades, engines, motors, wheels, axels, magnets, or nozzles, as previously described. For example, the propulsion mechanisms 23006 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 23006 can be mounted on the movable object 23000 using any suitable means, such as a support element (e.g. a drive shaft) as described elsewhere herein. The propulsion mechanisms 23006 can be mounted on any suitable portion of the movable object 23000, such as on the top, bottom, front, back, side, or suitable combinations thereof.

In some embodiments, the propulsion mechanisms 23006 can enable the movable object 23000 to take off vertically from a surface of land vertically on a surface without requiring any horizontal movement of the movable object 23000 (e.g. without traveling down a runway). Optionally, the propulsion mechanisms 23006 can be operable to permit the movable object 23000 to hover in the air at a specified position and/or orientation. One or more of the propulsion mechanisms 22006 may be controlled independently of the other propulsion mechanisms. Alternatively, the propulsion mechanisms 23006 can be configured to be controlled simultaneously. For example, the movable object 23000 can have multiple horizontally oriented rotors that can provide lift or thrust to the movable object. The multiple horizontally oriented rotors can be actuated to provide vertical takeoff, vertical landing, and hovering capabilities to the movable object 23000. In some embodiments, one or more of the horizontally oriented rotors may spin in a clockwise direction, while one or more of the horizontally rotors may spin in a counterclockwise direction. For example, the number of clockwise rotors may be equal to the number of counter-clockwise rotors. The rotation rate of each of the horizontally oriented rotors can be varied independently in order to control the lift or thrust produced by each rotor, and thereby adjust the spatial disposition, velocity, and acceleration of the movable object 22000 (e.g. with respect to up to three degrees of translation and up to three degrees of rotation).

The sensing system 23008 can include one or more sensors that may sense the spatial disposition, velocity, and acceleration of the movable object 23000 (e.g. with respect to up to three degrees of translation and up to three degrees of rotation). The one or more sensors can include global positioning system (GPS) sensors, motion sensors, inertial sensors, proximity sensors, or image sensors. The sensing data provided by the sensing system 23008 can be used to control the spatial disposition, velocity, and orientation of the movable object 23000 (e.g. using a suitable processing unit and/or control module, as described below). Alternatively, the sensing system 23008 can be used to provide data regarding the environment surrounding the movable object, such as weather conditions, proximity to potential obstacles, location of geographical features, location of manmade structures, and the like.

The communication system 23010 enables communication with terminal 23012 having a communication system 23014 via wireless signals 23016. The communication systems 23010, 23014 may include any number of transmitters, receivers, and/or transceivers suitable for wireless communication. The communication may be one-way communication; such that data can be transmitted in only one direction. For example, one-way communication may involve only the movable object 23000 transmitting data to the terminal 23012, or vice-versa. The data may be transmitted from one or more transmitters of the communication system 23010 to one or more receivers of the communication system 23012, or vice-versa. Alternatively, the communication may be two-way communication, such that data can be transmitted in both directions between the movable object 23000 and the terminal 23012. The two-way communication can involve transmitting data from one or more transmitters of the communication system 23010 to one or more receivers of the communication system 23014, and vice-versa.

In some embodiments, the terminal 23012 can provide control data to one or more of the movable object 23000, carrier 23002, and payload 23004 and receive information from one or more of the movable object 23000, carrier 23002, and payload 23004 (e.g. position and/or motion information of the movable object, carrier or payload; data sensed by the payload such as image data captured by a payload camera). In some instances, control data form the terminal may include instructions for relative positions, movements, actuations, or controls of the movable object, carrier and/or payload. For example, the control data may result in a modification of the location and/or orientation of the movable object (e.g. via control of the propulsion mechanisms 23006), or movement of the payload with respect to the movable object (e.g. via control the carrier 23002). The control data form the terminal may result in control of the payload, such as control the operation of a camera of other image capturing device (e.g. taking still or moving pictures, zooming in or out, turning on or off, switching image modes, change image resolution, changing focus, changing depth of field, changing exposure time, changing viewing angle or field of view). In some instances, the communication from the movable object, carrier and/or payload may include information from one or more sensors (e.g. of the sensing system 23008 or of the payload 23004). The communication may include sensed information from one or more different types of sensors (e.g. GPS sensors, motion sensors, inertial sensor, proximity sensors, or image sensors). Such information may pertain to the position (e.g. location, orientation), movement, or acceleration of the movable object 23000, carrier 23002, or payload 23004. Such information from a payload may include data captured by the payload or a sensed state of the payload. The control data provided transmitted by the terminal 23012 can be configured to control a state of one or more of the movable object 23000, carrier 23002, or payload 23004. Alternatively, or in combination, the carrier 23002 and payload 23004 can also each include a communication module configured to communicate with terminal 23012, such that the terminal can communicate with and control each of the movable object 23000, carrier 23002, or payload 23004 independently.

In some embodiments, the movable object 23000 can be configured to communicate with another remote device in addition to the terminal 23012, or instead of the terminal 23012. The terminal 23012 may also be configured to communicate with another remote device as well as the movable object 23000. For example, the movable object 23000 and/or terminal 23012 may communicate with another remote device as well as the movable object 23000. For example, the movable object 23000 and/or terminal 23012 may communicate with another movable object, or a carrier or payload of another movable object. When desired, the remote device may be a second terminal or other computing device (e.g. computer, laptop, tablet, smartphone, or other mobile device). The remote device can be configured to transmit data to the movable object 23000, receive data from the movable object 23000, transmit data to the terminal 23012, and receive data from the terminal 23012. Optionally, the remote device can be connected to the internet or other telecommunications network, such that data received from the movable object 23000 and/or terminal 23012 can be uploaded to a website or server.

Figure 24:
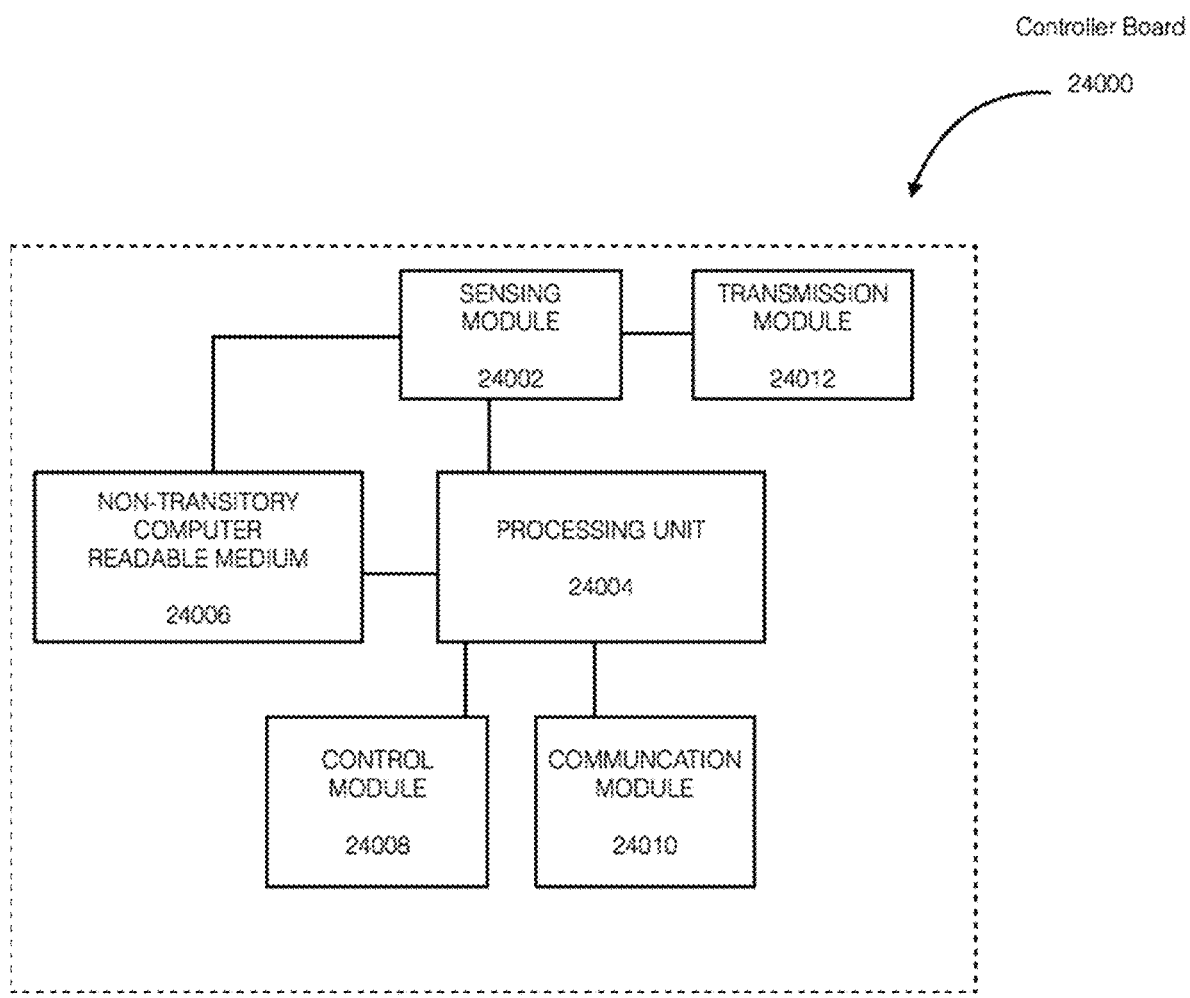
FIG. 24 is a schematic illustration by way of block diagram of a system for controlling a movable object, in accordance with embodiments.

FIG. 24 is a schematic illustration by way of block diagram of a controller board 24000 for controlling a movable object, in accordance with embodiments. The controller board 24000 can be used in combination with any suitable embodiment of the systems, devices, and methods disclosed herein. The controller board 24000 can include a sensing module 24002, processing unit 24004, non-transitory computer readable medium 24006, control module 24008, and communication module 24010. The controller board 2400 for controlling a movable object (e.g. a UAV) may be in direct simultaneous communication with the CESS 60 and motor drivers of the movable object 19100. The benefit of simultaneous direct communication of controller board 2400 with the CESS 60 and motor drivers of the movable object 19100 is to minimize feedback lag of power electronics control loop in CESC (see FIG. 10A-10I), which promotes voltage stability. Voltage stability is improved by simultaneously matching CESC power output to power demand of motor drivers during operation of the movable object.

The sensing module 24002 can utilize different types of sensors that collect information relating to the movable object in different ways. Different types of sensors may sense different types of signals or signals from different sources. For example, the sensors can include inertial sensors, GPS sensors, proximity sensors (e.g. LIDAR), or vision/image sensors (e.g. a camera). The sensing module 24002 can be operatively coupled to a processing unit 24004 having a plurality of processors. In some embodiments, the sensing module can be operatively coupled to a transmission module 24012 (e.g. a wireless internet communication or the like image transmission module) configured to directly transmit sensing data to a suitable external device or system. For example, the transmission module 24012 can be used to transmit images captured by a camera of the sensing module 24002 to a remote terminal.

The processing unit 24004 can have one or more processors, such as a programmable processor (e.g. a central processing unit (CPU)). The processing unit 24004 can be operatively coupled to a non-transitory computer readable medium 24006. The non-transitory computer readable medium 24006 can store logic, code, and/or program instructions executable by the processing unit 24004 for performing one or more steps. The non-transitory computer readable medium can include one or more memory units (e.g. removable media or external storage such as an SD card or random access memory (RAM)). In some embodiments, data from the sensing module 24002 can be directly conveyed to and stored within the memory units of the non-transitory computer readable medium 24006. The memory units of the non-transitory computer readable medium 24006 can store logic, code and/or program instructions executable by the processing unit 24004 to perform any suitable embodiment of the methods described herein. For example, the processing unit 24004 can be configured to execute instructions causing one or more processors of the processing unit 24004 to analyze sensing data produced by the sensing module. The memory units can store sensing data from the sensing module to be processed by the processing unit 24004. In some embodiments, the memory units of the non-transitory computer readable medium 24006 can be used to store the processing results produced by the processing unit 24004.

In some embodiments, the processing unit 24004 can be operatively coupled to a control module 24008 configured to control a state of the movable object. For example, the control module 24008 can be configured to control the propulsion mechanisms of the movable object to adjust the spatial disposition, velocity, and/or acceleration of the movable object with respect to six degrees of freedom. Alternatively, or in combination, the control module 24008 can control one or more of a state of a carrier, payload, or sensing module.

The processing unit 24004 can be operatively coupled to a communication module 24010 configured to transmit and receive data from one or more external devices (e.g. a terminal, display device, or other remote controller). Any suitable means of communication can be used, such as wired communication or wireless communication. For example, the communication module 24010 can utilize one or more of local area networks (LAN), wide area networks (WAN), infrared, radio, wireless internet communication or the like, point-to-point (P2P) networks, telecommunication networks, cloud communication, and the like. Optionally, relay stations, such as towers, satellites, or mobile stations, can be used. wireless communications can be proximity dependent or proximity independent. In some embodiments, line-of-sight may or may not be required for communications. The communication module 24010 can transmit and/or receive one or more of sensing data from the sensing module 24002, processing results produced by the processing unit 24004, predetermined control data, user commands from a terminal or remote controller, and the like.

The components of the controller board 24000 can be arranged in any suitable configuration. For example, one or more of the components of the controller board 24000 can be located on the movable object, carrier, payload, terminal, sensing system, or any additional external device in communication with one or more of the above. Additionally, although FIG. 24 depicts a single processing unit 24004 and a single non-transitory computer readable medium 24006, one of skill in the art would appreciate that this is not intended to be limiting, and that the controller board 24000 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the controller board 24000 can occur at one or more of the aforementioned locations.

While the above is a complete description of the preferred embodiment of the present invention, it is possible to use various alternatives, modifications and equivalents. Therefore, the scope of the present disclosure should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. As used herein, in a listing of elements in the alternative, the word "or" is used in the logical inclusive sense, e.g., "X or Y" covers X alone, Y alone, or both X and Y together, except where expressly stated otherwise. Two or more elements listed as alternatives may be combined together. The appended claims are not to be interpreted as including means-plus-function limitations, unless such a limitation is explicitly recited in a given claim using the phrase "means for."

What is claimed is:

1. An unmanned aerial vehicle (UAV), comprising:
one or more propulsion mechanisms;
a capacitor energy storage system configured to at least temporarily discharge power to the one or more propulsion mechanisms;
a controller board configured to control the one or more propulsion mechanisms and to power on and off the capacitor energy storage system;
wherein the capacitor energy storage system includes one or more metacapacitors, wherein each of the one or more metacapacitors includes a first electrode and a second electrode separated by a layer of metadielectric material with a relative permittivity greater than or equal to 1000 Coulombs$^2$/(Newton-meter$^2$) and a resistivity between $10^{15}$ SI cm and $10^{24}$ Ω cm; and
wherein the layer of metadielectric material includes supramolecular structures of polarizable compounds, and said supramolecular structures of polarizable compounds are comprised of composite organic molecules with at least one enhanced polarizable fragment, and electrically resistive substituents that reduce the electrical interaction of the enhanced polarizable fragments from other supramolecular structures of polarizable compounds in said metadielectric material and said metadielectric material has a resistivity between $10^{15}$ Ω·cm and $10^{24}$ Ω·cm.

2. The UAV according to claim 1, wherein the capacitor energy storage system includes one or more metacapacitors.

3. The UAV of claim 1, wherein the capacitor energy storage system includes:
at least one capacitor energy storage module (CESM), wherein each one of the at least one CESM includes one or more individual capacitor energy storage cells having anodes and cathodes and an interconnection system, wherein each of the one or more individual capacitor energy storage cells includes at least one capacitor energy storage device and a DC-voltage conversion device, wherein the capacitor energy storage device comprises one or more metacapacitors, wherein the output voltage of the capacitor energy storage device is an input voltage of the DC-voltage conversion device during discharging the capacitor energy storage device, wherein the input voltage of the capacitor energy storage device is an output voltage of the DC-voltage conversion device while charging the capacitor energy storage device;
an interconnection system coupled to the one or more capacitor energy storage modules, wherein the interconnection system connects the anodes and cathodes of the individual energy storage cells to create a common anode and common cathode of the capacitor energy storage module, wherein each individual capacitor energy storage cell includes one or more metacapacitors coupled to a DC-voltage conversion device; and
a power interconnection system and a system controller coupled to the one or more capacitive energy storage modules, through which the capacitor energy storage system discharges to power the device.

4. The UAV of claim 3, wherein the interconnection system of the capacitor energy storage module includes a parameter bus connected to the one or more individual capacitor energy storage cells by power switches; and wherein the capacitor energy storage module of further comprising a power meter coupled to the one or more individual capacitor energy storage cells.

5. The UAV of claim 3 further comprising a networked control node coupled to the one or more individual capacitor energy storage cells.

6. The UAV of claim 3, wherein the system controller includes a deterministic controller, an asynchronous controller, or a controller having distributed clock, an electronic switch and an input device configured to receive a user input, the electronic switch being electrically connected to the at least one CESM for controlling discharge of power from the capacitor energy storage system to the one or more mocw propulsion mechanisms, the input device electrically connected to the electronic switch for controlling a switch-on or a switch-off state of the electronic switch.

7. The UAV of claim 3, wherein the capacitive energy storage cells (CESCs) are configured to be replaceable and charged by power from a DC power generation system or an AC power source and to be discharged to supply power to said unmanned aerial vehicle and its systems, wherein each individual CESC includes at least one capacitive energy storage device (CESD) coupled to a DC-voltage conversion device, wherein each individual CESC includes a control board to stabilize output voltage of the DC-conversion device and to control the charging and discharging of the CESD, wherein the CESD comprises one or more metacapacitors.

8. The UAV of claim 3, wherein the capacitor energy storage system includes two different configurations of CESM, wherein a first configuration of CESM includes a CESC adapted for constant speed operation of the UAV, and a second configuration of CESM includes a CESC adapted for acceleration operation of the UAV.

9. The UAV of claim 1, wherein the metadielectric material has a breakdown field ($E_{bd}$) strength between 0.01 V/nm and 2.0 V/nm.

10. The UAV of claim 1, wherein the electrically resistive substituents are alkyl and perhaloalkyl $C_{3-50}$ chains or fused polycyclic alkyl or partially halogenated alkyl or perhalo alkyl groups, wherein the resistive substituents are longer than 3 nm in one direction.

11. The UAV of claim 1, wherein polarization may include non-linear polarization, hyperpolarization, ionic polarization, electronic polarization, any combination thereof; and wherein hyperpolarizablity and non-linear polarization effects are enhanced due to non-symmetrical positioning of at least 1 electrophilic group, at least 1 nucleophilic group, at least one conjugated rings system fragment, at least one ionic substituent, any combination thereof.

12. The UAV of claim 11, wherein the enhanced polarizable fragments include rylene fragments, naphthalene fragments, anthracene fragments, chromophores, tictoids, zwitterion substituents, ionic liquid substituents, Sharp polymers, Furuta co-polymers, para-Furuta polymers, or any combination thereof.

13. A UAV of claim 1, wherein the supramolecular structures of polarizable compounds include liquid crystal derived structures.

14. The UAV of claim 13, wherein the liquid crystal derived structures include nematic type structures, chematic type structures, chiral nematic type structures, lyotropic type structures or any combination thereof.

15. The UAV of claim 14, wherein the liquid crystal derived structures include lyotropic type structures, wherein the lyotropic type structures are lamellar and micelle structures.

16. The UAV of claim 1, wherein charge is measured by voltage of the capacitor energy storage device.

17. The UAV of claim 1, wherein a device to be powered includes a propulsion unit of the unmanned aerial vehicle.

18. The UAV of claim 17, wherein the propulsion unit includes at least one rotor with rotatable blades, an equivalent number of motor drivers and motors; and
- wherein the capacitor energy storage system energizes the motor to cause rotation of the rotor including the blades, thereby generating a lift for the unmanned vehicle; and
- wherein the at least one motor driver and motor are controlled by said controller board; and
- wherein the capacitor energy storage system is configured to store sufficient energy for the UAV to fly for at least about 10 minutes without recharging.

19. The UAV of claim 17, wherein the unmanned vehicle is configured to bear and deploy a payload weighing at least 0.25 kg; and
- wherein the said payload is configured to be electrically connected to the capacitor energy storage system; and
- wherein the capacitor energy storage system is configured to store sufficient energy for the UAV to fly for a minimum of 10 minutes or more of flight time on a full charge.

20. The UAV of claim 17 further comprising a power generation system electrically connected to the capacitor energy storage system and capable of charging said capacitor energy storage system or directly powering said unmanned vehicle.

* * * * *